US008964623B2

(12) United States Patent
Ko et al.

(10) Patent No.: US 8,964,623 B2
(45) Date of Patent: Feb. 24, 2015

(54) TRANSMISSION METHOD OF DOWNLINK REFERENCE SIGNAL AND APPARATUS THEREOF

(75) Inventors: Hyun Soo Ko, Anyang-si (KR); Bin Chul Ihm, Anyang-si (KR); Sung Ho Park, Anyang-si (KR); Young Seob Lee, Anyang-si (KR); Seung Hyun Kang, Anyang-si (KR); Ja Ho Koo, Anyang-si (KR); Su Nam Kim, Anyang-si (KR); Wook Bong Lee, Anyang-si (KR); Jin Young Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 566 days.

(21) Appl. No.: 13/263,334

(22) PCT Filed: Apr. 12, 2010

(86) PCT No.: PCT/KR2010/002241

§ 371 (c)(1),
(2), (4) Date: Oct. 6, 2011

(87) PCT Pub. No.: WO2010/117251

PCT Pub. Date: Oct. 14, 2010

(65) Prior Publication Data

US 2012/0039287 A1 Feb. 16, 2012

Related U.S. Application Data

(60) Provisional application No. 61/168,234, filed on Apr. 10, 2009, provisional application No. 61/168,235, filed on Apr. 10, 2009, provisional application No. 61/168,236, filed on Apr. 10, 2009, provisional application No. 61/172,764, filed on Apr. 26, 2009, provisional application No. 61/172,782, filed on Apr. 26, 2009.

(30) Foreign Application Priority Data

| | | |
|---|---|---|
| Apr. 9, 2010 | (KR) | 10-2010-0032590 |
| Apr. 9, 2010 | (KR) | 10-2010-0032591 |
| Apr. 9, 2010 | (KR) | 10-2010-0032592 |
| Apr. 9, 2010 | (KR) | 10-2010-0032593 |
| Apr. 9, 2010 | (KR) | 10-2010-0032594 |

(51) Int. Cl.
*H04W 4/00* (2009.01)
*H04L 5/00* (2006.01)

(52) U.S. Cl.
CPC .................................... *H04L 5/0053* (2013.01)
USPC ........... 370/314; 370/326; 370/330; 370/344; 370/350; 370/436; 370/479; 370/480; 370/509

(58) Field of Classification Search
USPC ........... 370/31, 324, 326, 330, 344, 350, 436, 370/479, 480, 509, 510, 512, 514
See application file for complete search history.

(56) References Cited

U.S. PATENT DOCUMENTS

2008/0049668 A1 * 2/2008 Kakura et al. ................ 370/329
2008/0080560 A1 4/2008 Inoue et al.

FOREIGN PATENT DOCUMENTS

KR 1020080033060 4/2008
KR 1020080036939 4/2008
KR 1020080054164 6/2008

*Primary Examiner* — Alvin Zhu

(74) *Attorney, Agent, or Firm* — Lee, Hong, Degerman, Kang & Waimey

(57) ABSTRACT

The present invention relates to a wireless communication system, and provides a method and an apparatus for transmitting a downlink reference signal in the wireless communication system. The method for enabling a base station to transmit the reference signal to a terminal using layers of 8 or less in accordance with one embodiment of the present invention comprises the steps of: transmitting data for the layers of 8 or less through a data domain of a downlink sub frame; and transmitting a reference signal for the layers of 8 or less on a fixed OFDM symbol of the downlink sub frame, wherein the reference signal is a DRS (Dedicated Reference Signal) which demodulates the data for the layers of 8 or less, and the reference signal for the layers of 8 or less is separated into 1st and 2nd groups, and reference signals of the 1st and 2nd groups can be multiplexed in a CDM (Code Division Multiplexing) method on one resource element, respectively.

12 Claims, 82 Drawing Sheets

| F \ T | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | A | | | | | | | A | A | |
| 1 | | | | | | | | | | | | | | |
| 2 | | | | | | | | | | | | | | |
| 3 | | | | | | | | A | A | | | | | |
| 4 | | | | | | | | | | | | | | |
| 5 | | | | | | | | | | | | | | |
| 6 | | | | | | | | | | | | | | |
| 7 | | | | | | | | A | A | | | | | |
| 8 | | | | | | | | | | | | | | |
| 9 | | | | | | | | | | | | | | |
| 10 | | | | A | A | | | | | | | A | A | |
| 11 | | | | | | | | | | | | | | |

(1)

| F \ T | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | A | A | | | | | | | A | A | |
| 2 | | | | | | | | | | | | | | |
| 3 | | | | | | | | | | | | | | |
| 4 | | | | | | | | A | A | | | | | |
| 5 | | | | | | | | | | | | | | |
| 6 | | | | | | | | | | | | | | |
| 7 | | | | | | | | A | A | | | | | |
| 8 | | | | | | | | | | | | | | |
| 9 | | | | | | | | | | | | | | |
| 10 | | | | A | A | | | | | | | A | A | |
| 11 | | | | | | | | | | | | | | |

(2)

| F \ T | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | A | | | | | | | A | A | |
| 1 | | | | | | | | | | | | | | |
| 2 | | | | | | | | | | | | | | |
| 3 | | | | A | A | | | | | | | A | A | |
| 4 | | | | | | | | | | | | | | |
| 5 | | | | | | | | | | | | | | |
| 6 | | | | | | | | | | | | | | |
| 7 | | | | A | A | | | | | | | A | A | |
| 8 | | | | | | | | | | | | | | |
| 9 | | | | | | | | | | | | | | |
| 10 | | | | A | A | | | | | | | A | A | |
| 11 | | | | | | | | | | | | | | |

(3)

| F \ T | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | A | A | | | | | | | A | A | |
| 2 | | | | | | | | | | | | | | |
| 3 | | | | | | | | | | | | | | |
| 4 | | | | A | A | | | | | | | A | A | |
| 5 | | | | | | | | | | | | | | |
| 6 | | | | | | | | | | | | | | |
| 7 | | | | A | A | | | | | | | A | A | |
| 8 | | | | | | | | | | | | | | |
| 9 | | | | | | | | | | | | | | |
| 10 | | | | A | A | | | | | | | A | A | |
| 11 | | | | | | | | | | | | | | |

| T / F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | A | | | |
| 1 | | | | A | | | | | | | A | | | |
| 2 | | | | A | | | | | | | A | | | |
| 3 | | | | | | | | | | | | | | |
| 4 | | | | | | | | | | | | | | |
| 5 | | | | | | | | | | | | | | |
| 6 | | | | | | | | | | | | | | |
| 7 | | | | | | | | | | | | | | |
| 8 | | | | | | | | | | | | | | |
| 9 | | | | A | | | | | | | A | | | |
| 10 | | | | A | | | | | | | A | | | |
| 11 | | | | A | | | | | | | A | | | |

(5)

| T / F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | B | | | |
| 1 | | | | B | | | | | | | A | | | |
| 2 | | | | A | | | | | | | B | | | |
| 3 | | | | | | | | | | | | | | |
| 4 | | | | | | | | | | | | | | |
| 5 | | | | | | | | | | | | | | |
| 6 | | | | | | | | | | | | | | |
| 7 | | | | | | | | | | | | | | |
| 8 | | | | | | | | | | | | | | |
| 9 | | | | B | | | | | | | A | | | |
| 10 | | | | A | | | | | | | B | | | |
| 11 | | | | B | | | | | | | A | | | |

(6)

| T / F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | E~H | | | | | B | | | C |
| 1 | | | | B | | | | | | | A | | | D |
| 2 | | | | A | | | | | | | B | | | |
| 3 | | | | | | | | | | | | | | E~H |
| 4 | | | | | | C | | | | | | | | |
| 5 | | | | | | D | | | | | | | | |
| 6 | | | | | | | | | | | | | | |
| 7 | | | | | | E~H | | | | | | | | C |
| 8 | | | | | | | | | | | | | | D |
| 9 | | | | B | | | | | | | A | | | |
| 10 | | | | A | | C | | | | | B | | | E~H |
| 11 | | | | B | | D | | | | | A | | | |

(7)

| T / F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | B | | | C/E/G |
| 1 | | | | B | | | | | | | A | | | D/F/H |
| 2 | | | | A | | C/E/G | | | | | B | | | |
| 3 | | | | | | D/F/H | | | | | | | | |
| 4 | | | | | | | | | | | | | | C/E/G |
| 5 | | | | | | | | | | | | | | D/F/H |
| 6 | | | | | | C/E/G | | | | | | | | |
| 7 | | | | | | D/F/H | | | | | | | | |
| 8 | | | | | | | | | | | | | | C/E/G |
| 9 | | | | B | | | | | | | A | | | D/F/H |
| 10 | | | | A | | C/E/G | | | | | B | | | |
| 11 | | | | B | | D/F/H | | | | | A | | | |

| T/F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | A | | | |
| 1 | | | | A | | | | | | | A | | | |
| 2 | | | | | | | | | | | | | | |
| 3 | | | | | | | | | | | | | | |
| 4 | | | | | | | | | | | | | | |
| 5 | | | | A | | | | | | | A | | | |
| 6 | | | | A | | | | | | | A | | | |
| 7 | | | | | | | | | | | | | | |
| 8 | | | | | | | | | | | | | | |
| 9 | | | | | | | | | | | | | | |
| 10 | | | | A | | | | | | | A | | | |
| 11 | | | | A | | | | | | | A | | | |

(5)

| T/F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | B | | | |
| 1 | | | | B | | | | | | | A | | | |
| 2 | | | | | | | | | | | | | | |
| 3 | | | | | | | | | | | | | | |
| 4 | | | | | | | | | | | | | | |
| 5 | | | | A | | | | | | | B | | | |
| 6 | | | | B | | | | | | | A | | | |
| 7 | | | | | | | | | | | | | | |
| 8 | | | | | | | | | | | | | | |
| 9 | | | | | | | | | | | | | | |
| 10 | | | | A | | | | | | | B | | | |
| 11 | | | | B | | | | | | | A | | | |

(6)

| T/F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | E~H | | | | | B | | | C |
| 1 | | | | B | | | | | | | A | | | D |
| 2 | | | | | | | | | | | | | | |
| 3 | | | | | | | | | | | | | | E~H |
| 4 | | | | | | C | | | | | | | | |
| 5 | | | | A | | D | | | | | B | | | |
| 6 | | | | B | | | | | | | A | | | |
| 7 | | | | | | E~H | | | | | | | | C |
| 8 | | | | | | | | | | | | | | D |
| 9 | | | | | | | | | | | | | | |
| 10 | | | | A | | C | | | | | B | | | E~H |
| 11 | | | | B | | D | | | | | A | | | |

(7)

| T/F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | B | | | C/E/G |
| 1 | | | | B | | | | | | | A | | | D/F/H |
| 2 | | | | | | C/E/G | | | | | | | | |
| 3 | | | | | | D/F/H | | | | | | | | |
| 4 | | | | | | | | | | | | | | C/E/G |
| 5 | | | | A | | | | | | | B | | | D/F/H |
| 6 | | | | B | | C/E/G | | | | | A | | | |
| 7 | | | | | | D/F/H | | | | | | | | |
| 8 | | | | | | | | | | | | | | C/E/G |
| 9 | | | | | | | | | | | | | | D/F/H |
| 10 | | | | A | | C/E/G | | | | | B | | | |
| 11 | | | | B | | D/F/H | | | | | A | | | |

| F \ T | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | A | | | |
| 1 | | | | A | | | | | | | A | | | |
| 2 | | | | | | | | | | | | | | |
| 3 | | | | | | | | | | | | | | |
| 4 | | | | | | | | | | | | | | |
| 5 | | | | | | A | | | A | | | | | |
| 6 | | | | | | A | | | A | | | | | |
| 7 | | | | | | | | | | | | | | |
| 8 | | | | | | | | | | | | | | |
| 9 | | | | | | | | | | | | | | |
| 10 | | | | A | | | | | | | A | | | |
| 11 | | | | A | | | | | | | A | | | |

(1)

| F \ T | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | B | | | |
| 1 | | | | B | | | | | | | A | | | |
| 2 | | | | | | | | | | | | | | |
| 3 | | | | | | | | | | | | | | |
| 4 | | | | | | | | | | | | | | |
| 5 | | | | | | A | | | B | | | | | |
| 6 | | | | | | B | | | A | | | | | |
| 7 | | | | | | | | | | | | | | |
| 8 | | | | | | | | | | | | | | |
| 9 | | | | | | | | | | | | | | |
| 10 | | | | A | | | | | | | B | | | |
| 11 | | | | B | | | | | | | A | | | |

(2)

| F \ T | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | E~H | | | | B | | C | |
| 1 | | | | B | | | | | | | A | | D | |
| 2 | | | | | | | | | | | | | | |
| 3 | | | | | | | | | | | | | E~H | |
| 4 | | | | | | | C | | | | | | | |
| 5 | | | | | | A | D | | B | | | | | |
| 6 | | | | | | B | | | A | | | | | |
| 7 | | | | | | | E~H | | | | | | C | |
| 8 | | | | | | | | | | | | | D | |
| 9 | | | | | | | | | | | | | | |
| 10 | | | | A | | | C | | | | B | | E~H | |
| 11 | | | | B | | | D | | | | A | | | |

(3)

| F \ T | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | B | | C/E/G | |
| 1 | | | | B | | | | | | | A | | D/F/H | |
| 2 | | | | | | | C/E/G | | | | | | | |
| 3 | | | | | | | D/F/H | | | | | | | |
| 4 | | | | | | | | | | | | | C/E/G | |
| 5 | | | | | | A | | | B | | | | D/F/H | |
| 6 | | | | | | B | C/E/G | | A | | | | | |
| 7 | | | | | | | D/F/H | | | | | | | |
| 8 | | | | | | | | | | | | | C/E/G | |
| 9 | | | | | | | | | | | | | D/F/H | |
| 10 | | | | A | | | C/E/G | | | | B | | | |
| 11 | | | | B | | | D/F/H | | | | A | | | |

| T / F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | A | | | | | | | | |
| 1 | | | | | | | | | | | | | | |
| 2 | | | | | | | | | | | | | | |
| 3 | | | | | | | | | | | A | | A | |
| 4 | | | | A | | A | | | | | | | | |
| 5 | | | | | | | | | | | | | | |
| 6 | | | | | | | | | | | | | | |
| 7 | | | | | | | | | | | A | | A | |
| 8 | | | | A | | A | | | | | | | | |
| 9 | | | | | | | | | | | | | | |
| 10 | | | | | | | | | | | | | | |
| 11 | | | | | | | | | | | A | | A | |

(1)

| T / F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | B | | | | | | | | |
| 1 | | | | | | | | | | | | | | |
| 2 | | | | | | | | | | | | | | |
| 3 | | | | | | | | | | | A | | B | |
| 4 | | | | A | | B | | | | | | | | |
| 5 | | | | | | | | | | | | | | |
| 6 | | | | | | | | | | | | | | |
| 7 | | | | | | | | | | | A | | B | |
| 8 | | | | A | | B | | | | | | | | |
| 9 | | | | | | | | | | | | | | |
| 10 | | | | | | | | | | | | | | |
| 11 | | | | | | | | | | | A | | B | |

(2)

| T / F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | B | E~H | | | C | | | | |
| 1 | | | | | | | | | | D | | | | |
| 2 | | | | | | | | | | | | | | |
| 3 | | | | | | | | | | E~H | A | | B | |
| 4 | | | | A | | B | C | | | | | | | |
| 5 | | | | | | | D | | | | | | | |
| 6 | | | | | | | | | | | | | | |
| 7 | | | | | | | E~H | | | C | A | | B | |
| 8 | | | | A | | B | | | | D | | | | |
| 9 | | | | | | | | | | | | | | |
| 10 | | | | | | | C | | | E~H | | | | |
| 11 | | | | | | | D | | | | A | | B | |

(3)

| T / F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | B | | | | C/E/G | | | | |
| 1 | | | | | | | | | | D/F/H | | | | |
| 2 | | | | | | | C/E/G | | | | | | | |
| 3 | | | | | | | D/F/H | | | | A | | B | |
| 4 | | | | A | | B | | | | C/E/G | | | | |
| 5 | | | | | | | | | | D/F/H | | | | |
| 6 | | | | | | | C/E/G | | | | | | | |
| 7 | | | | | | | D/F/H | | | | A | | B | |
| 8 | | | | A | | B | | | | C/E/G | | | | |
| 9 | | | | | | | | | | D/F/H | | | | |
| 10 | | | | | | | C/E/G | | | | | | | |
| 11 | | | | | | | D/F/H | | | | A | | B | |

| l / k | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | A | | | | | | | | |
| 1 | | | | | | | | | | | | | | |
| 2 | | | | | | | | | | | | | | |
| 3 | | | | | | | | | | | A | | | A |
| 4 | | | | A | | A | | | | | | | | |
| 5 | | | | | | | | | | | | | | |
| 6 | | | | | | | | | | | | | | |
| 7 | | | | | | | | | | | A | | | A |
| 8 | | | | A | | A | | | | | | | | |
| 9 | | | | | | | | | | | | | | |
| 10 | | | | | | | | | | | | | | |
| 11 | | | | | | | | | | | A | | | A |

(5)

| l / k | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | B | | | | | | | | |
| 1 | | | | | | | | | | | | | | |
| 2 | | | | | | | | | | | | | | |
| 3 | | | | | | | | | | | A | | | B |
| 4 | | | | A | | B | | | | | | | | |
| 5 | | | | | | | | | | | | | | |
| 6 | | | | | | | | | | | | | | |
| 7 | | | | | | | | | | | A | | | B |
| 8 | | | | A | | B | | | | | | | | |
| 9 | | | | | | | | | | | | | | |
| 10 | | | | | | | | | | | | | | |
| 11 | | | | | | | | | | | A | | | B |

(6)

| l / k | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | B | E~H | | | C | | | | |
| 1 | | | | | | | | | | D | | | | |
| 2 | | | | | | | | | | | | | | |
| 3 | | | | | | | | | | E~H | A | | | B |
| 4 | | | | A | | B | C | | | | | | | |
| 5 | | | | | | | D | | | | | | | |
| 6 | | | | | | | | | | | | | | |
| 7 | | | | | | | E~H | | | C | A | | | B |
| 8 | | | | A | | B | | | | D | | | | |
| 9 | | | | | | | | | | | | | | |
| 10 | | | | | | | C | | | E~H | | | | |
| 11 | | | | | | | D | | | | A | | | B |

(7)

| l / k | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | B | | | | C/E/G | | | | |
| 1 | | | | | | | | | | D/F/H | | | | |
| 2 | | | | | | | C/E/G | | | | | | | |
| 3 | | | | | | | D/F/H | | | | A | | | B |
| 4 | | | | A | | B | | | | C/E/G | | | | |
| 5 | | | | | | | | | | D/F/H | | | | |
| 6 | | | | | | | C/E/G | | | | | | | |
| 7 | | | | | | | D/F/H | | | | A | | | B |
| 8 | | | | A | | B | | | | C/E/G | | | | |
| 9 | | | | | | | | | | D/F/H | | | | |
| 10 | | | | | | | C/E/G | | | | | | | |
| 11 | | | | | | | D/F/H | | | | A | | | B |

| T / F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | A | | | |
| 1 | | | | | | | | | | | | | | |
| 2 | | | | | | | | | | | | | | |
| 3 | | | | | | A | | | | | | | | A |
| 4 | | | | | | | | | | | | | | |
| 5 | | | | | | | | | | | | | | |
| 6 | | | | A | | | | | | | A | | | |
| 7 | | | | | | | | | | | | | | |
| 8 | | | | | | | | | | | | | | |
| 9 | | | | | | A | | | | | | | | A |
| 10 | | | | | | | | | | | | | | |
| 11 | | | | | | | | | | | | | | |

(5)

| T / F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | A | | | B |
| 1 | | | | | | | | | | | | | | |
| 2 | | | | | | | | | | | | | | |
| 3 | | | | B | | A | | | | | | | | A |
| 4 | | | | | | | | | | | | | | |
| 5 | | | | | | | | | | | | | | |
| 6 | | | | A | | | | | | | A | | | B |
| 7 | | | | | | | | | | | | | | |
| 8 | | | | | | | | | | | | | | |
| 9 | | | | B | | A | | | | | | | | A |
| 10 | | | | | | | | | | | | | | |
| 11 | | | | | | | | | | | | | | |

(6)

| T / F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | E~H | | | C | A | | | B |
| 1 | | | | | | | | | | D | | | | |
| 2 | | | | | | | | | | | | | | |
| 3 | | | | B | | A | | | | E~H | | | | A |
| 4 | | | | | | | C | | | | | | | |
| 5 | | | | | | | D | | | | | | | |
| 6 | | | | A | | | | | | | A | | | B |
| 7 | | | | | | | E~H | | | C | | | | |
| 8 | | | | | | | | | | D | | | | |
| 9 | | | | B | | A | | | | | | | | A |
| 10 | | | | | | | C | | | E~H | | | | |
| 11 | | | | | | | D | | | | | | | |

(7)

| T / F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | C/E/G | A | | | B |
| 1 | | | | | | | | | | D/F/H | | | | |
| 2 | | | | | | | C/E/G | | | | | | | |
| 3 | | | | B | | A | D/F/H | | | | | | | A |
| 4 | | | | | | | | | | C/E/G | | | | |
| 5 | | | | | | | | | | D/F/H | | | | |
| 6 | | | | A | | | C/E/G | | | | A | | | B |
| 7 | | | | | | | D/F/H | | | | | | | |
| 8 | | | | | | | | | | C/E/G | | | | |
| 9 | | | | B | | A | | | | D/F/H | | | | A |
| 10 | | | | | | | C/E/G | | | | | | | |
| 11 | | | | | | | D/F/H | | | | | | | |

| F \ T | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | | | | A |
| 1 | | | | | | | | | | | | | | |
| 2 | | | | | | | | | | | | | | |
| 3 | | | | | | | A | | | | | | | |
| 4 | | | | | | | | | | | | | | |
| 5 | | | | | | | | | | | | | | |
| 6 | | | | | | | | | | A | | | | |
| 7 | | | | | | | | | | | | | | |
| 8 | | | | | | | | | | | | | | |
| 9 | | | | A | | | | | | | | | | A |
| 10 | | | | | | | | | | | | | | |
| 11 | | | | | | | | | | | | | | |

(5)

| F \ T | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | B | | | | | B | | | A |
| 1 | | | | | | | | | | | | | | |
| 2 | | | | | | | | | | | | | | |
| 3 | | | | | | | A | | | B | | | | |
| 4 | | | | | | | | | | | | | | |
| 5 | | | | | | | | | | | | | | |
| 6 | | | | | | | B | | | A | | | | |
| 7 | | | | | | | | | | | | | | |
| 8 | | | | | | | | | | | | | | |
| 9 | | | | A | | B | | | | | B | | | A |
| 10 | | | | | | | | | | | | | | |
| 11 | | | | | | | | | | | | | | |

(6)

| F \ T | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | B | C~H | | | C~H | B | | | A |
| 1 | | | | | | | | | | | | | | |
| 2 | | | | | | | | | | | | | | |
| 3 | | | | C~H | | | A | | | B | | | | C~H |
| 4 | | | | | | | | | | | | | | |
| 5 | | | | | | | | | | | | | | |
| 6 | | | | C~H | | | B | | | A | | | | C~H |
| 7 | | | | | | | | | | | | | | |
| 8 | | | | | | | | | | | | | | |
| 9 | | | | A | | B | C~H | | | C~H | B | | | A |
| 10 | | | | | | | | | | | | | | |
| 11 | | | | | | | | | | | | | | |

(7)

| F \ T | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | B | C~E | | | F~H | B | | | A |
| 1 | | | | | | | | | | | | | | |
| 2 | | | | | | | | | | | | | | |
| 3 | | | | C~E | | | A | | | B | | | | F~H |
| 4 | | | | | | | | | | | | | | |
| 5 | | | | | | | | | | | | | | |
| 6 | | | | C~E | | | B | | | A | | | | F~H |
| 7 | | | | | | | | | | | | | | |
| 8 | | | | | | | | | | | | | | |
| 9 | | | | A | | B | C~E | | | F~H | B | | | A |
| 10 | | | | | | | | | | | | | | |
| 11 | | | | | | | | | | | | | | |

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | | | A | |
| 1 | | | | | | | | | | | | | | |
| 2 | | | | | | | | | | | | | | |
| 3 | | | | | | | A | | | | | | | |
| 4 | | | | | | | | | | | | | | |
| 5 | | | | | | | | | | | | | | |
| 6 | | | | | | | | | | A | | | | |
| 7 | | | | | | | | | | | | | | |
| 8 | | | | | | | | | | | | | | |
| 9 | | | | A | | | | | | | | | A | |
| 10 | | | | | | | | | | | | | | |
| 11 | | | | | | | | | | | | | | |

(6)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A/B | | | | | | | | | A/B | |
| 1 | | | | | | | | | | | | | | |
| 2 | | | | | | | | | | | | | | |
| 3 | | | | | | | A/B | | | | | | | |
| 4 | | | | | | | | | | | | | | |
| 5 | | | | | | | | | | | | | | |
| 6 | | | | | | | | | | A/B | | | | |
| 7 | | | | | | | | | | | | | | |
| 8 | | | | | | | | | | | | | | |
| 9 | | | | A/B | | | | | | | | | A/B | |
| 10 | | | | | | | | | | | | | | |
| 11 | | | | | | | | | | | | | | |

(7)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A/B | | E-H | | | | | C | | | A/B |
| 1 | | | | | | | | | | | D | | | |
| 2 | | | | | | | | | | | | | | |
| 3 | | | | | | | A/B | | | | E-H | | | |
| 4 | | | | | | C | | | | | | | | |
| 5 | | | | | | D | | | | | | | | |
| 6 | | | | | | | | | | A/B | | | | |
| 7 | | | | | | E-H | | | | | C | | | |
| 8 | | | | | | | | | | | D | | | |
| 9 | | | | A/B | | | | | | | | | | A/B |
| 10 | | | | | | C | | | | | E-H | | | |
| 11 | | | | | | D | | | | | | | | |

(8)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A/B | | | | | | | C/E/G | | | A/B |
| 1 | | | | | | | | | | | D/F/H | | | |
| 2 | | | | | | C/E/G | | | | | | | | |
| 3 | | | | | | D/F/H | A/B | | | | | | | |
| 4 | | | | | | | | | | | C/E/G | | | |
| 5 | | | | | | | | | | | D/F/H | | | |
| 6 | | | | | | C/E/G | | | | A/B | | | | |
| 7 | | | | | | D/F/H | | | | | | | | |
| 8 | | | | | | | | | | | C/E/G | | | |
| 9 | | | | A/B | | | | | | | D/F/H | | | A/B |
| 10 | | | | | | C/E/G | | | | | | | | |
| 11 | | | | | | D/F/H | | | | | | | | |

(9)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A/B | | C/D | E/F | | | G/H | C/D | | | A/B |
| 1 | | | | | | | | | | | | | | |
| 2 | | | | | | | | | | | | | | |
| 3 | | | | | | G/H | A/B | | | C/D | E/F | | | |
| 4 | | | | | | | | | | | | | | |
| 5 | | | | | | | | | | | | | | |
| 6 | | | | | | E/F | C/D | | | A/B | G/H | | | |
| 7 | | | | | | | | | | | | | | |
| 8 | | | | | | | | | | | | | | |
| 9 | | | | A/B | | C/D | G/H | | | E/F | C/D | | | A/B |
| 10 | | | | | | | | | | | | | | |
| 11 | | | | | | | | | | | | | | |

| l / k | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | | | A | |
| 1 | | | | | | | | | | | | | | |
| 2 | | | | | | | | | | | | | | |
| 3 | | | | | | | A | | | | | | | |
| 4 | | | | | | | | | | | | | | |
| 5 | | | | | | | | | | | | | | |
| 6 | | | | | | | | | | A | | | | |
| 7 | | | | | | | | | | | | | | |
| 8 | | | | | | | | | | | | | | |
| 9 | | | | A | | | | | | | | | A | |
| 10 | | | | | | | | | | | | | | |
| 11 | | | | | | | | | | | | | | |

(1)

| l / k | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A/B | | | | | | | | | A/B | |
| 1 | | | | | | | | | | | | | | |
| 2 | | | | | | | | | | | | | | |
| 3 | | | | | | | A | | | B | | | | |
| 4 | | | | | | | | | | | | | | |
| 5 | | | | | | | | | | | | | | |
| 6 | | | | | | | B | | | A | | | | |
| 7 | | | | | | | | | | | | | | |
| 8 | | | | | | | | | | | | | | |
| 9 | | | | A/B | | | | | | | | | A/B | |
| 10 | | | | | | | | | | | | | | |
| 11 | | | | | | | | | | | | | | |

(2)

| l / k | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A/B | | E~H | | | | | C | | A/B | |
| 1 | | | | | | | | | | | D | | | |
| 2 | | | | | | | | | | | | | | |
| 3 | | | | | | | A | | | B | E~H | | | |
| 4 | | | | | | C | | | | | | | | |
| 5 | | | | | | D | | | | | | | | |
| 6 | | | | | | | B | | | A | | | | |
| 7 | | | | | | E~H | | | | | C | | | |
| 8 | | | | | | | | | | | D | | | |
| 9 | | | | A/B | | | | | | | | | A/B | |
| 10 | | | | | | C | | | | | E~H | | | |
| 11 | | | | | | D | | | | | | | | |

(3)

| l / k | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A/B | | | | | | | C/E/G | | A/B | |
| 1 | | | | | | | | | | | D/F/H | | | |
| 2 | | | | | | C/E/G | | | | | | | | |
| 3 | | | | | | D/F/H | A | | | B | | | | |
| 4 | | | | | | | | | | | C/E/G | | | |
| 5 | | | | | | | | | | | D/F/H | | | |
| 6 | | | | | | C/E/G | B | | | A | | | | |
| 7 | | | | | | D/F/H | | | | | | | | |
| 8 | | | | | | | | | | | C/E/G | | | |
| 9 | | | | A/B | | | | | | | D/F/H | | A/B | |
| 10 | | | | | | C/E/G | | | | | | | | |
| 11 | | | | | | D/F/H | | | | | | | | |

(4)

| l / k | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A/B | | | C/D | | | E/F | G/H | | A/B | |
| 1 | | | | | | | | | | | | | | |
| 2 | | | | | | | | | | | | | | |
| 3 | | | | C/D | | | A | | | B | G/H | | E/F | |
| 4 | | | | | | | | | | | | | | |
| 5 | | | | | | | | | | | | | | |
| 6 | | | | C/D | | | B | | | A | G/H | | E/F | |
| 7 | | | | | | | | | | | | | | |
| 8 | | | | | | | | | | | | | | |
| 9 | | | | A/B | | | C/D | | | E/F | G/H | | A/B | |
| 10 | | | | | | | | | | | | | | |
| 11 | | | | | | | | | | | | | | |

| l / k | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | | | | A |
| 1 | | | | | | | | | | | | | | |
| 2 | | | | | | | | | | | | | | |
| 3 | | | | | | | A | | | | | | | |
| 4 | | | | | | | | | | | | | | |
| 5 | | | | | | | | | | | | | | |
| 6 | | | | | | | | | | A | | | | |
| 7 | | | | | | | | | | | | | | |
| 8 | | | | | | | | | | | | | | |
| 9 | | | | A | | | | | | | | | | A |
| 10 | | | | | | | | | | | | | | |
| 11 | | | | | | | | | | | | | | |

(6)

| l / k | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A/B | | | | | | | | | | A/B |
| 1 | | | | | | | | | | | | | | |
| 2 | | | | | | | | | | | | | | |
| 3 | | | | | | | A | | | B | | | | |
| 4 | | | | | | | | | | | | | | |
| 5 | | | | | | | | | | | | | | |
| 6 | | | | | | | B | | | A | | | | |
| 7 | | | | | | | | | | | | | | |
| 8 | | | | | | | | | | | | | | |
| 9 | | | | A/B | | | | | | | | | | A/B |
| 10 | | | | | | | | | | | | | | |
| 11 | | | | | | | | | | | | | | |

(7)

| l / k | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A/B | | E-H | | | | | C | | | A/B |
| 1 | | | | | | | | | | | D | | | |
| 2 | | | | | | | | | | | | | | |
| 3 | | | | | | | A | | | B | E-H | | | |
| 4 | | | | | | C | | | | | | | | |
| 5 | | | | | | D | | | | | | | | |
| 6 | | | | | | | B | | | A | | | | |
| 7 | | | | | | E-H | | | | | C | | | |
| 8 | | | | | | | | | | | D | | | |
| 9 | | | | A/B | | | | | | | | | | A/B |
| 10 | | | | | | C | | | | | E-H | | | |
| 11 | | | | | | D | | | | | | | | |

(8)

| l / k | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A/B | | | | | | | C/E/G | | | A/B |
| 1 | | | | | | | | | | | D/F/H | | | |
| 2 | | | | | | C/E/G | | | | | | | | |
| 3 | | | | | | D/F/H | A | | | B | | | | |
| 4 | | | | | | | | | | | C/E/G | | | |
| 5 | | | | | | | | | | | D/F/H | | | |
| 6 | | | | | | C/E/G | B | | | A | | | | |
| 7 | | | | | | D/F/H | | | | | | | | |
| 8 | | | | | | | | | | | C/E/G | | | |
| 9 | | | | A/B | | | | | | | D/F/H | | | A/B |
| 10 | | | | | | C/E/G | | | | | | | | |
| 11 | | | | | | D/F/H | | | | | | | | |

(9)

| l / k | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A/B | | | C/D | | | E/F | G/H | | | A/B |
| 1 | | | | | | | | | | | | | | |
| 2 | | | | | | | | | | | | | | |
| 3 | | | | C/D | | | A | | | B | G/H | | | E/F |
| 4 | | | | | | | | | | | | | | |
| 5 | | | | | | | | | | | | | | |
| 6 | | | | C/D | | | B | | | A | G/H | | | E/F |
| 7 | | | | | | | | | | | | | | |
| 8 | | | | | | | | | | | | | | |
| 9 | | | | A/B | | | C/D | | | E/F | G/H | | | A/B |
| 10 | | | | | | | | | | | | | | |
| 11 | | | | | | | | | | | | | | |

| l \ N | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | A | | | | | A | | A | |
| 1 | | | | | | | | | | | | | | |
| 2 | | | | | | | | | | | | | | |
| 3 | | | | | | | A | | | A | | | | |
| 4 | | | | | | | | | | | | | | |
| 5 | | | | | | | | | | | | | | |
| 6 | | | | | | | A | | | A | | | | |
| 7 | | | | | | | | | | | | | | |
| 8 | | | | | | | | | | | | | | |
| 9 | | | | A | | A | | | | | A | | A | |
| 10 | | | | | | | | | | | | | | |
| 11 | | | | | | | | | | | | | | |

(1)

| l \ N | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | B | | | | | B | | A | |
| 1 | | | | | | | | | | | | | | |
| 2 | | | | | | | | | | | | | | |
| 3 | | | | | | | A | | | B | | | | |
| 4 | | | | | | | | | | | | | | |
| 5 | | | | | | | | | | | | | | |
| 6 | | | | | | | B | | | A | | | | |
| 7 | | | | | | | | | | | | | | |
| 8 | | | | | | | | | | | | | | |
| 9 | | | | A | | B | | | | | B | | A | |
| 10 | | | | | | | | | | | | | | |
| 11 | | | | | | | | | | | | | | |

(2)

| l \ N | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | B | C~H | | | C~H | B | | A | |
| 1 | | | | | | | | | | | | | | |
| 2 | | | | | | | | | | | | | | |
| 3 | | | | C~H | | | A | | | B | | | C~H | |
| 4 | | | | | | | | | | | | | | |
| 5 | | | | | | | | | | | | | | |
| 6 | | | | C~H | | | B | | | A | | | C~H | |
| 7 | | | | | | | | | | | | | | |
| 8 | | | | | | | | | | | | | | |
| 9 | | | | A | | B | C~H | | | C~H | B | | A | |
| 10 | | | | | | | | | | | | | | |
| 11 | | | | | | | | | | | | | | |

(3)

| l \ N | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | B | C/D | | | E/F | B | | A | |
| 1 | | | | | | | | | | | | | | |
| 2 | | | | | | | | | | | | | | |
| 3 | | | | C/D | | G/H | A | | | B | G/H | | E/F | |
| 4 | | | | | | | | | | | | | | |
| 5 | | | | | | | | | | | | | | |
| 6 | | | | C/D | | G/H | B | | | A | G/H | | E/F | |
| 7 | | | | | | | | | | | | | | |
| 8 | | | | | | | | | | | | | | |
| 9 | | | | A | | B | C/D | | | E/F | B | | A | |
| 10 | | | | | | | | | | | | | | |
| 11 | | | | | | | | | | | | | | |

(4)

| l \ N | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | B | F~H | | | C~E | B | | A | |
| 1 | | | | | | | | | | | | | | |
| 2 | | | | | | | | | | | | | | |
| 3 | | | | F~H | | | A | | | B | | | C~E | |
| 4 | | | | | | | | | | | | | | |
| 5 | | | | | | | | | | | | | | |
| 6 | | | | C~E | | | B | | | A | | | F~H | |
| 7 | | | | | | | | | | | | | | |
| 8 | | | | | | | | | | | | | | |
| 9 | | | | A | | B | C~E | | | F~H | B | | A | |
| 10 | | | | | | | | | | | | | | |
| 11 | | | | | | | | | | | | | | |

| F \ T | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | A | | | A | | | | A |
| 1 | | | | | | | | | | | | | | |
| 2 | | | | | | | | | | | | | | |
| 3 | | | | | | A | | | | | A | | | |
| 4 | | | | | | | | | | | | | | |
| 5 | | | | | | | | | | | | | | |
| 6 | | | | | | A | | | | | A | | | |
| 7 | | | | | | | | | | | | | | |
| 8 | | | | | | | | | | | | | | |
| 9 | | | | A | | | A | | | A | | | | A |
| 10 | | | | | | | | | | | | | | |
| 11 | | | | | | | | | | | | | | |

(4)

| F \ T | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | B | | | | | B | | | A |
| 1 | | | | | | | | | | | | | | |
| 2 | | | | | | | | | | | | | | |
| 3 | | | | | | | A | | | B | | | | |
| 4 | | | | | | | | | | | | | | |
| 5 | | | | | | | | | | | | | | |
| 6 | | | | | | | B | | | A | | | | |
| 7 | | | | | | | | | | | | | | |
| 8 | | | | | | | | | | | | | | |
| 9 | | | | A | | B | | | | | B | | | A |
| 10 | | | | | | | | | | | | | | |
| 11 | | | | | | | | | | | | | | |

(5)

| F \ T | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | B | C~H | | | C~H | B | | | A |
| 1 | | | | | | | | | | | | | | |
| 2 | | | | | | | | | | | | | | |
| 3 | | | | C~H | | | A | | | B | | | | C~H |
| 4 | | | | | | | | | | | | | | |
| 5 | | | | | | | | | | | | | | |
| 6 | | | | C~H | | | B | | | A | | | | C~H |
| 7 | | | | | | | | | | | | | | |
| 8 | | | | | | | | | | | | | | |
| 9 | | | | A | | B | C~H | | | C~H | B | | | A |
| 10 | | | | | | | | | | | | | | |
| 11 | | | | | | | | | | | | | | |

| T / F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | | | | A |
| 1 | | | | | | | A | | | | | | | |
| 2 | | | | | | | | | | | | | | |
| 3 | | | | A | | | | | | | | | | A |
| 4 | | | | | | | A | | | | | | | |
| 5 | | | | | | | | | | | | | | |
| 6 | | | | A | | | | | | | | | | A |
| 7 | | | | | | | A | | | | | | | |
| 8 | | | | | | | | | | | | | | |
| 9 | | | | A | | | | | | | | | | A |
| 10 | | | | | | | A | | | | | | | |
| 11 | | | | | | | | | | | | | | |

(5)

| T / F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | | | | B |
| 1 | | | | | | | B | | | | | | | |
| 2 | | | | | | | | | | | | | | |
| 3 | | | | B | | | | | | | | | | A |
| 4 | | | | | | | A | | | | | | | |
| 5 | | | | | | | | | | | | | | |
| 6 | | | | A | | | | | | | | | | B |
| 7 | | | | | | | B | | | | | | | |
| 8 | | | | | | | | | | | | | | |
| 9 | | | | B | | | | | | | | | | A |
| 10 | | | | | | | A | | | | | | | |
| 11 | | | | | | | | | | | | | | |

(6)

| T / F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | E~H | | | | | C | | | B |
| 1 | | | | | | | B | | | | D | | | |
| 2 | | | | | | | | | | | | | | |
| 3 | | | | B | | | | | | | E~H | | | A |
| 4 | | | | | | C | A | | | | | | | |
| 5 | | | | | | D | | | | | | | | |
| 6 | | | | A | | | | | | | | | | B |
| 7 | | | | | | E~H | B | | | | C | | | |
| 8 | | | | | | | | | | | D | | | |
| 9 | | | | B | | | | | | | | | | A |
| 10 | | | | | | C | A | | | | E~H | | | |
| 11 | | | | | | D | | | | | | | | |

(7)

| T / F | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | C/E/G | | | B |
| 1 | | | | | | | B | | | | D/F/H | | | |
| 2 | | | | | | C/E/G | | | | | | | | |
| 3 | | | | B | | D/F/H | | | | | | | | A |
| 4 | | | | | | | A | | | | C/E/G | | | |
| 5 | | | | | | | | | | | D/F/H | | | |
| 6 | | | | A | | C/E/G | | | | | | | | B |
| 7 | | | | | | D/F/H | B | | | | | | | |
| 8 | | | | | | | | | | | C/E/G | | | |
| 9 | | | | B | | | | | | | D/F/H | | | A |
| 10 | | | | | | C/E/G | A | | | | | | | |
| 11 | | | | | | D/F/H | | | | | | | | |

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | A | | C | E~H | | | C | A | | A | |
| 2 | | | | | | | | | | | | | | |
| 3 | | | | | | | | | | | | | | |
| 4 | | | | B | | E~H | D | | | D | B | | B | |
| 5 | | | | | | | | | | | | | | |
| 6 | | | | | | | | | | | | | | |
| 7 | | | | A | | C | E~H | | | C | A | | A | |
| 8 | | | | | | | | | | | | | | |
| 9 | | | | | | | | | | | | | | |
| 10 | | | | B | | E~H | D | | | D | B | | B | |
| 11 | | | | | | | | | | | | | | |

(1)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | E~H | | | C | A | | A | |
| 1 | | | | | | | | | | | | | | |
| 2 | | | | | | | | | | | | | | |
| 3 | | | | B | | E~H | D | | | D | B | | B | |
| 4 | | | | | | | | | | | | | | |
| 5 | | | | | | | | | | | | | | |
| 6 | | | | A | | C | E~H | | | C | A | | A | |
| 7 | | | | | | | | | | | | | | |
| 8 | | | | | | | | | | | | | | |
| 9 | | | | B | | E~H | D | | | D | B | | B | |
| 10 | | | | | | | | | | | | | | |
| 11 | | | | | | | | | | | | | | |

(2)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | | | | | | | | | | | |
| 2 | | | | A | | C | E~H | | | C | A | | A | |
| 3 | | | | | | | | | | | | | | |
| 4 | | | | | | | | | | | | | | |
| 5 | | | | B | | E~H | D | | | D | B | | B | |
| 6 | | | | | | | | | | | | | | |
| 7 | | | | | | | | | | | | | | |
| 8 | | | | A | | C | E~H | | | C | A | | A | |
| 9 | | | | | | | | | | | | | | |
| 10 | | | | | | | | | | | | | | |
| 11 | | | | B | | E~H | D | | | D | B | | B | |

(3)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | C | | | | |
| 1 | | | | A | | | | | | D | A | | A | |
| 2 | | | | | | | | | | E~H | | | | |
| 3 | | | | | | | | | | C | | | | |
| 4 | | | | B | | | | | | D | B | | B | |
| 5 | | | | | | | | | | E~H | | | | |
| 6 | | | | | | | | | | C | | | | |
| 7 | | | | A | | | | | | D | A | | A | |
| 8 | | | | | | | | | | E~H | | | | |
| 9 | | | | | | | | | | C | | | | |
| 10 | | | | B | | | | | | D | B | | B | |
| 11 | | | | | | | | | | E~H | | | | |

(4)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | | | | | | | | |
| 1 | | | | | | | E~H | | | | A | | | |
| 2 | | | | | | | | | | C | | | A | |
| 3 | | | | B | | E~H | | | | | | | | |
| 4 | | | | | | | D | | | | B | | | |
| 5 | | | | | | | | | | D | | | B | |
| 6 | | | | A | | C | | | | | | | | |
| 7 | | | | | | | E~H | | | | A | | | |
| 8 | | | | | | | | | | C | | | A | |
| 9 | | | | B | | E~H | | | | | | | | |
| 10 | | | | | | | D | | | | B | | | |
| 11 | | | | | | | | | | D | | | B | |

(5)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | C | | | A | |
| 1 | | | | | | | E~H | | | | A | | | |
| 2 | | | | A | | C | | | | | | | | |
| 3 | | | | | | | | | | D | | | B | |
| 4 | | | | | | | D | | | | B | | | |
| 5 | | | | B | | E~H | | | | | | | | |
| 6 | | | | | | | | | | C | | | A | |
| 7 | | | | | | | E~H | | | | A | | | |
| 8 | | | | A | | C | | | | | | | | |
| 9 | | | | | | | | | | D | | | B | |
| 10 | | | | | | | D | | | | B | | | |
| 11 | | | | B | | E~H | | | | | | | | |

(6)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | E~H | | | C | A | | A | |
| 1 | | | | B | | E~H | D | | | D | B | | B | |
| 2 | | | | | | | | | | | | | | |
| 3 | | | | | | | | | | | | | | |
| 4 | | | | | | | | | | | | | | |
| 5 | | | | | | | | | | | | | | |
| 6 | | | | A | | C | E~H | | | C | A | | A | |
| 7 | | | | B | | E~H | D | | | D | B | | B | |
| 8 | | | | | | | | | | | | | | |
| 9 | | | | | | | | | | | | | | |
| 10 | | | | | | | | | | | | | | |
| 11 | | | | | | | | | | | | | | |

(7)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | A | | C | | | | | | | | |
| 2 | | | | B | | E~H | E~H | | | | A | | | |
| 3 | | | | | | | D | | | C | B | | A | |
| 4 | | | | | | | | | | D | | | B | |
| 5 | | | | | | | | | | | | | | |
| 6 | | | | | | | | | | | | | | |
| 7 | | | | A | | C | | | | | | | | |
| 8 | | | | B | | E~H | E~H | | | | A | | | |
| 9 | | | | | | | D | | | C | B | | A | |
| 10 | | | | | | | | | | D | | | B | |
| 11 | | | | | | | | | | | | | | |

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | | | | | | | | | | | |
| 2 | | | | A | | C | | | | | | | | |
| 3 | | | | B | | E-H | E-H | | | | A | | | |
| 4 | | | | | | | D | | | C | B | | A | |
| 5 | | | | | | | | | | D | | | B | |
| 6 | | | | | | | | | | | | | | |
| 7 | | | | | | | | | | | | | | |
| 8 | | | | A | | C | | | | | | | | |
| 9 | | | | B | | E-H | E-H | | | | A | | | |
| 10 | | | | | | | D | | | C | B | | A | |
| 11 | | | | | | | | | | D | | | B | |

(9)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | | | | | | | | | | | |
| 2 | | | | A | | C | E-H | | | C | A | | A | |
| 3 | | | | B | | E-H | D | | | D | B | | B | |
| 4 | | | | | | | | | | | | | | |
| 5 | | | | | | | | | | | | | | |
| 6 | | | | | | | | | | | | | | |
| 7 | | | | | | | | | | | | | | |
| 8 | | | | A | | C | E-H | | | C | A | | A | |
| 9 | | | | B | | E-H | D | | | D | B | | B | |
| 10 | | | | | | | | | | | | | | |
| 11 | | | | | | | | | | | | | | |

(10)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | | | | | | | | |
| 1 | | | | B | | E-H | | | | | | | | |
| 2 | | | | | | | E-H | | | | A | | | |
| 3 | | | | | | | D | | | | B | | | |
| 4 | | | | | | | | | | C | | | A | |
| 5 | | | | | | | | | | D | | | B | |
| 6 | | | | A | | C | | | | | | | | |
| 7 | | | | B | | E-H | E-H | | | | | | | |
| 8 | | | | | | | D | | | | A | | | |
| 9 | | | | | | | | | | | B | | | |
| 10 | | | | | | | | | | C | | | A | |
| 11 | | | | | | | | | | D | | | B | |

(11)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | A | | | | | | | A | | A | |
| 2 | | | | C | | | | | | | C | | E-H | |
| 3 | | | | | | | | | | | | | | |
| 4 | | | | B | | | | | | | B | | B | |
| 5 | | | | D | | | | | | | D | | E-H | |
| 6 | | | | | | | | | | | | | | |
| 7 | | | | A | | | | | | | A | | A | |
| 8 | | | | C | | | | | | | C | | E-H | |
| 9 | | | | | | | | | | | | | | |
| 10 | | | | B | | | | | | | B | | B | |
| 11 | | | | D | | | | | | | D | | E-H | |

(12)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | A | | A | |
| 1 | | | | B | | | | | | | B | | B | |
| 2 | | | | C | | | | | | | C | | E-H | |
| 3 | | | | D | | | | | | | D | | E-H | |
| 4 | | | | | | | | | | | | | | |
| 5 | | | | | | | | | | | | | | |
| 6 | | | | A | | | | | | | A | | A | |
| 7 | | | | B | | | | | | | B | | B | |
| 8 | | | | C | | | | | | | C | | E-H | |
| 9 | | | | D | | | | | | | D | | E-H | |
| 10 | | | | | | | | | | | | | | |
| 11 | | | | | | | | | | | | | | |

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | A | | C | E-H | | | C | A | | | A |
| 2 | | | | | | | | | | | | | | |
| 3 | | | | | | | | | | | | | | |
| 4 | | | | B | | E-H | D | | | D | B | | | B |
| 5 | | | | | | | | | | | | | | |
| 6 | | | | | | | | | | | | | | |
| 7 | | | | A | | C | E-H | | | C | A | | | A |
| 8 | | | | | | | | | | | | | | |
| 9 | | | | | | | | | | | | | | |
| 10 | | | | B | | E-H | D | | | D | B | | | B |
| 11 | | | | | | | | | | | | | | |

(1)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | E-H | | | C | A | | | A |
| 1 | | | | | | | | | | | | | | |
| 2 | | | | | | | | | | | | | | |
| 3 | | | | B | | E-H | D | | | D | B | | | B |
| 4 | | | | | | | | | | | | | | |
| 5 | | | | | | | | | | | | | | |
| 6 | | | | A | | C | E-H | | | C | A | | | A |
| 7 | | | | | | | | | | | | | | |
| 8 | | | | | | | | | | | | | | |
| 9 | | | | B | | E-H | D | | | D | B | | | B |
| 10 | | | | | | | | | | | | | | |
| 11 | | | | | | | | | | | | | | |

(2)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | | | | | | | | | | | |
| 2 | | | | A | | C | E-H | | | C | A | | | A |
| 3 | | | | | | | | | | | | | | |
| 4 | | | | | | | | | | | | | | |
| 5 | | | | B | | E-H | D | | | D | B | | | B |
| 6 | | | | | | | | | | | | | | |
| 7 | | | | | | | | | | | | | | |
| 8 | | | | A | | C | E-H | | | C | A | | | A |
| 9 | | | | | | | | | | | | | | |
| 10 | | | | | | | | | | | | | | |
| 11 | | | | B | | E-H | D | | | D | B | | | B |

(3)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | C | | | | |
| 1 | | | | A | | | | | | D | A | | | A |
| 2 | | | | | | | | | | E-H | | | | |
| 3 | | | | | | | | | | C | | | | |
| 4 | | | | B | | | | | | D | B | | | B |
| 5 | | | | | | | | | | E-H | | | | |
| 6 | | | | | | | | | | C | | | | |
| 7 | | | | A | | | | | | D | A | | | A |
| 8 | | | | | | | | | | E-H | | | | |
| 9 | | | | | | | | | | C | | | | |
| 10 | | | | B | | | | | | D | B | | | B |
| 11 | | | | | | | | | | E-H | | | | |

(4)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | | | | | | | | |
| 1 | | | | | | | E-H | | | | A | | | |
| 2 | | | | | | | | | | C | | | | A |
| 3 | | | | B | | E-H | | | | | | | | |
| 4 | | | | | | | D | | | | B | | | |
| 5 | | | | | | | | | | D | | | | B |
| 6 | | | | A | | C | | | | | | | | |
| 7 | | | | | | | E-H | | | | A | | | |
| 8 | | | | | | | | | | C | | | | A |
| 9 | | | | B | | E-H | | | | | | | | |
| 10 | | | | | | | D | | | | B | | | |
| 11 | | | | | | | | | | D | | | | B |

(5)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | C | | | | A |
| 1 | | | | | | | E-H | | | | A | | | |
| 2 | | | | A | | C | | | | | | | | |
| 3 | | | | | | | | | | D | | | | B |
| 4 | | | | | | | D | | | | B | | | |
| 5 | | | | B | | E-H | | | | | | | | |
| 6 | | | | | | | | | | C | | | | A |
| 7 | | | | | | | E-H | | | | A | | | |
| 8 | | | | A | | C | | | | | | | | |
| 9 | | | | | | | | | | D | | | | B |
| 10 | | | | | | | D | | | | B | | | |
| 11 | | | | B | | E-H | | | | | | | | |

(6)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | E-H | | | C | A | | | A |
| 1 | | | | B | | E-H | D | | | D | B | | | B |
| 2 | | | | | | | | | | | | | | |
| 3 | | | | | | | | | | | | | | |
| 4 | | | | | | | | | | | | | | |
| 5 | | | | | | | | | | | | | | |
| 6 | | | | A | | C | E-H | | | C | A | | | A |
| 7 | | | | B | | E-H | D | | | D | B | | | B |
| 8 | | | | | | | | | | | | | | |
| 9 | | | | | | | | | | | | | | |
| 10 | | | | | | | | | | | | | | |
| 11 | | | | | | | | | | | | | | |

(7)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | A | | C | | | | | | | | |
| 2 | | | | B | | E-H | E-H | | | | A | | | |
| 3 | | | | | | | D | | | C | B | | | A |
| 4 | | | | | | | | | | D | | | | B |
| 5 | | | | | | | | | | | | | | |
| 6 | | | | | | | | | | | | | | |
| 7 | | | | A | | C | | | | | | | | |
| 8 | | | | B | | E-H | E-H | | | | A | | | |
| 9 | | | | | | | D | | | C | B | | | A |
| 10 | | | | | | | | | | D | | | | B |
| 11 | | | | | | | | | | | | | | |

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | | | | | | | | | | | |
| 2 | | | | A | | C | | | | | | | | |
| 3 | | | | B | | E-H | E-H | | | | A | | | |
| 4 | | | | | | | D | | | C | B | | | A |
| 5 | | | | | | | | | | D | | | | B |
| 6 | | | | | | | | | | | | | | |
| 7 | | | | | | | | | | | | | | |
| 8 | | | | A | | C | | | | | | | | |
| 9 | | | | B | | E-H | E-H | | | | A | | | |
| 10 | | | | | | | D | | | C | B | | | A |
| 11 | | | | | | | | | | D | | | | B |

(9)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | | | | | | | | | | | |
| 2 | | | | A | | C | E-H | | | C | A | | | A |
| 3 | | | | B | | E-H | D | | | D | B | | | B |
| 4 | | | | | | | | | | | | | | |
| 5 | | | | | | | | | | | | | | |
| 6 | | | | | | | | | | | | | | |
| 7 | | | | | | | | | | | | | | |
| 8 | | | | A | | C | E-H | | | C | A | | | A |
| 9 | | | | B | | E-H | D | | | D | B | | | B |
| 10 | | | | | | | | | | | | | | |
| 11 | | | | | | | | | | | | | | |

(10)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | | | | | | | | |
| 1 | | | | B | | E-H | | | | | | | | |
| 2 | | | | | | | E-H | | | | A | | | |
| 3 | | | | | | | D | | | | B | | | |
| 4 | | | | | | | | | | C | | | | A |
| 5 | | | | | | | | | | D | | | | B |
| 6 | | | | A | | C | | | | | | | | |
| 7 | | | | B | | E-H | E-H | | | | | | | |
| 8 | | | | | | | D | | | | A | | | |
| 9 | | | | | | | | | | | B | | | |
| 10 | | | | | | | | | | C | | | | A |
| 11 | | | | | | | | | | D | | | | B |

(11)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | A | | | | | | | A | | | A |
| 2 | | | | C | | | | | | | C | | | E-H |
| 3 | | | | | | | | | | | | | | |
| 4 | | | | B | | | | | | | B | | | B |
| 5 | | | | D | | | | | | | D | | | E-H |
| 6 | | | | | | | | | | | | | | |
| 7 | | | | A | | | | | | | A | | | A |
| 8 | | | | C | | | | | | | C | | | E-H |
| 9 | | | | | | | | | | | | | | |
| 10 | | | | B | | | | | | | B | | | B |
| 11 | | | | D | | | | | | | D | | | E-H |

(12)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | | | A | | | A |
| 1 | | | | B | | | | | | | B | | | B |
| 2 | | | | C | | | | | | | C | | | E-H |
| 3 | | | | D | | | | | | | D | | | E-H |
| 4 | | | | | | | | | | | | | | |
| 5 | | | | | | | | | | | | | | |
| 6 | | | | A | | | | | | | A | | | A |
| 7 | | | | B | | | | | | | B | | | B |
| 8 | | | | C | | | | | | | C | | | E-H |
| 9 | | | | D | | | | | | | D | | | E-H |
| 10 | | | | | | | | | | | | | | |
| 11 | | | | | | | | | | | | | | |

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | C | | A | C | C | | A | |
| 1 | | | | B | | D | D | | B | D | D | | B | |
| 2 | | | | | | | | | | | | | | |
| 3 | | | | | | | | | | | | | | |
| 4 | | | | | | | | | | | | | | |
| 5 | | | | | | | | | | | | | | |
| 6 | | | | A | | E-H | E-H | | A | E-H | E-H | | A | |
| 7 | | | | B | | | | | B | | | | B | |
| 8 | | | | | | | | | | | | | | |
| 9 | | | | | | | | | | | | | | |
| 10 | | | | | | | | | | | | | | |
| 11 | | | | | | | | | | | | | | |

(7)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | A | | C | | | | | | | | |
| 2 | | | | B | | D | C | | A | | | | | |
| 3 | | | | | | | D | | B | C | | | A | |
| 4 | | | | | | | | | | D | C | | B | |
| 5 | | | | | | | | | | | D | | | |
| 6 | | | | | | | | | | | | | | |
| 7 | | | | A | | E-H | | | | | | | | |
| 8 | | | | B | | | E-H | | A | | | | | |
| 9 | | | | | | | | | B | E-H | | | A | |
| 10 | | | | | | | | | | | E-H | | B | |
| 11 | | | | | | | | | | | | | | |

(8)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | | | | | | | | | | | |
| 2 | | | | A | | C | | | | | | | | |
| 3 | | | | B | | D | C | | A | | | | | |
| 4 | | | | | | | D | | B | C | | | A | |
| 5 | | | | | | | | | | D | C | | B | |
| 6 | | | | | | | | | | | D | | | |
| 7 | | | | | | | | | | | | | | |
| 8 | | | | A | | E-H | | | | | | | | |
| 9 | | | | B | | | E-H | | A | | | | | |
| 10 | | | | | | | | | B | E-H | | | A | |
| 11 | | | | | | | | | | | E-H | | B | |

(9)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | A | | C | | A | |
| 1 | | | | B | | | | | B | | D | | B | |
| 2 | | | | | | | | | | | E-H | | | |
| 3 | | | | | | | | | | | C | | | |
| 4 | | | | | | | | | | | D | | | |
| 5 | | | | | | | | | | | E-H | | | |
| 6 | | | | A | | | | | A | | C | | A | |
| 7 | | | | B | | | | | B | | D | | B | |
| 8 | | | | | | | | | | | E-H | | | |
| 9 | | | | | | | | | | | C | | | |
| 10 | | | | | | | | | | | D | | | |
| 11 | | | | | | | | | | | E-H | | | |

(10)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | | | | | | | | | | | |
| 2 | | | | A | | C | C | | A | C | C | | A | |
| 3 | | | | B | | D | D | | B | D | D | | B | |
| 4 | | | | | | | | | | | | | | |
| 5 | | | | | | | | | | | | | | |
| 6 | | | | | | | | | | | | | | |
| 7 | | | | | | | | | | | | | | |
| 8 | | | | A | | E-H | E-H | | A | E-H | E-H | | A | |
| 9 | | | | B | | | | | B | | | | B | |
| 10 | | | | | | | | | | | | | | |
| 11 | | | | | | | | | | | | | | |

(11)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | | | | | | | | |
| 1 | | | | B | | D | C | | | | | | | |
| 2 | | | | | | | D | | A | C | | | | |
| 3 | | | | | | | | | B | D | C | | | |
| 4 | | | | | | | | | | | D | | A | |
| 5 | | | | | | | | | | | | | B | |
| 6 | | | | A | | E-H | | | | | | | | |
| 7 | | | | B | | | E-H | | | | | | | |
| 8 | | | | | | | | | A | E-H | | | | |
| 9 | | | | | | | | | B | | E-H | | | |
| 10 | | | | | | | | | | | | | A | |
| 11 | | | | | | | | | | | | | B | |

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | A | | C | E-H | | A | | C | | A | |
| 2 | | | | | | | | | | | | | | |
| 3 | | | | | | | | | | | | | | |
| 4 | | | | B | | E-H | D | | B | | D | | B | |
| 5 | | | | | | | | | | | | | | |
| 6 | | | | | | | | | | | | | | |
| 7 | | | | A | | C | E-H | | A | | C | | A | |
| 8 | | | | | | | | | | | | | | |
| 9 | | | | | | | | | | | | | | |
| 10 | | | | B | | E-H | D | | B | | D | | B | |
| 11 | | | | | | | | | | | | | | |

(13)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | E-H | | A | | C | | A | |
| 1 | | | | | | | | | | | | | | |
| 2 | | | | | | | | | | | | | | |
| 3 | | | | B | | E-H | D | | B | | D | | B | |
| 4 | | | | | | | | | | | | | | |
| 5 | | | | | | | | | | | | | | |
| 6 | | | | A | | C | E-H | | A | | C | | A | |
| 7 | | | | | | | | | | | | | | |
| 8 | | | | | | | | | | | | | | |
| 9 | | | | B | | E-H | D | | B | | D | | B | |
| 10 | | | | | | | | | | | | | | |
| 11 | | | | | | | | | | | | | | |

(14)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | | | | | | | | | | | |
| 2 | | | | A | | C | E-H | | A | | C | | A | |
| 3 | | | | | | | | | | | | | | |
| 4 | | | | | | | | | | | | | | |
| 5 | | | | B | | E-H | D | | B | | D | | B | |
| 6 | | | | | | | | | | | | | | |
| 7 | | | | | | | | | | | | | | |
| 8 | | | | A | | C | E-H | | A | | C | | A | |
| 9 | | | | | | | | | | | | | | |
| 10 | | | | | | | | | | | | | | |
| 11 | | | | B | | E-H | D | | B | | D | | B | |

(15)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | | | | | | | | |
| 1 | | | | | | | E-H | | A | | | | | |
| 2 | | | | | | | | | | | C | | A | |
| 3 | | | | B | | E-H | | | | | | | | |
| 4 | | | | | | | D | | B | | | | | |
| 5 | | | | | | | | | | | D | | B | |
| 6 | | | | A | | C | | | | | | | | |
| 7 | | | | | | | E-H | | A | | | | | |
| 8 | | | | | | | | | | | C | | A | |
| 9 | | | | B | | E-H | | | | | | | | |
| 10 | | | | | | | D | | B | | | | | |
| 11 | | | | | | | | | | | D | | B | |

(16)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | C | | A | |
| 1 | | | | | | | E-H | | A | | | | | |
| 2 | | | | A | | C | | | | | | | | |
| 3 | | | | | | | | | | | D | | B | |
| 4 | | | | | | | D | | B | | | | | |
| 5 | | | | B | | E-H | | | | | | | | |
| 6 | | | | | | | | | | | C | | A | |
| 7 | | | | | | | E-H | | A | | | | | |
| 8 | | | | A | | C | | | | | | | | |
| 9 | | | | | | | | | | | D | | B | |
| 10 | | | | | | | D | | B | | | | | |
| 11 | | | | B | | E-H | | | | | | | | |

(17)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | E-H | | A | | C | | A | |
| 1 | | | | B | | E-H | D | | B | | D | | B | |
| 2 | | | | | | | | | | | | | | |
| 3 | | | | | | | | | | | | | | |
| 4 | | | | | | | | | | | | | | |
| 5 | | | | | | | | | | | | | | |
| 6 | | | | A | | C | E-H | | A | | C | | A | |
| 7 | | | | B | | E-H | D | | B | | D | | B | |
| 8 | | | | | | | | | | | | | | |
| 9 | | | | | | | | | | | | | | |
| 10 | | | | | | | | | | | | | | |
| 11 | | | | | | | | | | | | | | |

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | A | | C | C | | A | C | C | | | A |
| 2 | | | | | | | | | | | | | | |
| 3 | | | | | | | | | | | | | | |
| 4 | | | | B | | | | | B | | | | | B |
| 5 | | | | | | E-H | E-H | | | E-H | E-H | | | |
| 6 | | | | | | | | | | | | | | |
| 7 | | | | A | | | | | A | | | | | A |
| 8 | | | | | | | | | | | | | | |
| 9 | | | | | | D | D | | | D | D | | | |
| 10 | | | | B | | | | | B | | | | | B |
| 11 | | | | | | | | | | | | | | |

(1)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | C | | A | C | C | | | A |
| 1 | | | | | | | | | | | | | | |
| 2 | | | | | | | | | | | | | | |
| 3 | | | | B | | | | | B | | | | | B |
| 4 | | | | | | E-H | E-H | | | E-H | E-H | | | |
| 5 | | | | | | | | | | | | | | |
| 6 | | | | A | | | | | A | | | | | A |
| 7 | | | | | | | | | | | | | | |
| 8 | | | | | | D | D | | | D | D | | | |
| 9 | | | | B | | | | | B | | | | | B |
| 10 | | | | | | | | | | | | | | |
| 11 | | | | | | | | | | | | | | |

(2)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | | | | | | | | | | | |
| 2 | | | | A | | C | C | | A | C | C | | | A |
| 3 | | | | | | | | | | | | | | |
| 4 | | | | | | | | | | | | | | |
| 5 | | | | B | | | | | B | | | | | B |
| 6 | | | | | | E-H | E-H | | | E-H | E-H | | | |
| 7 | | | | | | | | | | | | | | |
| 8 | | | | A | | | | | A | | | | | A |
| 9 | | | | | | | | | | | | | | |
| 10 | | | | | | D | D | | | D | D | | | |
| 11 | | | | B | | | | | B | | | | | B |

(3)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | C | | | |
| 1 | | | | A | | | | | A | | D | | | A |
| 2 | | | | | | | | | | | E-H | | | |
| 3 | | | | | | | | | | | C | | | |
| 4 | | | | B | | | | | B | | D | | | B |
| 5 | | | | | | | | | | | E-H | | | |
| 6 | | | | | | | | | | | C | | | |
| 7 | | | | A | | | | | A | | D | | | A |
| 8 | | | | | | | | | | | E-H | | | |
| 9 | | | | | | | | | | | C | | | |
| 10 | | | | B | | | | | B | | D | | | B |
| 11 | | | | | | | | | | | E-H | | | |

(4)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | | | | | | | | |
| 1 | | | | | | | C | | A | | | | | |
| 2 | | | | | | | | | | C | | | | A |
| 3 | | | | B | | | | | | | C | | | |
| 4 | | | | | | E-H | | | B | | | | | |
| 5 | | | | | | | E-H | | | | | | | B |
| 6 | | | | A | | | | | | E-H | | | | |
| 7 | | | | | | | | | A | | E-H | | | |
| 8 | | | | | | D | | | | | | | | A |
| 9 | | | | B | | | D | | | | | | | |
| 10 | | | | | | | | | B | D | | | | |
| 11 | | | | | | | | | | | D | | | B |

(5)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | C | | | A |
| 1 | | | | | | | | | A | C | | | | |
| 2 | | | | A | | | C | | | | | | | |
| 3 | | | | | | C | | | | | | | | B |
| 4 | | | | | | | | | B | | E-H | | | |
| 5 | | | | B | | | | | | E-H | | | | |
| 6 | | | | | | | E-H | | | | | | | A |
| 7 | | | | | | E-H | | | A | | | | | |
| 8 | | | | A | | | | | | | D | | | |
| 9 | | | | | | | | | | D | | | | B |
| 10 | | | | | | | D | | B | | | | | |
| 11 | | | | B | | D | | | | | | | | |

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | C | | A | C | C | | A | |
| 1 | | | | B | | D | D | | B | D | D | | B | |
| 2 | | | | | | | | | | | | | | |
| 3 | | | | | | | | | | | | | | |
| 4 | | | | | | | | | | | | | | |
| 5 | | | | | | | | | | | | | | |
| 6 | | | | A | | E-H | E-H | | A | E-H | E-H | | A | |
| 7 | | | | B | | | | | B | | | | B | |
| 8 | | | | | | | | | | | | | | |
| 9 | | | | | | | | | | | | | | |
| 10 | | | | | | | | | | | | | | |
| 11 | | | | | | | | | | | | | | |

(7)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | A | | C | | | | | | | | |
| 2 | | | | B | | D | C | | A | | | | | |
| 3 | | | | | | | D | | B | C | | | | A |
| 4 | | | | | | | | | | D | C | | | B |
| 5 | | | | | | | | | | | D | | | |
| 6 | | | | | | | | | | | | | | |
| 7 | | | | A | | E-H | | | | | | | | |
| 8 | | | | B | | | E-H | | A | | | | | |
| 9 | | | | | | | | | B | E-H | | | | A |
| 10 | | | | | | | | | | | E-H | | | B |
| 11 | | | | | | | | | | | | | | |

(8)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | | | | | | | | | | | |
| 2 | | | | A | | C | | | | | | | | |
| 3 | | | | B | | D | C | | A | | | | | |
| 4 | | | | | | | D | | B | C | | | | A |
| 5 | | | | | | | | | | D | C | | | B |
| 6 | | | | | | | | | | | D | | | |
| 7 | | | | | | | | | | | | | | |
| 8 | | | | A | | E-H | | | | | | | | |
| 9 | | | | B | | | E-H | | A | | | | | |
| 10 | | | | | | | | | B | E-H | | | | A |
| 11 | | | | | | | | | | | E-H | | | B |

(9)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | A | | C | | | A |
| 1 | | | | B | | | | | B | | D | | | B |
| 2 | | | | | | | | | | | E-H | | | |
| 3 | | | | | | | | | | | C | | | |
| 4 | | | | | | | | | | | D | | | |
| 5 | | | | | | | | | | | E-H | | | |
| 6 | | | | A | | | | | A | | C | | | A |
| 7 | | | | B | | | | | B | | D | | | B |
| 8 | | | | | | | | | | | E-H | | | |
| 9 | | | | | | | | | | | C | | | |
| 10 | | | | | | | | | | | D | | | |
| 11 | | | | | | | | | | | E-H | | | |

(10)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | | | | | | | | | | | |
| 2 | | | | A | | C | C | | A | C | C | | | A |
| 3 | | | | B | | D | D | | B | D | D | | | B |
| 4 | | | | | | | | | | | | | | |
| 5 | | | | | | | | | | | | | | |
| 6 | | | | | | | | | | | | | | |
| 7 | | | | | | | | | | | | | | |
| 8 | | | | A | | E-H | E-H | | A | E-H | E-H | | | A |
| 9 | | | | B | | | | | B | | | | | B |
| 10 | | | | | | | | | | | | | | |
| 11 | | | | | | | | | | | | | | |

(11)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | | | | | | | | |
| 1 | | | | B | | D | C | | | | | | | |
| 2 | | | | | | | D | | A | C | | | | |
| 3 | | | | | | | | | B | D | C | | | |
| 4 | | | | | | | | | | | D | | | A |
| 5 | | | | | | | | | | | | | | B |
| 6 | | | | A | | E-H | | | | | | | | |
| 7 | | | | B | | | E-H | | | | | | | |
| 8 | | | | | | | | | A | E-H | | | | |
| 9 | | | | | | | | | B | | E-H | | | |
| 10 | | | | | | | | | | | | | | A |
| 11 | | | | | | | | | | | | | | B |

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | A | | C | | | | | | | | |
| 2 | | | | B | | E~H | E~H | | A | | | | | |
| 3 | | | | | | | D | | B | | C | | | A |
| 4 | | | | | | | | | | | D | | | B |
| 5 | | | | | | | | | | | | | | |
| 6 | | | | | | | | | | | | | | |
| 7 | | | | A | | C | | | | | | | | |
| 8 | | | | B | | E~H | E~H | | A | | | | | |
| 9 | | | | | | | D | | B | | C | | | A |
| 10 | | | | | | | | | | | D | | | B |
| 11 | | | | | | | | | | | | | | |

(19)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | | | | | | | | | | | |
| 2 | | | | A | | C | | | A | | | | | |
| 3 | | | | B | | E~H | E~H | | B | | C | | | A |
| 4 | | | | | | | D | | | | D | | | B |
| 5 | | | | | | | | | | | | | | |
| 6 | | | | | | | | | | | | | | |
| 7 | | | | | | | | | | | | | | |
| 8 | | | | A | | C | | | | | | | | |
| 9 | | | | B | | E~H | E~H | | A | | | | | |
| 10 | | | | | | | D | | B | | C | | | A |
| 11 | | | | | | | | | | | D | | | B |

(20)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | | | | | | | | | | | |
| 2 | | | | A | | C | E~H | | A | | C | | | A |
| 3 | | | | B | | E~H | D | | B | | D | | | B |
| 4 | | | | | | | | | | | | | | |
| 5 | | | | | | | | | | | | | | |
| 6 | | | | | | | | | | | | | | |
| 7 | | | | | | | | | | | | | | |
| 8 | | | | A | | C | E~H | | A | | C | | | A |
| 9 | | | | B | | E~H | D | | B | | D | | | B |
| 10 | | | | | | | | | | | | | | |
| 11 | | | | | | | | | | | | | | |

(21)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | C | | | | | | | | |
| 1 | | | | B | | E~H | | | | | | | | |
| 2 | | | | | | | E~H | | A | | | | | |
| 3 | | | | | | | D | | B | | | | | |
| 4 | | | | | | | | | | | C | | | A |
| 5 | | | | | | | | | | | D | | | B |
| 6 | | | | A | | C | | | | | | | | |
| 7 | | | | B | | E~H | | | | | | | | |
| 8 | | | | | | | E~H | | A | | | | | |
| 9 | | | | | | | D | | B | | | | | |
| 10 | | | | | | | | | | | C | | | A |
| 11 | | | | | | | | | | | D | | | B |

(22)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | A | | | | | A | | | | | A |
| 2 | | | | C | | | | | E~H | | | | | C |
| 3 | | | | | | | | | | | | | | |
| 4 | | | | B | | | | | B | | | | | B |
| 5 | | | | D | | | | | E~H | | | | | D |
| 6 | | | | | | | | | | | | | | |
| 7 | | | | A | | | | | A | | | | | A |
| 8 | | | | C | | | | | E~H | | | | | C |
| 9 | | | | | | | | | | | | | | |
| 10 | | | | B | | | | | B | | | | | B |
| 11 | | | | D | | | | | E~H | | | | | D |

(23)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | A | | | | | A | | | | | A |
| 1 | | | | B | | | | | B | | | | | B |
| 2 | | | | C | | | | | E~H | | | | | C |
| 3 | | | | D | | | | | E~H | | | | | D |
| 4 | | | | | | | | | | | | | | |
| 5 | | | | | | | | | | | | | | |
| 6 | | | | A | | | | | A | | | | | A |
| 7 | | | | B | | | | | B | | | | | B |
| 8 | | | | C | | | | | E~H | | | | | C |
| 9 | | | | D | | | | | E~H | | | | | D |
| 10 | | | | | | | | | | | | | | |
| 11 | | | | | | | | C | | | | | | |

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | P0 | | | | | | | | | P2 | |
| 1 | | | | P1 | | | | | | | | | P3 | |
| 2 | | | | P2 | | | | | P0 | | | | | |
| 3 | | | | P3 | | | | | P1 | | | | | |
| 4 | | | | | | | | | P2 | | | | P0 | |
| 5 | | | | | | | | | P3 | | | | P1 | |
| 6 | | | | P0 | | | | | | | | | P2 | |
| 7 | | | | P1 | | | | | | | | | P3 | |
| 8 | | | | P2 | | | | | P0 | | | | | |
| 9 | | | | P3 | | | | | P1 | | | | | |
| 10 | | | | | | | | | P2 | | | | P0 | |
| 11 | | | | | | | | | P3 | | | | P1 | |

(1)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | P0 | | | | | P2 | | | | | |
| 1 | | | | P1 | | | | | P3 | | | | | |
| 2 | | | | P2 | | | | | | | | | P0 | |
| 3 | | | | P3 | | | | | | | | | P1 | |
| 4 | | | | | | | | | P0 | | | | P2 | |
| 5 | | | | | | | | | P1 | | | | P3 | |
| 6 | | | | P0 | | | | | P2 | | | | | |
| 7 | | | | P1 | | | | | P3 | | | | | |
| 8 | | | | P2 | | | | | | | | | P0 | |
| 9 | | | | P3 | | | | | | | | | P1 | |
| 10 | | | | | | | | | P0 | | | | P2 | |
| 11 | | | | | | | | | P1 | | | | P3 | |

(2)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | P0 | | | | | P3 | | | | P0 | |
| 1 | | | | P2 | | | | | | | | | P2 | |
| 2 | | | | | | | | | P0 | | | | | |
| 3 | | | | P1 | | | | | P2 | | | | P1 | |
| 4 | | | | P3 | | | | | | | | | P3 | |
| 5 | | | | | | | | | P1 | | | | | |
| 6 | | | | P0 | | | | | P3 | | | | P0 | |
| 7 | | | | P2 | | | | | | | | | P2 | |
| 8 | | | | | | | | | P0 | | | | | |
| 9 | | | | P1 | | | | | P2 | | | | P1 | |
| 10 | | | | P3 | | | | | | | | | P3 | |
| 11 | | | | | | | | | P1 | | | | | |

(3)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | P0 | | | | | P1 | | | | P0 | |
| 1 | | | | P2 | | | | | P3 | | | | P2 | |
| 2 | | | | | | | | | | | | | | |
| 3 | | | | P1 | | | | | P0 | | | | P1 | |
| 4 | | | | P3 | | | | | P2 | | | | P3 | |
| 5 | | | | | | | | | | | | | | |
| 6 | | | | P0 | | | | | P1 | | | | P0 | |
| 7 | | | | P2 | | | | | P3 | | | | P2 | |
| 8 | | | | | | | | | | | | | | |
| 9 | | | | P1 | | | | | P0 | | | | P1 | |
| 10 | | | | P3 | | | | | P2 | | | | P3 | |
| 11 | | | | | | | | | | | | | | |

(4)

| k \ l | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | P3 | | | | | P2 | | | | P3 | |
| 1 | | | | | | | | | | | | | | |
| 2 | | | | P0 | | | | | P1 | | | | P0 | |
| 3 | | | | P2 | | | | | P3 | | | | P2 | |
| 4 | | | | | | | | | | | | | | |
| 5 | | | | P1 | | | | | P0 | | | | P1 | |
| 6 | | | | P3 | | | | | P2 | | | | P3 | |
| 7 | | | | | | | | | | | | | | |
| 8 | | | | P0 | | | | | P1 | | | | P0 | |
| 9 | | | | P2 | | | | | P3 | | | | P2 | |
| 10 | | | | | | | | | | | | | | |
| 11 | | | | P1 | | | | | P0 | | | | P1 | |

| f \ t | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | P0 | | | | | | | | | | P2 |
| 1 | | | | P1 | | | | | | | | | | P3 |
| 2 | | | | P2 | | | | | P0 | | | | | |
| 3 | | | | P3 | | | | | P1 | | | | | |
| 4 | | | | | | | | | P2 | | | | | P0 |
| 5 | | | | | | | | | P3 | | | | | P1 |
| 6 | | | | P0 | | | | | | | | | | P2 |
| 7 | | | | P1 | | | | | | | | | | P3 |
| 8 | | | | P2 | | | | | P0 | | | | | |
| 9 | | | | P3 | | | | | P1 | | | | | |
| 10 | | | | | | | | | P2 | | | | | P0 |
| 11 | | | | | | | | | P3 | | | | | P1 |

(1)

| f \ t | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | P0 | | | | | P2 | | | | | |
| 1 | | | | P1 | | | | | P3 | | | | | |
| 2 | | | | P2 | | | | | | | | | | P0 |
| 3 | | | | P3 | | | | | | | | | | P1 |
| 4 | | | | | | | | | P0 | | | | | P2 |
| 5 | | | | | | | | | P1 | | | | | P3 |
| 6 | | | | P0 | | | | | P2 | | | | | |
| 7 | | | | P1 | | | | | P3 | | | | | |
| 8 | | | | P2 | | | | | | | | | | P0 |
| 9 | | | | P3 | | | | | | | | | | P1 |
| 10 | | | | | | | | | P0 | | | | | P2 |
| 11 | | | | | | | | | P1 | | | | | P3 |

(2)

| f \ t | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | P0 | | | | | P3 | | | | | P0 |
| 1 | | | | P2 | | | | | | | | | | P2 |
| 2 | | | | | | | | | P0 | | | | | |
| 3 | | | | P1 | | | | | P2 | | | | | P1 |
| 4 | | | | P3 | | | | | | | | | | P3 |
| 5 | | | | | | | | | P1 | | | | | |
| 6 | | | | P0 | | | | | P3 | | | | | P0 |
| 7 | | | | P2 | | | | | | | | | | P2 |
| 8 | | | | | | | | | P0 | | | | | |
| 9 | | | | P1 | | | | | P2 | | | | | P1 |
| 10 | | | | P3 | | | | | | | | | | P3 |
| 11 | | | | | | | | | P1 | | | | | |

(3)

| f \ t | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | P0 | | | | | P1 | | | | | P0 |
| 1 | | | | P2 | | | | | P3 | | | | | P2 |
| 2 | | | | | | | | | | | | | | |
| 3 | | | | P1 | | | | | P0 | | | | | P1 |
| 4 | | | | P3 | | | | | P2 | | | | | P3 |
| 5 | | | | | | | | | | | | | | |
| 6 | | | | P0 | | | | | P1 | | | | | P0 |
| 7 | | | | P2 | | | | | P3 | | | | | P2 |
| 8 | | | | | | | | | | | | | | |
| 9 | | | | P1 | | | | | P0 | | | | | P1 |
| 10 | | | | P3 | | | | | P2 | | | | | P3 |
| 11 | | | | | | | | | | | | | | |

(4)

| f \ t | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | P3 | | | | | P2 | | | | | P3 |
| 1 | | | | | | | | | | | | | | |
| 2 | | | | P0 | | | | | P1 | | | | | P0 |
| 3 | | | | P2 | | | | | P3 | | | | | P2 |
| 4 | | | | | | | | | | | | | | |
| 5 | | | | P1 | | | | | P0 | | | | | P1 |
| 6 | | | | P3 | | | | | P2 | | | | | P3 |
| 7 | | | | | | | | | | | | | | |
| 8 | | | | P0 | | | | | P1 | | | | | P0 |
| 9 | | | | P2 | | | | | P3 | | | | | P2 |
| 10 | | | | | | | | | | | | | | |
| 11 | | | | P1 | | | | | P0 | | | | | P1 |

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | P | | | P | | | P | | | P | |
| 2 | | | | Ph | | | Ph | | | Ph | | | Ph | |
| 3 | | | | | | | | | | | | | | |
| 4 | | | | | | | | | | | | | | |
| 5 | | | | P | | | P | | | P | | | P | |
| 6 | | | | Ph | | | Ph | | | Ph | | | Ph | |
| 7 | | | | | | | | | | | | | | |
| 8 | | | | | | | | | | | | | | |
| 9 | | | | P | | | P | | | P | | | P | |
| 10 | | | | Ph | | | Ph | | | Ph | | | Ph | |
| 11 | | | | | | | | | | | | | | |

(1)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | P | | | | | | P | | | | |
| 2 | | | | Ph | | | P | | | Ph | | | P | |
| 3 | | | | | | | Ph | | | | | | Ph | |
| 4 | | | | | | | | | | | | | | |
| 5 | | | | P | | | | | | P | | | | |
| 6 | | | | Ph | | | P | | | Ph | | | P | |
| 7 | | | | | | | Ph | | | | | | Ph | |
| 8 | | | | | | | | | | | | | | |
| 9 | | | | P | | | | | | P | | | | |
| 10 | | | | Ph | | | P | | | Ph | | | P | |
| 11 | | | | | | | Ph | | | | | | Ph | |

(2)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | P | | | Ph | | | P | | | Ph | |
| 1 | | | | Ph | | | | | | Ph | | | | |
| 2 | | | | | | | | | | | | | | |
| 3 | | | | | | | P | | | | | | P | |
| 4 | | | | P | | | Ph | | | P | | | Ph | |
| 5 | | | | Ph | | | | | | Ph | | | | |
| 6 | | | | | | | | | | | | | | |
| 7 | | | | | | | P | | | | | | P | |
| 8 | | | | P | | | Ph | | | P | | | Ph | |
| 9 | | | | Ph | | | | | | Ph | | | | |
| 10 | | | | | | | | | | | | | | |
| 11 | | | | | | | P | | | | | | P | |

(3)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | P | | | | | | | | | P | |
| 1 | | | | Ph | | | | | | | | | Ph | |
| 2 | | | | | | | | | P | | | | | |
| 3 | | | | P | | | | | Ph | | | | P | |
| 4 | | | | Ph | | | | | | | | | Ph | |
| 5 | | | | | | | | | P | | | | | |
| 6 | | | | P | | | | | Ph | | | | P | |
| 7 | | | | Ph | | | | | | | | | Ph | |
| 8 | | | | | | | | | P | | | | | |
| 9 | | | | P | | | | | Ph | | | | P | |
| 10 | | | | Ph | | | | | | | | | | |
| 11 | | | | | | | | | P | | | | | |

(4)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | P | | | | | P | | | | P | |
| 1 | | | | Ph | | | | | Ph | | | | Ph | |
| 2 | | | | | | | | | | | | | | |
| 3 | | | | P | | | | | P | | | | P | |
| 4 | | | | Ph | | | | | Ph | | | | Ph | |
| 5 | | | | | | | | | | | | | | |
| 6 | | | | P | | | | | P | | | | P | |
| 7 | | | | Ph | | | | | Ph | | | | Ph | |
| 8 | | | | | | | | | | | | | | |
| 9 | | | | P | | | | | P | | | | P | |
| 10 | | | | Ph | | | | | Ph | | | | Ph | |
| 11 | | | | | | | | | | | | | | |

(5)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | Ph | | | | | Ph | | | | Ph | |
| 1 | | | | | | | | | | | | | | |
| 2 | | | | P | | | | | P | | | | P | |
| 3 | | | | Ph | | | | | Ph | | | | Ph | |
| 4 | | | | | | | | | | | | | | |
| 5 | | | | P | | | | | P | | | | P | |
| 6 | | | | Ph | | | | | Ph | | | | Ph | |
| 7 | | | | | | | | | | | | | | |
| 8 | | | | P | | | | | P | | | | P | |
| 9 | | | | Ph | | | | | Ph | | | | Ph | |
| 10 | | | | | | | | | | | | | | |
| 11 | | | | P | | | | | P | | | | P | |

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | P | | | P | | | P | | | | P |
| 2 | | | | Ph | | | Ph | | | Ph | | | | Ph |
| 3 | | | | | | | | | | | | | | |
| 4 | | | | | | | | | | | | | | |
| 5 | | | | P | | | P | | | P | | | | P |
| 6 | | | | Ph | | | Ph | | | Ph | | | | Ph |
| 7 | | | | | | | | | | | | | | |
| 8 | | | | | | | | | | | | | | |
| 9 | | | | P | | | P | | | P | | | | P |
| 10 | | | | Ph | | | Ph | | | Ph | | | | Ph |
| 11 | | | | | | | | | | | | | | |

(1)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | | | | | | | | | | | |
| 1 | | | | P | | | | | | P | | | | |
| 2 | | | | Ph | | | P | | | Ph | | | | P |
| 3 | | | | | | | Ph | | | | | | | Ph |
| 4 | | | | | | | | | | | | | | |
| 5 | | | | P | | | | | | P | | | | |
| 6 | | | | Ph | | | P | | | Ph | | | | P |
| 7 | | | | | | | Ph | | | | | | | Ph |
| 8 | | | | | | | | | | | | | | |
| 9 | | | | P | | | | | | P | | | | |
| 10 | | | | Ph | | | P | | | Ph | | | | P |
| 11 | | | | | | | Ph | | | | | | | Ph |

(2)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | P | | | Ph | | | P | | | | Ph |
| 1 | | | | Ph | | | | | | Ph | | | | |
| 2 | | | | | | | | | | | | | | |
| 3 | | | | | | | P | | | | | | | P |
| 4 | | | | P | | | Ph | | | P | | | | Ph |
| 5 | | | | Ph | | | | | | Ph | | | | |
| 6 | | | | | | | | | | | | | | |
| 7 | | | | | | | P | | | | | | | P |
| 8 | | | | P | | | Ph | | | P | | | | Ph |
| 9 | | | | Ph | | | | | | Ph | | | | |
| 10 | | | | | | | | | | | | | | |
| 11 | | | | | | | P | | | | | | | P |

(3)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | P | | | | | | | | | | P |
| 1 | | | | Ph | | | | | | | | | | Ph |
| 2 | | | | | | | | | P | | | | | |
| 3 | | | | P | | | | | Ph | | | | | P |
| 4 | | | | Ph | | | | | | | | | | Ph |
| 5 | | | | | | | | | P | | | | | |
| 6 | | | | P | | | | | Ph | | | | | P |
| 7 | | | | Ph | | | | | | | | | | Ph |
| 8 | | | | | | | | | P | | | | | |
| 9 | | | | P | | | | | Ph | | | | | P |
| 10 | | | | Ph | | | | | | | | | | |
| 11 | | | | | | | | | P | | | | | |

(4)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | P | | | | | P | | | | | P |
| 1 | | | | Ph | | | | | Ph | | | | | Ph |
| 2 | | | | | | | | | | | | | | |
| 3 | | | | P | | | | | P | | | | | P |
| 4 | | | | Ph | | | | | Ph | | | | | Ph |
| 5 | | | | | | | | | | | | | | |
| 6 | | | | P | | | | | P | | | | | P |
| 7 | | | | Ph | | | | | Ph | | | | | Ph |
| 8 | | | | | | | | | | | | | | |
| 9 | | | | P | | | | | P | | | | | P |
| 10 | | | | Ph | | | | | Ph | | | | | Ph |
| 11 | | | | | | | | | | | | | | |

(5)

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | | | Ph | | | | | Ph | | | | | Ph |
| 1 | | | | | | | | | | | | | | |
| 2 | | | | P | | | | | P | | | | | P |
| 3 | | | | Ph | | | | | Ph | | | | | Ph |
| 4 | | | | | | | | | | | | | | |
| 5 | | | | P | | | | | P | | | | | P |
| 6 | | | | Ph | | | | | Ph | | | | | Ph |
| 7 | | | | | | | | | | | | | | |
| 8 | | | | P | | | | | P | | | | | P |
| 9 | | | | Ph | | | | | Ph | | | | | Ph |
| 10 | | | | | | | | | | | | | | |
| 11 | | | | P | | | | | P | | | | | P |

(6)

TRANSMISSION METHOD OF DOWNLINK REFERENCE SIGNAL AND APPARATUS THEREOF

CROSS-REFERENCE TO RELATED APPLICATIONS

This application is a 371 U.S. national stage application of International Application No. PCT/KR2010/002241, filed on Apr. 12, 2010, which claims priority to Korean Application Nos. 10-2010-0032594, filed on Apr. 9, 2010, 10-2010-0032593, filed on Apr. 9, 2010, 10-2010-0032592, filed on Apr. 9, 2010, 10-2010-0032591, filed on Apr. 9, 2010, and 10-2010-0032590, filed on Apr. 9, 2010, and U.S. Provisional Application Ser. Nos. 61/172,782, filed on Apr. 26, 2009, 61/172,764, filed on Apr. 26, 2009, 61/168,236, filed on Apr. 10, 2009, 61/168,235, filed on Apr. 10, 2009, and 61/168,234, filed on Apr. 10, 2009, the contents of which are incorporated by reference herein in their entirety.

TECHNICAL FIELD

The present invention relates to a wireless communication system and more particularly to a method and apparatus for transmitting a downlink Reference Signal (RS) in a wireless communication system.

BACKGROUND ART

A Multiple Input Multiple Output (MIMO) system is a system that improves data transmission and reception efficiency using multiple transmit antennas and multiple receive antennas. MIMO technology includes a spatial diversity scheme and a spatial multiplexing scheme. The spatial diversity scheme is suitable for data transmission by a User Equipment (UE) that moves at a high speed since transmission reliability or cell coverage can be increased using diversity gain. The spatial diversity scheme can increase data transfer rate without increasing system bandwidth by simultaneously transmitting different data.

In a MIMO system, each transmit antenna has an independent data channel. A receiver estimates a channel with respect to each transmit antenna and receives data transmitted from each transmit antenna. Channel estimation refers to a process of compensating for signal distortion due to fading so as to restore the received signal. Fading refers to a phenomenon in which the intensity of a signal is rapidly changed due to multi-path and time delay in a wireless communication system environment. A reference signal known to both a transmitter and a receiver is necessary for channel estimation. The reference signal may be abbreviated to RS or referred to as a pilot signal depending on the standard.

A downlink reference signal is a pilot signal for coherent demodulation, such as a Physical Downlink Shared Channel (PDSCH), a Physical Control Format Indicator Channel (PCFICH), a Physical Hybrid Indicator Channel (PHICH), and a Physical Downlink Control Channel (PDCCH). The downlink reference signal includes a Common Reference Signal (CRS) shared among all UEs in a cell and a Dedicated Reference Signal (DRS) for a specific UE. The CRS may be referred to as a cell-specific reference signal. The DRS may also be referred to as a UE-specific reference signal.

The DRS is used to provide coherent demodulation of a UE that performs beamforming. CRS-based channel estimation is performed by interpolating and averaging RSs in the time domain and the frequency domain excluding an allocated bandwidth. The UE measures the CRS and provides feedback information such as Channel Quality Information (CQI), a Precoding Matrix Indicator (PMI), and a Rank Indicator (RI) to a base station (or eNB). The base station may perform downlink frequency domain scheduling using the feedback information. A pseudo-random sequence may be used as each of the DRS and the CRS.

A number of considerations should be taken into account when arranging the DRS and the CRS. Such considerations include the amount of radio resources to be allocated to an RS, the exclusive arrangement of the DRS and the CRS, the positions of a synchronization channel (SCH) and a broadcast channel (BCH), the density of the DRS, and the like.

If a large amount of resources are allocated to an RS, data transfer rate may be reduced while it is possible to achieve high channel estimation performance since the density of the RS is high. If a small amount of resources are allocated to an RS, channel estimation performance may be reduced since the density of the RS is decreased although it is possible to achieve a high data transfer rate.

In the case of beamforming transmission, there is a need to use a method of arranging a DRS and a CRS such that the DRS and the CRS do not overlap since both the DRS and the CRS are transmitted. In the case where a specific Orthogonal Frequency Division Multiplexing (OFDM) symbol is allocated for transmission of an SCH and a BCH, it is not possible to transmit a DRS. The UE may fail to restore data if the DRS is not transmitted exclusively with the CRS or is transmitted such that the DRS overlaps the SCH or the BCH.

Accordingly, there is a need to provide a method for efficiently transmitting the DRS.

DISCLOSURE

Technical Problem

An object of the present invention devised to solve the problem lies in a method for transmitting a DRS, wherein the DRS is efficiently arranged in a subframe to reduce loss of data when the data is demodulated.

Technical Solution

In accordance with an embodiment of the present invention, the object of the present invention can be achieved by providing a method for a base station to transmit a reference signal to a user equipment using 8 layers or less, the method including transmitting data of the 8 layers or less through a data region of a downlink subframe, and transmitting reference signals of the 8 layers or less in a specific Orthogonal Frequency Division Multiplexing (OFDM) symbol of the downlink subframe, wherein the reference signals are Dedicated Reference Signals (DRSs) for demodulating data of the 8 layers or less, and the reference signals of the 8 layers or less are divided into first and second groups and the reference signals of the first and second groups are multiplexed according to a Code Division Multiplexing (CDM) scheme at each resource element.

In addition, the reference signals of the first and second groups may be arranged at resource elements at 2 contiguous subcarrier positions in one Orthogonal Frequency Division Multiplexing (OFDM) symbol.

Further, the reference signals of the first and second groups may be arranged at equal intervals of subcarriers in one OFDM symbol.

Furthermore, the reference signals of the first and second groups may be arranged at the same frequency-domain positions in each OFDM symbol in which the reference signals are arranged.

In addition, frequency-domain positions of the reference signals of the first and second groups may be shifted in each OFDM symbol in which the reference signals are arranged.

In accordance with another embodiment of the present invention, the object of the present invention can be achieved by providing a method for a user equipment to process a reference signal received from a base station using 8 layers or less, the method including receiving data of the 8 layers or less through a data region of a downlink subframe, receiving reference signals of the 8 layers or less in a specific Orthogonal Frequency Division Multiplexing (OFDM) symbol of the downlink subframe, and performing channel estimation for demodulating data of the 8 layers or less using the received reference signals, wherein the reference signals of the 8 layers or less are divided into first and second groups and the reference signals of the first and second groups are multiplexed according to a Code Division Multiplexing (CDM) scheme at each resource element.

The reference signals of the first and second groups may be arranged at resource elements at 2 contiguous subcarrier positions in one OFDM symbol.

In addition, the reference signals of the first and second groups may be arranged at equal intervals of subcarriers in one OFDM symbol.

Further, the reference signals of the first and second groups may be arranged at the same frequency-domain positions in each OFDM symbol in which the reference signals are arranged.

Furthermore, frequency-domain positions of the reference signals of the first and second groups may be shifted in each OFDM symbol in which the reference signals are arranged.

In accordance with another embodiment of the present invention, the object of the present invention can be achieved by providing a base station for transmitting a reference signal to a user equipment using 8 layers or less, the base station including a reception module for receiving an uplink signal from the user equipment, a transmission module for transmitting a downlink signal to the user equipment, and a processor connected to the reception module and the transmission module, the processor controlling the base station including the reception module and the transmission module, wherein the processor controls the transmission module to transmit data of the 8 layers or less through a data region of a downlink subframe and to transmit reference signals of the 8 layers or less in a specific Orthogonal Frequency Division Multiplexing (OFDM) symbol of the downlink subframe, wherein the reference signals are Dedicated Reference Signals (DRSs) for demodulating data of the 8 layers or less, and wherein the reference signals of the 8 layers or less are divided into first and second groups and the reference signals of the first and second groups are multiplexed according to a Code Division Multiplexing (CDM) scheme at each resource element.

In accordance with another embodiment of the present invention, the object of the present invention can be achieved by providing a user equipment for processing a reference signal received from a base station using 8 layers or less, the base station including a reception module for receiving control information and data from the base station, a transmission module for transmitting control information and data to the base station, and a processor connected to the reception module and the transmission module, the processor controlling the user equipment including the reception module and the transmission module, wherein the processor controls the reception module to receive data of the 8 layers or less through a data region of a downlink subframe and to receive reference signals of the 8 layers or less in a specific Orthogonal Frequency Division Multiplexing (OFDM) symbol of the downlink subframe, wherein the processor controls the user equipment to perform channel estimation for demodulating data of the 8 layers or less using the received reference signals, and wherein the reference signals of the 8 layers or less are divided into first and second groups and the reference signals of the first and second groups are multiplexed according to a Code Division Multiplexing (CDM) scheme at each resource element.

Advantageous Effects

According to the present invention, it is possible to increase channel estimation performance in a wireless communication system since a DRS can be transmitted exclusively with a variety of control channels. In addition, it is possible to reduce data loss when data demodulation is performed since the DRS is efficiently arranged in a subframe.

Advantages of the present invention are not limited to those described above and other advantages will be clearly understood by those skilled in the art from the following description.

DESCRIPTION OF DRAWINGS

FIGS. 5 to 82 illustrate embodiments of DRS patterns according to the present invention.

BEST MODE

Figure 1:
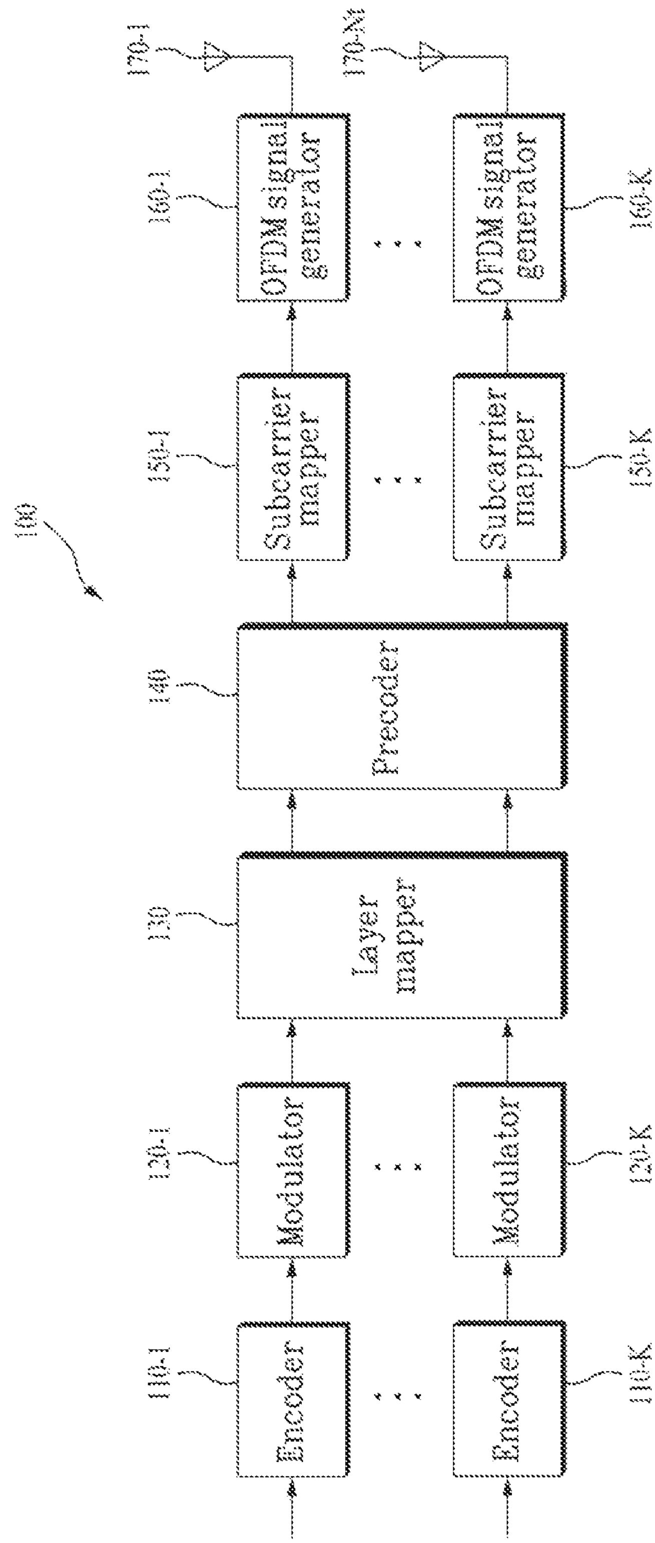
FIG. 1 is a block diagram illustrating a structure of a transmitter including multiple antennas.

The embodiments described below are provided by combining components and features of the present invention in specific forms. The components or features of the present invention can be considered optional unless explicitly stated otherwise. The components or features may be implemented without being combined with other components or features. The embodiments of the present invention may also be provided by combining some of the components and/or features. The order of the operations described below in the embodiments of the present invention may be changed. Some components or features of one embodiment may be included in another embodiment or may be replaced with corresponding components or features of another embodiment.

The embodiments of the present invention have been described focusing mainly on the data communication relationship between a terminal and a Base Station (BS). The BS is a terminal node in a network which performs communication directly with the terminal. Specific operations which have been described as being performed by the BS may also be performed by an upper node as needed.

That is, it will be apparent to those skilled in the art that the BS or any other network node may perform various operations for communication with terminals in a network including a number of network nodes including BSs. Here, the term "base station (BS)" may be replaced with another term such as "fixed station", "Node B", "eNode B (eNB)", or "Access Point (AP)". The term "relay" may be replaced with another term such as “Relay Node (RN)”, “Relay Station (RS)”. The term “terminal” may also be replaced with another term such as “User Equipment (UE)”, “Mobile Station (MS)”, “Mobile Subscriber Station (MSS)”, or “Subscriber Station (SS)”.

Specific terms used in the following description are provided for better understanding of the present invention and can be replaced with other terms without departing from the spirit of the present invention.

In some instances, known structures and devices are omitted or shown in block diagram form, focusing on important features of the structures and devices, so as not to obscure the concept of the present invention. The same reference numbers will be used throughout this specification to refer to the same or like parts.

The embodiments of the present invention can be supported by standard documents of at least one of the IEEE 802 system, the 3GPP system, the 3GPP LTE system, the 3GPP LTE-Advanced (LTE-A) system, and the 3GPP2 system which are wireless access systems. That is, steps or portions that are not described in the embodiments of the present invention for the sake of clearly describing the spirit of the present invention can be supported by the standard documents. For all terms used in this disclosure, reference can be made to the standard documents.

The following embodiments of the present invention can be applied to a variety of wireless access technologies, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. The CDMA may be embodied with wireless (or radio) technology such as Universal Terrestrial Radio Access (UTRA) or CDMA2000. The TDMA may be embodied with wireless (or radio) technology such as Global System for Mobile communications (GSM)/General Packet Radio Service (GPRS)/Enhanced Data Rates for GSM Evolution (EDGE). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). Although the following description focuses on the 3GPP LTE and LTE-A standards for the sake of clarity, technical features of the present invention are not limited to the 3GPP LTE and LTE-A standards.

FIG. 1 is a block diagram illustrating a structure of a transmitter including multiple antennas.

As shown in FIG. 1, the transmitter 100 includes encoders 110-1 to 110-K, modulation mappers 120-1 to 120-K, a layer mapper 130, a precoder 140, resource element mappers (or subcarrier mappers) 150-1 to 150-K, and Orthogonal Frequency Division Multiplexing (OFDM) signal generators 160-1 to 160-K. The transmitter 100 also includes Nt transmit antennas 170-1 to 170-K.

Each of the encoders 110-1 to 110-K encodes input data according to a predetermined coding scheme to create coded data. Each of the modulation mappers 120-1 to 120-K maps the coded data to a modulation symbol that represents a position on a signal constellation. The modulation scheme may be, but is not limited to, any of m-Phase Shift Keying (m-PKS) and m-Quadrature Amplitude Modulation (m-QAM). For example, the m-PSK may be BPSK, QPSK, or 8-PSK. The m-QAM may be 16-QAM, 64-QAM, or 256-QAM.

The layer mapper 130 defines a layer of the modulation symbol to allow the precoder 140 to distribute an antenna-specific symbol to a path of each antenna. The layer is defined as an information path input to the precoder 140. Information path prior to the precoder 140 may be referred to as a virtual antenna or a layer.

The precoder 140 processes the modulation symbol using a MIMO scheme in accordance with the multiple transmit antennas 170-1 to 170-Nt and outputs corresponding antenna-specific symbols. The precoder 140 distributes the antenna-specific symbols to the resource element mappers 150-1 to 150-K of paths of the corresponding antennas. Each information path transmitted by the precoder 140 to a single antenna is referred to as a stream. This can be considered a physical antenna.

The resource element mappers 150-1 to 150-K allocate the antenna-specific symbols to appropriate resource elements and multiplex the antenna-specific symbols according to the user. The OFDM signal generators 160-1 to 160-K modulate the antenna-specific symbols according to the OFDM scheme and output OFDM symbols. The OFDM signal generators 160-1 to 160-K may perform Inverse Fast Fourier Transform (IFFT) on the antenna-specific symbols and may insert a Cyclic Prefix (CP) into each time-domain symbol produced through IFFT. The CP is a signal that is inserted into a guard interval in order to remove inter-symbol interference which is caused by multiple paths in the OFDM transmission scheme. The OFDM symbol is transmitted through each of the transmit antennas 170-1 to 170-Nt.

Figure 2:
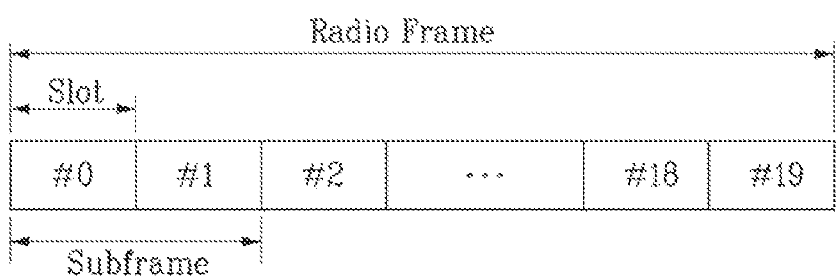
FIG. 2 illustrates a structure of a downlink radio frame.

FIG. 2 illustrates a structure of a downlink radio frame.

As shown in FIG. 2, the downlink radio frame includes 10 subframes, each of which includes two slots. The downlink radio frame may be constructed using Frequency Division Duplex (FDD) or Time Division Duplex (TDD). A time required to transmit one subframe is defined as a Transmission Time Interval (TTI). For example, one subframe may have a length of 1 ms and one slot may have a length of 0.5 ms. One slot may include a plurality of OFDM symbols in the time domain and include a plurality of Resource Blocks (RBs) in the frequency domain.

The number of OFDM symbols included in one slot may vary depending on the configuration of a Cyclic Prefix (CP). CPs include an extended CP and a normal CP. For example, in the case where the OFDM symbols are configured using the normal CP, the number of OFDM symbols included in one slot may be 7. In the case where the OFDM symbols are configured using the extended CP, the length of one OFDM symbol is increased such that the number of OFDM symbols included in one slot is less than when the normal CP is used. In the case where the extended CP is used, the number of OFDM symbols included in one slot may be, for example, 6. When the channel state is unstable, for example, when a User Equipment (UE) moves at a high speed, the extended CP may be used in order to further reduce inter-symbol interference.

In the case where the normal CP is used, one subframe includes 14 OFDM symbols since one slot includes 7 OFDM symbols. In this case, the first 2 or 3 OFDM symbols of each subframe may be allocated to a Physical Downlink Control Channel (PDCCH) and the remaining OFDM symbols may be allocated to a Physical Downlink Shared Channel (PDSCH).

The structure of the radio frame is only exemplary and the number of subframes included in the radio frame, the number of slots included in each subframe, or the number of symbols included in each slot may be changed in various manners.

Figure 3:
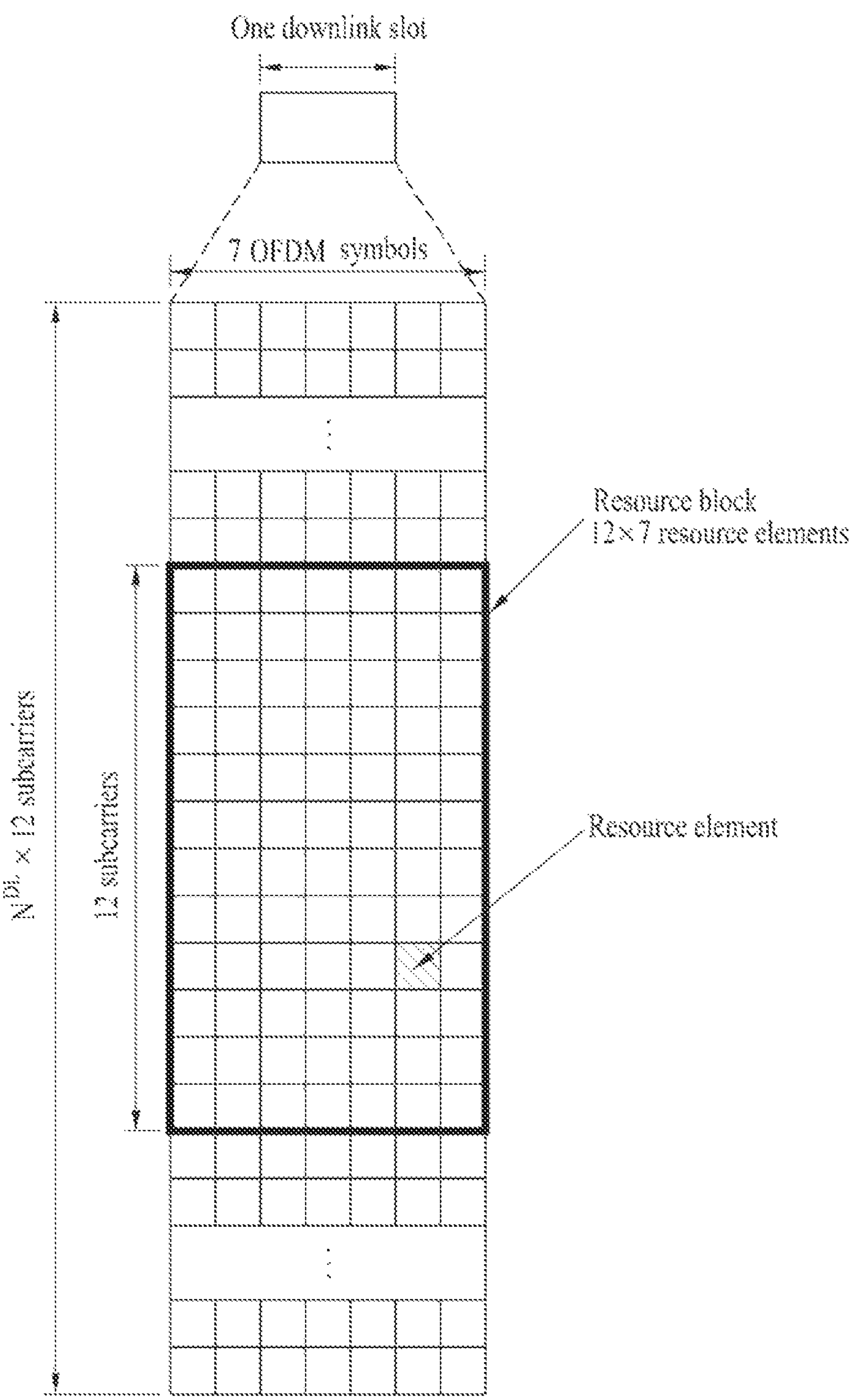
FIG. 3 illustrates an example of a resource grid of one downlink slot.

FIG. 3 illustrates an example of a resource grid in one downlink slot. In this example, OFDM symbols are configured using the normal CP. As shown in FIG. 3, the downlink slot includes a plurality of OFDM symbols in the time domain and includes a plurality of Resource Blocks (RBs) in the frequency domain. Although one downlink slot includes 7 OFDM symbols and one RB includes 12 subcarriers in the example, the present invention is not limited to this example. Each element of the resource grid is referred to as a Resource Element (RE). For example, an RE a(k,l) is located at a k-th subcarrier and an l-th OFDM symbol. One RB includes 12×7 REs. Since the distance between each subcarrier is 15 kHz, one RB includes about 180 kHz in the frequency region. $N^{DL}$ denotes the number of RBs included in the downlink slot. The value $N^{DL}$ is determined based on a downlink transmission bandwidth set by scheduling of a base station.

Figure 4:
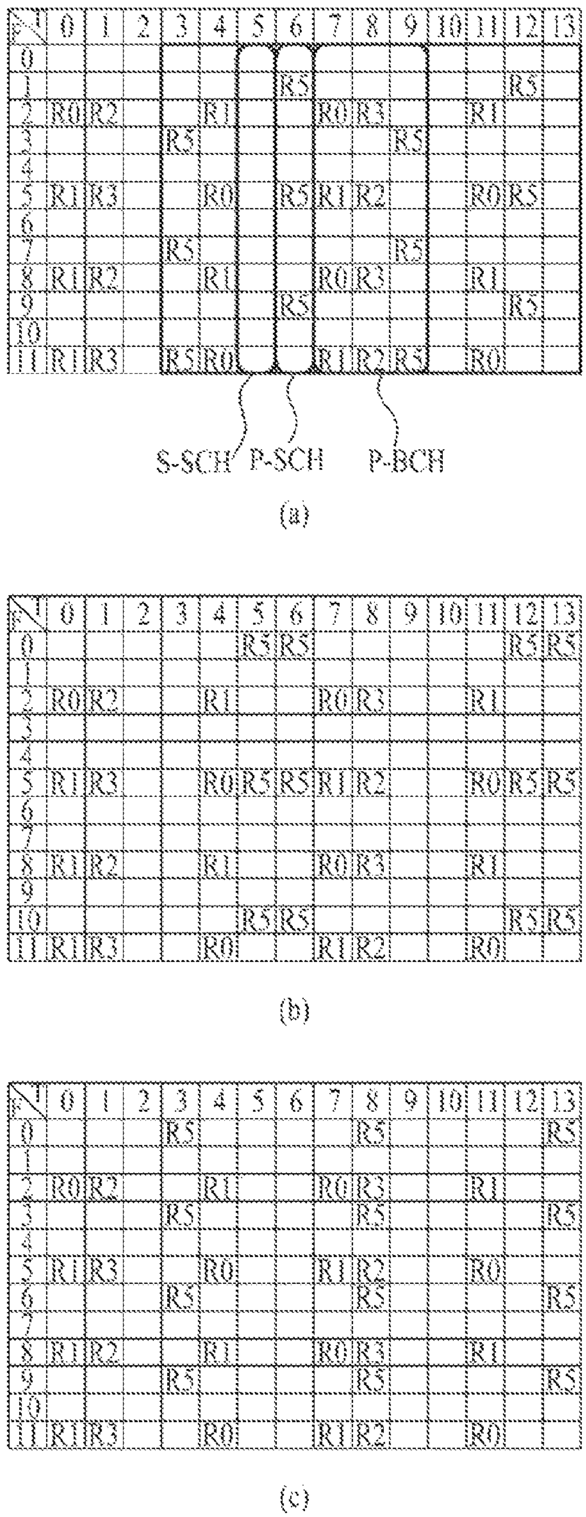
FIG. 4 illustrates a subframe structure according to a normal CP configuration.

FIG. 4 illustrates REs to which an RS, a synchronization signal, and a broadcast channel are mapped when a normal CP is used. In FIG. 4, the horizontal axis represents the time domain and the vertical axis represents the frequency domain. The REs of FIG. 4 correspond to 2 slots that constitute one subframe in the time domain and subcarriers that constitute RBs of one slot in the frequency domain. For example, 2 consecutive RBs of one subframe, i.e., a pair of RBs that may be a unit for resource mapping in one TTI (or first and second slots of one subframe), may include 14 OFDM symbols in the time domain and 12 subcarriers in the frequency domain. A smallest square region in the time-frequency region shown in FIG. 4 corresponds to 1 OFDM symbol in the time domain and corresponds to 1 subcarrier in the frequency domain.

Referring to FIG. 4(*a*), Rp denotes a RE that is used for transmission of an RS in a pth antenna port. For example, R0 to R3 denote REs to which CRSs transmitted in the 0th to 3rd antenna ports are mapped and R5 denotes a RE to which a DRS transmitted in the 5th antenna port is mapped. CRSs transmitted in the 0th and 1st antenna ports are transmitted at intervals of 6 subcarriers (per antenna port) in the 0th, 4th, 7th, and 11th OFDM symbols. The DRS is transmitted at intervals of 4 subcarriers in the 3rd, 6th, 9th, and 12th OFDM symbols. Accordingly, 12 DRSs are transmitted in 2 RBs (i.e., in a pair of RBs) which are consecutive in time in one subframe.

FIGS. 4(*b*) and 4(*c*) illustrate another embodiment associated with the positions of DRSs R5 transmitted in the 5th antenna port in the time-frequency domain in which CRSs R0 to R3 are located at the same positions as those shown in FIG. 4(*a*).

Although not illustrated in FIG. 4, R4 may represent an RE that is used to transmit an RS of a Multicast Broadcast Single Frequency Network (MBSFN) in the 4th antenna port. RSs R0 to R5 are arranged so as not to overlap with each other.

Synchronization signals are signals of a physical layer used for cell search and include a primary synchronization signal and a secondary synchronization signal. A physical channel in which the primary synchronization signal is referred to as a Primary Synchronization CHannel (P-SCH) and a physical channel in which the secondary synchronization signal is referred to as a Secondary Synchronization CHannel (S-SCH).

A primary synchronization signal is a signal that the UE uses to achieve slot synchronization when performing initial cell search and may be generated using a Zadoff-Chu sequence in the frequency domain. In the case where the downlink radio frame supports FDD, the primary synchronization signal may be mapped to the last OFDM symbols of the 0th and 10th slots of each radio frame (i.e., to the 6th OFDM symbol of a subframe at intervals of 5 subframes) as shown in FIG. 4. In the case where a downlink radio frame supports TDD, the primary synchronization signal may be mapped to the third OFDM symbols of the 1st and 6th subframes (now shown).

A secondary synchronization signal is a signal that the UE uses to achieve frame synchronization after achieving slot synchronization and may be defined as a combination of two 31-bit sequences. The secondary synchronization signal may be mapped to the 5th OFDM symbols of the 0th and 10th slots of the radio frame (i.e., to the 5th OFDM symbol of a subframe at intervals of 5 subframes) as shown in FIG. 4.

A Physical Broadcast Channel (P-BCH) transmits system information of a cell. The P-BCH is mapped to the 7th to 9th OFDM symbols in one subframe as shown in FIG. 4 and may be transmitted at intervals of 10 subframes. However, the PDCCH is mapped only to subcarriers that are located at different positions from the REs R0 to R3 allocated to the CRSs.

Here, REs to which an SCH and a PDCCH are mapped may overlap an RE in which data is transmitted or an RE in which a DRS is transmitted. For example, in the case where the downlink radio frame supports FDD, the 5th to 9th OFDM symbols are occupied by an SCH or a PDCCH while overlapping a DRS mapped to R5 in the 6th and 9th OFDM symbols. Accordingly, a DRS is punctured and is not transmitted in the OFDM symbols of such an overlapping region. A similar problem may occur in the case where the downlink radio frame supports TDD. Thus, there is a need to take into consideration the positions of an SCH and a PDCCH when arranging a DRS, and a DRS may be arranged in the region of at least one OFDM symbol excluding OFDM symbols in which an SCH and a PDCCH are transmitted. Other considerations that need to be taken into account include PDSCH decoding, the density of transmission of a DRS, robustness in a high-speed moving environment, frequency-selective channel, whether or not a distributed mode is supported, and the number of OFDM symbols of a PDCCH. Since a normal CP is used in the example of FIG. 4, how DRSs are arranged also needs to be taken into consideration when an extended CP is used.

The cell-specific RS is used to perform channel estimation of a physical antenna portion and is commonly transmitted to all UEs in the cell. Channel information that the UE has estimated through the cell-specific RS may be used to demodulate data that has been transmitted through a transmission scheme such as single antenna transmission, transmit diversity, closed-loop spatial multiplexing, open-loop spatial multiplexing, or Multi-User MIMO (MU-MIMO) and may also be used when the UE reports a channel estimation to the BS (or eNB). To increase channel estimation performance using cell-specific RSs, the position (in a subframe) of a cell-specific RS of each cell may be shifted so as to be different from each other. For example, in the case where RSs are located every 3 subcarriers, RSs of one cell may be arranged at 3kth subcarriers while RSs of another cell may be arranged at 3k+1th subcarriers.

A DRS is a UE-specific RS used for data modulation. When multi-antenna transmission is performed, the same precoding weight as that used for a specific UE is used for a corresponding RS to allow the UE to estimate, upon receiving the RS, an equivalent channel corresponding to the transmission channel with the precoding weight applied to transmission of each transmit antenna. Since DRSs should satisfy the requirement that respective DRSs of transmission layers be orthogonal to each other, the pattern of an RS may be defined to be different for each transmission rank.

The conventional 3GPP LTE system supports transmission of up to 4 transmit antennas, and cell-specific RSs for supporting a single transmit antenna, 2 transmit antennas, 4 transmit antennas and DRSs for rank-1 beamforming have been defined in the conventional 3GPP LTE system. On the other hand, high-order MIMO, multi-cell transmission, enhanced MU-MIMO, and the like are under consideration in LTE-A which is an evolved version of 3GPP LTE. Especially, DRS-based data demodulation is under consideration in order to support an enhanced transmission scheme and efficient use of RSs. In the LTE-A system, it is possible to provide an 8-transmit antenna RS structure in order to support an 8-transmit antenna MIMO scheme while separately transmitting an RS for measurement and a DRS in order to reduce RS overhead. In the case of a DRS, it is possible to further reduce RS overhead using a precoded RS and it is also possible to optimize an RS structure by transmitting an RS for measurement with a low duty cycle. In addition, it is preferable that a DRS be set so as to be present only in an RB and layer in which downlink transmission has been scheduled by a BS.

A DRS newly defined to satisfy such requirements needs to be able to support up to rank 8 and also to support dual stream beamforming, cooperative multi-point transmission, enhanced MU-MIMO, and the like. The following may be taken into consideration in order to accomplish this.

If high-density RSs are transmitted in order to increase channel estimation performance, pilots of some users may be wasted although it is possible to satisfy target performance of users which request high channel estimation performance. On the other hand, if low-density RSs are transmitted in order to increase system throughput, bit error rates of some users may be increased although data transfer rate is increased. For example, a user moving at a high speed experiences a channel that rapidly changes in time. In this case, it is suitable to use an RS structure in which RSs are arranged at small intervals in order to achieve desired channel estimation performance since the correlation time is short. On the other hand, some users may be in a stationary state. In this case, it is possible to achieve high channel estimation performance even when the RS interval is great since the correlation time is long. Accordingly, there is a need to provide a method of transmitting RSs having an RS density and a time-domain and frequency-domain pattern that are suitable for a user taking into consideration RS density and channel estimation performance.

In the LTE-A system, there is a need to always transmit a cell-specific RS such that the conventional LTE system can operate. The cell-specific RS may be an RS for a single transmit antenna, an RS for 2 transmit antennas, or an RS for 4 transmit antennas. It may be considered to shift the frequency of a cell-specific RS when designing a DRS. A DRS may be located at the same OFDM symbol as a cell-specific RS and may be located at an OFDM symbol which does not include a cell-specific RS.

In the LTE-A system, it is necessary to support two types of RSs, an RS for PDSCH modulation and an RS for Channel State Information (CSI) measurement. The DRS may also be referred to as a Demodulation Reference Signal (DMRS) and is distinguished from an RS for CSI measurement. 1 or 2 RSs for CSI measurement may be present in one subframe. RSs may be designed such that an RS for CSI measurement and a DRS are located together in one OFDM symbol.

Taking into consideration that data and DRSs are punctured at REs to which an SCH and a BCH are mapped, RSs may be designed such that a DRS is included in at least one OFDM symbol excluding OFDM symbols to which an SCH and a BCH are mapped. In addition, it may be required to perform subframe timing transition in a backhaul link between a relay and a base station for the purpose of, for example, timing arrangement. To accomplish this, it may also be possible to puncture the last OFDM symbol of the subframe.

In the case of dual stream beamforming, a DRS for rank-2 beamforming may be designed so as to reuse a DRS pattern for rank-1 beamforming. In this case, 2 layers may be multiplexed using Code Division Multiplexing (CDM), Time Division Multiplexing (TDM), or Frequency Division Multiplexing (FDM). In addition, in the case where an RS of rank 2 or higher is transmitted using two or more layers, respective RSs may be transmitted through the layers after being multiplexed using CDM in a specific time-frequency region or DRSs of time-frequency regions may be additionally transmitted after being multiplexed using TDM or FDM.

A frequency region and a time region to which no DRS is allocated may be demodulated by interpolating or extrapolating DRSs. Channel estimation based on extrapolation may provide lower channel estimation performance than channel estimation based on interpolation. Accordingly, it may be considered to reduce channel estimation based on extrapolation by locating DRSs at end portions of time-frequency regions of 2 RBs (i.e., in a pair of RBs) that are consecutive in time in one subframe.

Thus, in the case of a normal CP configuration in which one subframe includes 14 OFDM symbols (the 0th to 13th OFDM symbols), a PDCCH region may be located at the 0th to 2nd OFDM symbols, a cell-specific RSs may be located at the 0th, 1st, 4th, 7th, 8th, and 11th OFDM symbols, an SCH may be located at the 5th and 6th OFDM symbols, and a BCH may be located at the 7th, 8th, and 9th OFDM symbols. The 13th OFDM symbol may be punctured according to subframe timing transition. Accordingly, there is a need to design a DRS so as to be located in at least one of the 3rd, 10th, and 12th OFDM symbols.

Taking into consideration these facts, there is a need to design a DRS pattern so as to efficiently perform data demodulation through channel estimation using a DRS.

The following embodiments will be described focusing mainly on a normal CP structure in which one subframe is constructed of 14 OFDM symbols. However, one subframe may also be constructed of less than 14 OFDM symbols as in the extended CP structure in which one subframe includes 12 OFDM symbols. In this case, in the following embodiments, each subframe may be constructed in such a manner that OFDM symbols, each including a DRS, a cell-specific RS, or an RS for CSI measurement, are included in the subframe and OFDM symbols in which only data is included and to which no RS is allocated are not included in the subframe.

The present invention suggests a DRS pattern for each layer (antenna port) of up to rank 8 as described below in the following embodiments.

In the case of rank-2 transmission, a position denoted by ‘A’ in the time-frequency domain in drawings illustrating REs to which the present invention is applied and relevant descriptions in association with a DRS pattern according to FDM or TDM indicates the position of a DRS for the 1st layer (antenna port) and a position denoted by ‘B’ indicates the position of a DRS for the 2nd layer (antenna port). In the case of rank-2 transmission, DRSs for the 2nd layer may be multiplexed using a variety of codes according to CDM. For example, Hadamard, Discrete Fourier Transform (DFT), Walsh, Constant Amplitude Zero Autocorrelation Waveform (CAZAC), and Pseudo Noise (PN) sequences may be used for multiplexing of DRSs. In the drawings and relevant descriptions, a position denoted by 'A/B' in one RE indicates the position of each DRS for the 1st and 2nd layers that are multiplexed using CDM.

In the case of rank-4 transmission, a position denoted by 'C' indicates the position of a DRS for the 3rd layer and a position denoted by 'D' indicates the position of a DRS for the 4th layer in addition to the DRS position indications of rank-2 transmission described above. In the case of rank-8 transmission, a position denoted by 'E' indicates the position of a DRS for the 5th layer, a position denoted by 'F' indicates the position of a DRS for the 6th layer, a position denoted by 'G' indicates the position of a DRS for the 7th layer, and a position denoted by 'H' indicates the position of a DRS for the 8th layer in addition to the DRS position indications of rank-4 transmission described above.

In the drawings, a position denoted by 'C/D' indicates that DRSs for the 3rd and 4th layers multiplexed according to a CDM scheme are arranged in a corresponding RE, a position denoted by 'E/F' indicates that DRSs for the 5th and 6th layers multiplexed according to a CDM scheme are arranged in a corresponding RE, and a position denoted by 'G/H' indicates that DRSs for the 7th and 8th layers multiplexed according to a CDM scheme are arranged in a corresponding RE.

In addition, a position denoted by 'C/E/G' indicates that DRSs for the 3rd, 5th, and 7th layers multiplexed according to a CDM scheme are arranged in a corresponding RE and a position denoted by 'D/F/H' indicates that DRSs for the 4th, 6th, and 8th layers multiplexed according to a CDM scheme are arranged in a corresponding RE.

In addition, a position denoted by 'C~E' or 'C-E' indicates that DRSs for the 3rd to 5th layers multiplexed according to a CDM scheme are arranged in a corresponding RE and a position denoted by 'F~H' or 'F-H' indicates that DRSs for the 6th to 8th layers multiplexed according to a CDM scheme are arranged in a corresponding RE. In addition, a position denoted by 'C~H' or 'C-H' indicates that DRSs for the 3rd to 8th layers multiplexed according to a CDM scheme are arranged in a corresponding RE.

The mapping relationship of the positions in the time-frequency domain of the RSs and the layers are not limited to those described above and any layer may be mapped to any RS position while maintaining the 1:1 mapping relationship.

In the case where RSs of rank 2 or higher are transmitted using 2 or more layers, respective RSs to be transmitted through the layers may be multiplexed using CDM in a specific time-frequency region or DRSs may additionally be transmitted after being multiplexed using TDM or FDM in time-frequency regions.

On the other hand, in the case of rank-1 transmission, positions at which DRSs for rank-2 transmission are indicated to be located may all be used as positions of RSs for a single layer (antenna port).

In the following embodiments, a DRS pattern may be configured taking into consideration the following facts.

DRSs for all antenna ports may be equally allocated to one subframe in order to reduce the occurrence of symbol power fluctuation upon power boosting of the DRSs. On the other hand, a greater number of DRSs of one layer than those of other layers may be allocated to a single layer in order to increase channel estimation performance of the layer.

DRSs may be arranged at small symbol intervals so as to span the time regions of one subframe in order to increase the robustness of channel estimation through DRSs with respect to time selective characteristics. In addition, DRSs may be arranged at small subcarrier intervals so as to span the frequency regions of one subframe in order to increase the robustness of channel estimation through DRSs with respect to frequency selective characteristics.

Taking into consideration low mobility, DRSs may be arranged to be concentrated in a specific time region. On the other hand, taking into consideration high mobility, DRSs may be arranged so as to span the time regions of one subframe.

In addition, taking into consideration frequency shift of a cell-specific RS in DRS pattern design, a margin in which no DRSs are arranged may be defined in a range of subcarriers to increase the extensity of frequency shift. Alternatively, DRSs may be located at the first or last subcarriers if possible to prevent a reduction in channel estimation performance due to channel estimation through extrapolation of DRSs.

In the following embodiments, DRSs may be set so as not to be arranged at 0th to 2nd OFDM symbols to which a PDCCH region is allocated. In addition, DRSs may be set so as not to be arranged at 0th, 1st, 4th, 7th, 8th, and 11th OFDM symbols in which CRSs are transmitted.

In this regard, data of an RE to which no DRS is allocated is restored (or reconstructed) by estimating a channel of the RE through DRS interpolation/extrapolation. Thus, if all DRSs are allocated to the 3rd, 10th, and 12th OFDM symbols, the efficiency of channel estimation performance may be reduced and therefore there may be a need to appropriately arrange DRSs at the remaining OFDM symbols as circumstances require.

An SCH and a BCH are transmitted at intervals of 5 subframes and at intervals of 10 subframes. Accordingly, DRSs are not punctured at 5th to 9th OFDM symbols in all subframes. Therefore, it is possible to design a pattern such that DRSs are partially located at 5th to 9th OFDM symbols.

Alternatively, in the case of a normal CP configuration, 14 OFDM symbols may be classified into 2 groups. The first OFDM symbol group may include the 0th to 2nd OFDM symbols to which a PDCCH region is allocated, the 0th, 1st, 4th, 7th, 8th, and 11th OFDM symbols at which cell-specific RSs are located, the 5th and 6th OFDM symbols at which an SCH is located, the 7th, 8th, and 9th OFDM symbols at which a BCH is located, and the 13th OFDM symbol which is punctured according to subframe timing transition. That is, the first OFDM symbol group may include the 0th to 2nd OFDM symbols, the 4th to 9th OFDM symbols, and the 11th and 13th OFDM symbols. On the other hand, the second OFDM symbol group may include the 3rd, 10th, and 12th OFDM symbols which are not included in the first OFDM symbol group. In order to guarantee DRS transmission, there is a need to allocate at least one DRS to the second OFDM symbol group and there is also a need to allocate as many DRSs as possible to the second OFDM symbol group.

One of the OFDM symbols at which DRSs are arranged may be used as an RS for CQI in a variety of embodiments described below.

Figure 5:
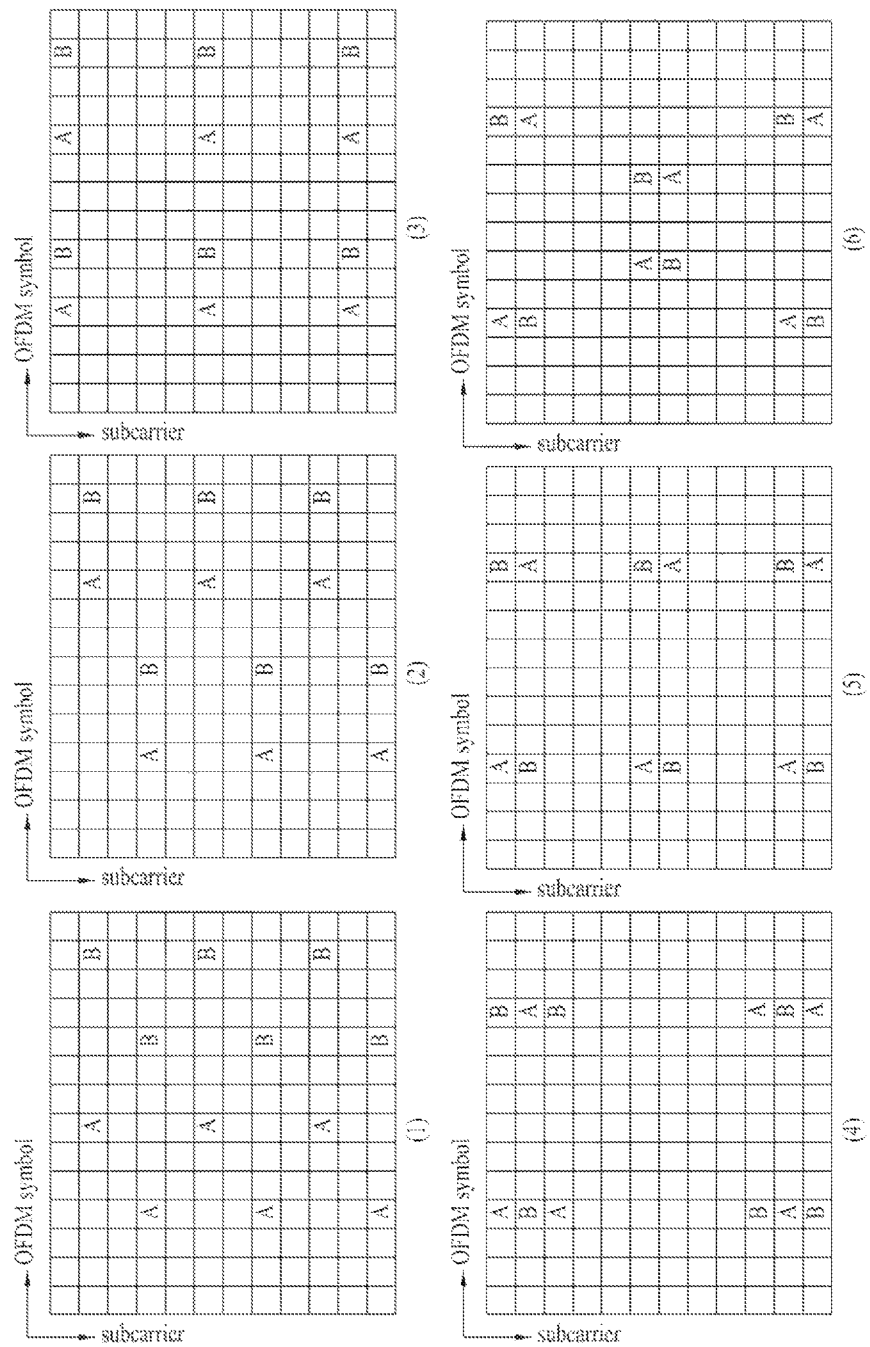

FIGS. 5 to 82 illustrate REs to which DRSs are mapped in one subframe according to a normal CP configuration in association with a variety of embodiments of the present invention. In FIGS. 5 to 82, the horizontal axis represents the time domain and the vertical axis represents the frequency domain. A smallest square region in the time-frequency domain is a region which corresponds to 1 OFDM symbol in the time domain and corresponds to 1 subcarrier in the frequency domain. In addition, the positions of DRSs may be represented by (OFDM symbol index (I), subcarrier index (k)).

Embodiment A-1

A(l,k)={(3,3), (3,7), (3,11), (6,1), (6,5), (6,9)}

B(l,k)={(9,3), (9,7), (9,11), (12,1), (12,5), (12,9)}

The present invention suggests an embodiment in which a conventional DRS pattern for rank-1 beamforming is reused as shown in FIG. 5(1). In this embodiment, DRSs (A) for the 1st layer and DRSs (B) for the 2nd layer are arranged at the same positions as denoted by 'R5' in FIG. 4 in a distributed manner in equal proportions. DRSs A and B which support up to rank-2 transmission are arranged at 12 REs in 2 RBs (i.e., in a pair of RBs) that are consecutive in time in one subframe.

In this and the following embodiments, it is to be noted in association with the meanings of A and B indicating DRSs that, in the case of rank-2 transmission, A and B may correspond to the 1st and 2nd layers, respectively, in a DRS pattern according to FDM or TDM and A and B may also correspond to the 2nd and 1st layers, respectively. It is also to be noted that A and B may be multiplexed using a CDM scheme at each shown DRS position and the positions A and B may both be used as positions of RSs for a single layer in the case of rank-1 transmission.

DRSs are allocated to 2 OFDM symbols (the 6th and 9th OFDM symbols) in the first OFDM symbol group and DRSs are allocated to 2 OFDM symbols (the 3rd and 12th OFDM symbols) in the second OFDM symbol group. 3 DRSs are allocated to one OFDM symbol at equal intervals of 4 subcarriers. No DRS is arranged in an OFDM symbol at which a cell-specific RS is located.

Embodiment A-2

A(l,k)={(3,3), (3,7), (3,11), (9,1), (9,5), (9,9)}

B(l,k)={(6,3), (6,7), (6,11), (12,1), (12,5), (12,9)}

As shown in FIG. 5(2), in this embodiment, DRSs A and B are arranged in equal proportions at 12 REs in 2 RBs (i.e., in a pair of RBs) that are consecutive in time in one subframe. DRSs are allocated to 2 OFDM symbols (the 6th and 9th OFDM symbols) in the first OFDM symbol group and DRSs are allocated to 2 OFDM symbols (the 3rd and 12th OFDM symbols) in the second OFDM symbol group. 3 DRSs are allocated to one OFDM symbol at equal intervals of 4 subcarriers.

Embodiment A-3

A(l,k)={(3,0), (3,5), (3,10), (9,0), (9,5), (9,10)}

B(l,k)={(5,0), (5,5), (5,10), (12,1), (12,5), (12,9)}

As shown in FIG. 5(3), in this embodiment, DRSs A and B are arranged in equal proportions at 12 REs in 2 RBs (i.e., in a pair of RBs) that are consecutive in time in one subframe. DRSs are allocated to 2 OFDM symbols (the 5th and 9th OFDM symbols) in the first OFDM symbol group and DRSs are allocated to 2 OFDM symbols (the 3rd and 12th OFDM symbols) in the second OFDM symbol group. 3 DRSs are allocated to one OFDM symbol at equal intervals of 5 subcarriers. Since DRSs are allocated so as to span the range of 3rd to 12th OFDM symbols and the range of 0th to 10th subcarriers, channel estimation through extrapolation of DRSs is reduced to increase the channel estimation performance.

Embodiment A-4

A(l,k)={(3,0), (3,2), (3,10), (10,1), (10,9), (10,11)}

B(l,k)={(3,1), (3,9), (3,11), (10,0), (10,2), (10,10)}

As shown in FIG. 5(4), in this embodiment, DRSs A and B are arranged in equal proportions at 12 REs in 2 RBs (i.e., in a pair of RBs) that are consecutive in time in one subframe. DRSs are not allocated to the first OFDM symbol group and DRSs are allocated to 2 OFDM symbols (the 3rd and 10th OFDM symbols) in the second OFDM symbol group. In one OFDM symbol, 6 DRSs are allocated at intervals of 1 or 7 subcarriers for rank-1 transmission and 3 DRSs are allocated for each layer at intervals of 2 or 8 subcarriers for rank-2 transmission. No DRSs are arranged in OFDM symbol positions at which a cell-specific RS, an SCH, and a BCH are located.

Embodiment A-5

A(l,k)={(3,0), (3,5), (3,10), (10,1), (10,6), (10,11)}

B(l,k)={(3,1), (3,6), (3,12), (10,0), (10,5), (10,10)}

As shown in FIG. 5(5), in this embodiment, DRSs A and B are arranged in equal proportions at 12 REs in 2 RBs (i.e., in a pair of RBs) that are consecutive in time in one subframe. DRSs are not allocated to the first OFDM symbol group and DRSs are allocated to 2 OFDM symbols (the 3rd and 10th OFDM symbols) in the second OFDM symbol group. In one OFDM symbol, 6 DRSs are allocated at intervals of 1 or 4 subcarriers for rank-1 transmission and 3 DRSs are allocated for each layer at equal intervals of 5 subcarriers for rank-2 transmission.

Embodiment A-6

A(l,k)={(3,0), (3,10), (5,5), (8,6), (10,1), (10,11)}

B(l,k)={(3,1), (3,11), (5,6), (8,5), (10,0), (10,10)}

As shown in FIG. 5(6), in this embodiment, DRSs A and B are arranged in equal proportions at 12 REs in 2 RBs (i.e., in a pair of RBs) that are consecutive in time in one subframe. DRSs are allocated to 2 OFDM symbols (the 5th and 8th OFDM symbols) in the first OFDM symbol group and DRSs are allocated to 2 OFDM symbols (the 3rd and 10th OFDM symbols) in the second OFDM symbol group. In one OFDM symbol belonging to the first OFDM symbol group, 2 DRSs are allocated at intervals of 1 subcarrier for rank-1 transmission and 1 DRS is allocated for each layer for rank-2 transmission. In one OFDM symbol belonging to the second OFDM symbol group, 4 DRSs are allocated at intervals of 1 or 9 subcarriers for rank-1 transmission and 2 DRSs are allocated for each layer at equal intervals of 10 subcarriers for rank-2 transmission.

Embodiment A-7

A(l,k)={(3,0), (3,4), (3,8), (10,3), (10,7), (10,11)}

B(l,k)={(5,0), (5,4), (5,8), (12,3), (12,7), (12,11)}

Figure 6:
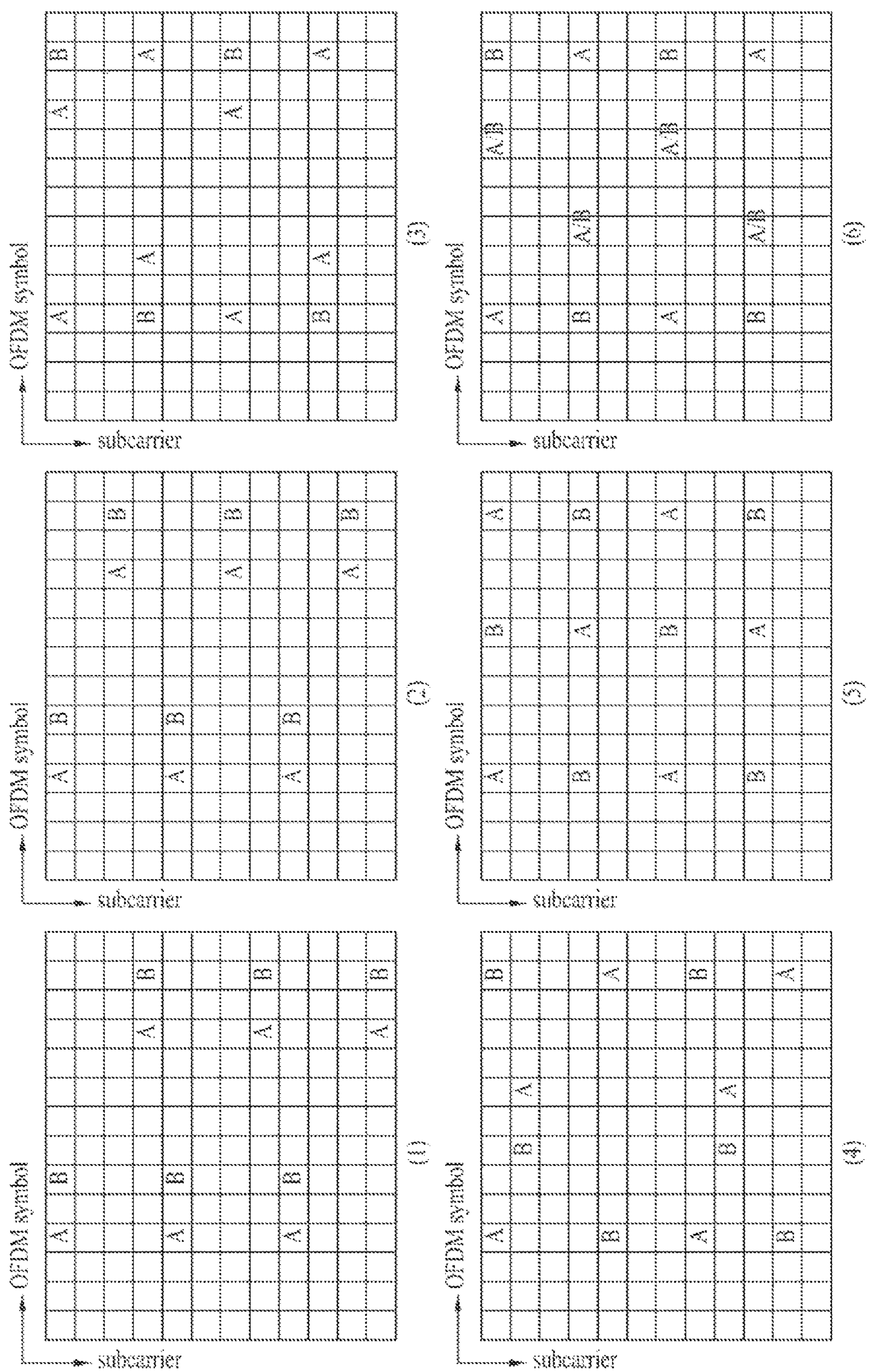

As shown in FIG. 6(1), in this embodiment, DRSs A and B are arranged in equal proportions at 12 REs in 2 RBs (i.e., in a pair of RBs) that are consecutive in time in one subframe. DRSs are allocated to 1 OFDM symbol (the 5th OFDM symbol) in the first OFDM symbol group and DRSs are allocated to 3 OFDM symbols (the 3rd, 10th, and 12th OFDM symbols) in the second OFDM symbol group. In one OFDM symbol, DRSs are allocated to 3 subcarriers at equal intervals of 4 subcarriers.

Embodiment A-8

A(l,k)={(3,0), (3,4), (3,8), (10,2), (10,6), (10,10)}

B(l,k)={(5,0), (5,4), (5,8), (12,2), (12,6), (12,10)}

As shown in FIG. 6(2), in this embodiment, DRSs A and B are arranged in equal proportions at 12 REs in 2 RBs (i.e., in a pair of RBs) that are consecutive in time in one subframe. DRSs are allocated to 1 OFDM symbol (the 5th OFDM symbol) in the first OFDM symbol group and DRSs are allocated to 3 OFDM symbols (the 3rd, 10th, and 12th OFDM symbols) in the second OFDM symbol group. In one OFDM symbol, 3 DRSs are allocated at equal intervals of 4 subcarriers.

Embodiment A-9

A(l,k)={(3,0), (3,6), (5,3), (5,9), (10,0), (10,6), (12,3), (12, 9)}

B(l,k)={(3,3), (3,6), (12,0), (12,6)}

As shown in FIG. 6(3), in this embodiment, DRSs A are arranged at 8 REs and DRSs B are arranged at 4 REs in 2 RBs (i.e., in a pair of RBs) that are consecutive in time in one subframe. A different DRS density may be applied to each layer to improve channel estimation performance of a layer having a high DRS density. DRSs are allocated to 1 OFDM symbol (the 5th OFDM symbol) in the first OFDM symbol group and DRSs are allocated to 3 OFDM symbols (the 3rd, 10th, and 12th OFDM symbols) in the second OFDM symbol group. In one OFDM symbol belonging to the first OFDM symbol group, only 2 DRSs for one layer are arranged at equal intervals of 6 subcarriers. In one OFDM symbol belonging to the second OFDM symbol group, 4 DRSs are allocated at equal intervals of 3 subcarriers for rank-1 transmission and 2 DRSs are allocated for each layer at equal intervals of 6 subcarriers for rank-2 transmission.

Embodiment A-10

A(l,k)={(3,0), (3,7), (8,1), (8,8), (12,4), (12,10)}

B(l,k)={(3,4), (3,10), (6,1), (6,8), (12,0), (12,7)}

As shown in FIG. 6(4), in this embodiment, DRSs A and B are arranged at 12 REs in equal proportions in 2 RBs (i.e., in a pair of RBs) that are consecutive in time in one subframe. DRSs are allocated to 2 OFDM symbols (the 6th and 8th OFDM symbols) in the first OFDM symbol group and DRSs are allocated to 2 OFDM symbols (the 3rd and 12th OFDM symbols) in the second OFDM symbol group. For rank-1 transmission, 2 DRSs are allocated to one OFDM symbol belonging to the first OFDM symbol group at intervals of 7 subcarriers. For rank-2 transmission, 2 DRSs of one layer are allocated to one OFDM symbol belonging to the first OFDM symbol group at equal intervals of 7 subcarriers and 2 DRSs of another layer are allocated to another OFDM symbol at intervals of 7 subcarriers. In one OFDM symbol belonging to the second OFDM symbol group, 4 DRSs are allocated at intervals of 3 or 4 subcarriers for rank-1 transmission and 2 DRSs are allocated for each layer at intervals of 6 or 7 subcarriers for rank-2 transmission.

Embodiment A-11

A(l,k)={(3,0), (3,6), (8,3), (8,9), (12,0), (12,6)}

B(l,k)={(3,3), (3,9), (8,0), (8,6), (12,3), (12,9)}

As shown in FIG. 6(5), in this embodiment, DRSs A and B are arranged at 12 REs in equal proportions in 2 RBs (i.e., in a pair of RBs) that are consecutive in time in one subframe. DRSs are allocated to 1 OFDM symbol (the 8th OFDM symbol) in the first OFDM symbol group and DRSs are allocated to 2 OFDM symbols (the 3rd and 12th OFDM symbols) in the second OFDM symbol group. In one OFDM symbol, 4 DRSs are allocated at equal intervals of 3 subcarriers for rank-1 transmission and 2 DRSs are allocated for each layer at equal intervals of 6 subcarriers for rank-2 transmission.

Embodiment A-12

A(l,k)={(3,0), (3,6), (6,3), (6,9), (9,0), (9,6), (12,3), (12, 9)}

B(l,k)={(3,3), (3,9), (6,3), (6,9), (9,0), (9,6), (12,0), (12, 6)}

As shown in FIG. 6(6), in this embodiment, DRSs A and B are arranged in equal proportions at 12 REs in 2 RBs (i.e., in a pair of RBs) that are consecutive in time in one subframe. DRSs are allocated to 2 OFDM symbols (the 6th and 9th OFDM symbols) in the first OFDM symbol group and DRSs are allocated to 2 OFDM symbols (the 3rd and 12th OFDM symbols) in the second OFDM symbol group.

DRSs A/B multiplexed according to a CDM scheme are allocated to 2 subcarrier positions at intervals of 6 subcarriers in one OFDM symbol belonging to the first OFDM symbol group. In this regard, RE positions {(6,3), (6,9), (9,0), (9,6)} are denoted by 'A/B', which indicates that 2 DRSs have been multiplexed into one RE using orthogonal codes according to a CDM scheme as described above. Accordingly, 8 DRSs are allocated to each of the 1st and 2nd layers in 2 RBs (i.e., in a pair of RBs) that are consecutive in time in one subframe.

In one OFDM symbol belonging to the first OFDM symbol group, only 2 DRSs for one layer are arranged at equal intervals of 6 subcarriers. In one OFDM symbol belonging to the second OFDM symbol group, 4 DRSs are allocated at equal intervals of 3 subcarriers for rank-1 transmission and 2 DRSs are allocated for each layer at equal intervals of 6 subcarriers for rank-2 transmission.

Embodiment A-13

A(l,k)={(3,0), (3,9), (6,3), (9,6), (12,0), (12,9)}

B(l,k)={(5,0), (5,9), (6,6), (9,3), (10,0), (10,9)}

Figure 7:
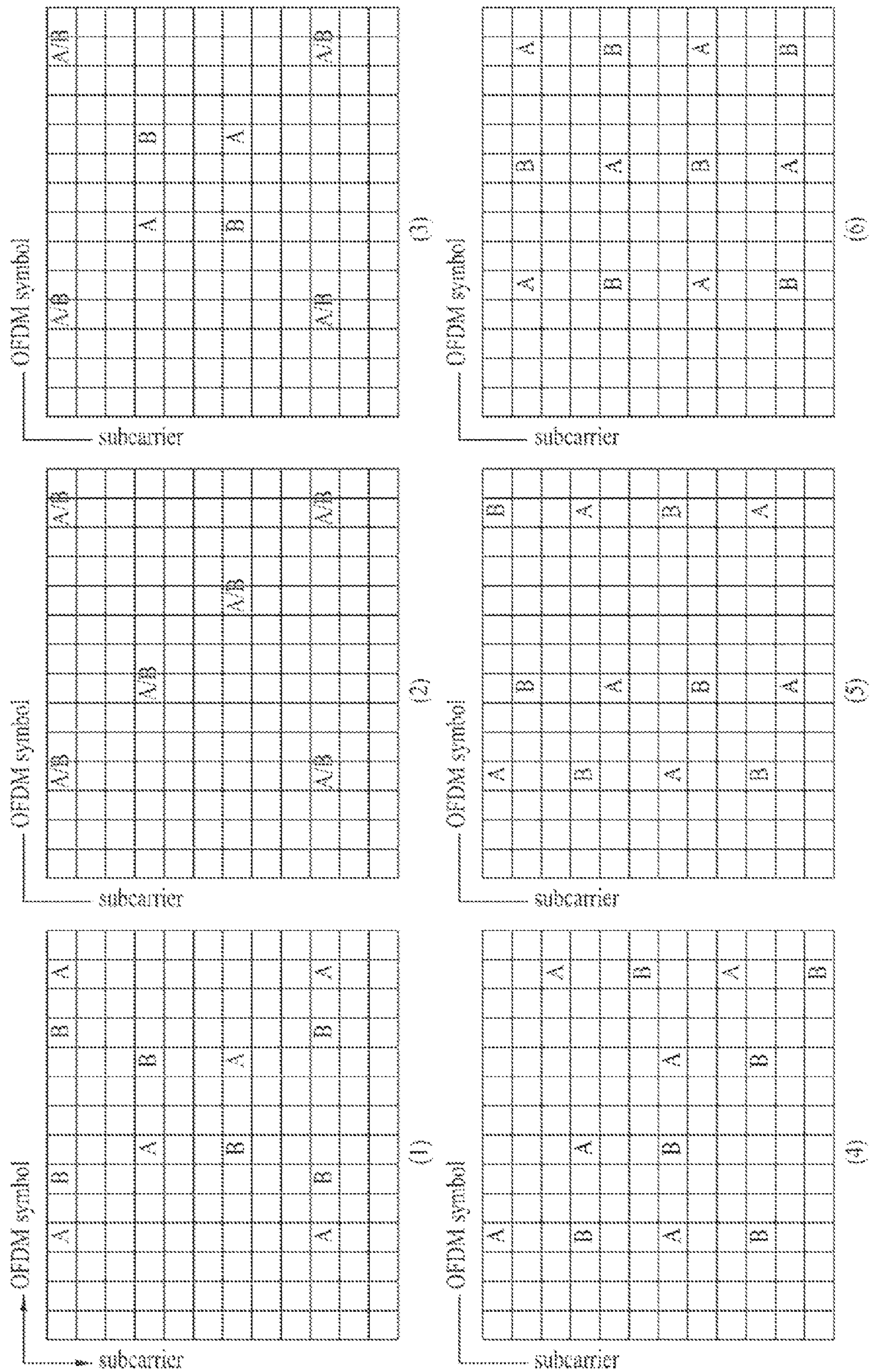

As shown in FIG. 7(1), in this embodiment, DRSs A and B are arranged in equal proportions at 12 REs in 2 RBs (i.e., in a pair of RBs) that are consecutive in time in one subframe. DRSs are allocated to 3 OFDM symbols (the 5th, 6th and 9th OFDM symbols) in the first OFDM symbol group and DRSs are allocated to 3 OFDM symbols (the 3rd, 10th, and 12th OFDM symbols) in the second OFDM symbol group. In one OFDM symbol belonging to the first OFDM symbol group, 2 DRSs of one layer are allocated at intervals of 9 subcarriers or 1 DRS is allocated for each layer at intervals of 3 subcarriers. In one OFDM symbol belonging to the second OFDM symbol group, 2 DRSs of one layer are allocated at intervals of 9 subcarriers.

Embodiment A-14

A(l,k)={(3,0), (3,9), (6,3), (9,6), (12,0), (12,9)}

B(l,k)={(3,0), (3,9), (6,3), (9,6), (12,0), (12,9)}

As shown in FIG. 7(2), in this embodiment, DRSs A and B are arranged in equal proportions at 12 REs in 2 RBs (i.e., in a pair of RBs) that are consecutive in time in one subframe. DRSs are allocated to 2 OFDM symbols (the 6th and 9th OFDM symbols) in the first OFDM symbol group and DRSs are allocated to 2 OFDM symbols (the 3rd and 12th OFDM symbols) in the second OFDM symbol group. DRSs A/B multiplexed according to a CDM scheme are allocated to 1 subcarrier position in one OFDM symbol belonging to the first OFDM symbol group. DRSs A/B multiplexed according to a CDM scheme are allocated to 2 subcarrier positions at intervals of 9 subcarriers in one OFDM symbol belonging to the second OFDM symbol group. Accordingly, 6 DRSs are allocated to each of the 1st and 2nd layers in 2 RBs (i.e., in a pair of RBs) that are consecutive in time in one subframe.

Embodiment A-15

A(l,k)={(3,0), (3,9), (6,3), (9,6), (12,0), (12,9)}

B(l,k)={(3,0), (3,9), (6,6), (9,3), (12,0), (12,9)}

As shown in FIG. 7(3), in this embodiment, DRSs A and B are arranged in equal proportions at 12 REs in 2 RBs (i.e., in a pair of RBs) that are consecutive in time in one subframe. DRSs are allocated to 2 OFDM symbols (the 6th and 9th OFDM symbols) in the first OFDM symbol group and DRSs are allocated to 2 OFDM symbols (the 3rd and 12th OFDM symbols) in the second OFDM symbol group. In one OFDM symbol belonging to the first OFDM symbol group, 2 DRSs are allocated at intervals of 3 subcarriers and 2 DRSs are allocated for each layer for rank-2 transmission. DRSs A/B multiplexed according to a CDM scheme are allocated to 2 subcarrier positions at intervals of 9 subcarriers in one OFDM symbol belonging to the second OFDM symbol group. Accordingly, 6 DRSs are allocated to each of the 1st and 2nd layers in 2 RBs (i.e., in a pair of RBs) that are consecutive in time in one subframe.

Embodiment A-16

A(l,k)={(3,0), (3,6), (6,3), (9,6), (12,2), (12,8)}

B(l,k)={(3,3), (3,9), (6,6), (9,9), (12,5), (12,11)}

As shown in FIG. 7(4), in this embodiment, DRSs A and B are arranged in equal proportions at 12 REs in 2 RBs (i.e., in a pair of RBs) that are consecutive in time in one subframe. DRSs are allocated to 2 OFDM symbols (the 6th and 9th OFDM symbols) in the first OFDM symbol group and DRSs are allocated to 2 OFDM symbols (the 3rd and 12th OFDM symbols) in the second OFDM symbol group. In one OFDM symbol belonging to the first OFDM symbol group, 2 DRSs are allocated at intervals of 3 subcarriers and 2 DRSs are allocated for each layer for rank-2 transmission. In one OFDM symbol belonging to the second OFDM symbol group, 4 DRSs are allocated at equal intervals of 3 subcarriers for rank-1 transmission and 2 DRSs are allocated for each layer at intervals of 6 subcarriers for rank-2 transmission.

Embodiment A-17

A(l,k)={(3,0), (3,6), (6,4), (6,10), (12,3), (12,9)}

B(l,k)={(3,3), (3,9), (6,1), (6,7), (12,0), (12,6)}

As shown in FIG. 7(5), in this embodiment, DRSs A and B are arranged in equal proportions at 12 REs in 2 RBs (i.e., in a pair of RBs) that are consecutive in time in one subframe. DRSs are allocated to 1 OFDM symbol (the 6th OFDM symbol) in the first OFDM symbol group and DRSs are allocated to 2 OFDM symbols (the 3rd and 12th OFDM symbols) in the second OFDM symbol group. In one OFDM symbol belonging to the first OFDM symbol group, 4 DRSs are allocated at equal intervals of 3 subcarriers for rank-1 transmission and 2 DRSs are allocated for each layer at intervals of 6 subcarriers for rank-2 transmission. In one OFDM symbol belonging to the second OFDM symbol group, 4 DRSs are allocated at equal intervals of 3 subcarriers for rank-1 transmission and 2 DRSs are allocated for each layer at intervals of 6 subcarriers for rank-2 transmission.

Embodiment A-18

A(l,k)={(4,1), (4,7), (8,4), (8,10), (12,1), (12,7)}

B(l,k)={(4,4), (4,10), (8,1), (8,7), (12,4), (12,10)}

As shown in FIG. 7(6), in this embodiment, DRSs A and B are arranged in equal proportions at 12 REs in 2 RBs (i.e., in a pair of RBs) that are consecutive in time in one subframe. DRSs are allocated to 2 OFDM symbols (the 4th and 8th OFDM symbols) in the first OFDM symbol group and DRSs are allocated to 1 OFDM symbol (the 12th OFDM symbol) in the second OFDM symbol group. In one OFDM symbol, 4 DRSs are allocated at equal intervals of 3 subcarriers for rank-1 transmission and 2 DRSs are allocated for each layer at intervals of 6 subcarriers for rank-2 transmission.

In this embodiment, DRSs are arranged in equal proportions for each layer (each antenna port or stream) in a symbol, in which the DRSs are located, taking into consideration that power boosting of DRSs is performed. In addition, DRSs are arranged at intervals of 4 OFDM symbols with reference to the third OFDM symbol in which data is transmitted, thereby achieving robustness to Doppler spread. The number of subcarriers, at intervals of which DRSs of rank 1 of the FDM scheme or DRSs of rank 1 or 2 of the CDM scheme are arranged, is maintained at 3 subcarriers while DRSs of rank 2 of the FDM scheme are arranged at intervals of 6 subcarriers such that the DRSs are alternately arranged among symbols, thereby achieving robustness to channel selectivity. Further, an interlaced pattern is designed so as to have a margin in which DRSs are not arranged at the first and last subcarrier positions of an OFDM symbol to which a DRS has been allocated, thereby supporting frequency shift.

Embodiment A-19

A(l,k)={(10,0), (10,4), (10,8), (12,2), (12,6), (12,10)}

B(l,k)={(10,1), (10,5), (10,9), (12,3), (12,7), (12,11)}

Figure 8:
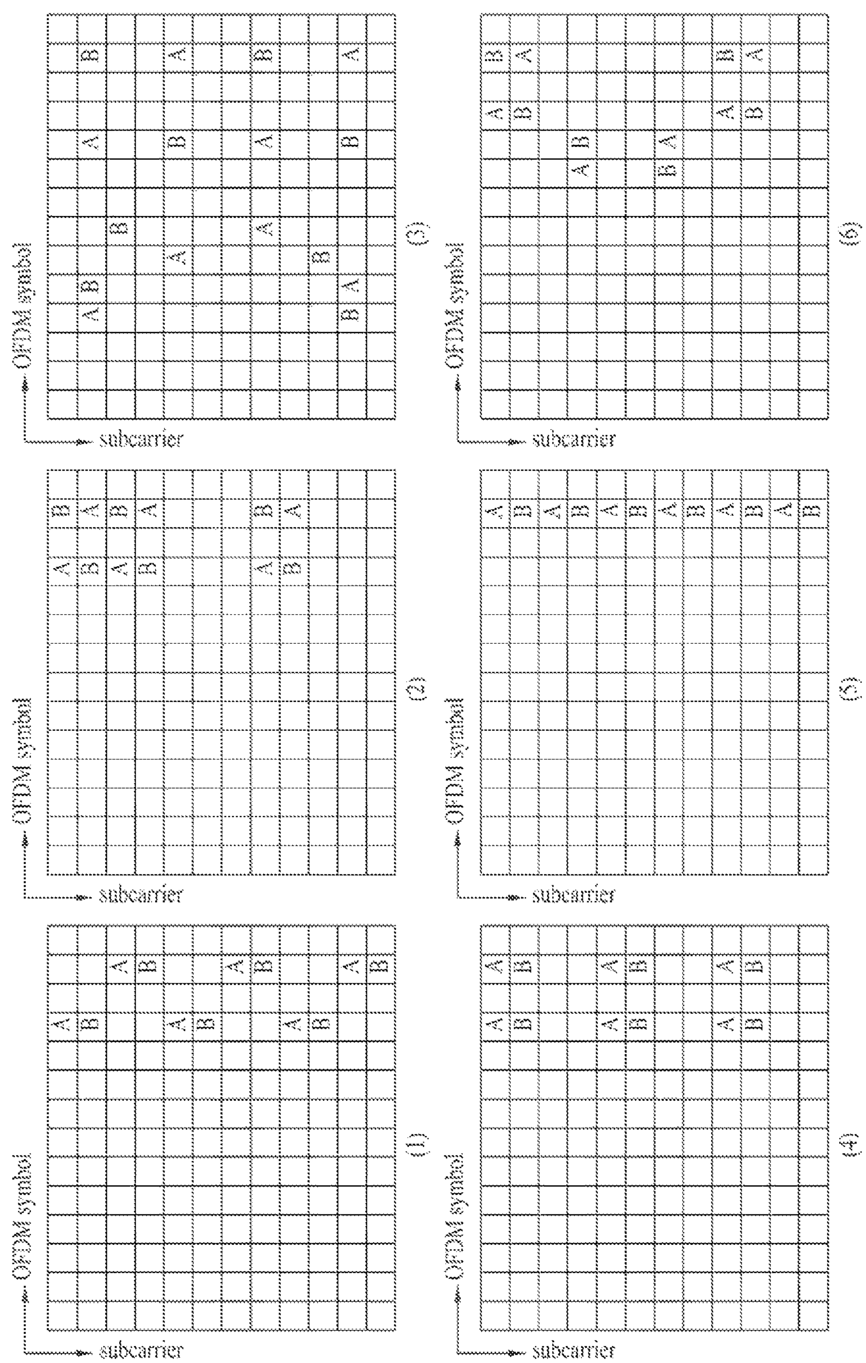

As shown in FIG. 8(1), in this embodiment, DRSs A and B are arranged in equal proportions at 12 REs in 2 RBs (i.e., in a pair of RBs) that are consecutive in time in one subframe. DRSs are not allocated to the first OFDM symbol group and DRSs are allocated to 2 OFDM symbols (the 10th and 12th OFDM symbols) in the second OFDM symbol group. In one OFDM symbol, 6 DRSs are allocated at intervals of 1 or 3 subcarriers for rank-1 transmission and 3 DRSs are allocated for each layer at intervals of 4 subcarriers for rank-2 transmission.

This embodiment suggests that, in the case where a downlink subframe is constructed using a TDD scheme, DRSs are not arranged in a region in which no data is present and DRSs are arranged to be concentrated in a region in which data is present. In addition, in this embodiment, taking into consideration the case where power boosting of DRSs is performed, DRSs are set to be arranged in equal proportions for each layer in a symbol in which the DRSs are located. Further, DRSs are set to be located at the 10th and 12th OFDM symbols of the second OFDM symbol group to prevent the DRSs from being affected by an SCH and a BCH (which are located at the 5th to 9th OFDM symbols). In this embodiment, DRSs are designed to be concentrated in a specific portion in the time domain taking into consideration relatively low mobility while DRSs are set to be arranged at intervals of 4 subcarriers or less in an OFDM symbol to which the DRSs are allocated to achieve robustness to frequency selective characteristics. In addition, DRSs of the 1st and 2nd layers are arranged contiguously to easily support DRSs of the CDM scheme while achieving the same channel estimation performance. Further, a margin of 2 subcarriers may be set in an OFDM symbol, to which a DRS has been allocated, to support frequency shift.

Embodiment A-20

A(l,k)={(10,0), (10,2), (10,7), (12,1), (12,3), (12,8)}

B(l,k)={(10,1), (10,3), (10,8), (12,0), (12,2), (12,7)}

As shown in FIG. 8(2), in this embodiment, DRSs A and B are arranged in equal proportions at 12 REs in 2 RBs (i.e., in a pair of RBs) that are consecutive in time in one subframe. DRSs are not allocated to the first OFDM symbol group and DRSs are allocated to 2 OFDM symbols (the 10th and 12th OFDM symbols) in the second OFDM symbol group. In one OFDM symbol, 6 DRSs are allocated at intervals of 1 or 4 subcarriers for rank-1 transmission and 3 DRSs are allocated for each layer at intervals of 2 or 5 subcarriers for rank-2 transmission.

In this embodiment, taking into consideration the case where power boosting of DRSs is performed, DRSs are set to be arranged in equal proportions for each layer in a symbol in which the DRSs are located. Further, DRSs are set to be located at the 10th and 12th OFDM symbols of the second OFDM symbol group to prevent the DRSs from being affected by an SCH and a BCH (which are located at the 5th to 9th OFDM symbols). In this embodiment, DRSs are designed to be concentrated in a specific portion in the time domain taking into consideration relatively low mobility while DRSs are set to be arranged at intervals of 4 subcarriers or less in an OFDM symbol to which the DRSs are allocated to achieve robustness to frequency selective characteristics. In addition, DRSs of the 1st and 2nd layers are arranged contiguously to easily support DRSs of the CDM scheme while achieving the same channel estimation performance. Further, a margin of 2 subcarriers may be set in an OFDM symbol, to which a DRS has been allocated, to support frequency shift.

Embodiment A-21

A(l,k)={(3,1), (4,10), (5,4), (6,7), (9,1), (9,7), (12,4), (12, 10)}

B(l,k)={(3,10), (4,1), (5,9), (6,2), (9,4), (9,10), (12,1), (12, 7)}

As shown in FIG. 8(3), in this embodiment, DRSs A and B are arranged in equal proportions at 16 REs in 2 RBs (i.e., in a pair of RBs) that are consecutive in time in one subframe. DRSs are allocated to 4 OFDM symbols (the 4th, 5th, 6th, and 9th OFDM symbols) in the first OFDM symbol group and DRSs are allocated to 2 OFDM symbols (the 3rd and 12th OFDM symbols) in the second OFDM symbol group. In the 3rd to 6th OFDM symbols, 2 DRSs are allocated at intervals of 5 or 9 subcarriers for rank-1 transmission and 1 DRS is allocated for each layer for rank-2 transmission. In the 9th and 12th OFDM symbols, 4 DRSs are allocated at equal intervals of 3 subcarriers for rank-1 transmission and 2 DRSs are allocated for each layer at intervals of 6 subcarriers for rank-2 transmission.

In this embodiment, DRSs are arranged at intervals of 1 to 3 OFDM symbols in a subframe in the case where an SCH and a BCH are not located at the subframe (where the SCH are transmitted at intervals of 5 subframes and the BCH are transmitted at intervals of 10 subframes), thereby achieving robustness to high mobility. In addition, DRSs are arranged at intervals of 3 subcarriers or less or at intervals of up to 9 subcarriers so as to span all RBs in the subframe, thereby coping with frequency selectivity. Even when an SCH and a BCH are located at the subframe, DRSs, which are not affected by the SCH or the BCH, may be allocated to the second OFDM symbol group, thereby maintaining overall channel estimation performance. A margin is set at each of the first subcarrier and the last subcarrier in the frequency region to support an interlaced pattern for frequency shift and a DRS pattern is designed such that DRSs are arranged in equal proportions for each layer in every OFDM symbol in which DRSs are inserted, thereby preventing symbol power fluctuation when power boosting is performed.

Embodiment A-22

A(l,k)={(10,0), (10,4), (10,8), (12,0), (12,4), (12,8)}

B(l,k)={(10,1), (10,5), (10,9), (12,1), (12,5), (12,9)}

As shown in FIG. 8(4), in this embodiment, DRSs A and B are arranged in equal proportions at 12 REs in 2 RBs (i.e., in a pair of RBs) that are consecutive in time in one subframe. DRSs are not allocated to the first OFDM symbol group and DRSs are allocated to 2 OFDM symbols (the 10th and 12th OFDM symbols) in the second OFDM symbol group. In one OFDM symbol, 6 DRSs are allocated at intervals of 1 or 3 subcarriers for rank-1 transmission and 3 DRSs are allocated for each layer at intervals of 4 subcarriers for rank-2 transmission.

In this embodiment, taking into consideration the case where power boosting of DRSs is performed, DRSs are set to be arranged in equal proportions for each antenna in an OFDM symbol to which the DRSs have been allocated. Further, DRSs are arranged at the 10th and 12th OFDM symbols to prevent the DRSs from being affected by an SCH and a BCH. In this embodiment, DRSs are designed to be concentrated in a specific region in the time domain taking into consideration relatively low mobility while DRSs are designed to be arranged at intervals of up to 4 subcarriers to achieve robustness to frequency selective characteristics. In addition, DRSs of the 1st and 2nd layers are arranged contiguously to easily support DRSs of the CDM scheme while achieving the same channel estimation performance. Further, DRSs of each layer may be arranged at the same positions in the frequency region in each OFDM symbol to further improve performance in the case where 1-dimensional channel estimation is applied. Furthermore, a margin of 3 subcarriers may be set in each OFDM symbol to support the extensity of frequency shift.

Embodiment A-23

A(l,k)={(12,0), (12,2), (12,4), (12,6), (12,8), (12,10)}

B(l,k)={(12,1), (12,3), (12,5), (12,7), (12,9), (12,11)}

As shown in FIG. 8(5), in this embodiment, DRSs A and B are arranged in equal proportions at 12 REs in 2 RBs (i.e., in a pair of RBs) that are consecutive in time in one subframe. DRSs are not allocated to the first OFDM symbol group and DRSs are allocated to 2 OFDM symbols (the 12th OFDM symbol) in the second OFDM symbol group. In one OFDM symbol, 12 DRSs are allocated at intervals of 1 subcarrier for rank-1 transmission and 6 DRSs are allocated for each layer at intervals of 2 subcarriers for rank-2 transmission.

In this embodiment, taking into consideration the case where power boosting of DRSs is performed, DRSs are set to be arranged in equal proportions for each layer in a symbol at which the DRSs are located. Further, DRSs may be arranged at the 12th OFDM symbol to prevent the DRSs from being affected by an SCH and a BCH or may be arranged at the 12th OFDM symbol regardless of an (FDD or TDD) scheme that has been applied to construct the radio frame or may be arranged at the 12th OFDM symbol such that the same DRS pattern can also be used when an extended CP is taken into consideration. In this embodiment, a DRS pattern is designed taking into consideration relatively low mobility while DRSs are designed to be arranged at intervals of up to 2 subcarriers to achieve robustness to frequency selective characteristics. DRSs of the 1st and 2nd layers are arranged contiguously to easily support DRSs of the CDM scheme while achieving the same channel estimation performance.

Embodiment A-24

A(l,k)={(8,3), (9,6), (10,0), (10,8), (12,1), (12,9)}

B(l,k)={(8,6), (9,3), (10,1), (10,9), (12,0), (12,8)}

As shown in FIG. 8(6), in this embodiment, DRSs A and B are arranged in equal proportions at 12 REs in 2 RBs (i.e., in a pair of RBs) that are consecutive in time in one subframe. DRSs are allocated to 2 OFDM symbols (the 8th and 9th OFDM symbols) in the first OFDM symbol group and DRSs are allocated to 2 OFDM symbols (the 12th OFDM symbol) in the second OFDM symbol group. In one OFDM symbol belonging to the first OFDM symbol group, 2 DRSs are allocated at intervals of 3 subcarriers for rank-1 transmission and 1 DRS is allocated for each layer for rank-2 transmission. In one OFDM symbol belonging to the second OFDM symbol group, 4 DRSs are allocated at intervals of 1 or 7 subcarriers for rank-1 transmission and 2 DRSs are allocated at intervals of 8 subcarriers for each layer for rank-2 transmission.

In this embodiment, DRSs are arranged taking into consideration low mobility. In addition, taking into consideration the case where power boosting of DRSs is performed, DRSs are set to be arranged in equal proportions for each layer in an OFDM symbol at which the DRSs are located. Further, DRSs are not arranged in an OFDM symbol at which an SCH cannot be located to eliminate the influence of the SCH. In the case where a BCH is not located in the subframe, DRSs are arranged in a middle portion of the frequency regions of the 8th and 9th OFDM symbols among the 7th to 9th OFDM symbols, at which a BCH may be located, thereby increasing 2-dimensional channel estimation performance. Even when a BCH is located in the subframe, DRSs may be arranged at intervals of 7 subcarriers or less in the 10th and 12th OFDM symbols to achieve high channel estimation performance. Furthermore, a margin of 2 subcarriers may be set in each OFDM symbol to support the extensity of frequency shift.

Embodiment A-25

A(l,k)={(5,6), (8,3), (10,1), (10,9), (12,0), (12,8)}

B(l,k)={(5,3), (8,6), (10,0), (10,8), (12,1), (12,9)}

Figure 9:
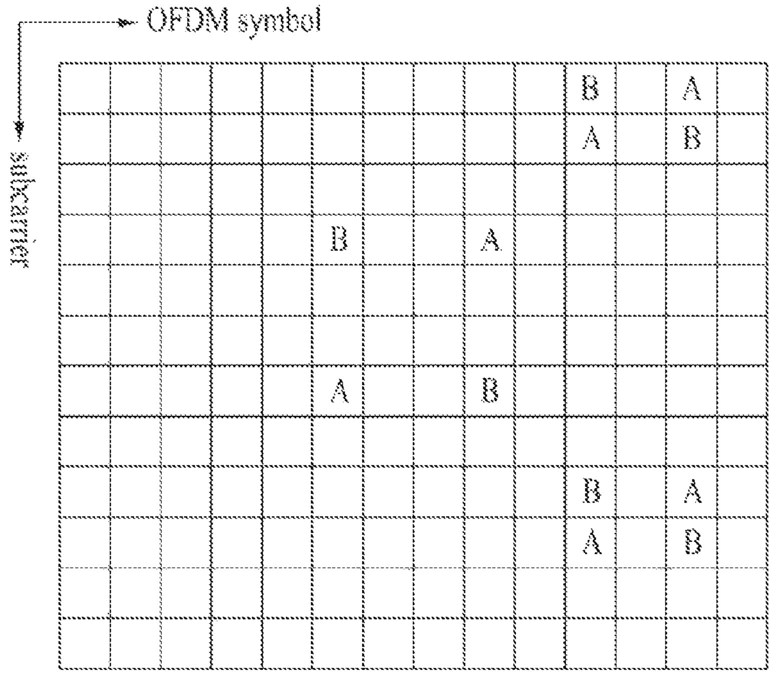
Figure 9:
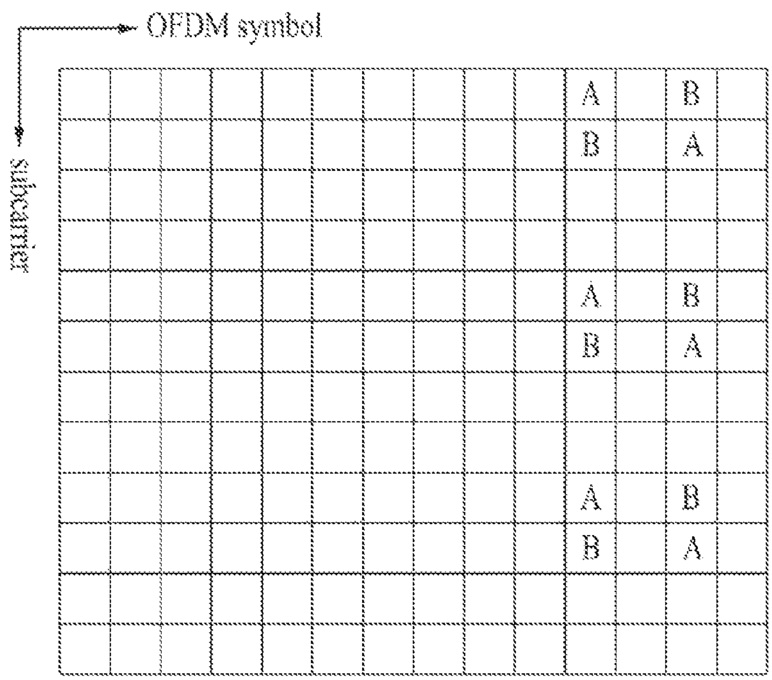

As shown in FIG. 9(1), in this embodiment, DRSs A and B are arranged in equal proportions at 12 REs in 2 RBs (i.e., in a pair of RBs) that are consecutive in time in one subframe. DRSs are allocated to 2 OFDM symbols (the 5th and 8th OFDM symbols) in the first OFDM symbol group and DRSs are allocated to 2 OFDM symbols (the 12th OFDM symbol) in the second OFDM symbol group. In one OFDM symbol belonging to the first OFDM symbol group, 2 DRSs are allocated at intervals of 3 subcarriers for rank-1 transmission and 1 DRS is allocated for each layer for rank-2 transmission. In one OFDM symbol belonging to the second OFDM symbol group, 4 DRSs are allocated at intervals of 1 or 7 subcarriers for rank-1 transmission and 2 DRSs are allocated at intervals of 8 subcarriers for each layer for rank-2 transmission.

In this embodiment, taking into consideration the case where power boosting of DRSs is performed, DRSs are set to be arranged in equal proportions for each layer in a symbol at which the DRSs are located. In addition, 1 or 2 DRSs are arranged in an OFDM symbol at which an SCH and a BCH may be located to secure minimum channel estimation performance for a corresponding region and DRSs may be arranged at intervals of 7 subcarriers or less in the 10th and 12th OFDM symbols which are not affected by an SCH and a BCH to achieve high channel estimation performance even when an SCH and a BCH are present in the subframe. Furthermore, a margin of 2 subcarriers may be set in each OFDM symbol to support the extensity of frequency shift.

Embodiment A-26

A(l,k)={(10,0), (10,4), (10,8), (12,1), (12,5), (12,9)}

B(l,k)={(10,1), (10,5), (10,9), (12,0), (12,4), (12,8)}

As shown in FIG. 9(2), in this embodiment, DRSs A and B are arranged in equal proportions at 12 REs in 2 RBs (i.e., in a pair of RBs) that are consecutive in time in one subframe. DRSs are not allocated to the first OFDM symbol group and DRSs are allocated to 2 OFDM symbols (the 10th and 12th OFDM symbols) in the second OFDM symbol group. In one OFDM symbol, 6 DRSs are allocated at intervals of 1 or 3 subcarriers for rank-1 transmission and 3 DRSs are allocated for each layer at intervals of 4 subcarriers for rank-2 transmission.

In this embodiment, taking into consideration the case where power boosting of DRSs is performed, DRSs are set to be arranged in equal proportions for each layer in an OFDM symbol at which the DRSs are located. Further, DRSs are arranged at the 10th and 12th OFDM symbols to prevent the DRSs from being affected by an SCH and a BCH. In addition, in this embodiment, a DRS pattern is designed taking into consideration relatively low mobility while DRSs are designed to be arranged at intervals of up to 4 subcarriers to achieve robustness to frequency selective characteristics. DRSs of the 1st and 2nd layers are arranged contiguously to easily support DRSs of the CDM scheme while achieving the same channel estimation performance. In addition, the positions of DRS of each layer in each OFDM symbol may be reversed to improve estimation performance of frequency selective characteristics in the case where 2-dimensional channel estimation is used. Further, a margin of 3 subcarriers may be set in each OFDM symbol to support the extensity of frequency shift.

Embodiment B-1

TABLE 1

| | | |
|---|---|---|
| (1) | A(l, k)= | {(4, 5), (4, 11), (5, 1), (5, 7), (7, 2), (7, 8), (8, 4), (8, 10), (10, 1), (10, 7), (11, 5), (11, 11)} |
| | B(l, k)= | {(4, 2), (4, 8), (5, 4), (5, 10), (7, 5), (7, 11), (8, 1), (8, 7), (10, 4), (10, 10), (11, 2), (11, 8)} |
| (2) | A(l, k)= | {(4, 5), (4, 11), (6, 1), (6, 7), (7, 2), (7, 8), (8, 4), (8, 10), (10, 1), (10, 7), (11, 5), (11, 11)} |
| | B(l, k)= | {(4, 2), (4, 8), (6, 4), (6, 10), (7, 5), (7, 11), (8, 1), (8, 7), (10, 4), (10, 10), (11, 2), (11, 8)} |

Figure 10:
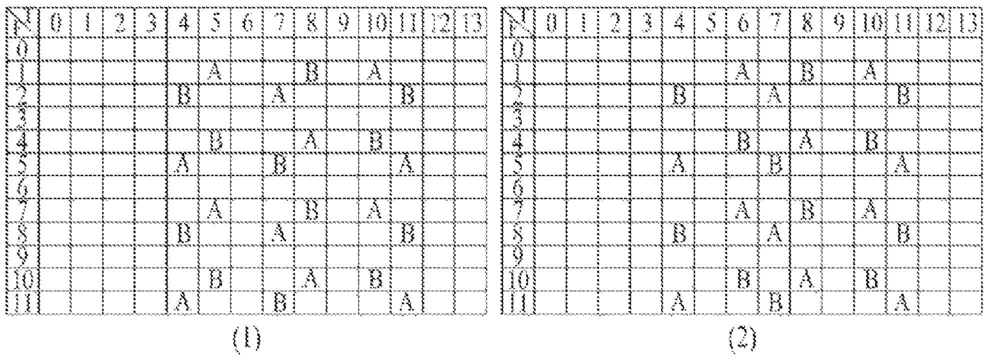

As shown in FIG. 10, in this embodiment, DRSs of the 1st and 2nd layers are arranged in equal proportions at 24 REs in 2 RBs (i.e., in a pair of RBs) that are consecutive in time in one subframe.

In an embodiment B-1-(1), DRSs are arranged in 4th and 5th, 7th and 8th, and 10th and 11th OFDM symbols. DRSs of one layer are arranged at intervals of 6 subcarriers in one OFDM symbol and are arranged at intervals of 2 or 4 subcarriers in an adjacent OFDM symbol. DRSs of 2 layers are alternately arranged at intervals of 3 subcarriers in one OFDM symbol.

In an embodiment B-1-(2), which is a modification of the embodiment B-1-(1), the same DRSs as those which are arranged in the 5th OFDM symbol in the embodiment B-1-(1) are arranged in the 6th OFDM symbol.

Embodiment B-2

TABLE 2

| | | |
|---|---|---|
| (1) | A(l, k)= | {(5, 2), (5, 9), (9, 2), (9, 9), (12, 2), (12, 9)} |
| | B(l, k)= | {(5, 3), (5, 10), (9, 3), (9, 10), (12, 3), (12, 10)} |
| (2) | A(l, k)= | {(5, 1), (5, 6), (5, 10), (9, 1), (9, 6), (9, 10)} |
| | B(l, k)= | {(6, 1), (6, 6), (6, 10), (10, 1), (10, 6), (10, 10)} |
| (3) | A(l, k)= | {(5, 1), (5, 5), (5, 9), (9, 1), (9, 5), (9, 9)} |
| | B(l, k)= | {(6, 2), (6, 6), (6, 10), (10, 2), (10, 6), (10, 10)} |

Figure 11:
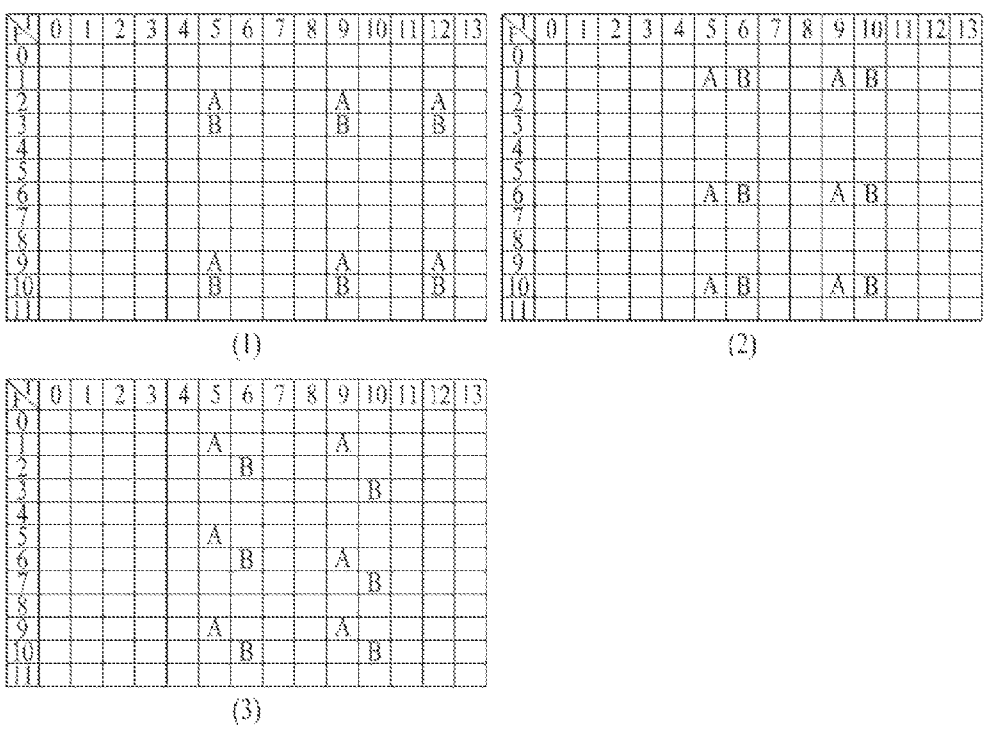

As shown in FIG. 11, in this embodiment, DRSs of the 1st and 2nd layers are arranged in equal proportions at 12 REs in 2 RBs (i.e., in a pair of RBs) that are consecutive in time in one subframe.

In an embodiment B-2-(1), DRSs are arranged in 5th, 9th, and 12th OFDM symbols. In one OFDM symbol, DRSs of one layer are arranged at subcarriers, which are adjacent to DRSs of another layer, at intervals of 7 subcarriers. DRSs of the 1st and 2nd layers are arranged contiguously in the frequency region to easily support DRSs of the CDM scheme while achieving the same channel estimation performance.

In an embodiment B-2-(2), DRSs are arranged in the 5th, 6th, 9th, and 10th OFDM symbols. In one OFDM symbol, DRSs of one layer are arranged at intervals of 4 or 5 subcarriers. DRSs of the 1st and 2nd layers are arranged at the same subcarrier indices in contiguous OFDM symbols to easily support DRSs of the CDM scheme while achieving the same channel estimation performance.

In an embodiment B-2-(3), which is a modification of the embodiment B-2-(2), DRSs of one layer are arranged at intervals of 4 subcarriers in one OFDM symbol. DRSs of the 2nd layer are arranged at subcarriers, which are spaced apart from DRSs of the 1st layer by 1 subcarrier, in an OFDM symbol which is contiguous to an OFDM symbol in which the DRSs of the 1st layer are arranged.

Embodiment B-3

TABLE 3

| | | |
|---|---|---|
| (1) | A(l, k)= | {(5, 3), (5, 6), (5, 9), (10, 1), (10, 9), (12, 3)} |
| | B(l, k)= | {(6, 4), (6, 7), (6, 10), (8, 1), (8, 9), (12, 10)} |
| (2) | A(l, k)= | {(5, 1), (5, 7), (8, 4), (8, 10), (10, 1), (10, 7)} |
| | B(l, k)= | {(6, 4), (6, 10), (8, 1), (8, 7), (12, 4), (12, 10)} |

TABLE 3-continued

| | | |
|---|---|---|
| (3) | A(l, k)= | {(5, 1), (5, 7), (8, 9), (10, 3), (12, 6), (12, 10)} |
| | B(l, k)= | {(6, 4), (6, 10), (8, 3), (10, 7), (10, 10), (12, 1)} |
| (4) | A(l, k)= | {(5, 1), (5, 7), (8, 10), (10, 1), (10, 9), (12, 7)} |
| | B(l, k)= | {(6, 4), (6, 9), (8, 3), (10, 4), (12, 3), (12, 10)} |

Figure 12:
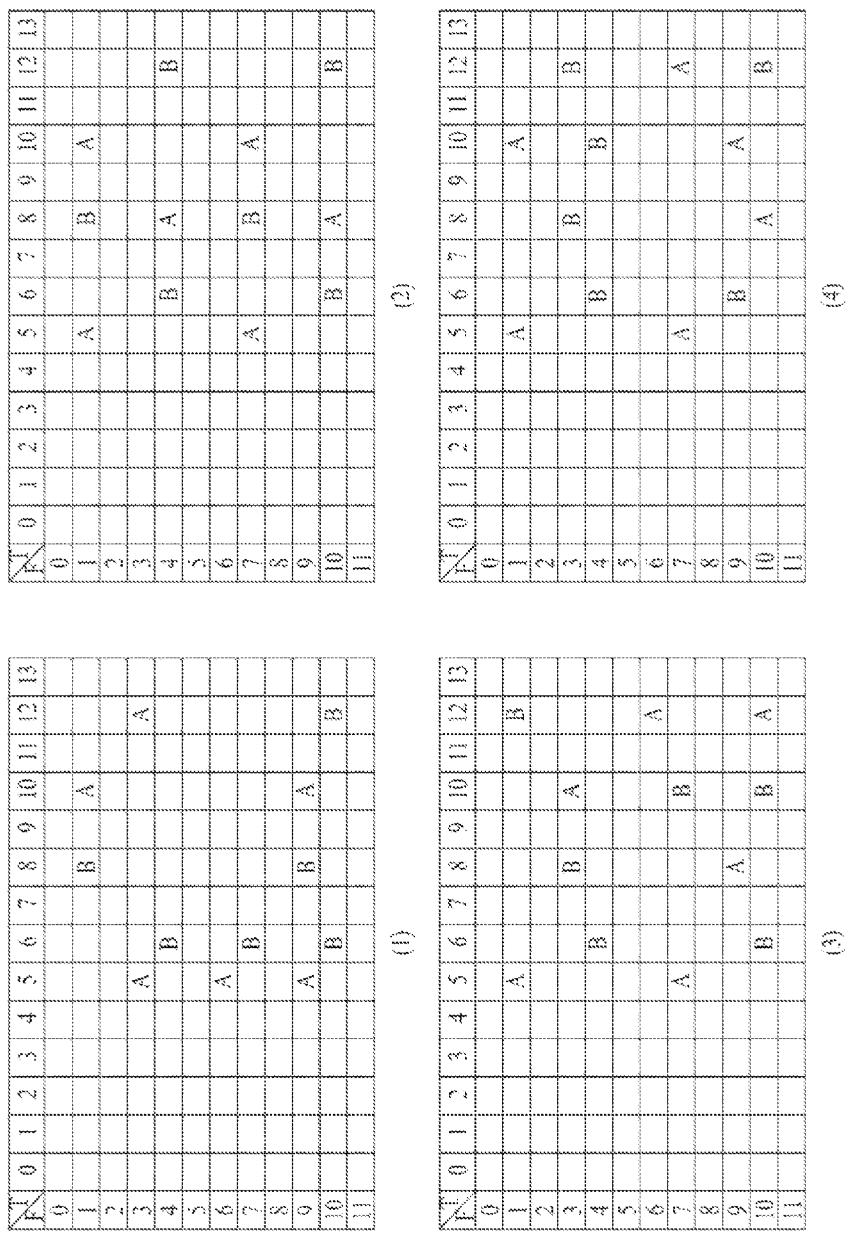

As shown in FIG. 12, in this embodiment, DRSs of the 1st and 2nd layers are arranged in equal proportions at 12 REs in 2 RBs (i.e., in a pair of RBs) that are consecutive in time in one subframe.

In an embodiment B-3-(1), 3 DRSs of the 1st layer are arranged at intervals of 3 subcarriers in the 5th OFDM symbol and 3 DRSs of the 2nd layer are arranged at intervals of 3 subcarriers in the 6th OFDM symbol. 2 DRSs of the 1st layer are arranged at intervals of 8 subcarriers in the 8th OFDM symbol and 2 DRSs of the 2nd layer are arranged at intervals of 8 subcarriers in the 10th OFDM symbol. DRSs of the 1st and 2nd layers are arranged at intervals of 7 subcarriers in the 12th OFDM symbol.

In an embodiment B-3-(2), 2 DRSs of the 1st layer are arranged at intervals of 6 subcarriers in each of the 5th and 10th OFDM symbols and 2 DRSs of the 2nd layer are arranged at intervals of 6 subcarriers in each of the 6th and 12th OFDM symbols. DRSs of the 1st and 2nd layers are alternately arranged at intervals of 3 subcarriers in the 8th OFDM symbol.

In an embodiment B-3-(3), 2 DRSs of the 1st layer and 2DRSs of the 2nd layer are arranged at intervals of 6 subcarriers in the 5th and 6th OFDM symbols, respectively. DRSs of the 1st and 2nd layers are arranged at intervals of 6 subcarriers in the 8th OFDM symbol. 1 DRS of the 1st layer and 2 DRSs of the 2nd layer are arranged in the 10th OFDM symbol and 2 DRSs of the 1st layer and 1 DRS of the 2nd layer are arranged in the 12th OFDM symbol.

In an embodiment B-3-(4), which is a modification of the embodiment B-3-(3), DRSs of the 1st and 2nd layers are alternately arranged in the 10th and 12th OFDM symbols.

Embodiment B-4

TABLE 4

| | | |
|---|---|---|
| (1) | A(l, k)= | {(3, 1), (3, 6), (3, 9), (6, 0), (6, 4), (6, 10)} |
| | B(l, k)= | {(9, 1), (9, 7), (9, 11), (12, 2), (12, 5), (12, 10)} |
| (2) | A(l, k)= | {(3, 1), (3, 5), (3, 9), (6, 0), (6, 4), (6, 10)} |
| | B(l, k)= | {(9, 1), (9, 7), (9, 11), (12, 2), (12, 6), (12, 10)} |
| (3) | A(l, k)= | {(3, 0), (3, 4), (3, 10), (6, 1), (6, 6), (6, 9)} |
| | B(l, k)= | {(9, 2), (9, 5), (9, 10), (12, 1), (12, 7), (12, 11)} |
| (4) | A(l, k)= | {(3, 1), (3, 6), (3, 9), (6, 2), (6, 5), (6, 10)} |
| | B(l, k)= | {(9, 1), (9, 6), (9, 9), (12, 2), (12, 5), (12, 10)} |
| (5) | A(l, k)= | {(3, 0), (3, 4), (3, 10), (6, 1), (6, 7), (6, 11)} |
| | B(l, k)= | {(9, 0), (9, 4), (9, 10), (12, 1), (12, 7), (12, 11)} |
| (6) | A(l, k)= | {(3, 0), (3, 4), (3, 8), (6, 1), (6, 5), (6, 9)} |
| | B(l, k)= | {(9, 2), (9, 6), (9, 10), (12, 3), (12, 7), (12, 11)} |
| (7) | A(l, k)= | {(3, 1), (3, 5), (3, 10), (6, 1), (6, 5), (6, 10)} |
| | B(l, k)= | {(9, 1), (9, 5), (9, 10), (12, 1), (12, 5), (12, 10)} |
| (8) | A(l, k)= | {(3, 0), (3, 6), (3, 10), (6, 1), (6, 5), (6, 11)} |
| | B(l, k)= | {(9, 0), (9, 6), (9, 10), (12, 1), (12, 5), (12, 11)} |
| (9) | A(l, k)= | {(3, 1), (3, 4), (3, 8), (6, 2), (6, 6), (6, 11)} |
| | B(l, k)= | {(9, 0), (9, 5), (9, 9), (12, 3), (12, 7), (12, 10)} |

Figure 13:
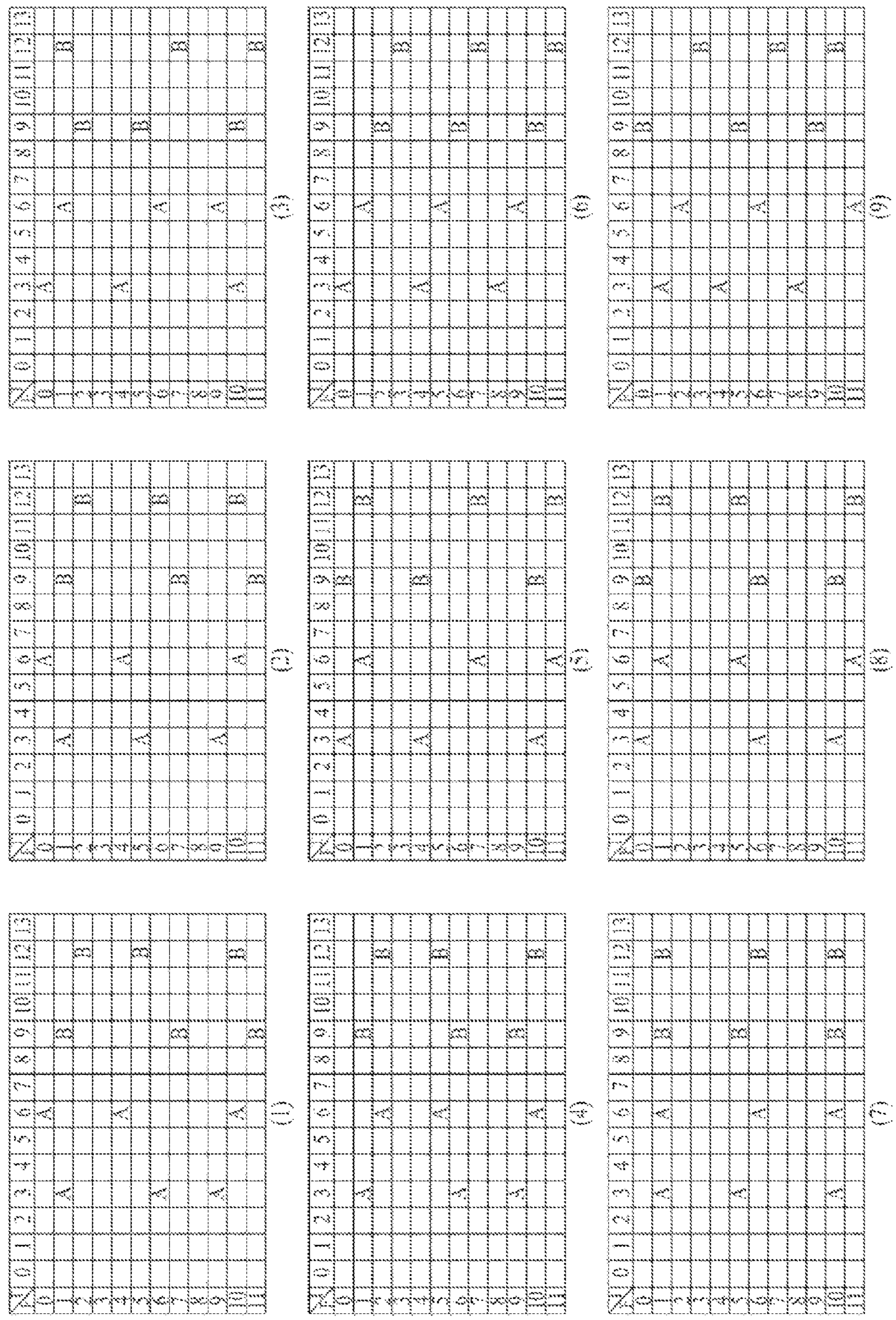

As shown in FIG. 13, in this embodiment, DRSs of the 1st and 2nd layers are arranged in equal proportions at 12 REs in 2 RBs (i.e., in a pair of RBs) that are consecutive in time in one subframe. 3 DRSs of the 1st layer are arranged in each of the 3rd and 6th OFDM symbols and 3 DRSs of the 2nd layer are arranged in each of the 9th and 12th OFDM symbols. Accordingly, DRSs are arranged at equal intervals in the time domain. In embodiments B-4-(1) to B-4-(9), the number of subcarriers, at intervals of which DRSs are arranged, is set to be different in each OFDM symbol. In addition, the present invention suggests a variety of embodiments in which, according to such setting, the positions of DRSs in the time-frequency domain are set to achieve high channel estimation performance for adjacent resource elements through interpolation/extrapolation of DRSs. In the case of rank-1 transmission, the positions, in the time-frequency domain, of RSs of the 1st and 2nd layers in FIG. 8 may all be used as positions of RSs of one layer.

Embodiment B-5

TABLE 5

| | | |
|---|---|---|
| (1) | A(l, k)= | {(3, 1), (3, 7), (10, 1), (10, 7), (12, 1), (12, 7)} |
| | B(l, k)= | {(3, 4), (3, 10), (10, 4), (10, 10), (12, 4), (12, 10)} |
| | C(l, k)= | {(8, 5), (8, 11)} |
| | D(l, k)= | {(8, 2), (8, 8)} |
| (2) | A(l, k)= | {(3, 0), (3, 6), (10, 0), (10, 6), (12, 0), (12, 6)} |
| | B(l, k)= | {(3, 3), (3, 9), (10, 3), (10, 9), (12, 3), (12, 9)} |
| | C(l, k)= | {(8, 5), (8, 11)} |
| | D(l, k)= | {(8, 2), (8, 8)} |
| (3) | A(l, k)= | {(3, 2), (3, 8), (10, 2), (10, 8), (12, 2), (12, 8)} |
| | B(l, k)= | {(3, 5), (3, 11), (10, 5), (10, 11), (12, 5), (12, 11)} |
| | C(l, k)= | {(8, 5), (8, 11)} |
| | D(l, k)= | {(8, 2), (8, 8)} |
| (4) | A(l, k)= | {(3, 1), (3, 7), (10, 1), (10, 7), (13, 1), (13, 7)} |
| | B(l, k)= | {(3, 4), (3, 10), (10, 4), (10, 10), (13, 4), (13, 10)} |
| | C(l, k)= | {(8, 5), (8, 11)} |
| | D(l, k)= | {(8, 2), (8, 8)} |
| (5) | A(l, k)= | {(3, 0), (3, 6), (10, 1), (10, 7), (12, 2), (12, 8)} |
| | B(l, k)= | {(3, 3), (3, 9), (10, 4), (10, 10), (12, 5), (12, 11)} |
| | C(l, k)= | {(8, 5), (8, 11)} |
| | D(l, k)= | {(8, 2), (8, 8)} |
| (6) | A(l, k)= | {(3, 2), (3, 8), (10, 1), (10, 7), (12, 0), (12, 6)} |
| | B(l, k)= | {(3, 5), (3, 11), (10, 4), (10, 10), (12, 3), (12, 9)} |
| | C(l, k)= | {(8, 5), (8, 11)} |
| | D(l, k)= | {(8, 2), (8, 8)} |

Figure 14:
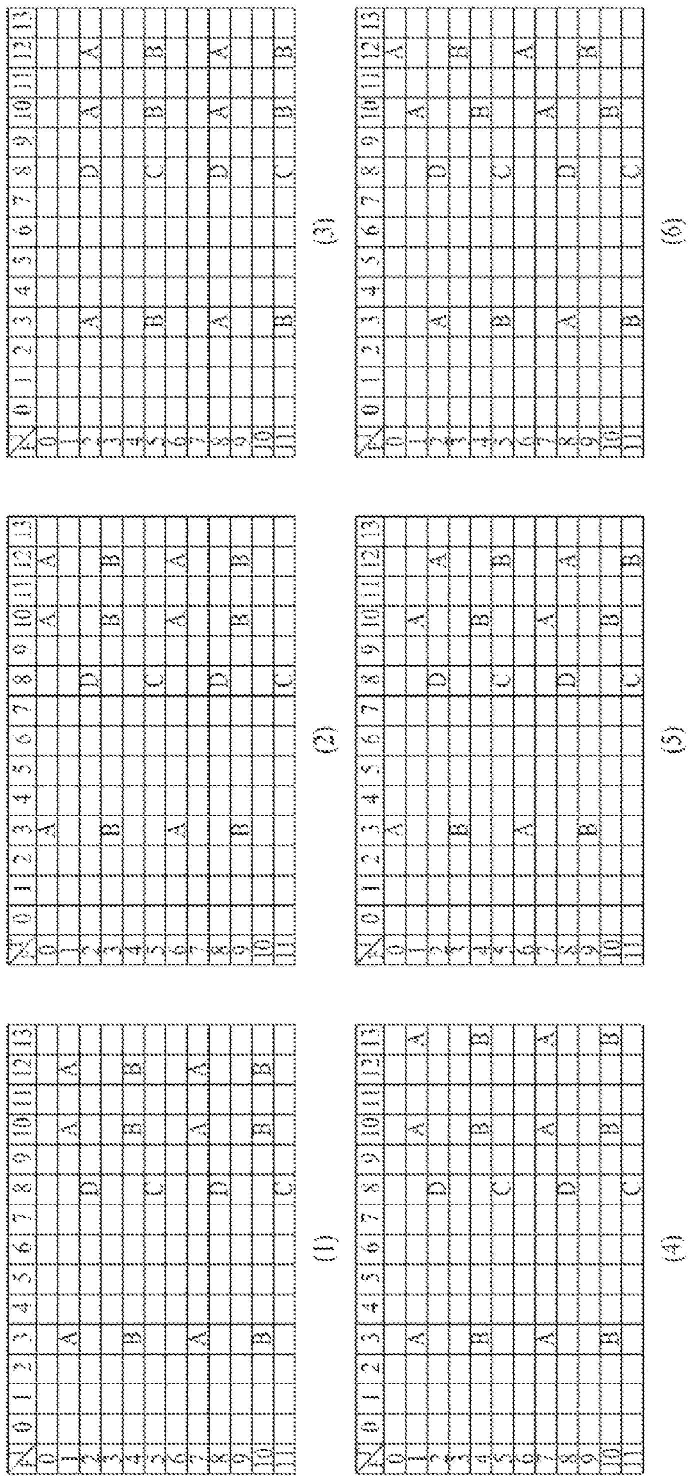

As shown in FIG. 14, in this embodiment, DRSs of the 1st and 2nd layers are arranged in equal proportions at 12 REs in 2 RBs (i.e., in a pair of RBs) that are consecutive in time in one subframe. In addition, DRSs of the 3rd and 4th layers are arranged in equal proportions at 4 REs. Accordingly, DRSs are arranged at a total of 16 REs in 2 RBs (i.e., in a pair of RBs) that are consecutive in time in one subframe.

The conventional LTE system supports up to rank-2 transmission and, in this regard, DRSs are arranged at 12 REs in 2 RBs (i.e., in a pair of RBs) that are consecutive in time in one subframe. To support this, in this embodiment, DRSs of the 1st and 2nd layers are arranged at 12 REs and DRSs of the 3rd and 4th layers are additionally set.

In the embodiments B-5-(1) to B-5-(6), 2 DRSs of the 3rd layer and 2 DRSs of the 4th layer are alternately arranged at intervals of 3 subcarriers in the 8th OFDM symbol. 2 DRSs of the 1st layer and 2 DRSs of 2nd layer are alternately arranged at intervals of 3 subcarriers in one OFDM symbol.

In the embodiments B-5-(1) to B-5-(3), DRSs of the 1st and 2nd layers are arranged at the same subcarrier positions in the 3rd, 10th, and 12th OFDM symbols. In the embodiment B-5-(4), which is a modification of the embodiment B-5(1), the 13th OFDM symbol is used instead of the 12 OFDM symbol.

In the embodiments B-5-(5) and B-5-(6), DRSs of the 1st and 2nd layers are arranged in increasing order or in decreasing order with an offset of 1 subcarrier in each OFDM symbol.

Embodiment B-6

TABLE 6

| | | |
|---|---|---|
| (1) | A(l, k)= | {(3, 0), (3, 6), (10, 0), (10, 6), (12, 0), (12, 6)} |
| | B(l, k)= | {(3, 1), (3, 7), (10, 1), (10, 7), (12, 1), (12, 7)} |
| | C(l, k)= | {(8, 5), (8, 11)} |
| | D(l, k)= | {(8, 2), (8, 8)} |
| (2) | A(l, k)= | {(3, 1), (3, 7), (10, 2), (10, 8), (12, 3), (12, 9)} |
| | B(l, k)= | {(3, 2), (3, 8), (10, 3), (10, 9), (12, 4), (12, 10)} |
| | C(l, k)= | {(8, 5), (8, 11)} |
| | D(l, k)= | {(8, 2), (8, 8)} |
| (3) | A(l, k)= | {(3, 2), (3, 8), (10, 3), (10, 9), (12, 4), (12, 10)} |
| | B(l, k)= | {(3, 3), (3, 9), (10, 4), (10, 10), (12, 5), (12, 11)} |
| | C(l, k)= | {(8, 5), (8, 11)} |
| | D(l, k)= | {(8, 2), (8, 8)} |
| (4) | A(l, k)= | {(3, 2), (3, 8), (10, 2), (10, 8), (13, 2), (13, 8)} |
| | B(l, k)= | {(3, 3), (3, 9), (10, 3), (10, 9), (13, 3), (13, 9)} |
| | C(l, k)= | {(8, 5), (8, 11)} |
| | D(l, k)= | {(8, 2), (8, 8)} |
| (5) | A(l, k)= | {(3, 0), (3, 6), (10, 2), (10, 8), (12, 4), (12, 10)} |
| | B(l, k)= | {(3, 1), (3, 7), (10, 3), (10, 9), (12, 5), (12, 11)} |
| | C(l, k)= | {(8, 5), (8, 11)} |
| | D(l, k)= | {(8, 2), (8, 8)} |

Figure 15:
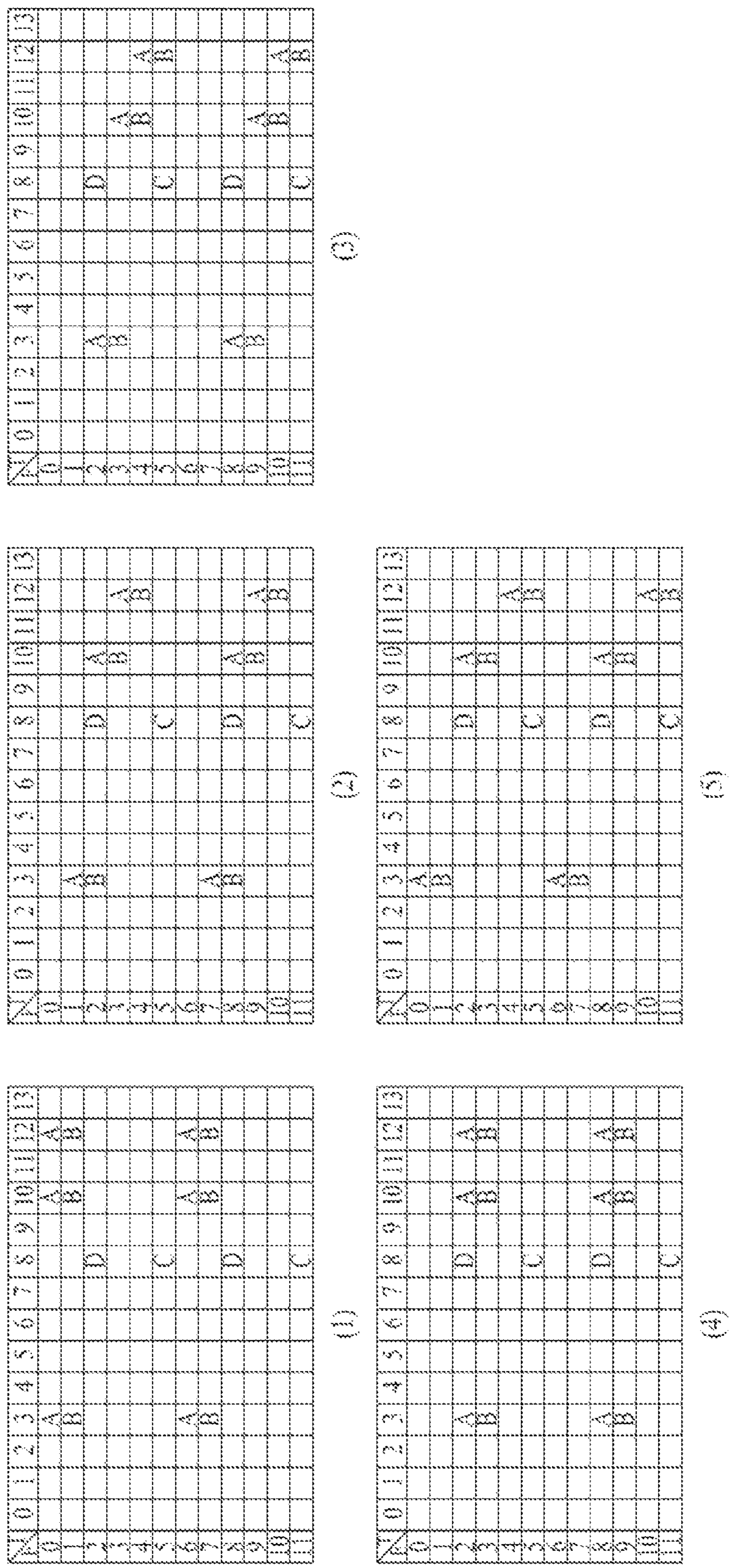

As shown in FIG. 15, in this embodiment, DRSs of the 1st and 2nd layers are arranged in equal proportions at 12 REs in 2 RBs (i.e., in a pair of RBs) that are consecutive in time in one subframe. In addition, similar to the embodiment E, DRSs of the 3rd and 4th layers are arranged in equal proportions at 4 REs and 2 DRSs of the 3rd layer and 2 DRSs of the 4th layer are alternately arranged at intervals of 3 subcarriers in the 8th OFDM symbol.

In the embodiments B-6-(1) to B-6-(5), 2 DRSs of the 1st layer and 2 DRSs of the 2nd layer are arranged in one OFDM symbol and DRSs of different layers are arranged at contiguous subcarriers. In one OFDM symbol, DRSs of one layer are arranged at intervals of 6 subcarriers.

In the embodiments B-6-(1) to B-6-(4), DRSs of the 1st and 2nd layers are arranged at the same subcarrier positions in the 3rd, 10th, and 12th OFDM symbols.

In the embodiments B-6-(2), B-6-(3), and B-6-(5), DRSs of the 1st and 2nd layers are arranged in increasing order or in decreasing order with an offset of 1 or 2 subcarriers in each OFDM symbol.

Embodiment B-7

TABLE 7

| | | |
|---|---|---|
| (1) | A(l, k)= | {(3, 1), (3, 7), (8, 1), (8, 7), (12, 1), (12, 7)} |
| | B(l, k)= | {(3, 4), (3, 10), (8, 4), (8, 10), (12, 4), (12, 10)} |
| (2) | A(l, k)= | {(3, 0), (3, 6), (8, 0), (8, 6), (12, 0), (12, 6)} |
| | B(l, k)= | {(3, 3), (3, 9), (8, 3), (8, 9), (12, 3), (12, 9)} |
| (3) | A(l, k)= | {(3, 2), (3, 8), (8, 2), (8, 8), (12, 2), (12, 8)} |
| | B(l, k)= | {(3, 5), (3, 11), (8, 5), (8, 11), (12, 5), (12, 11)} |
| (4) | A(l, k)= | {(3, 1), (3, 7), (8, 1), (8, 7), (12, 1), (13, 7)} |
| | B(l, k)= | {(3, 4), (3, 10), (8, 4), (8, 10), (12, 4), (13, 10)} |
| (5) | A(l, k)= | {(3, 0), (3, 6), (8, 1), (8, 7), (12, 2), (12, 8)} |
| | B(l, k)= | {(3, 3), (3, 9), (8, 4), (8, 10), (12, 5), (12, 11)} |
| (6) | A(l, k)= | {(3, 2), (3, 8), (8, 1), (8, 7), (12, 0), (12, 6)} |
| | B(l, k)= | {(3, 5), (3, 11), (8, 4), (8, 10), (12, 3), (12, 9)} |

Figure 16:
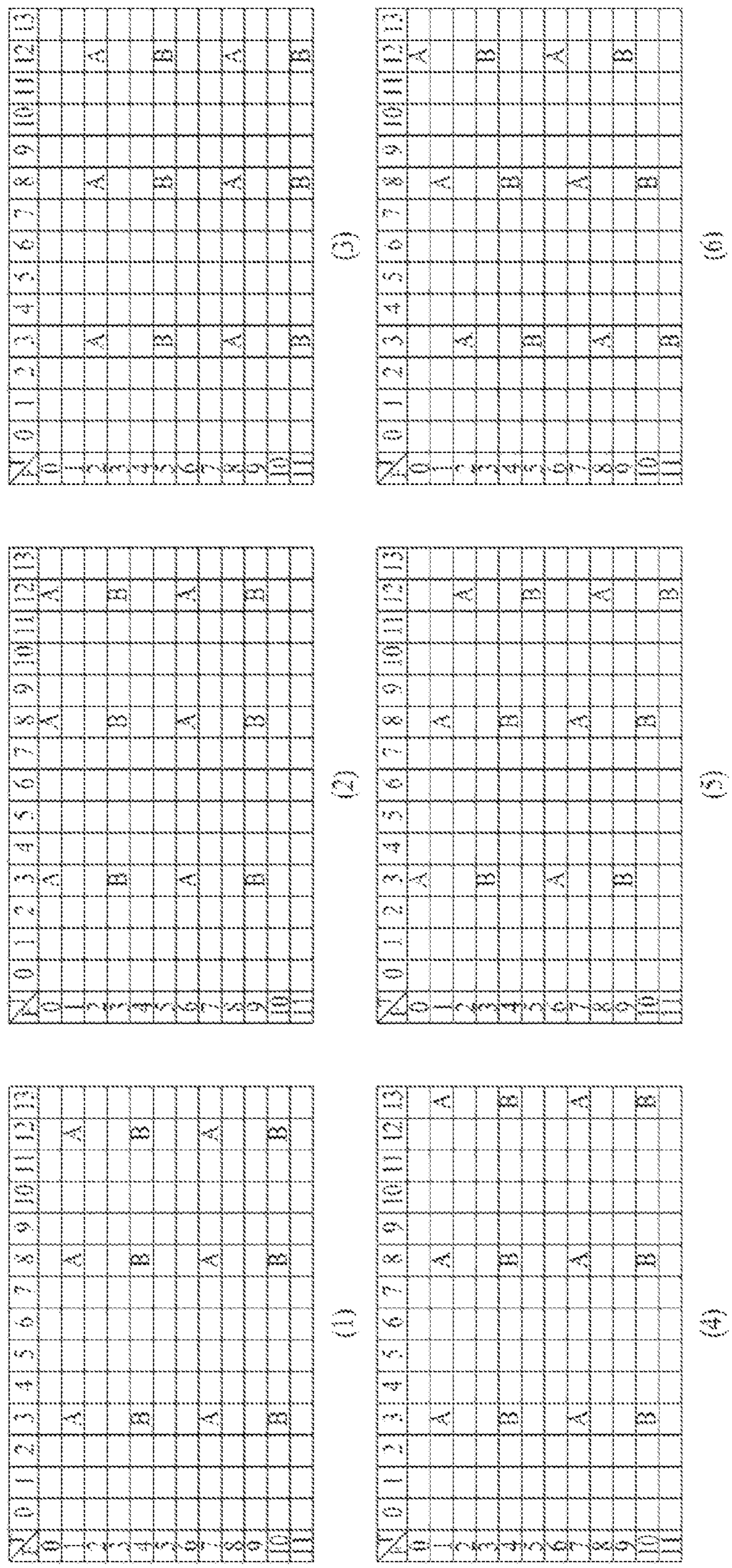

As shown in FIG. 16, in this embodiment, DRSs of the 1st and 2nd layers are arranged in equal proportions at 12 REs in 2 RBs (i.e., in a pair of RBs) that are consecutive in time in one subframe. DRSs of the 1st and 2nd layers are arranged in 3 OFDM symbols. 2 DRSs of the 1st layer and 2 DRSs of the 2nd layer are alternately arranged at intervals of 3 subcarriers in each of the OFDM symbols.

As described above, a synchronization channel (SCH) is located at each of the 5th and 6th OFDM symbols at intervals of 5 subframes and a broadcast channel (BCH) is located at each of the 7th to 9th OFDM symbols at intervals of 10 subframes. In the case where an SCH and a BCH are allocated, channel estimation performance may be reduced since DRSs are punctured at the corresponding OFDM symbols. In this embodiment, DRSs are arranged in only one OFDM symbol (i.e., the 8th OFDM symbol) from among the 5th to 9th OFDM symbols so as to achieve high channel estimation performance while minimizing the influence of the SCH and the BCH.

In the embodiments B-7-(1) to B-7-(3), DRSs of the 1st and 2nd layers are arranged at the same subcarrier positions in the 3rd, 8th, and 12th OFDM symbols. In the embodiment B-7-(4), which is a modification of the embodiment B-7(1), DRSs are arranged in the 13th OFDM symbol instead of the 12th OFDM symbol.

In the embodiments B-7-(5) and B-7-(6), DRSs of the 1st and 2nd layers are arranged in increasing order or in decreasing order with an offset of 1 subcarrier in each OFDM symbol.

Embodiment B-8

TABLE 8

| | | |
|---|---|---|
| (1) | A(l, k)= | {(3, 0), (3, 6), (8, 0), (8, 6), (12, 0), (12, 6)} |
| | B(l, k)= | {(3, 1), (3, 7), (8, 1), (8, 7), (12, 1), (12, 7)} |
| (2) | A(l, k)= | {(3, 1), (3, 7), (8, 2), (8, 8), (12, 3), (12, 9)} |
| | B(l, k)= | {(3, 2), (3, 8), (8, 3), (8, 9), (12, 4), (12, 10)} |
| (3) | A(l, k)= | {(3, 2), (3, 8), (8, 3), (8, 9), (12, 4), (12, 10)} |
| | B(l, k)= | {(3, 3), (3, 9), (8, 4), (8, 10), (12, 5), (12, 11)} |
| (4) | A(l, k)= | {(3, 2), (3, 8), (8, 2), (8, 8), (12, 2), (12, 8)} |
| | B(l, k)= | {(3, 3), (3, 9), (8, 3), (8, 9), (12, 3), (12, 9)} |
| (5) | A(l, k)= | {(3, 0), (3, 6), (8, 2), (8, 8), (12, 4), (12, 10)} |
| | B(l, k)= | {(3, 1), (3, 7), (8, 3), (8, 9), (12, 5), (12, 11)} |

Figure 17:
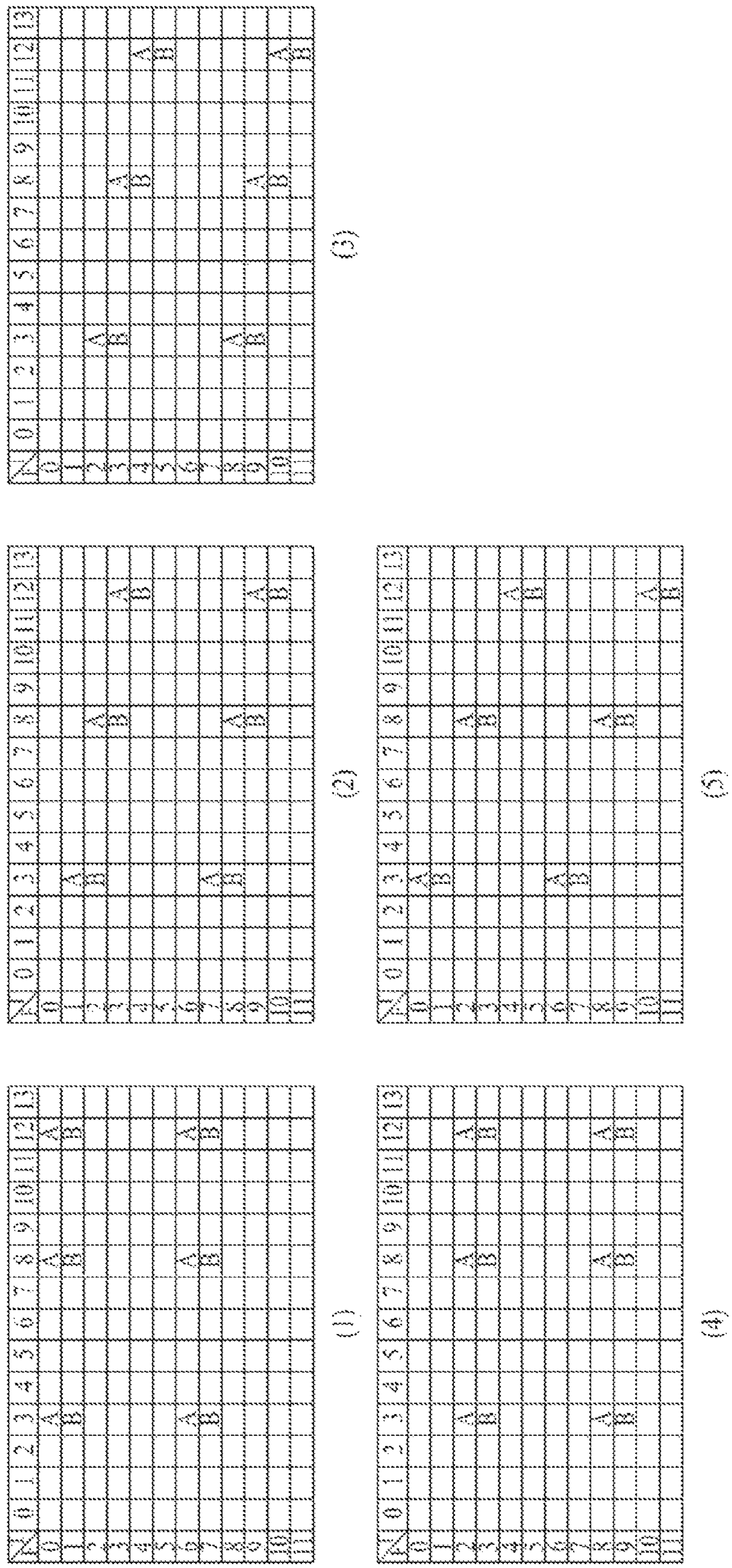

As shown in FIG. 17, in this embodiment, DRSs of the 1st and 2nd layers are arranged in equal proportions at 12 REs in 2 RBs (i.e., in a pair of RBs) that are consecutive in time in one subframe. DRSs of the 1st and 2nd layers are arranged in the 3rd, 8th, and 12th OFDM symbols.

In the embodiments B-8-(1) to B-8-(5), 2 DRSs of the 1st layer and 2 DRSs of the 2nd layer are arranged in one OFDM symbol and DRSs of different layers are arranged at contiguous subcarriers. In one OFDM symbol, DRSs of one layer are arranged at intervals of 6 subcarriers.

In the embodiments B-8-(1) to B-8-(4), DRSs of the 1st and 2nd layers are arranged at the same subcarrier positions in the 3rd, 10th, and 12th OFDM symbols.

In the embodiments B-8-(2), B-8-(3), and B-8-(5), DRSs of the 1st and 2nd layers are arranged in increasing order or in decreasing order with an offset of 1 or 2 subcarriers in each OFDM symbol.

Embodiment C-1

TABLE 9

| | | |
|---|---|---|
| (1) | A(l, k)= | {(3, 0), (3, 6), (8, 2), (8, 8), (12, 4), (12, 10)} |
| | B(l, k)= | {(3, 1), (3, 7), (8, 3), (8, 9), (12, 5), (12, 11)} |
| (2) | A(l, k)= | {(3, 0), (3, 6), (8, 4), (8, 10), (12, 2), (12, 8)} |
| | B(l, k)= | {(3, 1), (3, 7), (8, 5), (8, 11), (12, 3), (12, 9)} |
| (3) | A(l, k)= | {(3, 0), (3, 6), (8, 2), (8, 8), (12, 0), (12, 6)} |
| | B(l, k)= | {(3, 3), (3, 9), (8, 5), (8, 11), (12, 3), (12, 9)} |
| (4) | A(l, k)= | {(3, 0), (3, 6), (8, 3), (8, 9), (12, 0), (12, 6)} |
| | B(l, k)= | {(3, 3), (3, 9), (8, 0), (8, 6), (12, 3), (12, 9)} |
| (5) | A(l, k)= | {(3, 2), (3, 8), (8, 5), (8, 11), (12, 2), (12, 8)} |
| | B(l, k)= | {(3, 5), (3, 11), (8, 2), (8, 8), (12, 5), (12, 11)} |

Figure 18:
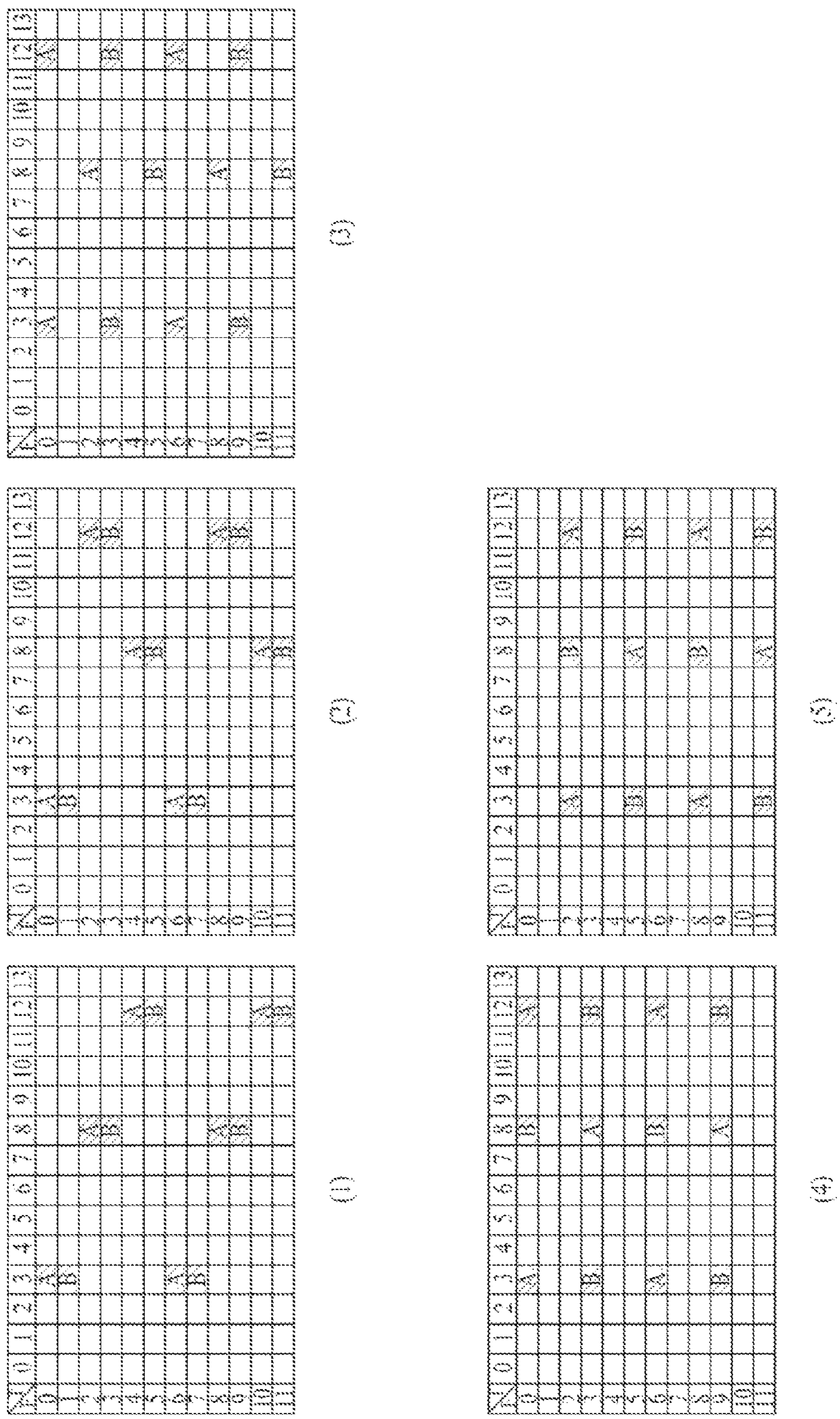

As shown in FIG. 18, in this embodiment, DRSs of the 1st and 2nd layers are arranged in equal proportions at 12 REs in 2 RBs (i.e., in a pair of RBs) that are consecutive in time in one subframe. DRSs of the 1st and 2nd layers may be multiplexed according to an FDM scheme and the corresponding positions in the frequency domain may change. Although DRSs are shown as being arranged in the 3rd, 8th, and 12th OFDM symbols in the embodiments A(1) to A(5), the 1st pattern may be arranged in the 3rd or 5th OFDM symbol, the 2nd pattern may be arranged in the 8th or 9th OFDM symbol, and the 3rd pattern may be arranged in the 10th or 12th OFDM symbol.

In embodiments C-1-(1) and C-1-(2), DRSs of the 1st and 2nd layers are arranged at contiguous subcarrier positions to easily support DRSs of the CDM scheme while achieving the same channel estimation performance. In embodiments C-1-(3) to C-1-(5), DRSs of the 1st and 2nd layers are arranged at equal subcarrier intervals in one OFDM symbol.

Embodiment C-2

TABLE 10

| | | |
|---|---|---|
| (1) | P(l, k)= | {(3, 1), (3, 5), (3, 9), (6, 1), (6, 5), (6, 9), (9, 1), (9, 5), (9, 9), (12, 1), (12, 5), (12, 9)} |
| (2) | P(l, k)= | {(3, 1), (3, 5), (3, 9), (6, 2), (6, 6), (6, 10), (9, 1), (9, 5), (9, 9), (12, 2), (12, 6), (12, 10)} |
| (3) | P(l, k)= | {(3, 0), (3, 4), (3, 8), (6, 3), (6, 7), (6, 11), (9, 0), (9, 4), (9, 8), (12, 3), (12, 7), (12, 11)} |
| (4) | P(l, k)= | {(3, 0), (3, 3), (3, 6), (3, 9), (8, 2), (8, 5), (8, 8), (8, 11), (12, 0), (12, 3), (12, 6), (12, 9)} |
| (5) | P(l, k)= | {(3, 0), (3, 3), (3, 6), (3, 9), (8, 0), (8, 3), (8, 6), (8, 9), (12, 0), (12, 3), (12, 6), (12, 9)} |
| (6) | P(l, k)= | {(3, 2), (3, 5), (3, 8), (3, 11), (8, 2), (8, 5), (8, 8), (8, 11), (12, 2), (12, 5), (12, 8), (12, 11)} |

Figure 19:
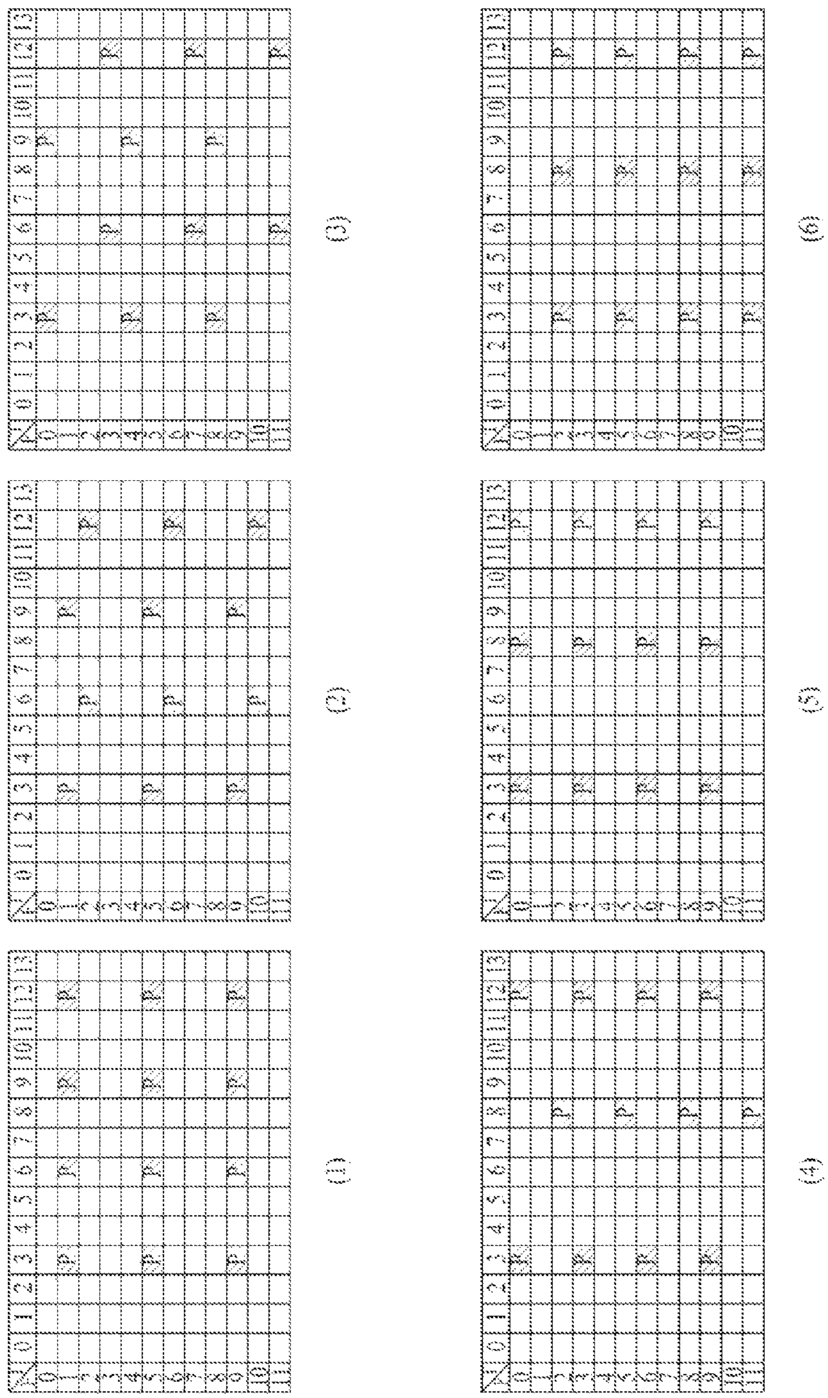

As shown in FIG. 19, time-frequency positions denoted by "P" indicate that DRSs of the 1st and 2nd layers are multiplexed according to a CDM scheme and each pair of multiplexed DRSs is then arranged in one RE.

In embodiments C-2-(1) to C-2-(3), DRSs of the 1st and 2nd layers are arranged in equal proportions at 16 REs in 2 RBs (i.e., in a pair of RBs) that are consecutive in time in one subframe. DRSs of the 1st and 2nd layers are multiplexed according to a CDM scheme and are arranged at 3 subcarriers at equal intervals in the 3rd, 6th, 9th, and 12th OFDM symbols. Alternatively, the 1st pattern may be arranged in the 3rd OFDM symbol, the 2nd pattern may be arranged in the 5th or 6th OFDM symbol, the 3rd pattern may be arranged in the 8th or the 9th OFDM symbol, and the 4th pattern may be arranged in 10th or 12th OFDM symbol.

In embodiments C-2-(4) to C-2-(6), DRSs of the 1st and 2nd layers are arranged in equal proportions at 12 REs in 2 RBs (i.e., in a pair of RBs) that are consecutive in time in one subframe. DRSs of the 1st and 2nd layers are multiplexed according to a CDM scheme and are arranged at 4 subcarriers at equal intervals in the 3rd, 8th, and 12th OFDM symbols. Alternatively, the 1st pattern may be arranged in the 3rd or 5th OFDM symbol, the 2nd pattern may be arranged in the 8th or the 9th OFDM symbol, and the 3rd pattern may be arranged in 10th or 12th OFDM symbol.

Embodiment C-3

TABLE 11

| | | |
|---|---|---|
| (1) | A(l, k)= | {(3, 0), (3, 7), (7, 3), (7, 10), (11, 0), (11, 7)} |
| | B(l, k)= | {(4, 0), (4, 7), (8, 3), (8, 10), (12, 0), (12, 7)} |
| | C(l, k)= | {(3, 3), (3, 10), (7, 0), (7, 7), (11, 3), (11, 10)} |
| | D(l, k)= | {(4, 3), (4, 10), (8, 0), (8, 7), (12, 3), (12, 10)} |
| (2) | A(l, k)= | {(3, 0), (3, 4), (3, 10), (9, 0), (9, 6), (9, 10)} |
| | B(l, k)= | {(4, 0), (4, 4), (4, 10), (10, 0), (10, 6), (10, 10)} |
| | C(l, k)= | {(5, 0), (5, 4), (5, 10), (11, 0), (11, 6), (11, 10)} |
| | D(l, k)= | {(6, 0), (6, 4), (6, 10), (12, 0), (12, 6), (12, 10)} |
| (3) | A(l, k)= | {(3, 0), (3, 10), (5, 6), (9, 0), (9, 10), (11, 6)} |
| | B(l, k)= | {(4, 0), (4, 10), (6, 6), (10, 0), (10, 10), (12, 6)} |
| | C(l, k)= | {(3, 4), (5, 0), (5, 10), (9, 4), (11, 0), (11, 10)} |
| | D(l, k)= | {(4, 4), (6, 0), (6, 10), (10, 4), (12, 0), (12, 10)} |

TABLE 11-continued

| | | |
|---|---|---|
| (4) | A(l, k)= | {(3, 0), (3, 10), (5, 4), (9, 0), (9, 10), (11, 6)} |
| | B(l, k)= | {(4, 0), (4, 10), (6, 4), (10, 0), (10, 10), (12, 6)} |
| | C(l, k)= | {(3, 4), (5, 0), (5, 10), (9, 6), (11, 0), (11, 10)} |
| | D(l, k)= | {(4, 4), (6, 0), (6, 10), (10, 6), (12, 0), (12, 10)} |
| (5) | A(l, k)= | {(3, 0), (3, 4), (3, 10), (9, 0), (9, 6), (9, 10)} |
| | B(l, k)= | {(4, 0), (4, 4), (10, 0), (4, 10), (10, 6), (10, 10)} |
| | C(l, k)= | {(5, 0), (5, 6), (5, 10), (11, 0), (11, 4), (11, 10)} |
| | D(l, k)= | {(6, 0), (6, 6), (6, 10), (12, 0), (12, 4), (12, 10)} |
| (6) | A(l, k)= | {(3, 1), (3, 7), (7, 4), (7, 10), (11, 1), (11, 7)} |
| | B(l, k)= | {(4, 1), (4, 7), (8, 4), (8, 10), (12, 1), (12, 7)} |
| | C(l, k)= | {(3, 4), (3, 10), (7, 1), (7, 7), (11, 4), (11, 10)} |
| | D(l, k)= | {(4, 4), (4, 10), (8, 1), (8, 7), (12, 4), (12, 10)} |
| (7) | A(l, k)= | {(3, 1), (3, 4), (3, 10), (9, 1), (9, 7), (9, 10)} |
| | B(l, k)= | {(4, 1), (4, 4), (4, 10), (10, 1), (10, 7), (10, 10)} |
| | C(l, k)= | {(5, 1), (5, 4), (5, 10), (11, 1), (11, 7), (11, 10)} |
| | D(l, k)= | {(6, 1), (6, 4), (6, 10), (12, 1), (12, 7), (12, 10)} |
| (8) | A(l, k)= | {(3, 1), (3, 4), (3, 10), (9, 1), (9, 4), (9, 10)} |
| | B(l, k)= | {(4, 1), (4, 4), (4, 10), (10, 1), (10, 4), (10, 10)} |
| | C(l, k)= | {(5, 1), (5, 7), (5, 10), (11, 1), (11, 7), (11, 10)} |
| | D(l, k)= | {(6, 1), (6, 7), (6, 10), (12, 1), (12, 7), (12, 10)} |
| (9) | A(l, k)= | {(3, 1), (5, 7), (5, 10), (9, 4), (9, 10), (11, 1)} |
| | B(l, k)= | {(4, 1), (6, 7), (6, 10), (10, 4), (10, 10), (12, 1)} |
| | C(l, k)= | {(3, 4), (3, 10), (5, 1), (9, 1), (11, 7), (11, 10)} |
| | D(l, k)= | {(4, 4), (4, 10), (6, 1), (10, 1), (12, 7), (12, 10)} |
| (10) | A(l, k)= | {(3, 1), (3, 10), (5, 4), (9, 1), (9, 10), (11, 7)} |
| | B(l, k)= | {(4, 1), (4, 10), (6, 4), (10, 1), (10, 10), (12, 7)} |
| | C(l, k)= | {(3, 4), (5, 1), (5, 10), (9, 7), (11, 1), (11, 10)} |
| | D(l, k)= | {(4, 4), (6, 1), (6, 10), (10, 7), (12, 1), (12, 10)} |
| (11) | A(l, k)= | {(3, 1), (3, 10), (5, 7), (9, 1), (9, 10), (11, 4)} |
| | B(l, k)= | {(4, 1), (4, 10), (6, 7), (10, 1), (10, 10), (12, 4)} |
| | C(l, k)= | {(3, 4), (5, 1), (5, 10), (9, 7), (11, 1), (11, 10)} |
| | D(l, k)= | {(4, 4), (6, 1), (6, 10), (10, 7), (12, 1), (12, 10)} |
| (12) | A(l, k)= | {(3, 1), (3, 10), (5, 7), (9, 4), (11, 1), (11, 10)} |
| | B(l, k)= | {(4, 1), (4, 10), (6, 7), (10, 4), (12, 1), (12, 10)} |
| | C(l, k)= | {(3, 4), (5, 1), (5, 10), (9, 1), (9, 10), (11, 7)} |
| | D(l, k)= | {(4, 4), (6, 1), (6, 10), (10, 1), (10, 10), (12, 7)} |
| (13) | A(l, k)= | {(3, 1), (5, 4), (5, 10), (9, 7), (9, 10), (11, 1)} |
| | B(l, k)= | {(4, 1), (6, 4), (6, 10), (10, 7), (10, 10), (12, 1)} |
| | C(l, k)= | {(3, 4), (3, 10), (5, 1), (9, 1), (11, 7), (11, 10)} |
| | D(l, k)= | {(4, 4), (4, 10), (6, 1), (10, 1), (12, 7), (12, 10)} |
| (14) | A(l, k)= | {(3, 1), (5, 7), (5, 10), (9, 7), (9, 10), (11, 1)} |
| | B(l, k)= | {(4, 1), (6, 7), (6, 10), (10, 7), (10, 10), (12, 1)} |
| | C(l, k)= | {(3, 4), (3, 10), (5, 1), (9, 1), (11, 4), (11, 10)} |
| | D(l, k)= | {(4, 4), (4, 10), (6, 1), (10, 1), (12, 4), (12, 10)} |
| (15) | A(l, k)= | {(3, 1), (3, 10), (5, 4), (9, 7), (11, 1), (11, 10)} |
| | B(l, k)= | {(4, 1), (4, 10), (6, 4), (10, 7), (12, 1), (12, 10)} |
| | C(l, k)= | {(3, 4), (5, 1), (5, 10), (9, 1), (9, 10), (11, 7)} |
| | D(l, k)= | {(4, 4), (6, 1), (6, 10), (10, 1), (10, 10), (12, 7)} |
| (16) | A(l, k)= | {(3, 1), (3, 10), (5, 7), (9, 7), (11, 1), (11, 10)} |
| | B(l, k)= | {(4, 1), (4, 10), (6, 7), (10, 7), (12, 1), (12, 10)} |
| | C(l, k)= | {(3, 4), (5, 1), (5, 10), (9, 1), (9, 10), (11, 4)} |
| | D(l, k)= | {(4, 4), (6, 1), (6, 10), (10, 1), (10, 10), (12, 4)} |

Figure 20:
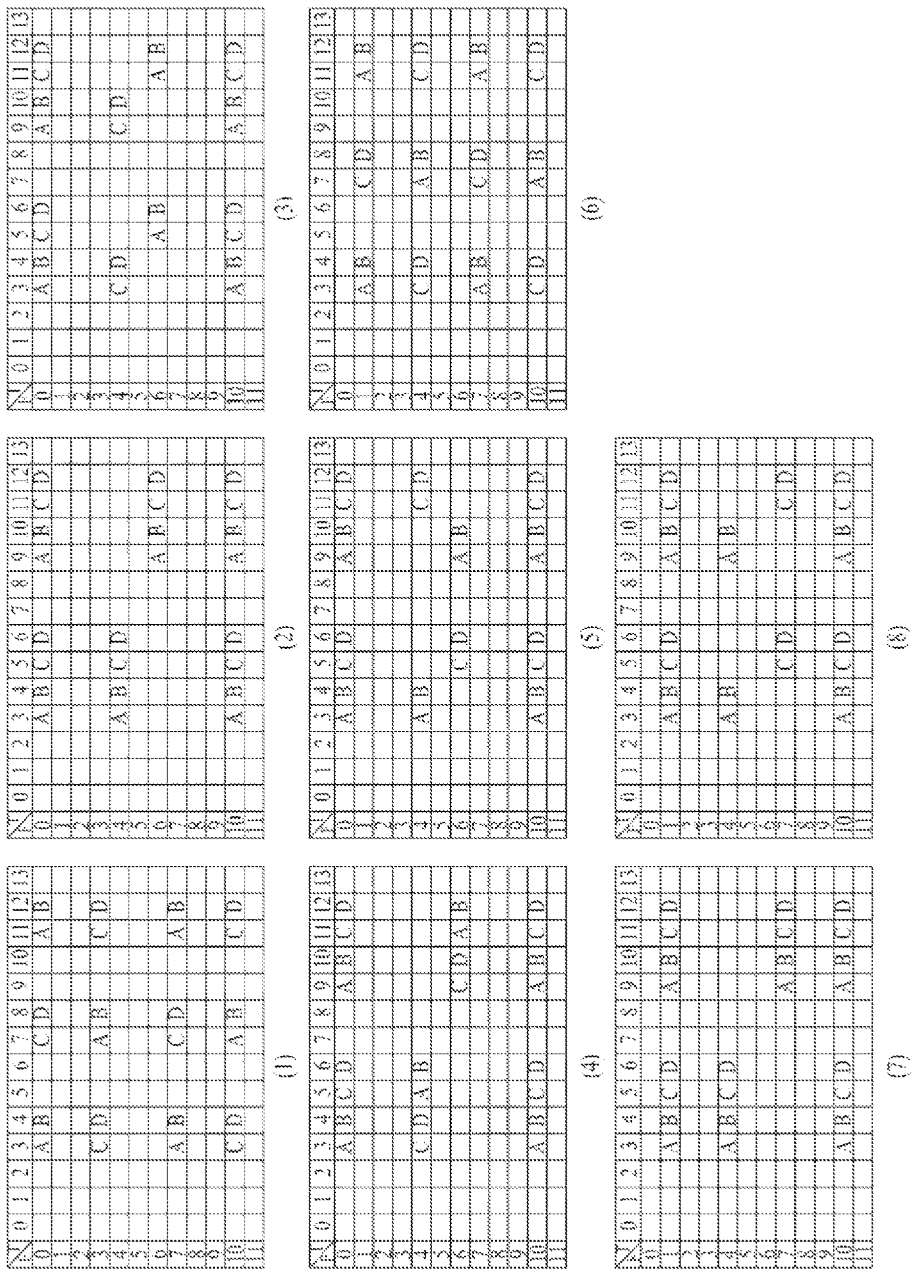
Figure 21:
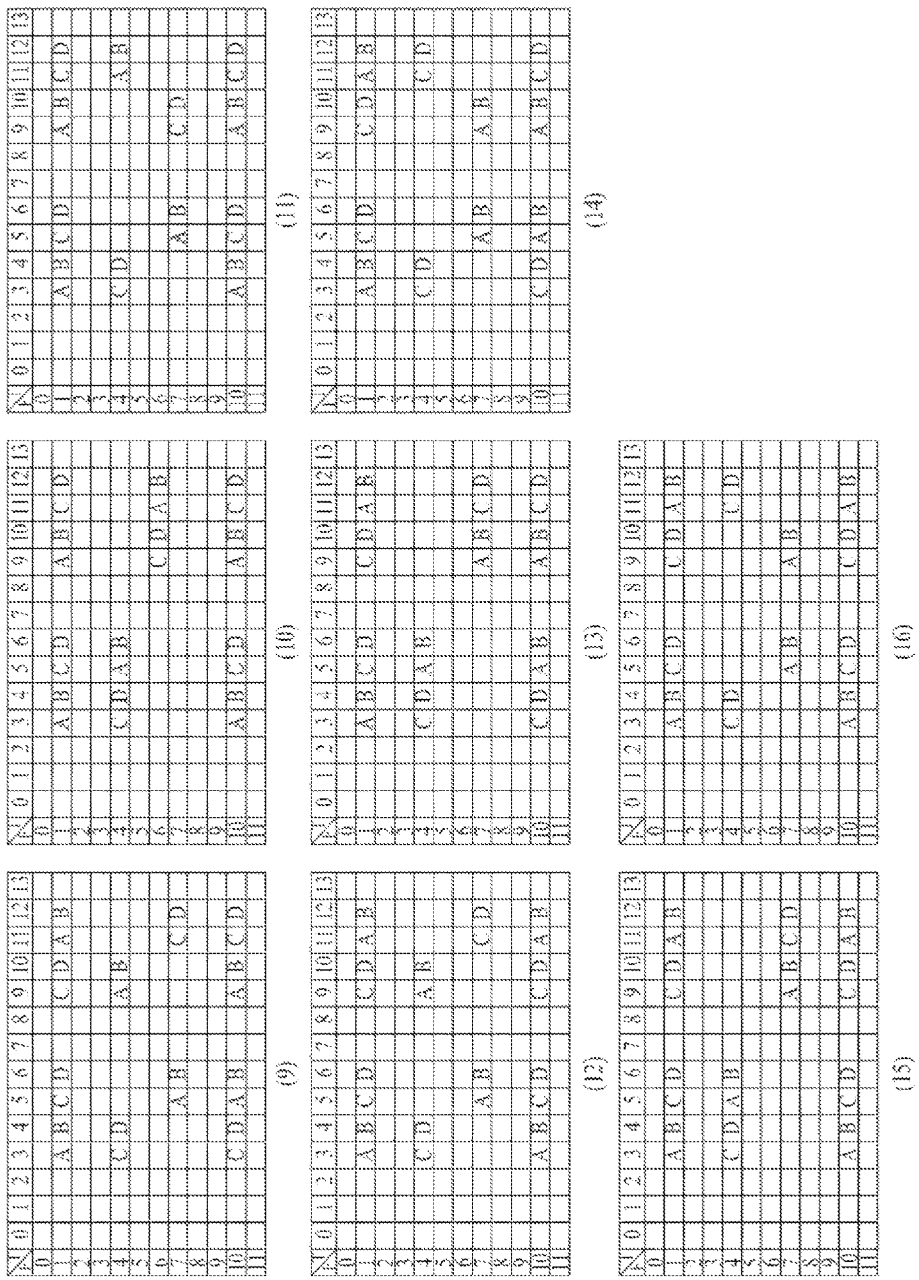

As shown in FIGS. 20 and 21, in this embodiment, for rank-4 transmission, DRSs of the 1st and 2nd layers are arranged in equal proportions at 12 REs in 2 RBs (i.e., in a pair of RBs) that are consecutive in time in one subframe and DRSs of the 3rd and 4th layers are arranged in equal proportions at 12 REs.

In this embodiment, DRSs of the 1st and 2nd layers or the 3rd and 4th layers are multiplexed according to a TDM scheme or DRSs of the 1st to 4th layers are multiplexed according to a TDM scheme.

In this embodiment, DRSs of the 1st and 2nd layers or the 3rd and 4th layers may be arranged respectively in 2 contiguous OFDM symbols at the same subcarrier index or alternatively DRSs of the 1st to 4th layers may be arranged respectively in 4 contiguous OFDM symbols at the same subcarrier index to easily apply multiplexing based on the CDM scheme. In addition, DRSs of the 1st to 4th layers may be arranged respectively in 4 contiguous OFDM symbols of a first slot of the subframe and DRSs of the 1st to 4th layers may also be arranged respectively in 4 contiguous OFDM symbols of a second slot of the subframe.

Embodiment C-4

TABLE 12

| | | |
|---|---|---|
| (1) | A(l, k)= | {(3, 0), (3, 10), (7, 3), (7, 7), (11, 0), (11, 10)} |
| | B(l, k)= | {(4, 0), (4, 10), (8, 3), (8, 7), (12, 0), (12, 10)} |
| (2) | A(l, k)= | {(3, 0), (4, 10), (7, 3), (8, 7), (11, 0), (12, 10)} |
| | B(l, k)= | {(3, 10), (4, 0), (7, 7), (8, 3), (11, 10), (12, 0)} |
| (3) | A(l, k)= | {(3, 1), (3, 10), (7, 4), (7, 7), (11, 1), (11, 10)} |
| | B(l, k)= | {(4, 1), (4, 10), (8, 4), (8, 7), (12, 1), (12, 10)} |
| (4) | A(l, k)= | {(3, 1), (4, 10), (7, 4), (8, 7), (11, 1), (12, 10)} |
| | B(l, k)= | {(3, 10), (4, 1), (7, 7), (8, 4), (11, 10), (12, 1)} |
| (5) | A(l, k)= | {(3, 0), (3, 3), (3, 7), (3, 10), (11, 0), (11, 3), (11, 7), (11, 10)} |
| | B(l, k)= | {(4, 0), (4, 3), (4, 7), (4, 10), (12, 0), (12, 3), (12, 7), (12, 10)} |
| (6) | A(l, k)= | {(3, 0), (3, 7), (4, 3), (4, 10), (11, 0), (11, 7), (12, 3), (12, 10)} |
| | B(l, k)= | {(3, 3), (3, 10), (4, 0), (4, 7), (11, 3), (11, 10), (12, 0), (12, 7)} |
| (7) | A(l, k)= | {(3, 1), (3, 4), (3, 7), (3, 10), (11, 1), (11, 4), (11, 7), (11, 10)} |
| | B(l, k)= | {(4, 1), (4, 4), (4, 7), (4, 10), (12, 1), (12, 4), (12, 7), (12, 10)} |
| (8) | A(l, k)= | {(3, 1), (3, 7), (4, 4), (4, 10), (11, 1), (11, 7), (12, 4), (12, 10)} |
| | B(l, k)= | {(3, 4), (3, 10), (4, 1), (4, 7), (11, 4), (11, 10), (12, 1), (12, 7)} |

Figure 22:
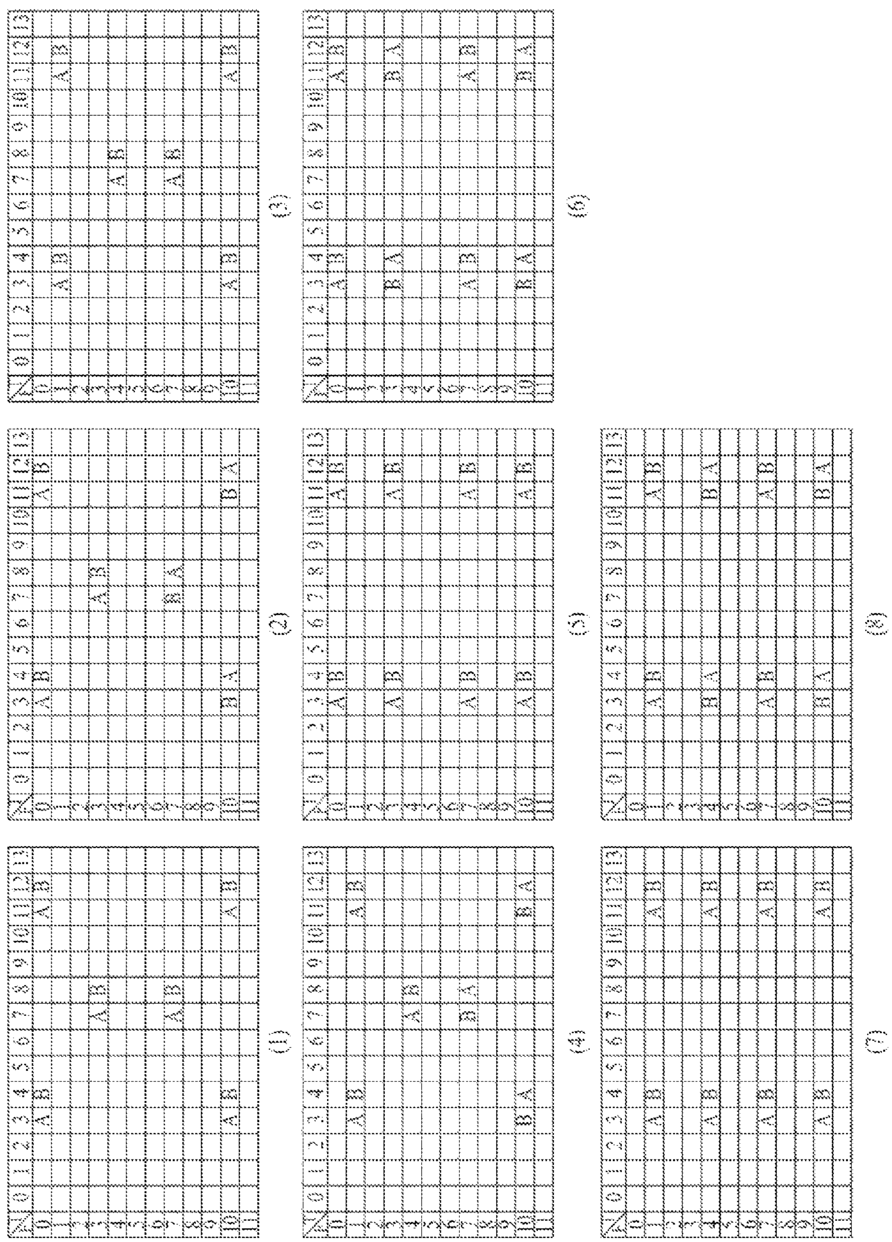

As shown in FIG. 22, in embodiments C-4-(1) to C-4-(4), DRSs of the 1st and 2nd layers are arranged in equal proportions at 12 REs in 2 RBs (i.e., in a pair of RBs) that are consecutive in time in one subframe.

In embodiments C-4-(5) to C-4-(8), DRSs of the 1st and 2nd layers are arranged in equal proportions at 16 REs in 2 RBs (i.e., in a pair of RBs) that are consecutive in time in one subframe.

In the embodiments C-4-(1) to C-4-(8), DRSs of the 1st and 2nd layers are multiplexed according to a TDM scheme. In addition, DRSs of the 1st and 2nd layers may be arranged respectively in 2 contiguous OFDM symbols at the same subcarrier index to easily apply multiplexing based on the CDM scheme. Further, DRSs may be arranged at end portions of 2 RBs (i.e., in a pair of RBs) that are consecutive in time in one subframe, thereby reducing channel estimation based on extrapolation of DRSs.

Embodiment C-5

TABLE 13

| | | |
|---|---|---|
| (1) | A(l, k)= | {(3, 0), (3, 10), (4, 0), (4, 10), (7, 3), (7, 7), (8, 3), (8, 7), (11, 0), (11, 10), (12, 0), (12, 10)} |
| (2) | A(l, k)= | {(3, 1), (3, 10), (4, 1), (4, 10), (7, 4), (7, 7), (8, 4), (8, 7), (11, 1), (11, 10), (12, 1), (12, 10)} |
| (3) | A(l, k)= | {(3, 0), (3, 3), (3, 7), (3, 10), (4, 0), (4, 3), (4, 7), (4, 10), (11, 0), (11, 3), (11, 7), (11, 10), (12, 0), (12, 3), (12, 7), (12, 10)} |
| (4) | A(l, k)= | {(3, 1), (3, 4), (3, 7), (3, 10), (4, 1), (4, 4), (4, 7), (4, 10), (11, 1), (11, 4), (11, 7), (11, 10), (12, 1), (12, 4), (12, 7), (12, 10)} |

As shown in FIG. 23, this embodiment suggests a correlation RS (pilot) which is effective for changes in the time domain. In embodiments C-5-(1) and C-5-(2), DRSs of one layer are arranged at 12 REs in 2 RBs (i.e., in a pair of RBs) that are consecutive in time in one subframe and, in embodiments C-5-(3) and C-5-(4), DRSs of one layer are arranged at 16 REs in 2 RBs (i.e., in a pair of RBs) that are consecutive in time in one subframe. It is possible to reduce the influence of changes in the time domain since DRSs of the same layer are arranged in contiguous OFDM symbols at the same subcarrier positions.

Embodiment C-6

TABLE 14

| | | |
|---|---|---|
| (1) | A(l, k)= | {(3, 1), (3, 9), (6, 5), (9, 1), (9, 9), (12, 5)} |
| | B(l, k)= | {(3, 5), (6, 1), (6, 9), (9, 5), (12, 1), (12, 9)} |
| (2) | A(l, k)= | {(3, 0), (3, 8), (6, 4), (9, 0), (9, 8), (12, 4)} |
| | B(l, k)= | {(3, 4), (6, 0), (6, 8), (9, 4), (12, 0), (12, 8)} |
| (3) | A(l, k)= | {(3, 2), (3, 10), (6, 6), (9, 2), (9, 10), (12, 6)} |
| | B(l, k)= | {(3, 6), (6, 2), (6, 10), (9, 6), (12, 2), (12, 10)} |
| (4) | A(l, k)= | {(3, 0), (3, 8), (6, 6), (9, 0), (9, 8), (12, 6)} |
| | B(l, k)= | {(3, 4), (6, 2), (6, 10), (9, 4), (12, 2), (12, 10)} |
| (5) | A(l, k)= | {(3, 2), (3, 10), (6, 4), (9, 2), (9, 10), (12, 4)} |
| | B(l, k)= | {(3, 6), (6, 0), (6, 8), (9, 6), (12, 0), (12, 8)} |
| (6) | A(l, k)= | {(3, 3), (3, 11), (6, 5), (9, 3), (9, 11), (12, 5)} |
| | B(l, k)= | {(3, 7), (6, 1), (6, 9), (9, 7), (12, 1), (12, 9)} |
| (7) | A(l, k)= | {(3, 3), (3, 11), (6, 7), (9, 3), (9, 11), (12, 7)} |
| | B(l, k)= | {(3, 7), (6, 3), (6, 11), (9, 7), (12, 3), (12, 11)} |
| (8) | A(l, k)= | {(3, 1), (3, 9), (6, 4), (9, 1), (9, 9), (12, 4)} |
| | B(l, k)= | {(3, 5), (6, 0), (6, 8), (9, 5), (12, 0), (12, 8)} |

Figure 24:
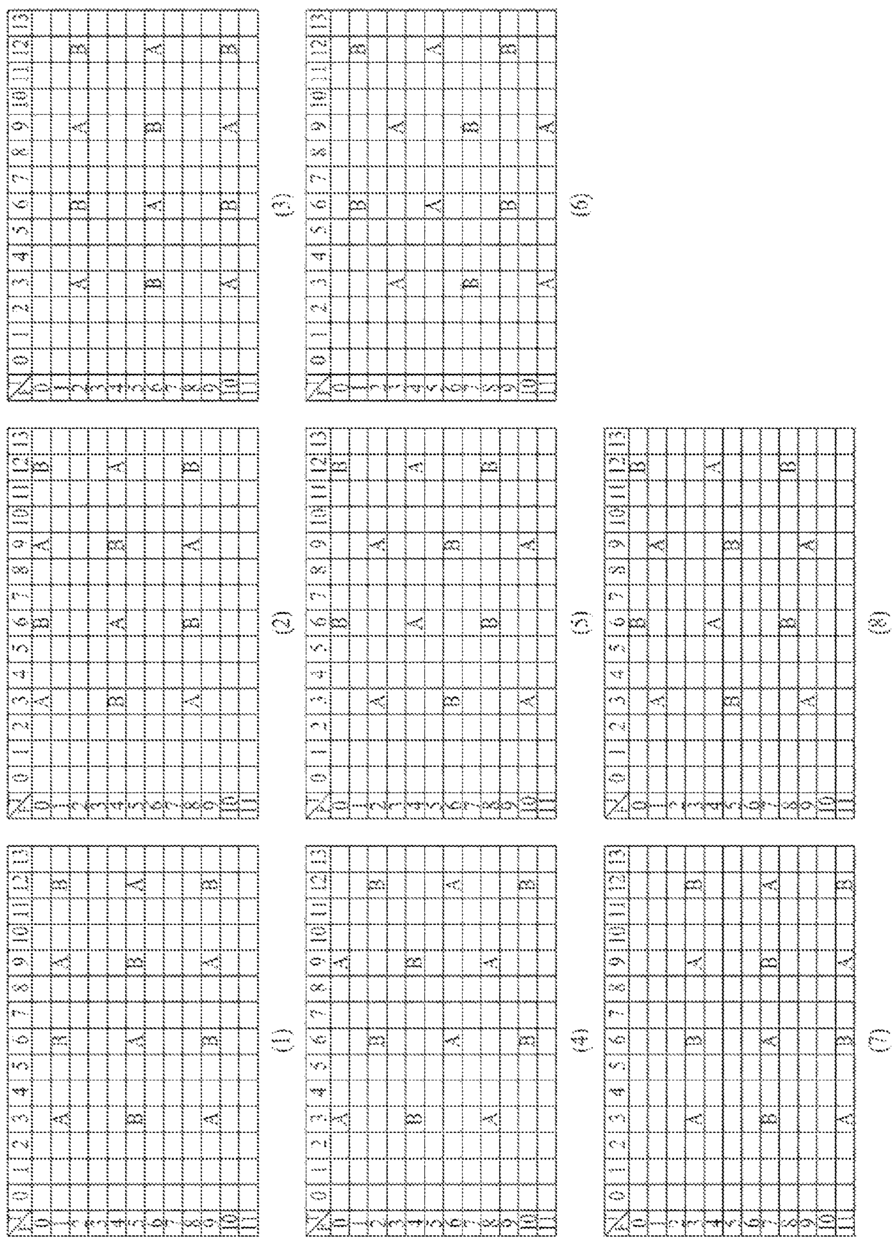

As shown in FIG. 24, in this embodiment, DRSs of the 1st and 2nd layers are arranged in equal proportions at 12 REs in 2 RBs (i.e., in a pair of RBs) that are consecutive in time in one subframe. DRSs of the 1st and 2nd layers are arranged at 3 subcarrier positions in 4 OFDM symbols.

DRSs of the 1st and 2nd layers are alternately arranged at equal intervals of 4 subcarriers in one OFDM symbol. If DRSs of the 1st and 2nd layers are arranged in one OFDM symbol at a ratio of 2:1, DRSs of the 1st and 2nd layers are arranged in a next OFDM symbol at a ratio of 1:2. It is possible to provide channel estimation performance that is robust to time selective characteristic and/or frequency selective characteristics since, due to such a DRS pattern, DRSs of each layer are distributed in uniform density in the time-frequency region.

Embodiment C-7

TABLE 15

| | | |
|---|---|---|
| (1) | A(l, k)= | {(3, 2), (3, 8), (9, 5), (9, 11), (12, 2), (12, 8)} |
| | B(l, k)= | {(3, 5), (3, 11), (9, 2), (9, 8), (12, 5), (12, 11)} |
| (2) | A(l, k)= | {(3, 0), (3, 6), (9, 4), (9, 10), (12, 2), (12, 8)} |
| | B(l, k)= | {(3, 3), (3, 9), (9, 1), (9, 7), (12, 5), (12, 11)} |
| (3) | A(l, k)= | {(3, 2), (3, 8), (9, 4), (9, 10), (12, 0), (12, 6)} |
| | B(l, k)= | {(3, 5), (3, 11), (9, 1), (9, 7), (12, 3), (12, 9)} |

Figure 25:
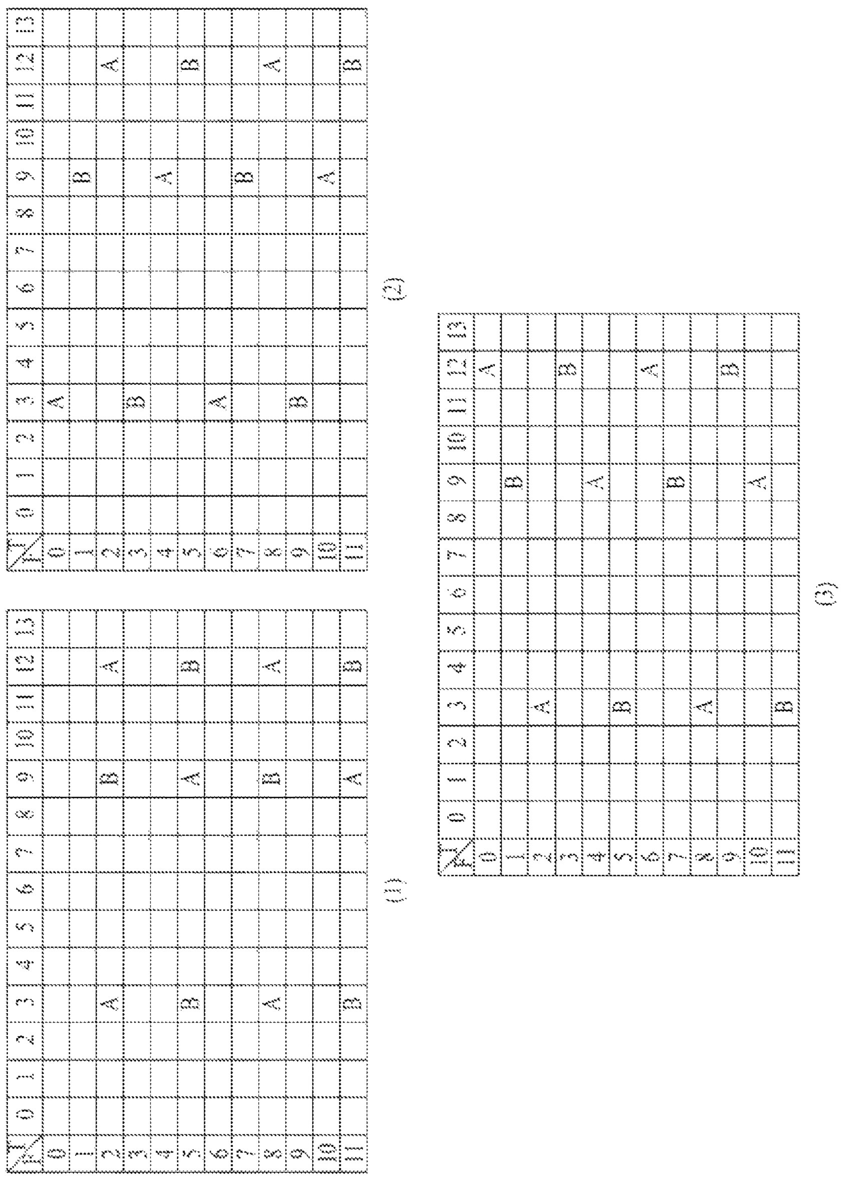

As shown in FIG. 25, in this embodiment, DRSs of the 1st and 2nd layers are arranged in equal proportions at 12 REs in 2 RBs (i.e., in a pair of RBs) that are consecutive in time in one subframe. DRSs of the 1st and 2nd layers are arranged at 4 subcarrier positions in 3 OFDM symbols.

DRSs of the 1st and 2nd layers are alternately arranged at equal intervals of 4 subcarriers in one OFDM symbol. It is possible to provide channel estimation performance that is robust to time selective characteristic and/or frequency selective characteristics since, due to such a DRS pattern, DRSs of each layer are distributed in uniform density in the time-frequency region. In addition, since a larger number of DRSs are arranged in the 3rd and 12th OFDM symbols at which a CRS, an SCH, and a BCH are not located, it is possible to guarantee DRS transmission in every subframe, thereby providing high channel estimation performance.

Embodiment C-8

TABLE 16

| | | |
|---|---|---|
| (1) | A(l, k)= | {(3, 0), (3, 4), (3, 8), (10, 0), (10, 4), (10, 8)} |
| | B(l, k)= | {(3, 2), (3, 6), (3, 10), (10, 2), (10, 6), (10, 10)} |
| (2) | A(l, k)= | {(3, 0), (3, 4), (3, 8), (10, 1), (10, 5), (10, 9)} |
| | B(l, k)= | {(3, 2), (3, 6), (3, 10), (10, 3), (10, 7), (10, 11)} |

TABLE 16-continued

| | | |
|---|---|---|
| (3) | A(l, k)= | {(3, 0), (3, 4), (3, 8), (10, 2), (10, 6), (10, 10)} |
| | B(l, k)= | {(3, 2), (3, 6), (3, 10), (10, 0), (10, 4), (10, 8)} |
| (4) | A(l, k)= | {(5, 0), (5, 4), (5, 8), (10, 3), (10, 7), (10, 11)} |
| | B(l, k)= | {(5, 2), (5, 6), (5, 10), (10, 1), (10, 5), (10, 9)} |
| (5) | A(l, k)= | {(5, 0), (5, 4), (5, 8), (10, 1), (10, 5), (10, 9)} |
| | B(l, k)= | {(5, 2), (5, 6), (5, 10), (10, 3), (10, 7), (10, 11)} |
| (6) | A(l, k)= | {(3, 0), (3, 4), (3, 8), (10, 3), (10, 7), (10, 11)} |
| | B(l, k)= | {(3, 2), (3, 6), (3, 10), (10, 1), (10, 5), (10, 9)} |

Figure 26:
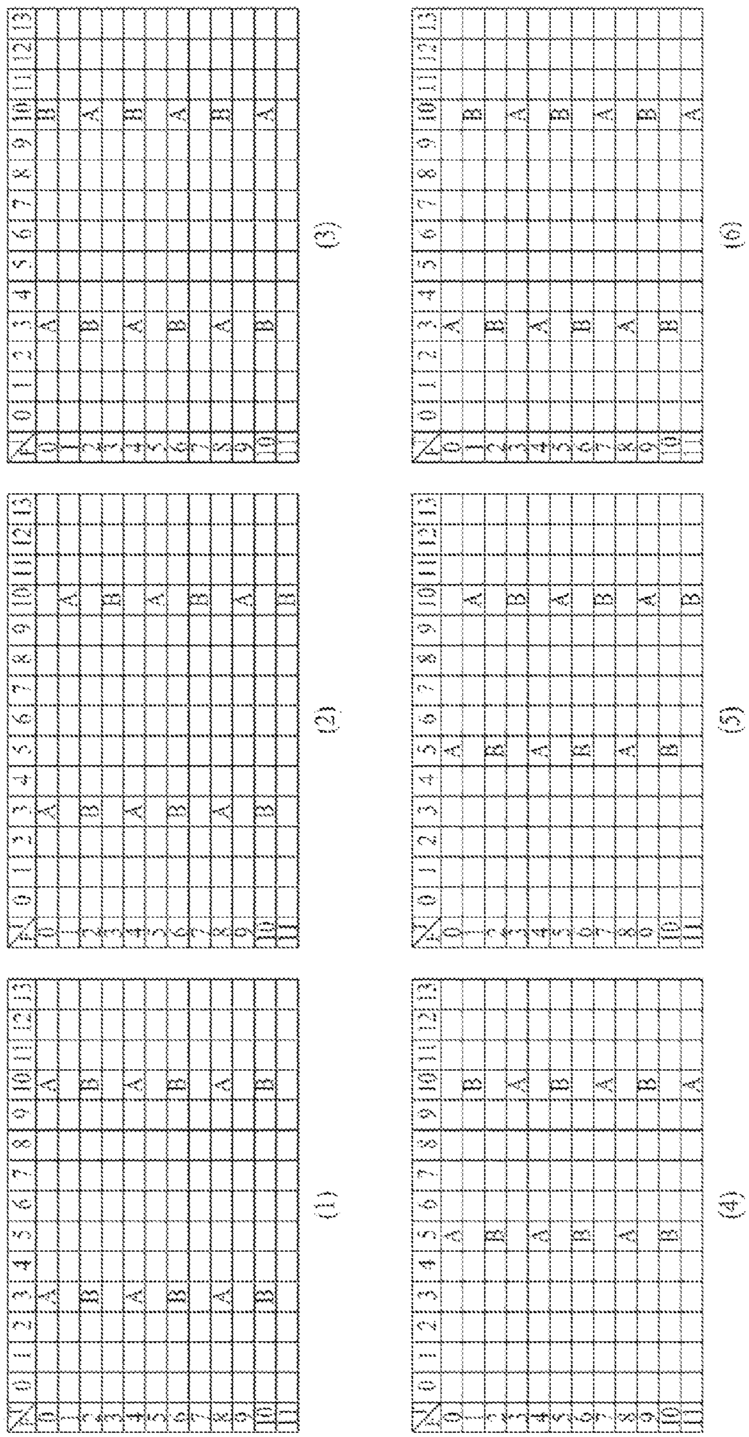

As shown in FIG. 26, in this embodiment, DRSs of the 1st and 2nd layers are arranged in equal proportions at 12 REs in 2 RBs (i.e., in a pair of RBs) that are consecutive in time in one subframe. DRSs of the 1st and 2nd layers are arranged at 6 subcarrier positions in 2 OFDM symbols. DRSs of the 1st and 2nd layers are alternately arranged at intervals of 2 subcarriers in one OFDM symbol.

In embodiments C-8-(1), C-8-(2), C-8-(3), and C-8-(6), all DRSs are distributed in the 3rd and 10th OFDM symbols and therefore, transmission of all DRSs is guaranteed even when a CRS, an SCH, and a BCH are transmitted, thereby providing high channel estimation performance.

Embodiment D-1

TABLE 17

| | | |
|---|---|---|
| (1) | A(l, k)= | {(3, 3), (3, 7), (3, 11), (6, 1), (6, 5), (6, 9), (9, 3), (9, 7), (9, 11), (12, 1), (12, 5), (12, 9)} |
| (2) | A(l, k)= | {(3, 3), (3, 7), (3, 11), (6, 1), (6, 5), (6, 9)} |
| | B(l, k)= | {(9, 3), (9, 7), (9, 11), (12, 1), (12, 5), (12, 9)} |
| (3) | A(l, k)= | {(3, 3), (3, 7), (3, 11), (6, 1), (6, 5), (6, 9)} |
| | B(l, k)= | {(9, 3), (9, 7), (9, 11), (12, 1), (12, 5), (12, 9)} |
| | C(l, k)= | {(5, 4), (5, 10), (10, 0), (10, 7)} |
| | D(l, k)= | {(5, 5), (5, 11), (10, 1), (10, 8)} |
| | E~H(l, k)= | {(5, 0), (5, 7), (10, 3), (10, 10)} |
| (4) | A(l, k)= | {(3, 3), (3, 7), (3, 11), (6, 1), (6, 5), (6, 9)} |
| | B(l, k)= | {(9, 3), (9, 7), (9, 11), (12, 1), (12, 5), (12, 9)} |
| | C/E/G(l, k)= | {(5, 2), (5, 6), (5, 10), (10, 0), (10, 4), (10, 8)} |
| | D/F/H(l, k)= | {(5, 3), (5, 7), (5, 11), (10, 1), (10, 5), (10, 9)} |
| (5) | A(l, k)= | {(3, 3), (3, 7), (3, 11), (6, 1), (6, 5), (6, 9), (9, 3), (9, 7), (9, 11), (13, 1), (13, 5), (13, 9)} |
| (6) | A(l, k)= | {(3, 3), (3, 7), (3, 11), (6, 1), (6, 5), (6, 9)} |
| | B(l, k)= | {(9, 3), (9, 7), (9, 11), (13, 1), (13, 5), (13, 9)} |
| (7) | A(l, k)= | {(3, 3), (3, 7), (3, 11), (6, 1), (6, 5), (6, 9)} |
| | B(l, k)= | {(9, 3), (9, 7), (9, 11), (13, 1), (13, 5), (13, 9)} |
| | C(l, k)= | {(5, 4), (5, 10), (10, 0), (10, 7)} |
| | D(l, k)= | {(5, 5), (5, 11), (10, 1), (10, 8)} |
| | E~H(l, k)= | {(5, 0), (5, 7), (10, 3), (10, 10)} |
| (8) | A(l, k)= | {(3, 3), (3, 7), (3, 11), (6, 1), (6, 5), (6, 9)} |
| | B(l, k)= | {(9, 3), (9, 7), (9, 11), (13, 1), (13, 5), (13, 9)} |
| | C/E/G(l, k)= | {(5, 2), (5, 6), (5, 10), (10, 0), (10, 4), (10, 8)} |
| | D/F/H(l, k)= | {(5, 3), (5, 7), (5, 11), (10, 1), (10, 5), (10, 9)} |

Figure 27:
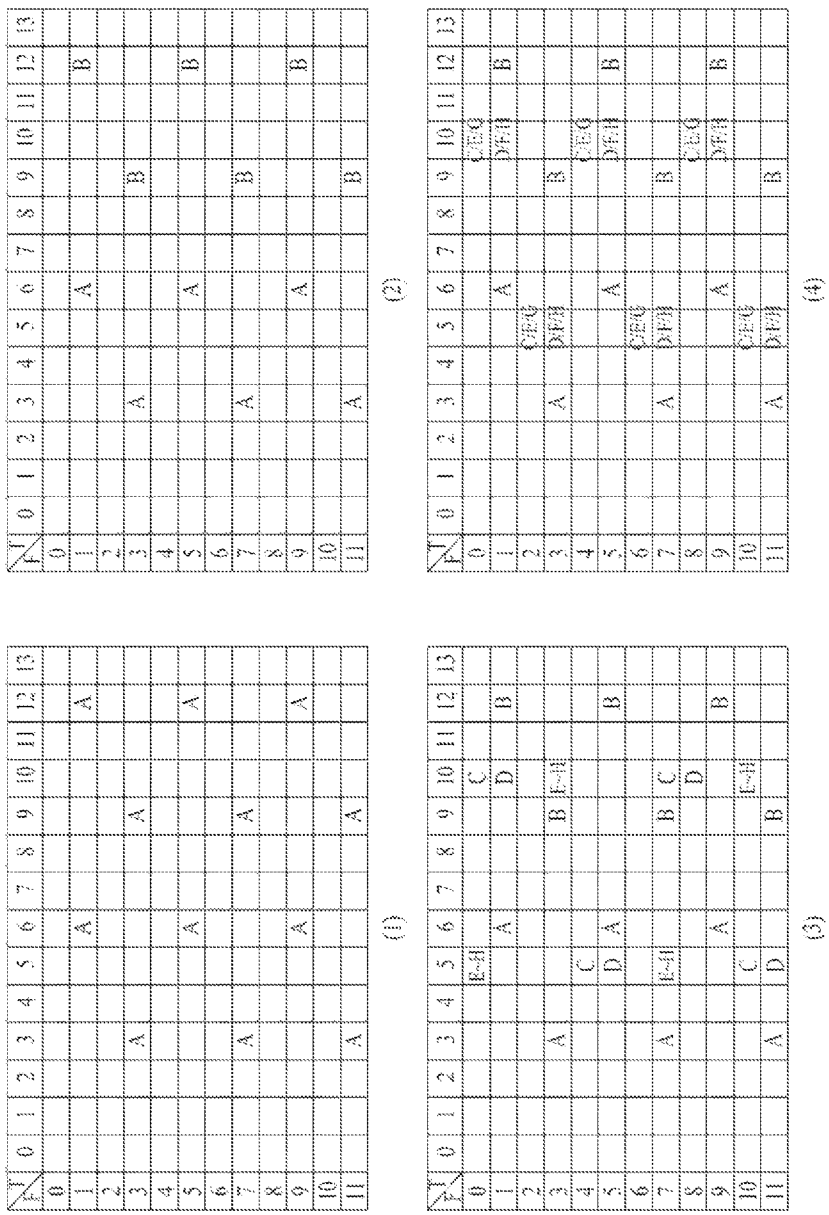

As shown in FIG. 27, an embodiment D-1-(1) defines a DRS pattern in which, for rank-1 transmission, DRSs of the 1st layer are arranged in 4 OFDM symbols at equal intervals such that the DRSs are arranged at 3 subcarrier positions at equal intervals in each of the OFDM symbols. DRSs of the 1st layer are arranged at 12 REs in 2 RBs (i.e., in a pair of RBs) that are consecutive in time in one subframe.

In an embodiment D-1-(2), for rank-2 transmission, DRSs of the 2nd layer are arranged in a second slot part of the subframe in the DRS pattern for the 1st layer set in the embodiment D-1-(1). DRSs of each of the 1st and 2nd layers are arranged at 6 REs in 2 RBs (i.e., in a pair of RBs) that are consecutive in time in one subframe.

In an embodiment D-1-(3), for rank-8 transmission, the same DRS pattern for the 1st and 2nd layers as that of the embodiment D-1-(2) is used without change and, in addition, a pattern of DRSs for the 3rd to 8th layers is defined. DRSs of the 3rd and 4th layers are arranged at 4 REs. DRSs of the 3rd and 4th layers are arranged at contiguous subcarriers in one OFDM symbol to be multiplexed according to an FDM scheme. DRSs of the 5th to 8th layers are arranged at 4 REs and each set of DRSs of the 5th to 8th layers is multiplexed at each RE according to a CDM scheme.

In an embodiment D-1-(4), for rank-8 transmission, the same DRS pattern for the 1st and 2nd layers as that of the embodiment D-1-(2) is used without change and, in addition, a pattern of DRSs for the 3rd to 8th layers is defined. DRSs of the 3rd, 5th, and 7th layers are arranged at 6 REs and each set of DRSs of the 3rd, 5th, and 7th layers is multiplexed at each RE according to a CDM scheme. DRSs of the 4th, 6th, and 8th layers are arranged at 6 REs and each set of DRSs of the 4th, 6th, and 8th layers is multiplexed at each RE according to a CDM scheme.

Figure 28:
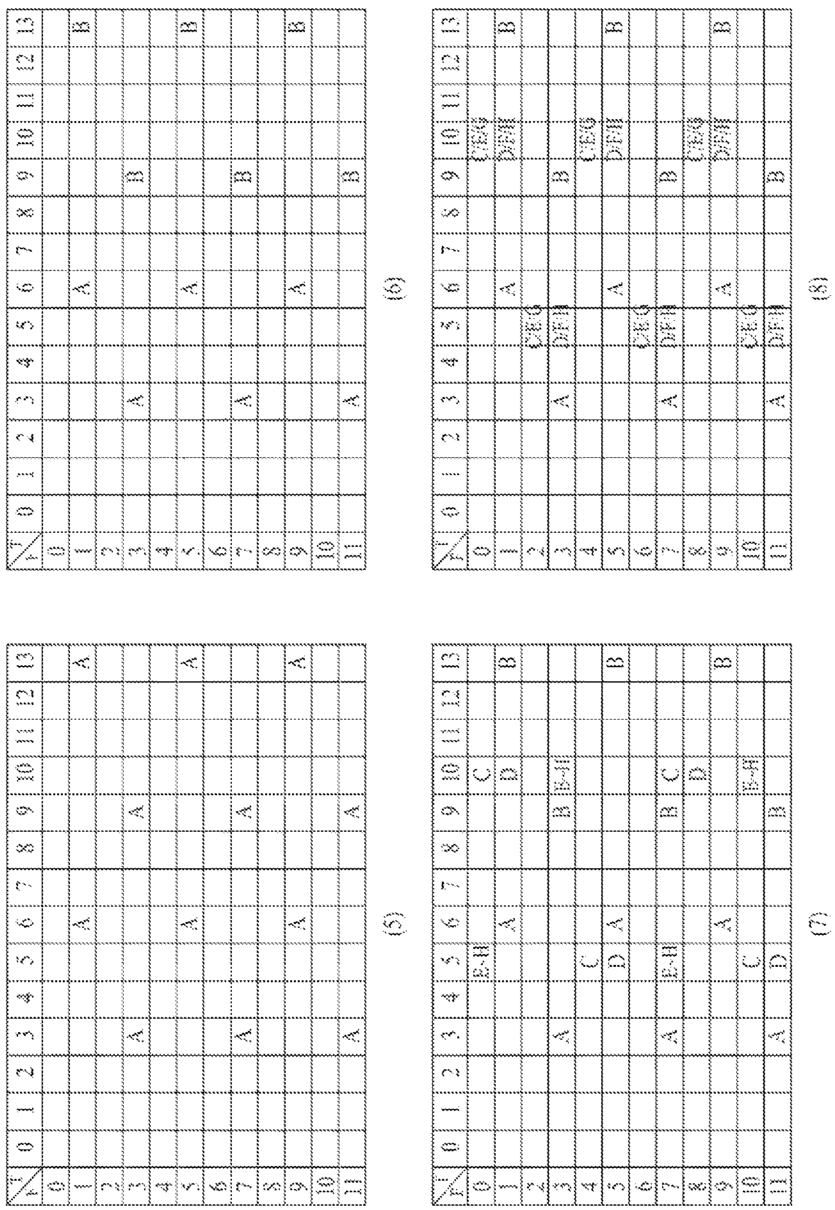

Embodiments D-1-(5) to D-1-(8) shown in FIG. 28 are modifications of the embodiments D-1-(1) to D-1-(4) of FIG. 27, in which the DRSs, which are located at the 12th OFDM symbol in the embodiments D-1-(1) to D-1-(4), are located at the 13th OFDM symbol.

Embodiment D-2

TABLE 18

| | | |
|---|---|---|
| (1) | A(l, k)= | {(3, 3), (3, 7), (3, 11), (6, 3), (6, 7), (6, 11), (9, 1), (9, 5), (9, 9), (12, 1), (12, 5), (12, 9)} |
| (2) | A(l, k)= | {(3, 3), (3, 7), (3, 11), (9, 1), (9, 5), (9, 9)} |
| | B(l, k)= | {(6, 3), (6, 7), (6, 11), (12, 1), (12, 5), (12, 9)} |
| (3) | A(l, k)= | {(3, 3), (3, 7), (3, 11), (9, 1), (9, 5), (9, 9)} |
| | B(l, k)= | {(6, 3), (6, 7), (6, 11), (12, 1), (12, 5), (12, 9)} |
| | C(l, k)= | {(5, 4), (5, 10), (10, 0), (10, 7)} |
| | D(l, k)= | {(5, 5), (5, 11), (10, 1), (10, 8)} |
| | E~H(l, k)= | {(5, 0), (5, 7), (10, 3), (10, 10)} |
| (4) | A(l, k)= | {(3, 3), (3, 7), (3, 11), (9, 1), (9, 5), (9, 9)} |
| | B(l, k)= | {(6, 3), (6, 7), (6, 11), (12, 1), (12, 5), (12, 9)} |
| | C/E/G(l, k)= | {(5, 2), (5, 6), (5, 10), (10, 0), (10, 4), (10, 8)} |
| | D/F/H(l, k)= | {(5, 3), (5, 7), (5, 11), (10, 1), (10, 5), (10, 9)} |
| (5) | A(l, k)= | {(3, 3), (3, 7), (3, 11), (6, 3), (6, 7), (6, 11), (9, 1), (9, 5), (9, 9), (13, 1), (13, 5), (13, 9)} |
| (6) | A(l, k)= | {(3, 3), (3, 7), (3, 11), (9, 1), (9, 5), (9, 9)} |
| | B(l, k)= | {(6, 3), (6, 7), (6, 11), (13, 1), (13, 5), (13, 9)} |
| (7) | A(l, k)= | {(3, 3), (3, 7), (3, 11), (9, 1), (9, 5), (9, 9)} |
| | B(l, k)= | {(6, 3), (6, 7), (6, 11), (13, 1), (13, 5), (13, 9)} |
| | C(l, k)= | {(5, 4), (5, 10), (10, 0), (10, 7)} |
| | D(l, k)= | {(5, 5), (5, 11), (10, 1), (10, 8)} |
| | E~H(l, k)= | {(5, 0), (5, 7), (10, 3), (10, 10)} |
| (8) | A(l, k)= | {(3, 3), (3, 7), (3, 11), (9, 1), (9, 5), (9, 9)} |
| | B(l, k)= | {(6, 3), (6, 7), (6, 11), (13, 1), (13, 5), (13, 9)} |
| | C/E/G(l, k)= | {(5, 2), (5, 6), (5, 10), (10, 0), (10, 4), (10, 8)} |
| | D/F/H(l, k)= | {(5, 3), (5, 7), (5, 11), (10, 1), (10, 5), (10, 9)} |

Figure 29:
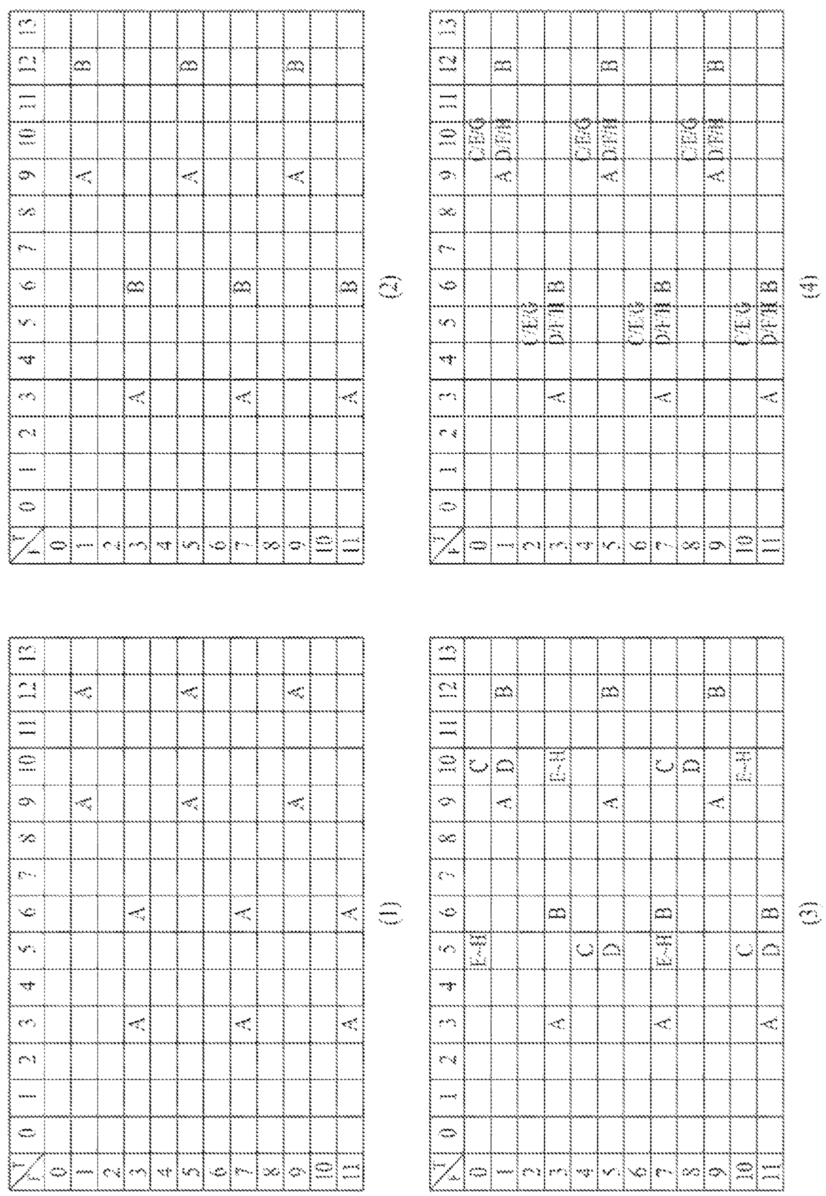

As shown in FIG. 29, an embodiment D-2-(1) defines a DRS pattern in which, for rank-1 transmission, DRSs of the 1st layer are arranged in 4 OFDM symbols at equal intervals such that the DRSs are arranged at 3 subcarrier positions at equal intervals in each of the OFDM symbols. DRSs of the 1st layer are arranged at 12 REs in 2 RBs (i.e., in a pair of RBs) that are consecutive in time in one subframe.

In an embodiment D-2-(2), DRSs for rank-2 transmission are arranged at the same RE positions as the embodiment D-2-(1) and DRSs of the 1st and 2nd layers are alternately arranged in OFDM symbols.

In an embodiment D-2-(3), for rank-8 transmission, the same DRS pattern for the 1st and 2nd layers as that of the embodiment D-2-(2) is used without change and, in addition, a pattern of DRSs for the 3rd to 8th layers is defined. DRSs of the 3rd and 4th layers are arranged at 4 REs. DRSs of the 3rd and 4th layers are arranged at contiguous subcarriers in one OFDM symbol to be multiplexed according to an FDM scheme. DRSs of the 5th to 8th layers are arranged at 4 REs and each set of DRSs of the 5th to 8th layers is multiplexed at each RE according to a CDM scheme.

In an embodiment D-2-(4), for rank-8 transmission, the same DRS pattern for the 1st and 2nd layers as that of the embodiment D-2-(2) is used without change and, in addition, a pattern of DRSs for the 3rd to 8th layers is defined. DRSs of the 3rd, 5th, and 7th layers are arranged at 6 REs and each set of DRSs of the 3rd, 5th, and 7th layers is multiplexed at each RE according to a CDM scheme. DRSs of the 4th, 6th, and 8th layers are arranged at 6 REs and each set of DRSs of the 4th, 6th, and 8th layers is multiplexed at each RE according to a CDM scheme.

Figure 30:
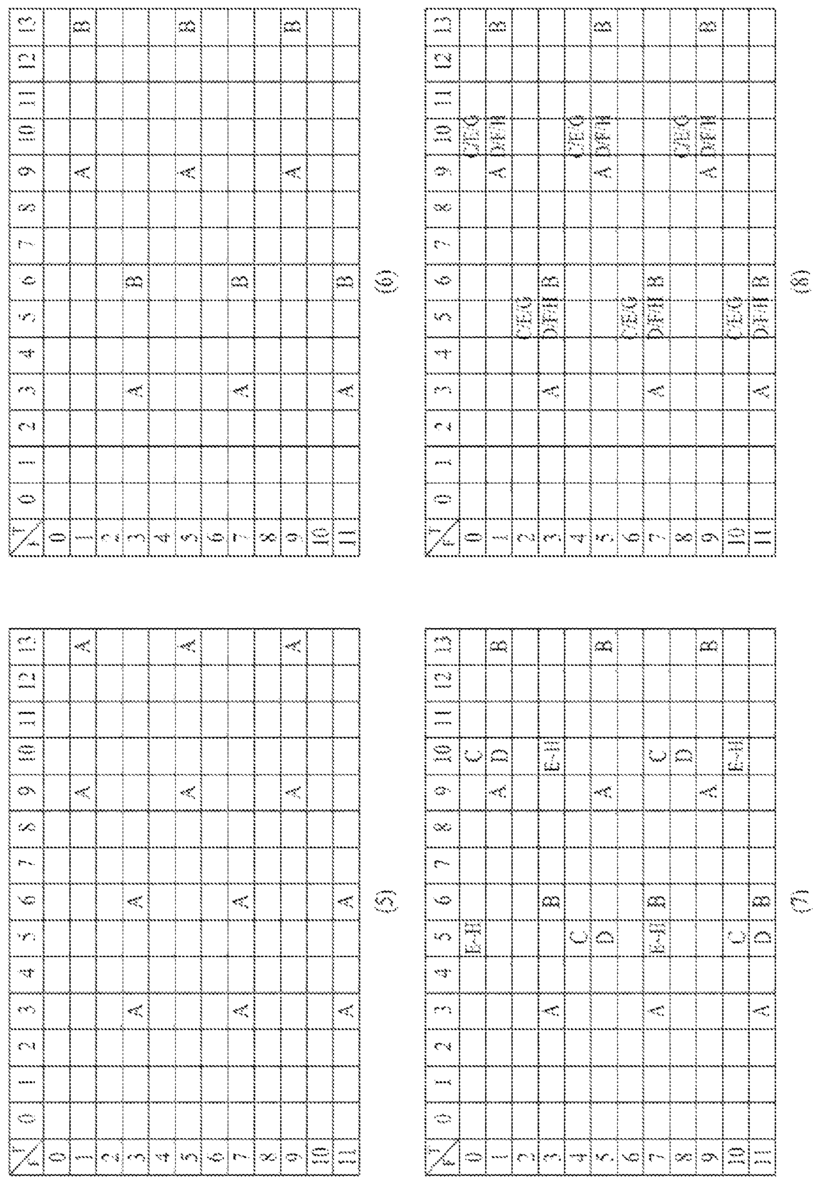

Embodiments D-2-(5) to D-2-(8) shown in FIG. 30 are modifications of the embodiments D-2-(1) to D-2-(4) of FIG. 29, in which the DRSs, which are located at the 12th OFDM symbol in the embodiments D-2-(1) to D-2-(4), are located at the 13th OFDM symbol.

Embodiment D-3

TABLE 19

| | | |
|---|---|---|
| (1) | A(l, k)= | {(3, 0), (3, 5), (3, 10), (8, 0), (8, 5), (8, 10), (12, 0), (12, 5), (12, 10)} |
| (2) | A(l, k)= | {(3, 0), (3, 5), (3, 10), (10, 0), (10, 5), (10, 10)} |
| | B(l, k)= | {(5, 0), (5, 5), (5, 10), (12, 0), (12, 5), (12, 10)} |
| (3) | A(l, k)= | {(3, 0), (3, 5), (3, 10), (10, 0), (10, 5), (10, 10)} |
| | B(l, k)= | {(5, 0), (5, 5), (5, 10), (12, 0), (12, 5), (12, 10)} |
| | C(l, k)= | {(6, 4), (6, 10), (9, 0), (9, 7)} |
| | D(l, k)= | {(6, 5), (6, 11), (9, 1), (9, 8)} |
| | E~H(l, k)= | {(6, 0), (6, 7), (9, 3), (9, 10)} |
| (4) | A(l, k)= | {(3, 0), (3, 5), (3, 10), (10, 0), (10, 5), (10, 10)} |
| | B(l, k)= | {(5, 0), (5, 5), (5, 10), (12, 0), (12, 5), (12, 10)} |
| | C/E/G(l, k)= | {(6, 2), (6, 6), (6, 10), (9, 0), (9, 4), (9, 8)} |
| | D/F/H(l, k)= | {(6, 3), (6, 7), (6, 11), (9, 1), (9, 5), (9, 9)} |
| (5) | A(l, k)= | {(3, 0), (3, 5), (3, 10), (8, 0), (8, 5), (8, 10), (13, 0), (13, 5), (13, 10)} |
| (6) | A(l, k)= | {(3, 0), (3, 5), (3, 10), (10, 0), (10, 5), (10, 10)} |
| | B(l, k)= | {(5, 0), (5, 5), (5, 10), (13, 0), (13, 5), (13, 10)} |
| (7) | A(l, k)= | {(3, 0), (3, 5), (3, 10), (10, 0), (10, 5), (10, 10)} |
| | B(l, k)= | {(5, 0), (5, 5), (5, 10), (13, 0), (13, 5), (13, 10)} |
| | C(l, k)= | {(6, 4), (6, 10), (9, 0), (9, 7)} |
| | D(l, k)= | {(6, 5), (6, 11), (9, 1), (9, 8)} |
| | E~H(l, k)= | {(6, 0), (6, 7), (9, 3), (9, 10)} |
| (8) | A(l, k)= | {(3, 0), (3, 5), (3, 10), (10, 0), (10, 5), (10, 10)} |
| | B(l, k)= | {(5, 0), (5, 5), (5, 10), (13, 0), (13, 5), (13, 10)} |
| | C/E/G(l, k)= | {(6, 2), (6, 6), (6, 10), (9, 0), (9, 4), (9, 8)} |
| | D/F/H(l, k)= | {(6, 3), (6, 7), (6, 11), (9, 1), (9, 5), (9, 9)} |

Figure 31:
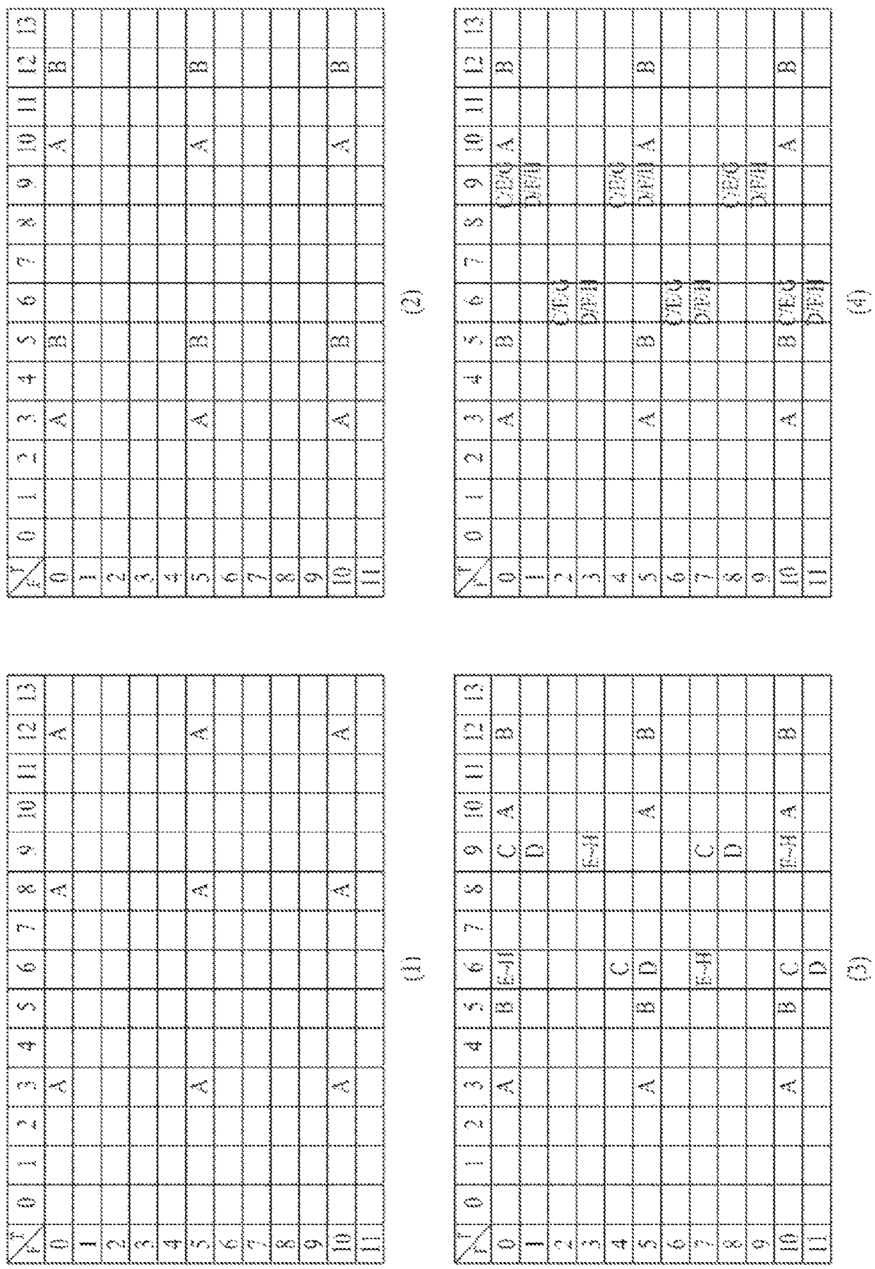

As shown in FIG. 31, an embodiment D-3-(1) defines a DRS pattern in which, for rank-1 transmission, DRSs of the 1st layer are arranged in 3 OFDM symbols such that the DRSs are arranged at 3 subcarrier positions at equal intervals in each of the OFDM symbols. DRSs of the 1st layer are arranged at 9 REs in 2 RBs (i.e., in a pair of RBs) that are consecutive in time in one subframe.

In an embodiment D-3-(2), in addition to the DRS pattern of the embodiment D-3-(1), DRSs of the 2nd layer are arranged at 9 REs at an interval of 2 OFDM symbols from the DRSs of the 1st layer. In this case, DRSs are arranged at 18 REs for rank-2 transmission.

In an embodiment D-3-(3), for rank-8 transmission, the same DRS pattern for the 1st and 2nd layers as that of the embodiment D-3-(2) is used without change and, in addition, a pattern of DRSs for the 3rd to 8th layers is defined. DRSs of the 3rd and 4th layers are arranged at 4 REs. DRSs of the 3rd and 4th layers are arranged at contiguous subcarriers in one OFDM symbol to be multiplexed according to an FDM scheme. DRSs of the 5th to 8th layers are arranged at 4 REs and each set of DRSs of the 5th to 8th layers is multiplexed at each RE according to a CDM scheme.

In an embodiment D-3-(4), for rank-8 transmission, the same DRS pattern for the 1st and 2nd layers as that of the embodiment D-3-(2) is used without change and, in addition, a pattern of DRSs for the 3rd to 8th layers is defined. DRSs of the 3rd, 5th, and 7th layers are arranged at 6 REs and each set of DRSs of the 3rd, 5th, and 7th layers is multiplexed at each RE according to a CDM scheme. DRSs of the 4th, 6th, and 8th layers are arranged at 6 REs and each set of DRSs of the 4th, 6th, and 8th layers is multiplexed at each RE according to a CDM scheme.

Figure 32:
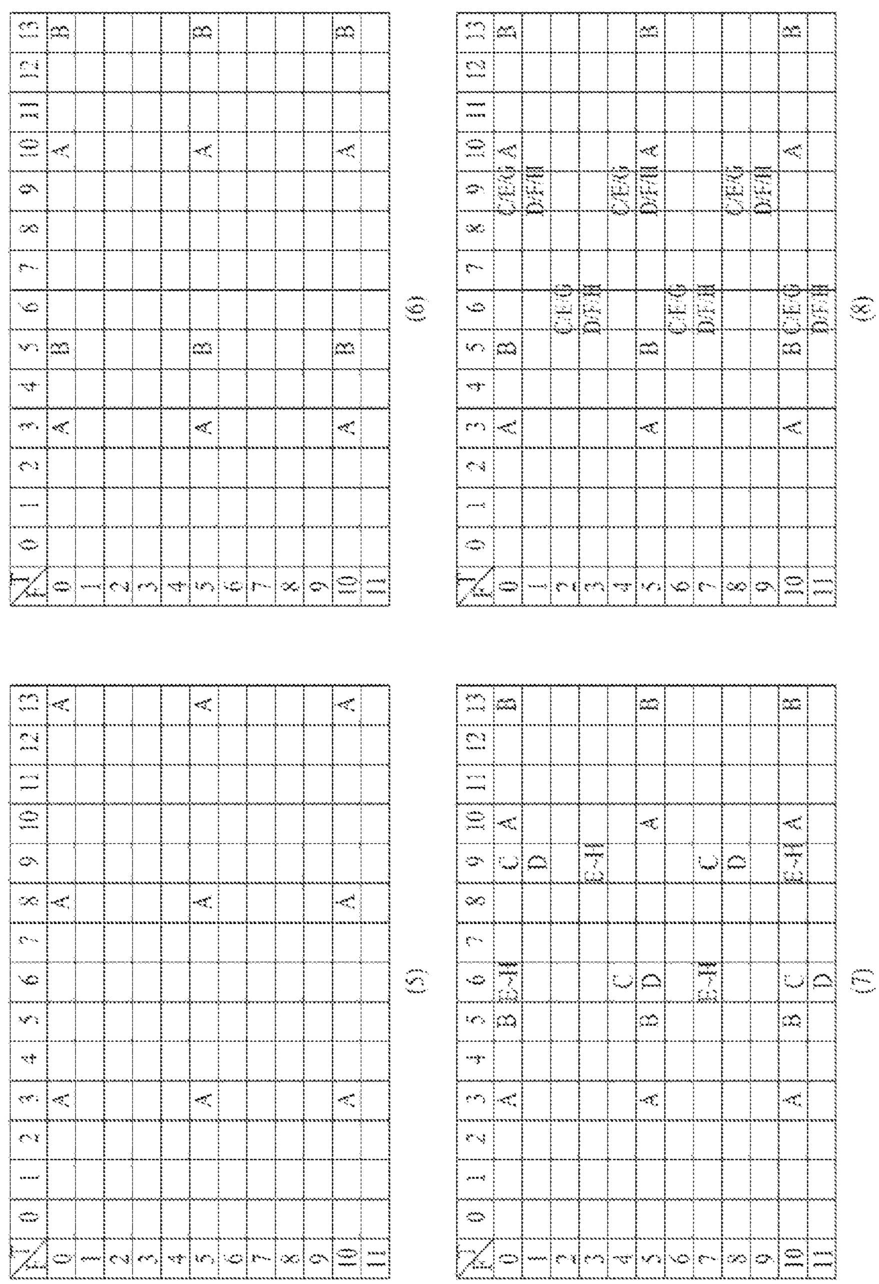

Embodiments D-3-(5) to D-3-(8) shown in FIG. 32 are modifications of the embodiments D-3-(1) to D-3-(4) of FIG. 31, in which the DRSs, which are located at the 12th OFDM symbol in the embodiments D-3-(1) to D-3-(4), are located at the 13th OFDM symbol.

Embodiment D-4

TABLE 20

| | | |
|---|---|---|
| (1) | A(l, k)= | {(3, 0), (3, 1), (3, 2), (3, 9), (3, 10), (3, 11), (10, 0), (10, 1), (10, 2), (10, 9), (10, 10), (10, 11)} |
| (2) | A(l, k)= | {(3, 0), (3, 2), (3, 10), (10, 1), (10, 9), (10, 11)} |
| | B(l, k)= | {(3, 1), (3, 9), (3, 11), (10, 0), (10, 2), (10, 10)} |
| (3) | A(l, k)= | {(3, 0), (3, 2), (3, 10), (10, 1), (10, 9), (10, 11)} |
| | B(l, k)= | {(3, 1), (3, 9), (3, 11), (10, 0), (10, 2), (10, 10)} |
| | C(l, k)= | {(5, 4), (5, 10), (12, 0), (12, 7)} |
| | D(l, k)= | {(5, 5), (5, 11), (12, 1), (12, 8)} |
| | E~H(l, k)= | {(5, 0), (5, 7), (12, 3), (12, 10)} |
| (4) | A(l, k)= | {(3, 0), (3, 2), (3, 10), (10, 1), (10, 9), (10, 11)} |
| | B(l, k)= | {(3, 1), (3, 9), (3, 11), (10, 0), (10, 2), (10, 10)} |
| | C/E/G(l, k)= | {(5, 2), (5, 6), (5, 10), (12, 0), (12, 4), (12, 8)} |
| | D/F/H(l, k)= | {(5, 3), (5, 7), (5, 11), (12, 1), (12, 5), (12, 9)} |
| (5) | A(l, k)= | {(3, 0), (3, 1), (3, 2), (3, 9), (3, 10), (3, 11), (10, 0), (10, 1), (10, 2), (10, 9), (10, 10), (10, 11)} |
| (6) | A(l, k)= | {(3, 0), (3, 2), (3, 10), (10, 1), (10, 9), (10, 11)} |
| | B(l, k)= | {(3, 1), (3, 9), (3, 11), (10, 0), (10, 2), (10, 10)} |
| (7) | A(l, k)= | {(3, 0), (3, 2), (3, 10), (10, 1), (10, 9), (10, 11)} |
| | B(l, k)= | {(3, 1), (3, 9), (3, 11), (10, 0), (10, 2), (10, 10)} |
| | C(l, k)= | {(5, 4), (5, 10), (13, 0), (13, 7)} |
| | D(l, k)= | {(5, 5), (5, 11), (13, 1), (13, 8)} |
| | E~H(l, k)= | {(5, 0), (5, 7), (13, 3), (13, 10)} |
| (8) | A(l, k)= | {(3, 0), (3, 2), (3, 10), (10, 1), (10, 9), (10, 11)} |
| | B(l, k)= | {(3, 1), (3, 9), (3, 11), (10, 0), (10, 2), (10, 10)} |
| | C/E/G(l, k)= | {(5, 2), (5, 6), (5, 10), (13, 0), (13, 4), (13, 8)} |
| | D/F/H(l, k)= | {(5, 3), (5, 7), (5, 11), (13, 1), (13, 5), (13, 9)} |

Figure 33:
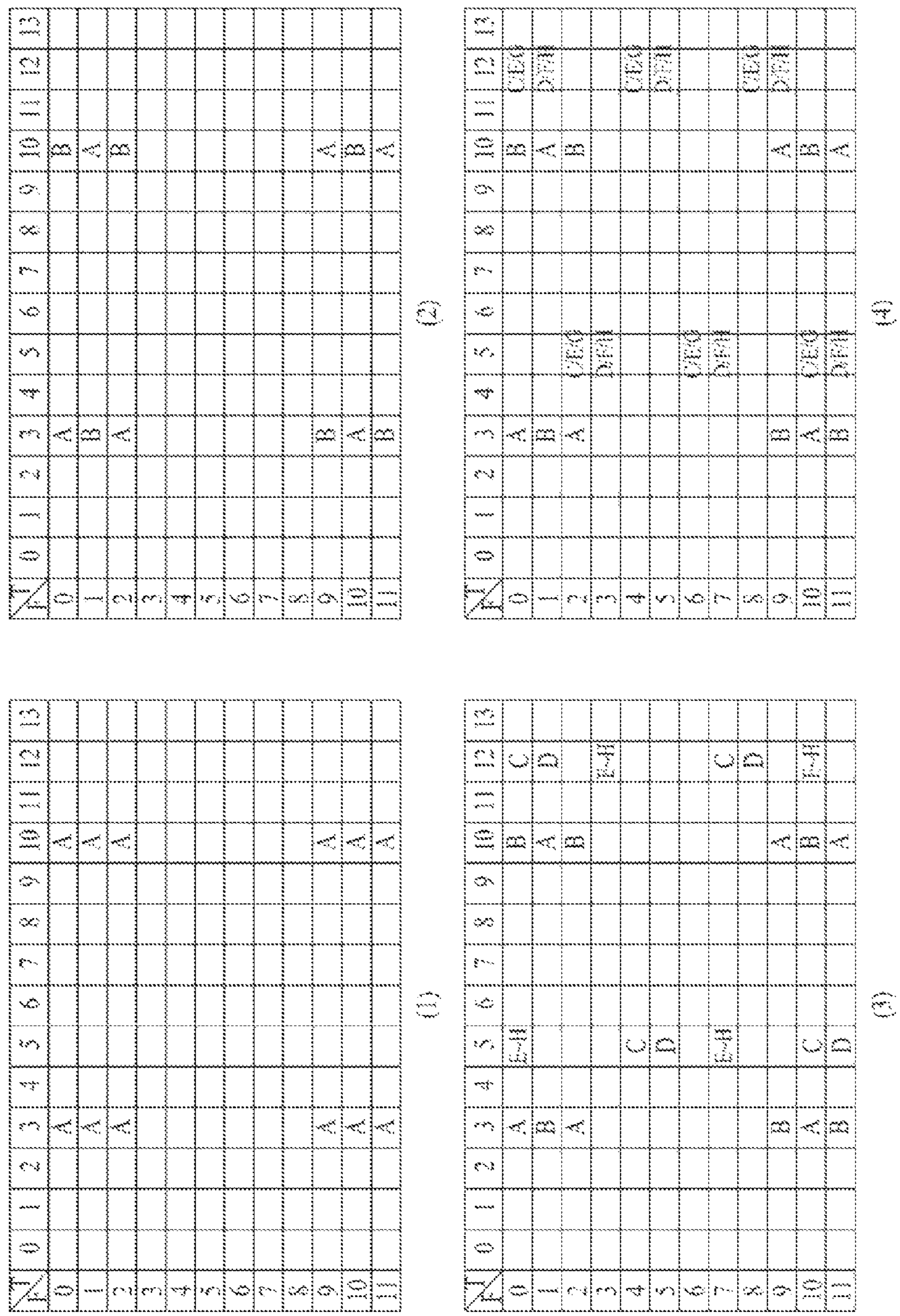

As shown in FIG. 33, an embodiment D-4-(1) defines a DRS pattern in which, for rank-1 transmission, DRSs of the 1st layer are arranged in 2 OFDM symbols such that the DRSs are arranged in 2 groups, each including 3 contiguous sub-carriers, in each of the OFDM symbols. DRSs of the 1st layer are arranged at 12 REs in 2 RBs (i.e., in a pair of RBs) that are consecutive in time in one subframe.

In an embodiment D-4-(2), DRSs of the 2nd layer are arranged at 6 REs from among the REs, at which the DRSs are located in the embodiment D-4-(1), and DRSs of the 1st and 2nd layers are alternately arranged in the frequency region in one OFDM symbol.

In an embodiment D-4-(3), for rank-8, transmission, the same DRS pattern for the 1st and 2nd layers as that of the embodiment D-4-(2) is used without change and, in addition, a pattern of DRSs for the 3rd to 8th layers is defined. DRSs of the 3rd and 4th layers are arranged at 4 REs. DRSs of the 3rd and 4th layers are arranged at contiguous subcarriers in one OFDM symbol to be multiplexed according to an FDM scheme. DRSs of the 5th to 8th layers are arranged at 4 REs and each set of DRSs of the 5th to 8th layers is multiplexed at each RE according to a CDM scheme.

In an embodiment D-4-(4), for rank-8 transmission, the same DRS pattern for the 1st and 2nd layers as that of the embodiment D-4-(2) is used without change and, in addition, a pattern of DRSs for the 3rd to 8th layers is defined. DRSs of the 3rd, 5th, and 7th layers are arranged at 6 REs and each set of DRSs of the 3rd, 5th, and 7th layers is multiplexed at each RE according to a CDM scheme. DRSs of the 4th, 6th, and 8th layers are arranged at 6 REs and each set of DRSs of the 4th, 6th, and 8th layers is multiplexed at each RE according to a CDM scheme.

Embodiments D-4-(5) to D-4-(8) shown in FIG. 34 are modifications of the embodiments D-4-(1) to D-4-(4) of FIG. 33, in which the DRSs, which are located at the 12th OFDM symbol in the embodiments D-4-(1) to D-4-(4), are located at the 13th OFDM symbol.

Embodiment D-5

TABLE 21

| | | |
|---|---|---|
| (1) | A(l, k)= | {(3, 0), (3, 1), (3, 5), (3, 6), (3, 10), (3, 11), (10, 0), (10, 1), (10, 5), (10, 6), (10, 10), (10, 11)} |
| (2) | A(l, k)= | {(3, 0), (3, 5), (3, 10), (10, 1), (10, 6), (10, 11)} |
| | B(l, k)= | {(3, 1), (3, 6), (3, 11), (10, 0), (10, 5), (10, 10)} |
| (3) | A(l, k)= | {(3, 0), (3, 5), (3, 10), (10, 1), (10, 6), (10, 11)} |
| | B(l, k)= | {(3, 1), (3, 6), (3, 11), (10, 0), (10, 5), (10, 10)} |
| | C(l, k)= | {(5, 4), (5, 10), (12, 0), (12, 7)} |
| | D(l, k)= | {(5, 5), (5, 11), (12, 1), (12, 8)} |
| | E~H(l, k)= | {(5, 0), (5, 7), (12, 3), (12, 10)} |
| (4) | A(l, k)= | {(3, 0), (3, 5), (3, 10), (10, 1), (10, 6), (10, 11)} |
| | B(l, k)= | {(3, 1), (3, 6), (3, 11), (10, 0), (10, 5), (10, 10)} |
| | C/E/G(l, k)= | {(5, 2), (5, 6), (5, 10), (12, 0), (12, 4), (12, 8)} |
| | D/F/H(l, k)= | {(5, 3), (5, 7), (5, 11), (12, 1), (12, 5), (12, 9)} |
| (5) | A(l, k)= | {(3, 0), (3, 1), (3, 5), (3, 6), (3, 10), (3, 11), (10, 0), (10, 1), (10, 5), (10, 6), (10, 10), (10, 11)} |
| (6) | A(l, k)= | {(3, 0), (3, 5), (3, 10), (10, 1), (10, 6), (10, 11)} |
| | B(l, k)= | {(3, 1), (3, 6), (3, 11), (10, 0), (10, 5), (10, 10)} |
| (7) | A(l, k)= | {(3, 0), (3, 5), (3, 10), (10, 1), (10, 6), (10, 11)} |
| | B(l, k)= | {(3, 1), (3, 6), (3, 11), (10, 0), (10, 5), (10, 10)} |
| | C(l, k)= | {(5, 4), (5, 10), (13, 0), (13, 7)} |
| | D(l, k)= | {(5, 5), (5, 11), (13, 1), (13, 8)} |
| | E~H(l, k)= | {(5, 0), (5, 7), (13, 3), (13, 10)} |
| (8) | A(l, k)= | {(3, 0), (3, 5), (3, 10), (10, 1), (10, 6), (10, 11)} |
| | B(l, k)= | {(3, 1), (3, 6), (3, 11), (10, 0), (10, 5), (10, 10)} |
| | C/E/G(l, k)= | {(5, 2), (5, 6), (5, 10), (13, 0), (13, 4), (13, 8)} |
| | D/F/H(l, k)= | {(5, 3), (5, 7), (5, 11), (13, 1), (13, 5), (13, 9)} |

Figure 35:
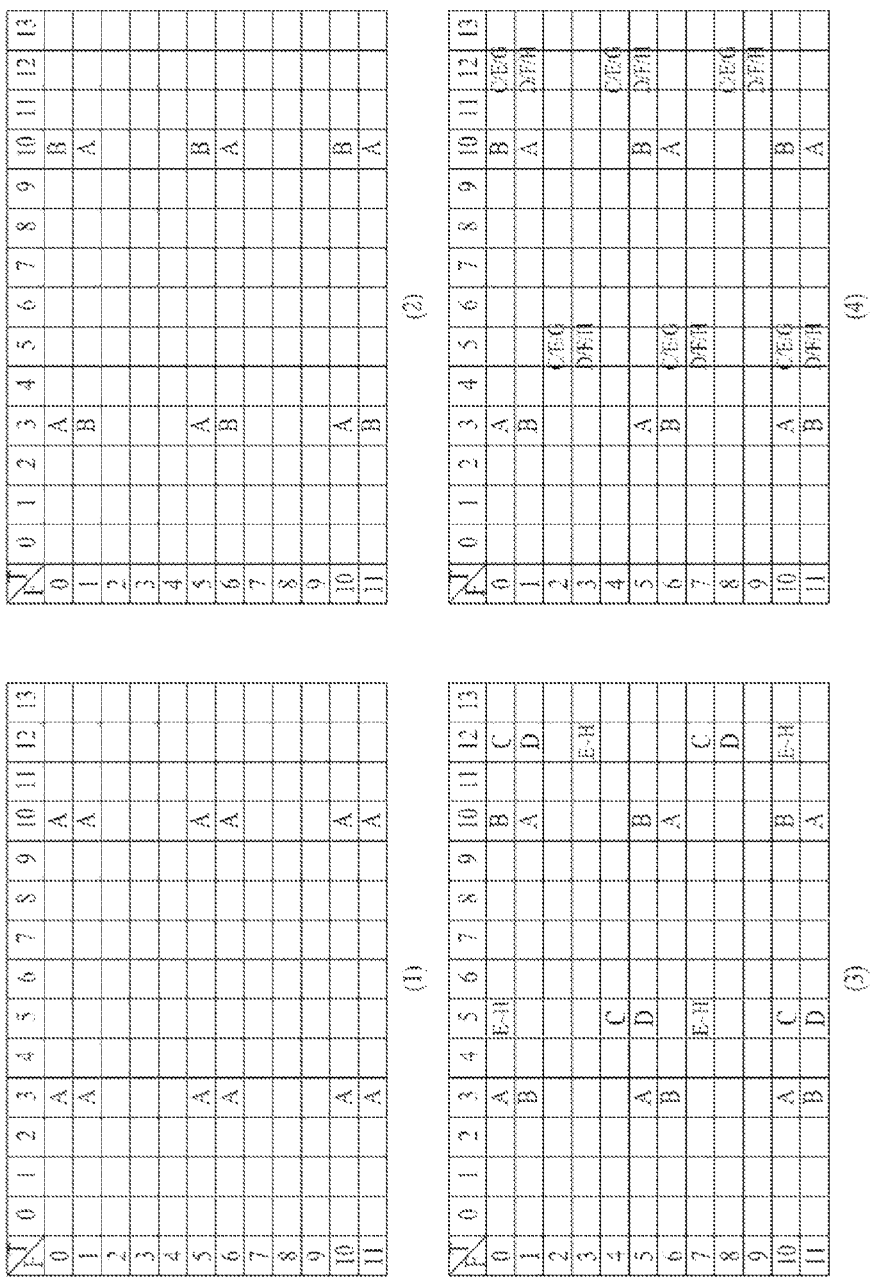

As shown in FIG. 35, an embodiment D-5-(1) defines a DRS pattern in which, for rank-1 transmission, DRSs of the 1st layer are arranged in 2 OFDM symbols such that the DRSs are arranged in 3 groups, each including 2 contiguous subcarriers, in each of the OFDM symbols. DRSs of the 1st layer are arranged at 12 REs in 2 RBs (i.e., in a pair of RBs) that are consecutive in time in one subframe.

In an embodiment D-5-(2), DRSs of the 2nd layer are arranged at 6 REs from among the REs, at which the DRSs are located in the embodiment D-5-(1), and DRSs of the 1st and 2nd layers are alternately arranged in the frequency region in one OFDM symbol.

In an embodiment D-5-(3), for rank-8 transmission, the same DRS pattern for the 1st and 2nd layers as that of the embodiment D-5-(2) is used without change and, in addition, a pattern of DRSs for the 3rd to 8th layers is defined. DRSs of the 3rd and 4th layers are arranged at 4 REs. DRSs of the 3rd and 4th layers are arranged at contiguous subcarriers in one OFDM symbol to be multiplexed according to an FDM scheme. DRSs of the 5th to 8th layers are arranged at 4 REs and each set of DRSs of the 5th to 8th layers is multiplexed at each RE according to a CDM scheme.

In an embodiment D-5-(4), for rank-8 transmission, the same DRS pattern for the 1st and 2nd layers as that of the embodiment D-5-(2) is used without change and, in addition, a pattern of DRSs for the 3rd to 8th layers is defined. DRSs of the 3rd, 5th, and 7th layers are arranged at 6 REs and each set of DRSs of the 3rd, 5th, and 7th layers is multiplexed at each RE according to a CDM scheme. DRSs of the 4th, 6th, and 8th layers are arranged at 6 REs and each set of DRSs of the 4th, 6th, and 8th layers is multiplexed at each RE according to a CDM scheme.

Embodiments D-5-(5) to D-5-(8) shown in FIG. 36 are modifications of the embodiments D-5-(1) to D-5-(4) of FIG. 35, in which the DRSs, which are located at the 12th OFDM symbol in the embodiments D-5-(1) to D-5-(4), are located at the 13th OFDM symbol.

Embodiment D-6

TABLE 22

| | | |
|---|---|---|
| (1) | A(l, k)= | {(3, 0), (3, 1), (3, 10), (3, 11), (5, 5), (5, 6), (8, 5), (8, 6), (10, 0), (10, 1), (10, 10), (10, 11)} |
| (2) | A(l, k)= | {(3, 0), (3, 10), (5, 5), (8, 6), (10, 1), (10, 11)} |
| | B(l, k)= | {(3, 1), (3, 11), (5, 6), (8, 5), (10, 0), (10, 10)} |
| (3) | A(l, k)= | {(3, 0), (3, 10), (5, 5), (8, 6), (10, 1), (10, 11)} |
| | B(l, k)= | {(3, 1), (3, 11), (5, 6), (8, 5), (10, 0), (10, 10)} |
| | C(l, k)= | {(6, 4), (6, 10), (12, 0), (12, 7)} |
| | D(l, k)= | {(6, 5), (6, 11), (12, 1), (12, 8)} |
| | E~H(l, k)= | {(6, 0), (6, 7), (12, 3), (12, 10)} |
| (4) | A(l, k)= | {(3, 0), (3, 10), (5, 5), (8, 6), (10, 1), (10, 11)} |
| | B(l, k)= | {(3, 1), (3, 11), (5, 6), (8, 5), (10, 0), (10, 10)} |
| | C/E/G(l, k)= | {(6, 2), (6, 6), (6, 10), (12, 0), (12, 4), (12, 8)} |
| | D/F/H(l, k)= | {(6, 3), (6, 7), (6, 11), (12, 1), (12, 5), (12, 9)} |
| (5) | A(l, k)= | {(3, 0), (3, 1), (3, 10), (3, 11), (5, 5), (5, 6), (8, 5), (8, 6), (10, 0), (10, 1), (10, 10), (10, 11)} |
| (6) | A(l, k)= | {(3, 0), (3, 10), (5, 5), (8, 6), (10, 1), (10, 11)} |
| | B(l, k)= | {(3, 1), (3, 11), (5, 6), (8, 5), (10, 0), (10, 10)} |
| (7) | A(l, k)= | {(3, 0), (3, 10), (5, 5), (8, 6), (10, 1), (10, 11)} |
| | B(l, k)= | {(3, 1), (3, 11), (5, 6), (8, 5), (10, 0), (10, 10)} |
| | C(l, k)= | {(6, 4), (6, 10), (13, 0), (13, 7)} |
| | D(l, k)= | {(6, 5), (6, 11), (13, 1), (13, 8)} |
| | E~H(l, k)= | {(6, 0), (6, 7), (13, 3), (13, 10)} |
| (8) | A(l, k)= | {(3, 0), (3, 10), (5, 5), (8, 6), (10, 1), (10, 11)} |
| | B(l, k)= | {(3, 1), (3, 11), (5, 6), (8, 5), (10, 0), (10, 10)} |
| | C/E/G(l, k)= | {(6, 2), (6, 6), (6, 10), (13, 0), (13, 4), (13, 8)} |
| | D/F/H(l, k)= | {(6, 3), (6, 7), (6, 11), (13, 1), (13, 5), (13, 9)} |

As shown in FIG. 37, in an embodiment D-6-(1), for rank-1 transmission, DRSs of the 1st layer are arranged in 4 OFDM symbols. DRSs are arranged in 2 groups, each including 2 contiguous subcarriers in each of the 1st and 4th of the OFDM symbols in which the DRSs are arranged and DRSs are arranged at 2 contiguous subcarriers in each of the 2nd and 3rd OFDM symbols. DRSs of the 1st layer are arranged at 12 REs in 2 RBs (i.e., in a pair of RBs) that are consecutive in time in one subframe.

In an embodiment D-6-(2), DRSs of the 2nd layer are arranged at 6 REs from among the REs, at which the DRSs are located in the embodiment D-6-(1), and DRSs of the 1st and 2nd layers are alternately arranged in the frequency region in one OFDM symbol.

In an embodiment D-6-(3), for rank-8 transmission, the same DRS pattern for the 1st and 2nd layers as that of the embodiment D-6-(2) is used without change and, in addition, a pattern of DRSs for the 3rd to 8th layers is defined. DRSs of the 3rd and 4th layers are arranged at 4 REs. DRSs of the 3rd and 4th layers are arranged at contiguous subcarriers in one OFDM symbol to be multiplexed according to an FDM scheme. DRSs of the 5th to 8th layers are arranged at 4 REs and each set of DRSs of the 5th to 8th layers is multiplexed at each RE according to a CDM scheme.

In an embodiment D-6-(4), for rank-8 transmission, the same DRS pattern for the 1st and 2nd layers as that of the embodiment D-6-(2) is used without change and, in addition, a pattern of DRSs for the 3rd to 8th layers is defined. DRSs of the 3rd, 5th, and 7th layers are arranged at 6 REs and each set of DRSs of the 3rd, 5th, and 7th layers is multiplexed at each RE according to a CDM scheme. DRSs of the 4th, 6th, and 8th layers are arranged at 6 REs and each set of DRSs of the 4th, 6th, and 8th layers is multiplexed at each RE according to a CDM scheme.

Figure 38:
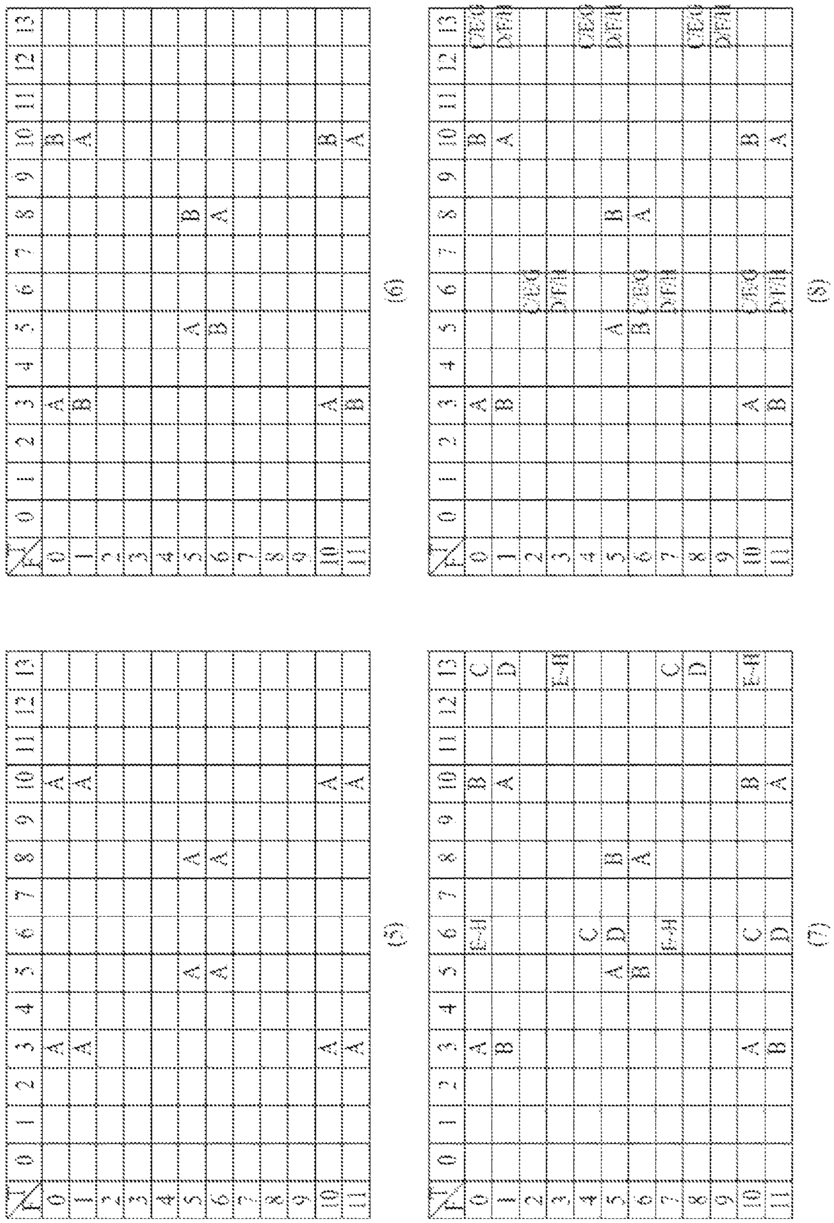

Embodiments D-6-(5) to D-6-(8) shown in FIG. 38 are modifications of the embodiments D-6-(1) to D-6-(4) of FIG.

37, in which the DRSs, which are located at the 12th OFDM symbol in the embodiments D-6-(1) to D-6-(4), are located at the 13th OFDM symbol.

Embodiment D-7

TABLE 23

| | | |
|---|---|---|
| (1) | A(l, k)= | {(3, 0), (3, 4), (3, 8), (10, 3), (10, 7), (10, 11)} |
| (2) | A(l, k)= | {(3, 0), (3, 4), (3, 8), (10, 3), (10, 7), (10, 11)} |
| | B(l, k)= | {(5, 0), (5, 4), (5, 8), (12, 3), (12, 7), (12, 11)} |
| (3) | A(l, k)= | {(3, 0), (3, 4), (3, 8), (10, 3), (10, 7), (10, 11)} |
| | B(l, k)= | {(5, 0), (5, 4), (5, 8), (12, 3), (12, 7), (12, 11)} |
| | C(l, k)= | {(6, 4), (6, 10), (9, 0), (9, 7)} |
| | D(l, k)= | {(6, 5), (6, 11), (9, 1), (9, 8)} |
| | E~H(l, k)= | {(6, 0), (6, 7), (9, 3), (9, 10)} |
| (4) | A(l, k)= | {(3, 0), (3, 4), (3, 8), (10, 3), (10, 7), (10, 11)} |
| | B(l, k)= | {(5, 0), (5, 4), (5, 8), (12, 3), (12, 7), (12, 11)} |
| | C/E/G(l, k)= | {(6, 2), (6, 6), (6, 10), (9, 0), (9, 4), (9, 8)} |
| | D/F/H(l, k)= | {(6, 3), (6, 7), (6, 11), (9, 1), (9, 5), (9, 9)} |
| (5) | A(l, k)= | {(3, 0), (3, 4), (3, 8), (10, 3), (10, 7), (10, 11)} |
| (6) | A(l, k)= | {(3, 0), (3, 4), (3, 8), (10, 3), (10, 7), (10, 11)} |
| | B(l, k)= | {(5, 0), (5, 4), (5, 8), (13, 3), (13, 7), (13, 11)} |
| (7) | A(l, k)= | {(3, 0), (3, 4), (3, 8), (10, 3), (10, 7), (10, 11)} |
| | B(l, k)= | {(5, 0), (5, 4), (5, 8), (13, 3), (13, 7), (13, 11)} |
| | C(l, k)= | {(6, 4), (6, 10), (9, 0), (9, 7)} |
| | D(l, k)= | {(6, 5), (6, 11), (9, 1), (9, 8)} |
| | E~H(l, k)= | {(6, 0), (6, 7), (9, 3), (9, 10)} |
| (8) | A(l, k)= | {(3, 0), (3, 4), (3, 8), (10, 3), (10, 7), (10, 11)} |
| | B(l, k)= | {(5, 0), (5, 4), (5, 8), (13, 3), (13, 7), (13, 11)} |
| | C/E/G(l, k)= | {(6, 2), (6, 6), (6, 10), (9, 0), (9, 4), (9, 8)} |
| | D/F/H(l, k)= | {(6, 3), (6, 7), (6, 11), (9, 1), (9, 5), (9, 9)} |

Figure 39:
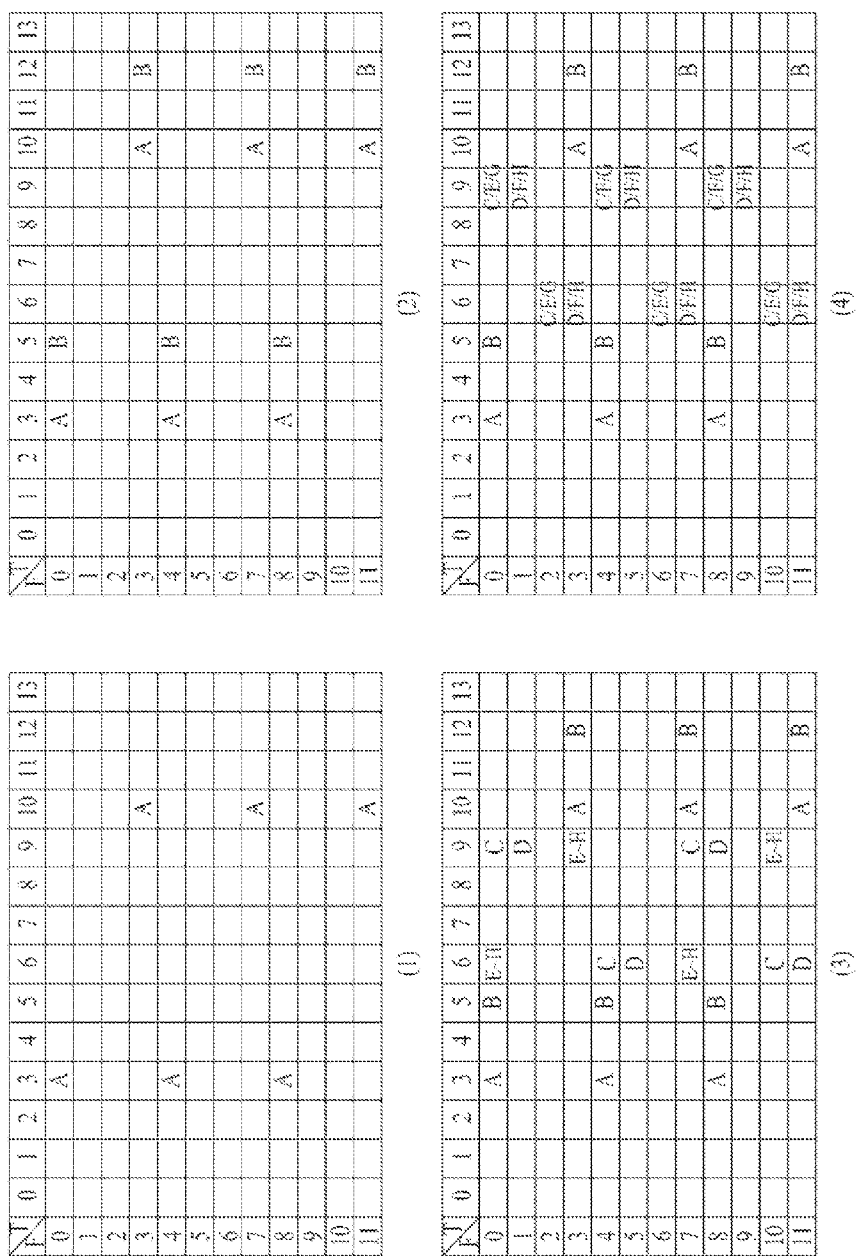

As shown in FIG. 39, in an embodiment D-7-(1), for rank-1 transmission, DRSs of the 1st layer are arranged at 3 subcarrier positions at equal intervals in 2 OFDM symbols. DRSs of the 1st layer are arranged at 6 REs in 2 RBs (i.e., in a pair of RBs) that are consecutive in time in one subframe.

In an embodiment D-7-(2), DRSs of the 2nd layer are arranged at 6 REs in addition to the REs, at which the DRSs are located in the embodiment D-7-(1), and DRSs of the 1st and 2nd layers are arranged at intervals of 2 OFDM symbols at the same subcarrier.

In an embodiment D-7-(3), for rank-8 transmission, the same DRS pattern for the 1st and 2nd layers as that of the embodiment D-7-(2) is used without change and, in addition, a pattern of DRSs for the 3rd to 8th layers is defined. DRSs of the 3rd and 4th layers are arranged at 4 REs. DRSs of the 3rd and 4th layers are arranged at contiguous subcarriers in one OFDM symbol to be multiplexed according to an FDM scheme. DRSs of the 5th to 8th layers are arranged at 4 REs and each set of DRSs of the 5th to 8th layers is multiplexed at each RE according to a CDM scheme.

In an embodiment D-7-(4), for rank-8 transmission, the same DRS pattern for the 1st and 2nd layers as that of the embodiment D-7-(2) is used without change and, in addition, a pattern of DRSs for the 3rd to 8th layers is defined. DRSs of the 3rd, 5th, and 7th layers are arranged at 6 REs and each set of DRSs of the 3rd, 5th, and 7th layers is multiplexed at each RE according to a CDM scheme. DRSs of the 4th, 6th, and 8th layers are arranged at 6 REs and each set of DRSs of the 4th, 6th, and 8th layers is multiplexed at each RE according to a CDM scheme.

Figure 40:
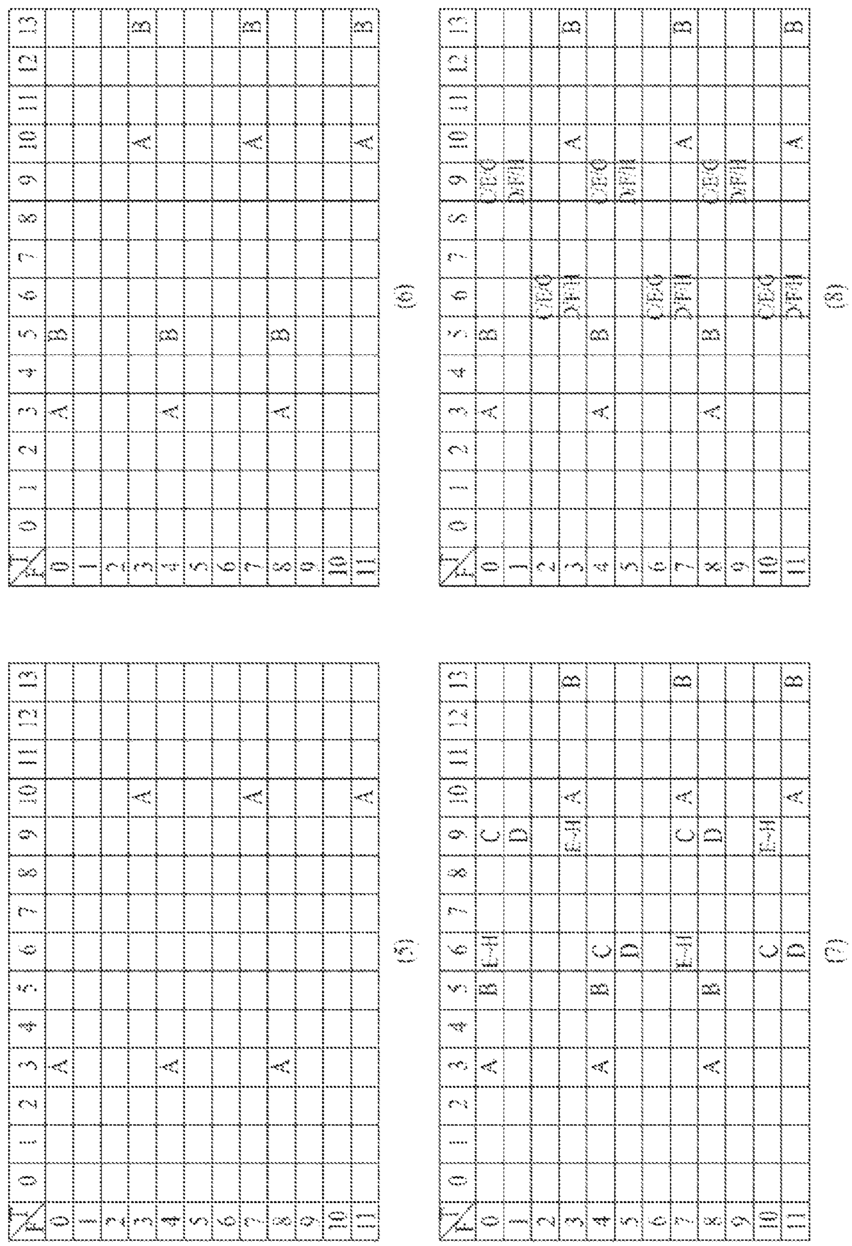

Embodiments D-7-(5) to D-7-(8) shown in FIG. 40 are modifications of the embodiments D-7-(1) to D-7-(4) of FIG. 39, in which the DRSs, which are located at the 12th OFDM symbol in the embodiments D-7-(1) to D-7-(4), are located at the 13th OFDM symbol.

Embodiment D-8

TABLE 24

| | | |
|---|---|---|
| (1) | A(l, k)= | {(3, 0), (3, 4), (3, 8), (5, 0), (5, 4), (5, 8), (10, 3), (10, 7), (10, 11), (12, 3), (12, 7), (12, 11)} |
| (2) | A(l, k)= | {(3, 0), (3, 4), (3, 8), (10, 3), (10, 7), (10, 11)} |
| | B(l, k)= | {(5, 0), (5, 4), (5, 8), (12, 3), (12, 7), (12, 11)} |
| (3) | A(l, k)= | {(3, 0), (3, 4), (3, 8), (10, 3), (10, 7), (10, 11)} |
| | B(l, k)= | {(5, 0), (5, 4), (5, 8), (12, 3), (12, 7), (12, 11)} |
| | C(l, k)= | {(6, 4), (6, 10), (9, 0), (9, 7)} |
| | D(l, k)= | {(6, 5), (6, 11), (9, 1), (9, 8)} |
| | E~H(l, k)= | {(6, 0), (6, 7), (9, 3), (9, 10)} |
| (4) | A(l, k)= | {(3, 0), (3, 4), (3, 8), (10, 3), (10, 7), (10, 11)} |
| | B(l, k)= | {(5, 0), (5, 4), (5, 8), (12, 3), (12, 7), (12, 11)} |
| | C/E/G(l, k)= | {(6, 2), (6, 6), (6, 10), (9, 0), (9, 4), (9, 8)} |
| | D/F/H(l, k)= | {(6, 3), (6, 7), (6, 11), (9, 1), (9, 5), (9, 9)} |
| (5) | A(l, k)= | {(3, 0), (3, 4), (3, 8), (5, 0), (5, 4), (5, 8), (10, 3), (10, 7), (10, 11), (13, 3), (13, 7), (13, 11)} |
| (6) | A(l, k)= | {(3, 0), (3, 4), (3, 8), (10, 3), (10, 7), (10, 11)} |
| | B(l, k)= | {(5, 0), (5, 4), (5, 8), (13, 3), (13, 7), (13, 11)} |
| (7) | A(l, k)= | {(3, 0), (3, 4), (3, 8), (10, 3), (10, 7), (10, 11)} |
| | B(l, k)= | {(5, 0), (5, 4), (5, 8), (13, 3), (13, 7), (13, 11)} |
| | C(l, k)= | {(6, 4), (6, 10), (9, 0), (9, 7)} |
| | D(l, k)= | {(6, 5), (6, 11), (9, 1), (9, 8)} |
| | E~H(l, k)= | {(6, 0), (6, 7), (9, 3), (9, 10)} |
| (8) | A(l, k)= | {(3, 0), (3, 4), (3, 8), (10, 3), (10, 7), (10, 11)} |
| | B(l, k)= | {(5, 0), (5, 4), (5, 8), (13, 3), (13, 7), (13, 11)} |
| | C/E/G(l, k)= | {(6, 2), (6, 6), (6, 10), (9, 0), (9, 4), (9, 8)} |
| | D/F/H(l, k)= | {(6, 3), (6, 7), (6, 11), (9, 1), (9, 5), (9, 9)} |

As shown in FIG. 41, in an embodiment D-8-(1), for rank-1 transmission, DRSs of the 1st layer are arranged at 3 subcarrier positions at equal intervals in 4 OFDM symbols. DRSs of the 1st layer are arranged at 12 REs in 2 RBs (i.e., in a pair of RBs) that are consecutive in time in one subframe.

In an embodiment D-8-(2), DRSs of the 2nd layer are arranged at 6 REs from among the REs, at which the DRSs are located in the embodiment D-8-(1), and DRSs of the 1st and 2nd layers are arranged at intervals of 2 OFDM symbols at the same subcarrier.

In an embodiment D-8-(3), for rank-8 transmission, the same DRS pattern for the 1st and 2nd layers as that of the embodiment D-8-(2) is used without change and, in addition, a pattern of DRSs for the 3rd to 8th layers is defined. DRSs of the 3rd and 4th layers are arranged at 4 REs. DRSs of the 3rd and 4th layers are arranged at contiguous subcarriers in one OFDM symbol to be multiplexed according to an FDM scheme. DRSs of the 5th to 8th layers are arranged at 4 REs and each set of DRSs of the 5th to 8th layers is multiplexed at each RE according to a CDM scheme.

In an embodiment D-8-(4), for rank-8 transmission, the same DRS pattern for the 1st and 2nd layers as that of the embodiment D-8-(2) is used without change and, in addition, a pattern of DRSs for the 3rd to 8th layers is defined. DRSs of the 3rd, 5th, and 7th layers are arranged at 6 REs and each set of DRSs of the 3rd, 5th, and 7th layers is multiplexed at each RE according to a CDM scheme. DRSs of the 4th, 6th, and 8th layers are arranged at 6 REs and each set of DRSs of the 4th, 6th, and 8th layers is multiplexed at each RE according to a CDM scheme.

Embodiments D-8-(5) to D-8-(8) shown in FIG. 42 are modifications of the embodiments D-8-(1) to D-8-(4) of FIG. 41, in which the DRSs, which are located at the 12th OFDM symbol in the embodiments D-8-(1) to D-8-(4), are located at the 13th OFDM symbol.

Embodiment D-9

TABLE 25

| | | |
|---|---|---|
| (1) | A(l, k)= | {(3, 0), (3, 6), (5, 3), (5, 9), (10, 0), (10, 6), (12, 3), (12, 9)} |
| (2) | A(l, k)= | {(3, 0), (3, 6), (5, 3), (5, 9), (10, 0), (10, 6), (12, 3), (12, 9)} |
| | B(l, k)= | {(3, 3), (3, 9), (12, 0), (12, 6)} |
| (3) | A(l, k)= | {(3, 0), (3, 6), (5, 3), (5, 9), (10, 0), (10, 6), (12, 3), (12, 9)} |
| | B(l, k)= | {(3, 3), (3, 9), (12, 0), (12, 6)} |
| | C(l, k)= | {(6, 4), (6, 10), (9, 0), (9, 7)} |
| | D(l, k)= | {(6, 5), (6, 11), (9, 1), (9, 8)} |
| | E~H(l, k)= | {(6, 0), (6, 7), (9, 3), (9, 10)} |
| (4) | A(l, k)= | {(3, 0), (3, 6), (5, 3), (5, 9), (10, 0), (10, 6), (12, 3), (12, 9)} |
| | B(l, k)= | {(3, 3), (3, 9), (12, 0), (12, 6)} |
| | C/E/G(l, k)= | {(6, 2), (6, 6), (6, 10), (9, 0), (9, 4), (9, 8)} |
| | D/F/H(l, k)= | {(6, 3), (6, 7), (6, 11), (9, 1), (9, 5), (9, 9)} |
| (5) | A(l, k)= | {(3, 0), (3, 6), (5, 3), (5, 9), (10, 0), (10, 6), (13, 3), (13, 9)} |
| (6) | A(l, k)= | {(3, 0), (3, 6), (5, 3), (5, 9), (10, 0), (10, 6), (13, 3), (13, 9)} |
| | B(l, k)= | {(3, 3), (3, 9), (13, 0), (13, 6)} |
| (7) | A(l, k)= | {(3, 0), (3, 6), (5, 3), (5, 9), (10, 0), (10, 6), (13, 3), (13, 9)} |
| | B(l, k)= | {(3, 3), (3, 9), (13, 0), (13, 6)} |
| | C(l, k)= | {(6, 4), (6, 10), (9, 0), (9, 7)} |
| | D(l, k)= | {(6, 5), (6, 11), (9, 1), (9, 8)} |
| | E~H(l, k)= | {(6, 0), (6, 7), (9, 3), (9, 10)} |
| (8) | A(l, k)= | {(3, 0), (3, 6), (5, 3), (5, 9), (10, 0), (10, 6), (13, 3), (13, 9)} |
| | B(l, k)= | {(3, 3), (3, 9), (13, 0), (13, 6)} |
| | C/E/G(l, k)= | {(6, 2), (6, 6), (6, 10), (9, 0), (9, 4), (9, 8)} |
| | D/F/H(l, k)= | {(6, 3), (6, 7), (6, 11), (9, 1), (9, 5), (9, 9)} |

Figure 43:
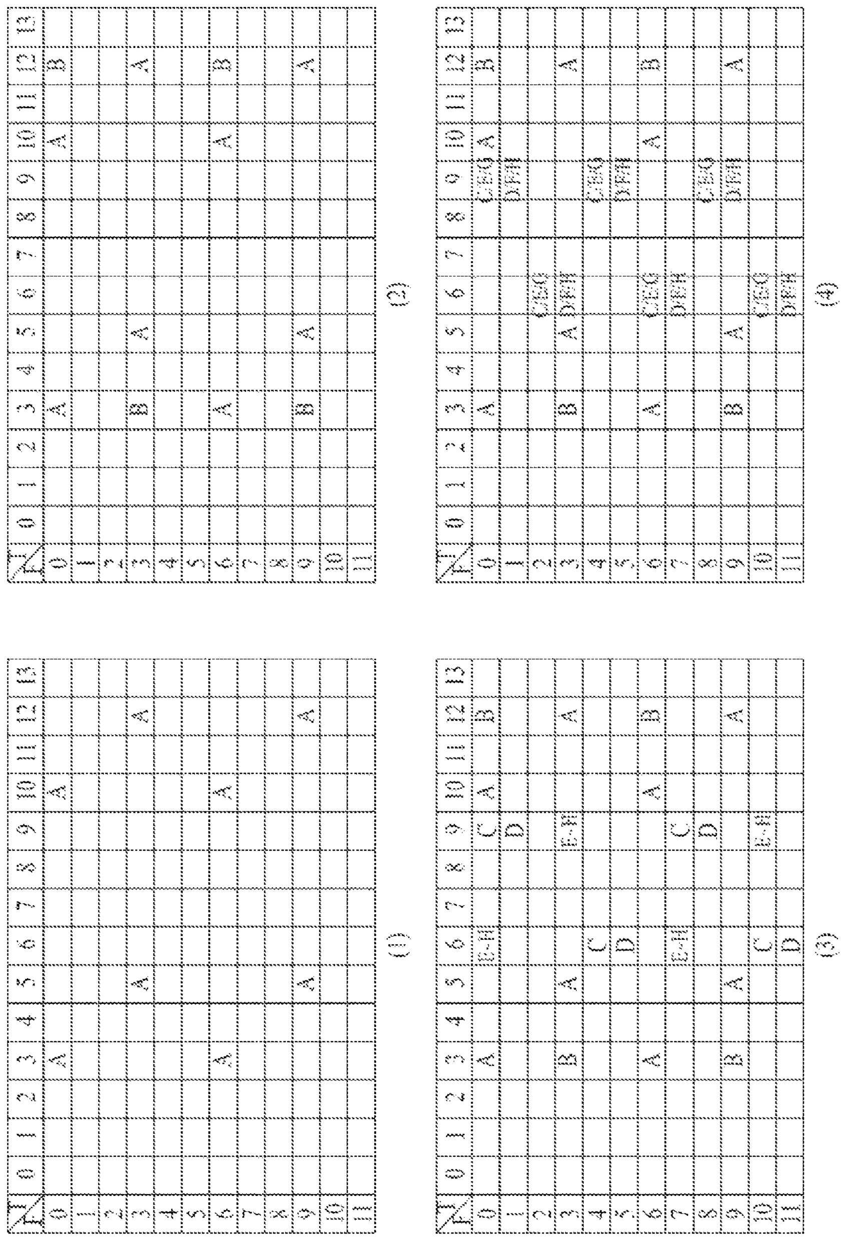

As shown in FIG. 43, in an embodiment D-9-(1), for rank-1 transmission, DRSs of the 1st layer are arranged at 2 subcarrier positions in 4 OFDM symbols. DRSs of the 1st layer are arranged at 8 REs in 2 RBs (i.e., in a pair of RBs) that are consecutive in time in one subframe.

In an embodiment D-9-(2), DRSs of the 2nd layer are arranged at 4 REs in addition to the REs, at which the DRSs are located in the embodiment D-9-(1), and DRSs of the 1st and 2nd layers are alternately arranged in the OFDM symbols in which the DRSs of the 2nd layer are arranged.

In an embodiment D-9-(3), for rank-8 transmission, the same DRS pattern for the 1st and 2nd layers as that of the embodiment D-9-(2) is used without change and, in addition, a pattern of DRSs for the 3rd to 8th layers is defined. DRSs of the 3rd and 4th layers are arranged at 4 REs. DRSs of the 3rd and 4th layers are arranged at contiguous subcarriers in one OFDM symbol to be multiplexed according to an FDM scheme. DRSs of the 5th to 8th layers are arranged at 4 REs and each set of DRSs of the 5th to 8th layers is multiplexed at each RE according to a CDM scheme.

In an embodiment D-9-(4), for rank-8 transmission, the same DRS pattern for the 1st and 2nd layers as that of the embodiment D-9-(2) is used without change and, in addition, a pattern of DRSs for the 3rd to 8th layers is defined. DRSs of the 3rd, 5th, and 7th layers are arranged at 6 REs and each set of DRSs of the 3rd, 5th, and 7th layers is multiplexed at each RE according to a CDM scheme. DRSs of the 4th, 6th, and 8th layers are arranged at 6 REs and each set of DRSs of the 4th, 6th, and 8th layers is multiplexed at each RE according to a CDM scheme.

Embodiments D-9-(5) to D-9-(8) shown in FIG. 44 are modifications of the embodiments D-9-(1) to D-9-(4) of FIG. 43, in which the DRSs, which are located at the 12th OFDM symbol in the embodiments D-9-(1) to D-9-(4), are located at the 13th OFDM symbol.

Embodiment D-10

TABLE 26

| | | |
|---|---|---|
| (1) | A(l, k)= | {(3, 0), (3, 6), (8, 1), (8, 7), (12, 3), (12, 9)} |
| (2) | A(l, k)= | {(3, 0), (3, 6), (8, 1), (8, 7), (12, 3), (12, 9)} |
| | B(l, k)= | {(3, 3), (3, 9), (6, 1), (6, 7), (12, 0), (12, 6)} |
| (3) | A(l, k)= | {(3, 0), (3, 6), (8, 1), (8, 7), (12, 3), (12, 9)} |
| | B(l, k)= | {(3, 3), (3, 9), (6, 1), (6, 7), (12, 0), (12, 6)} |
| | C(l, k)= | {(5, 4), (5, 10), (10, 0), (10, 7)} |
| | D(l, k)= | {(5, 5), (5, 11), (10, 1), (10, 8)} |
| | E~H(l, k)= | {(5, 0), (5, 7), (10, 3), (10, 10)} |
| (4) | A(l, k)= | {(3, 0), (3, 6), (8, 1), (8, 7), (12, 3), (12, 9)} |
| | B(l, k)= | {(3, 3), (3, 9), (6, 1), (6, 7), (12, 0), (12, 6)} |
| | C/E/G(l, k)= | {(5, 2), (5, 6), (5, 10), (10, 0), (10, 4), (10, 8)} |
| | D/F/H(l, k)= | {(5, 3), (5, 7), (5, 11), (10, 1), (10, 5), (10, 9)} |
| (5) | A(l, k)= | {(3, 0), (3, 6), (8, 1), (8, 7), (13, 3), (13, 9)} |
| (6) | A(l, k)= | {(3, 0), (3, 6), (8, 1), (8, 7), (13, 3), (13, 9)} |
| | B(l, k)= | {(3, 3), (3, 9), (6, 1), (6, 7), (13, 0), (13, 6)} |
| (7) | A(l, k)= | {(3, 0), (3, 6), (8, 1), (8, 7), (13, 3), (13, 9)} |
| | B(l, k)= | {(3, 3), (3, 9), (6, 1), (6, 7), (13, 0), (13, 6)} |
| | C(l, k)= | {(5, 4), (5, 10), (10, 0), (10, 7)} |
| | D(l, k)= | {(5, 5), (5, 11), (10, 1), (10, 8)} |
| | E~H(l, k)= | {(5, 0), (5, 7), (10, 3), (10, 10)} |
| (8) | A(l, k)= | {(3, 0), (3, 6), (8, 1), (8, 7), (13, 3), (13, 9)} |
| | B(l, k)= | {(3, 3), (3, 9), (6, 1), (6, 7), (13, 0), (13, 6)} |
| | C/E/G(l, k)= | {(5, 2), (5, 6), (5, 10), (10, 0), (10, 4), (10, 8)} |
| | D/F/H(l, k)= | {(5, 3), (5, 7), (5, 11), (10, 1), (10, 5), (10, 9)} |

Figure 45:
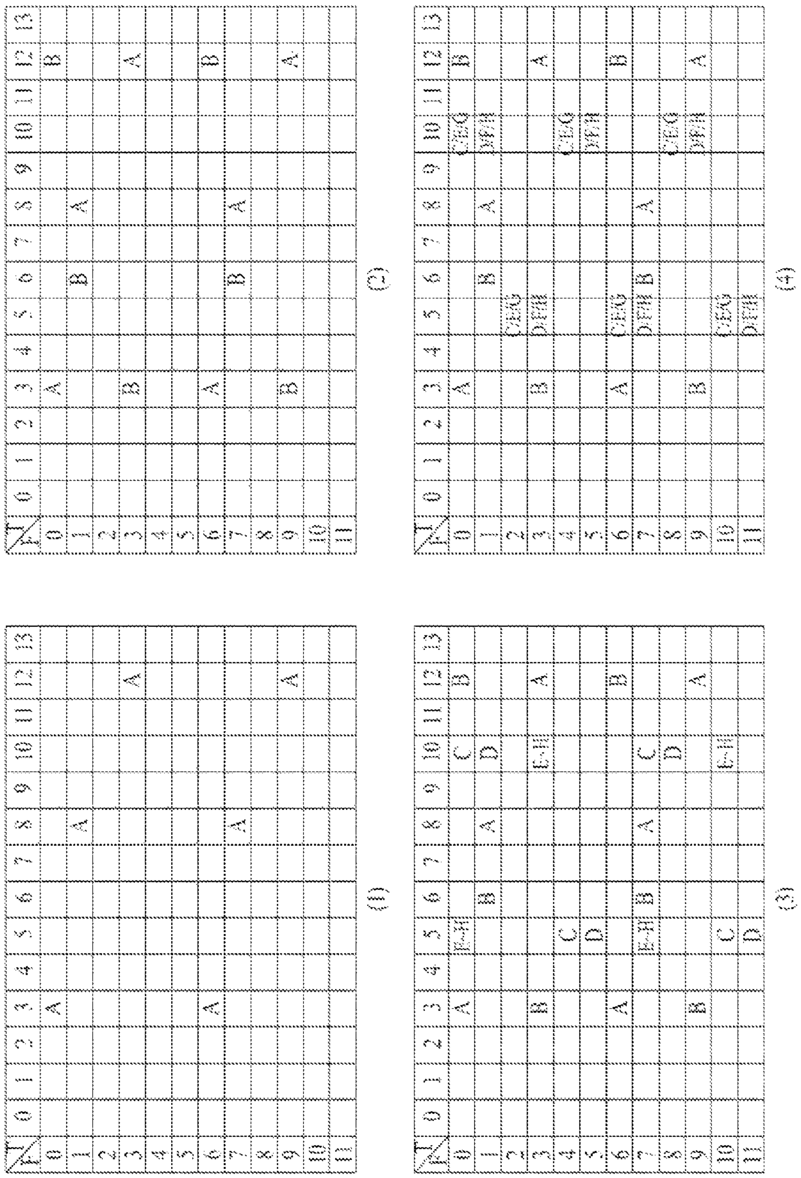

As shown in FIG. 45, in an embodiment D-10-(1), for rank-1 transmission, DRSs of the 1st layer are arranged at 2 subcarrier positions in 3 OFDM symbols. DRSs of the 1st layer are arranged at 6 REs in 2 RBs (i.e., in a pair of RBs) that are consecutive in time in one subframe.

In an embodiment D-10-(2), DRSs of the 2nd layer are arranged at 6 REs in addition to the REs, at which the DRSs are located in the embodiment D-10-(1), and DRSs of the 1st and 2nd layers are alternately arranged in the OFDM symbols in which the DRSs of the 1st and 2nd layers are arranged together.

In an embodiment D-10-(3), for rank-8 transmission, the same DRS pattern for the 1st and 2nd layers as that of the embodiment D-10-(2) is used without change and, in addition, a pattern of DRSs for the 3rd to 8th layers is defined. DRSs of the 3rd and 4th layers are arranged at 4 REs. DRSs of the 3rd and 4th layers are arranged at contiguous subcarriers in one OFDM symbol to be multiplexed according to an FDM scheme. DRSs of the 5th to 8th layers are arranged at 4 REs and each set of DRSs of the 5th to 8th layers is multiplexed at each RE according to a CDM scheme.

In an embodiment D-10-(4), for rank-8 transmission, the same DRS pattern for the 1st and 2nd layers as that of the embodiment D-10-(2) is used without change and, in addition, a pattern of DRSs for the 3rd to 8th layers is defined. DRSs of the 3rd, 5th, and 7th layers are arranged at 6 REs and each set of DRSs of the 3rd, 5th, and 7th layers is multiplexed at each RE according to a CDM scheme. DRSs of the 4th, 6th, and 8th layers are arranged at 6 REs and each set of DRSs of the 4th, 6th, and 8th layers is multiplexed at each RE according to a CDM scheme.

Figure 46:
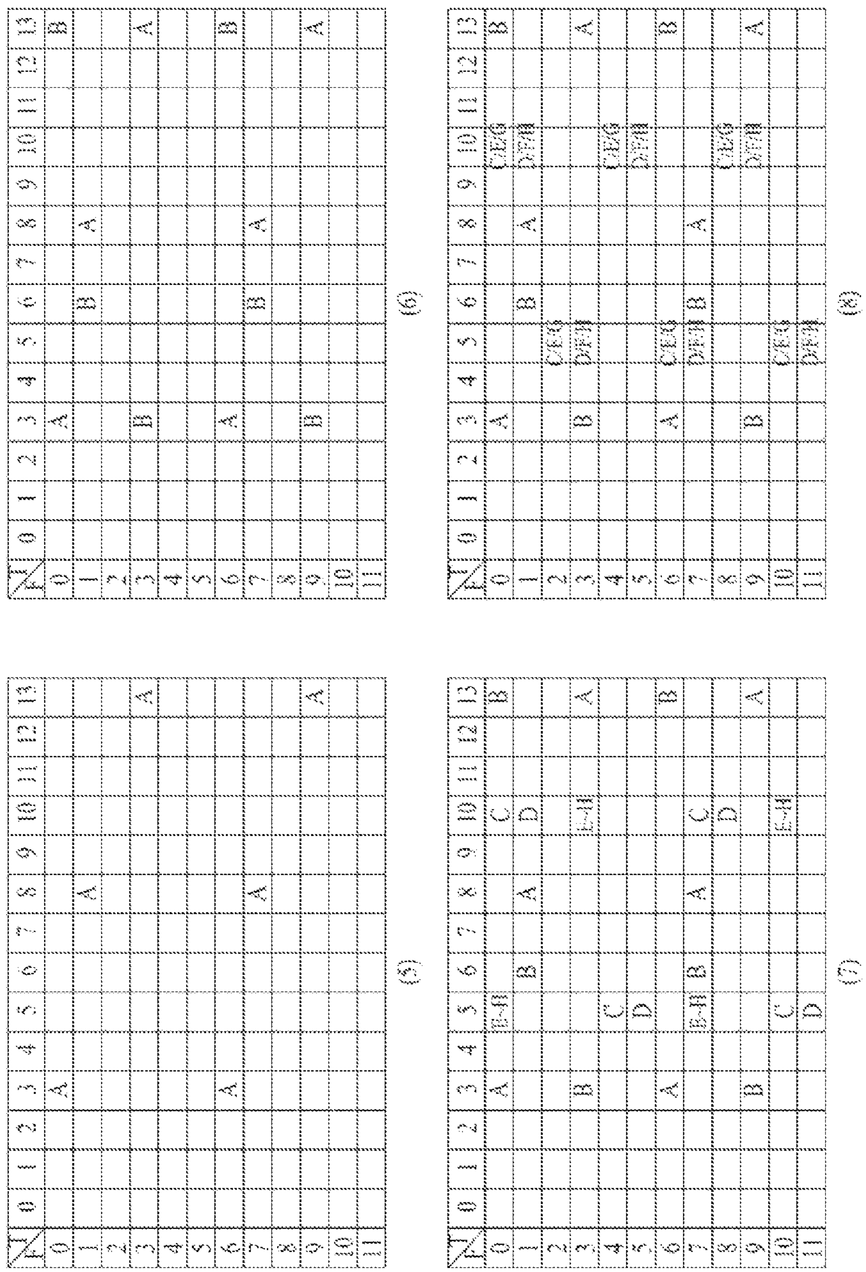

Embodiments D-10-(5) to D-10-(8) shown in FIG. 46 are modifications of the embodiments D-10-(1) to D-10-(4) of FIG. 45, in which the DRSs, which are located at the 12th OFDM symbol in the embodiments D-10-(1) to D-10-(4), are located at the 13th OFDM symbol.

Embodiment D-11

TABLE 27

| | | |
|---|---|---|
| (1) | A(l, k)= | {(3, 0), (3, 6), (8, 3), (8, 9), (12, 0), (12, 6)} |
| (2) | A(l, k)= | {(3, 0), (3, 6), (8, 3), (8, 9), (12, 0), (12, 6)} |
| | B(l, k)= | {(3, 3), (3, 9), (8, 0), (8, 6), (12, 3), (12, 9)} |
| (3) | A(l, k)= | {(3, 0), (3, 6), (8, 3), (8, 9), (12, 0), (12, 6)} |
| | B(l, k)= | {(3, 3), (3, 9), (8, 0), (8, 6), (12, 3), (12, 9)} |
| | C(l, k)= | {(5, 4), (5, 10), (10, 0), (10, 7)} |
| | D(l, k)= | {(5, 5), (5, 11), (10, 1), (10, 8)} |
| | E~H(l, k)= | {(5, 0), (5, 7), (10, 3), (10, 10)} |
| (4) | A(l, k)= | {(3, 0), (3, 6), (8, 3), (8, 9), (12, 0), (12, 6)} |
| | B(l, k)= | {(3, 3), (3, 9), (8, 0), (8, 6), (12, 3), (12, 9)} |
| | C/E/G(l, k)= | {(5, 2), (5, 6), (5, 10), (10, 0), (10, 4), (10, 8)} |
| | D/F/H(l, k)= | {(5, 3), (5, 7), (5, 11), (10, 1), (10, 5), (10, 9)} |
| (5) | A(l, k)= | {(3, 0), (3, 6), (8, 3), (8, 9), (13, 0), (13, 6)} |
| (6) | A(l, k)= | {(3, 0), (3, 6), (8, 3), (8, 9), (13, 0), (13, 6)} |
| | B(l, k)= | {(3, 3), (3, 9), (8, 0), (8, 6), (13, 3), (13, 9)} |
| (7) | A(l, k)= | {(3, 0), (3, 6), (8, 3), (8, 9), (13, 0), (13, 6)} |
| | B(l, k)= | {(3, 3), (3, 9), (8, 0), (8, 6), (13, 3), (13, 9)} |
| | C(l, k)= | {(5, 4), (5, 10), (10, 0), (10, 7)} |
| | D(l, k)= | {(5, 5), (5, 11), (10, 1), (10, 8)} |
| | E~H(l, k)= | {(5, 0), (5, 7), (10, 3), (10, 10)} |
| (8) | A(l, k)= | {(3, 0), (3, 6), (8, 3), (8, 9), (13, 0), (13, 6)} |
| | B(l, k)= | {(3, 3), (3, 9), (8, 0), (8, 6), (13, 3), (13, 9)} |
| | C/E/G(l, k)= | {(5, 2), (5, 6), (5, 10), (10, 0), (10, 4), (10, 8)} |
| | D/F/H(l, k)= | {(5, 3), (5, 7), (5, 11), (10, 1), (10, 5), (10, 9)} |

Figure 47:
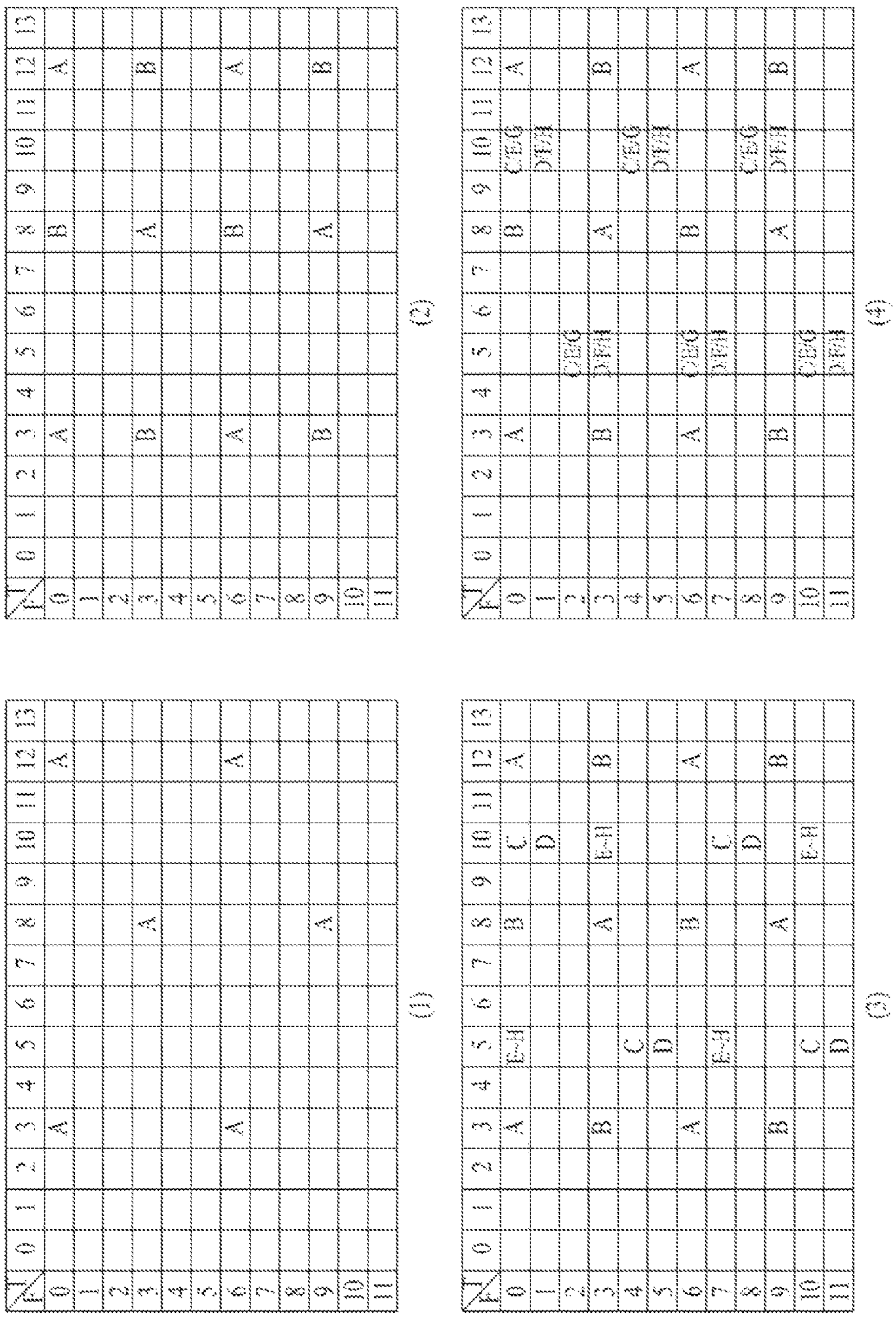

As shown in FIG. 47, in an embodiment D-11-(1), for rank-1 transmission, DRSs of the 1st layer are arranged at 2 subcarrier positions in 3 OFDM symbols. DRSs of the 1st layer are arranged at 6 REs in 2 RBs (i.e., in a pair of RBs) that are consecutive in time in one subframe.

In an embodiment D-11-(2), DRSs of the 2nd layer are arranged at 6 REs in addition to the REs, at which the DRSs are located in the embodiment D-11-(1), and DRSs of the 1st and 2nd layers are alternately arranged in the OFDM symbols in which the DRSs of the 1st and 2nd layers are arranged together.

In an embodiment D-11-(3), for rank-8 transmission, the same DRS pattern for the 1st and 2nd layers as that of the embodiment D-11-(2) is used without change and, in addition, a pattern of DRSs for the 3rd to 8th layers is defined. DRSs of the 3rd and 4th layers are arranged at 4 REs. DRSs of the 3rd and 4th layers are arranged at contiguous subcarriers in one OFDM symbol to be multiplexed according to an FDM scheme. DRSs of the 5th to 8th layers are arranged at 4 REs and each set of DRSs of the 5th to 8th layers is multiplexed at each RE according to a CDM scheme.

In an embodiment D-11-(4), for rank-8 transmission, the same DRS pattern for the 1st and 2nd layers as that of the embodiment D-11-(2) is used without change and, in addition, a pattern of DRSs for the 3rd to 8th layers is defined. DRSs of the 3rd, 5th, and 7th layers are arranged at 6 REs and each set of DRSs of the 3rd, 5th, and 7th layers is multiplexed at each RE according to a CDM scheme. DRSs of the 4th, 6th, and 8th layers are arranged at 6 REs and each set of DRSs of the 4th, 6th, and 8th layers is multiplexed at each RE according to a CDM scheme.

Figure 48:
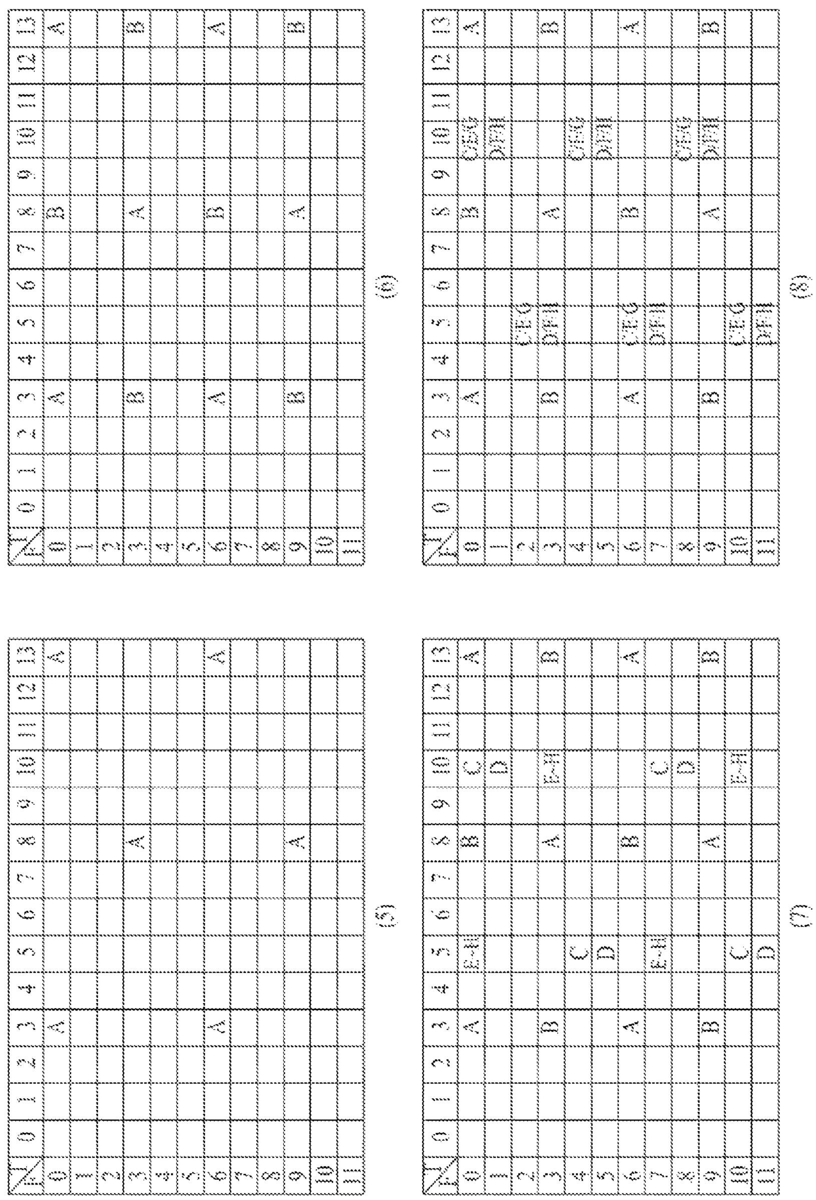

Embodiments D-11-(5) to D-11-(8) shown in FIG. 48 are modifications of the embodiments D-11-(1) to D-11-(4) of FIG. 47, in which the DRSs, which are located at the 12th OFDM symbol in the embodiments D-11-(1) to D-11-(4), are located at the 13th OFDM symbol.

Embodiment D-12

TABLE 28

| | | |
|---|---|---|
| (1) | A(l, k)= | {(3, 0), (3, 6), (6, 3), (6, 9), (9, 0), (9, 6), (12, 3), (12, 9)} |
| (2) | A(l, k)= | {(3, 0), (3, 6), (12, 3), (12, 9)} |
| | B(l, k)= | {(3, 3), (3, 9), (12, 0), (12, 6)} |
| | A/B(l, k)= | {(6, 3), (6, 9), (9, 0), (9, 6)} |
| (3) | A(l, k)= | {(3, 0), (3, 6), (12, 3), (12, 9)} |
| | B(l, k)= | {(3, 3), (3, 9), (12, 0), (12, 6)} |
| | A/B(l, k)= | {(6, 3), (6, 9), (9, 0), (9, 6)} |
| | C(l, k)= | {(5, 4), (5, 10), (10, 0), (10, 7)} |
| | D(l, k)= | {(5, 5), (5, 11), (10, 1), (10, 8)} |
| | E~H(l, k)= | {(5, 0), (5, 7), (10, 3), (10, 10)} |
| (4) | A(l, k)= | {(3, 0), (3, 6), (12, 3), (12, 9)} |
| | B(l, k)= | {(3, 3), (3, 9), (12, 0), (12, 6)} |
| | A/B(l, k)= | {(6, 3), (6, 9), (9, 0), (9, 6)} |
| | C/E/G(l, k)= | {(5, 2), (5, 6), (5, 10), (10, 0), (10, 4), (10, 8)} |
| | D/F/H(l, k)= | {(5, 3), (5, 7), (5, 11), (10, 1), (10, 5), (10, 9)} |
| (5) | A(l, k)= | {(3, 0), (3, 6), (6, 3), (6, 9), (9, 0), (9, 6), (13, 3), (13, 9)} |
| (6) | A(l, k)= | {(3, 0), (3, 6), (13, 3), (13, 9)} |
| | B(l, k)= | {(3, 3), (3, 9), (13, 0), (13, 6)} |
| | A/B(l, k)= | {(6, 3), (6, 9), (9, 0), (9, 6)} |
| (7) | A(l, k)= | {(3, 0), (3, 6), (13, 3), (13, 9)} |
| | B(l, k)= | {(3, 3), (3, 9), (13, 0), (13, 6)} |
| | A/B(l, k)= | {(6, 3), (6, 9), (9, 0), (9, 6)} |
| | C(l, k)= | {(5, 4), (5, 10), (10, 0), (10, 7)} |
| | D(l, k)= | {(5, 5), (5, 11), (10, 1), (10, 8)} |
| | E~H(l, k)= | {(5, 0), (5, 7), (10, 3), (10, 10)} |
| (8) | A(l, k)= | {(3, 0), (3, 6), (13, 3), (13, 9)} |
| | B(l, k)= | {(3, 3), (3, 9), (13, 0), (13, 6)} |
| | A/B(l, k)= | {(6, 3), (6, 9), (9, 0), (9, 6)} |
| | C/E/G(l, k)= | {(5, 2), (5, 6), (5, 10), (10, 0), (10, 4), (10, 8)} |
| | D/F/H(l, k)= | {(5, 3), (5, 7), (5, 11), (10, 1), (10, 5), (10, 9)} |

Figure 49:
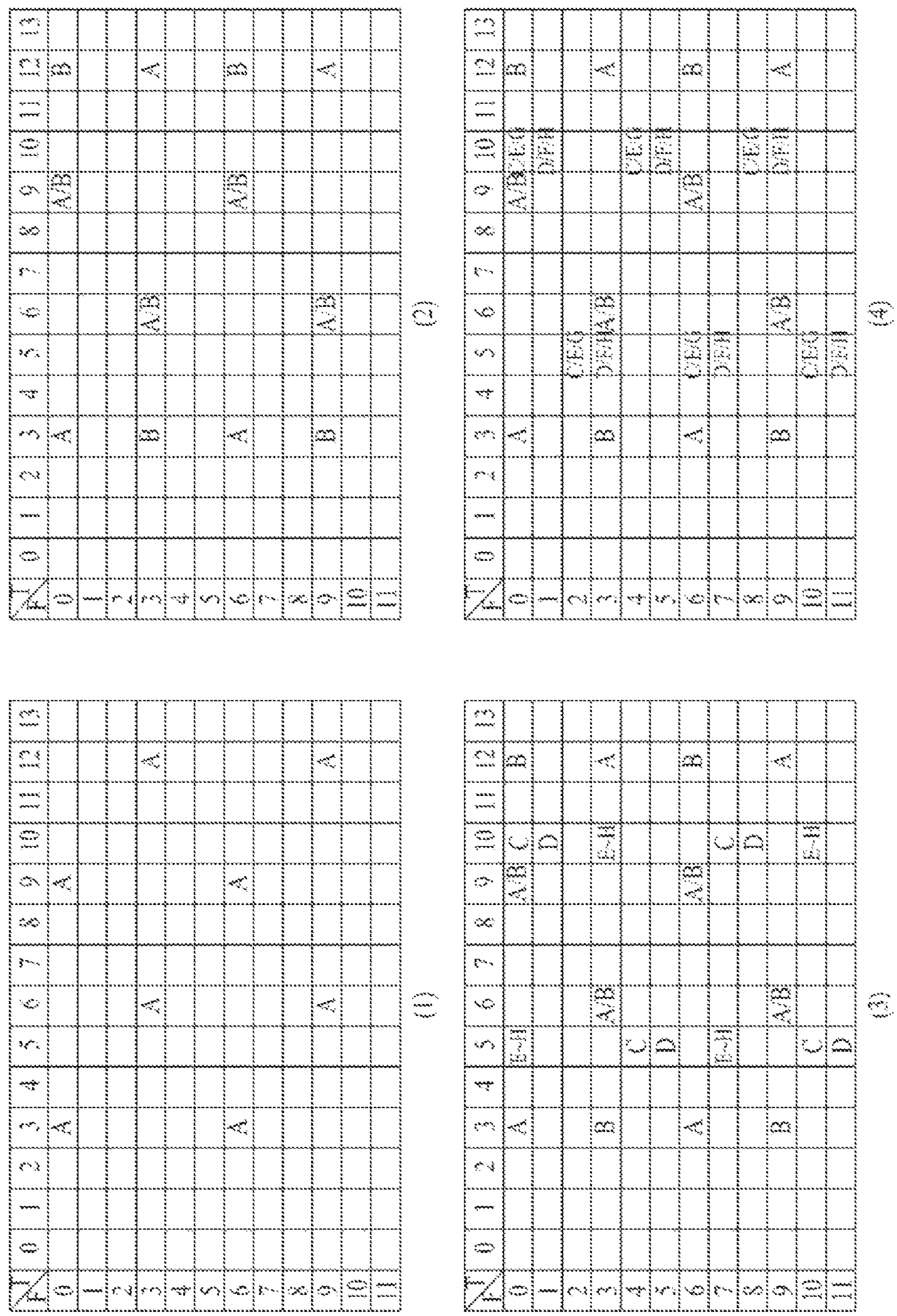

As shown in FIG. 49, in an embodiment D-12-(1), for rank-1 transmission, DRSs of the 1st layer are arranged at 2 subcarrier positions in 4 OFDM symbols. DRSs of the 1st layer are arranged at 8 REs in 2 RBs (i.e., in a pair of RBs) that are consecutive in time in one subframe.

In an embodiment D-12-(2), DRSs of the 1st and 2nd layers, which are multiplexed according to a CDM scheme, are arranged at 4 REs from among the REs, at which DRSs of the 1st layer are located in the embodiment D-12-(1). In addition, DRSs of the 2nd layer are arranged at 4 REs in addition to the REs, at which DRSs are located in the embodiment D-12-(1). Accordingly, DRSs of the 1st layer are arranged at 8 REs and DRSs of the 2nd layer are arranged at 8 REs in 2 RBs (i.e., in a pair of RBs) that are consecutive in time in one subframe.

In an embodiment D-12-(3), for rank-8 transmission, the same DRS pattern for the 1st and 2nd layers as that of the embodiment D-12-(2) is used without change and, in addition, a pattern of DRSs for the 3rd to 8th layers is defined. DRSs of the 3rd and 4th layers are arranged at 4 REs. DRSs of the 3rd and 4th layers are arranged at contiguous subcarriers in one OFDM symbol to be multiplexed according to an FDM scheme. DRSs of the 5th to 8th layers are arranged at 4 REs and each set of DRSs of the 5th to 8th layers is multiplexed at each RE according to a CDM scheme.

In an embodiment D-12-(4), for rank-8 transmission, the same DRS pattern for the 1st and 2nd layers as that of the embodiment D-12-(2) is used without change and, in addition, a pattern of DRSs for the 3rd to 8th layers is defined. DRSs of the 3rd, 5th, and 7th layers are arranged at 6 REs and each set of DRSs of the 3rd, 5th, and 7th layers is multiplexed at each RE according to a CDM scheme. DRSs of the 4th, 6th, and 8th layers are arranged at 6 REs and each set of DRSs of the 4th, 6th, and 8th layers is multiplexed at each RE according to a CDM scheme.

Figure 50:
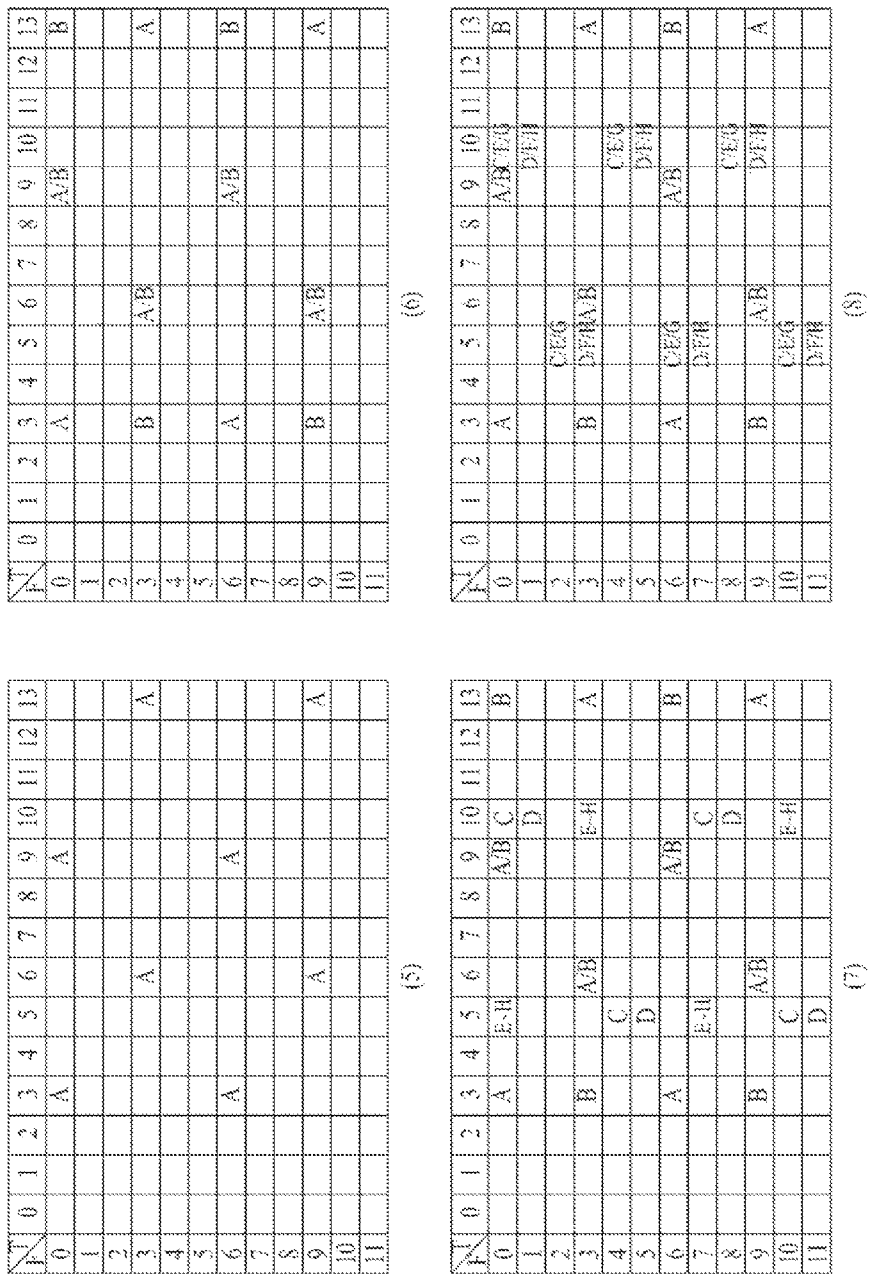

Embodiments D-12-(5) to D-12-(8) shown in FIG. 50 are modifications of the embodiments D-12-(1) to D-12-(4) of FIG. 49, in which the DRSs, which are located at the 12th OFDM symbol in the embodiments D-12-(1) to D-12-(4), are located at the 13th OFDM symbol.

Embodiment D-13

TABLE 29

| | | |
|---|---|---|
| (1) | A(l, k)= | {(3, 0), (3, 9), (6, 3), (9, 6), (12, 0), (12, 9)} |
| (2) | A(l, k)= | {(3, 0), (3, 9), (6, 3), (9, 6), (12, 0), (12, 9)} |
| | B(l, k)= | {(5, 0), (5, 9), (6, 6), (9, 3), (10, 0), (10, 9)} |
| (3) | A(l, k)= | {(3, 0), (3, 9), (6, 3), (9, 6), (12, 0), (12, 9)} |
| | B(l, k)= | {(5, 0), (5, 9), (6, 6), (9, 3), (10, 0), (10, 9)} |
| | C~H(l, k)= | {(3, 3), (3, 6), (6, 0), (6, 9), (9, 0), (9, 9), (12, 3), (12, 6)} |
| (4) | A(l, k)= | {(3, 0), (3, 9), (6, 3), (9, 6), (12, 0), (12, 9)} |
| | B(l, k)= | {(5, 0), (5, 9), (6, 6), (9, 3), (10, 0), (10, 9)} |
| | C~E(l, k)= | {(3, 3), (3, 6), (6, 0), (6, 9)} |
| | F~H(l, k)= | {(9, 0), (9, 9), (12, 3), (12, 6)} |
| (5) | A(l, k)= | {(3, 0), (3, 9), (6, 3), (9, 6), (13, 0), (13, 9)} |
| (6) | A(l, k)= | {(3, 0), (3, 9), (6, 3), (9, 6), (13, 0), (13, 9)} |
| | B(l, k)= | {(5, 0), (5, 9), (6, 6), (9, 3), (10, 0), (10, 9)} |
| (7) | A(l, k)= | {(3, 0), (3, 9), (6, 3), (9, 6), (13, 0), (13, 9)} |
| | B(l, k)= | {(5, 0), (5, 9), (6, 6), (9, 3), (10, 0), (10, 9)} |
| | C~H(l, k)= | {(3, 3), (3, 6), (6, 0), (6, 9), (9, 0), (9, 9), (13, 3), (13, 6)} |
| (8) | A(l, k)= | {(3, 0), (3, 9), (6, 3), (9, 6), (13, 0), (13, 9)} |
| | B(l, k)= | {(5, 0), (5, 9), (6, 6), (9, 3), (10, 0), (10, 9)} |
| | C~E(l, k)= | {(3, 3), (3, 6), (6, 0), (6, 9)} |
| | F~H(l, k)= | {(9, 0), (9, 9), (13, 3), (13, 6)} |

Figure 51:
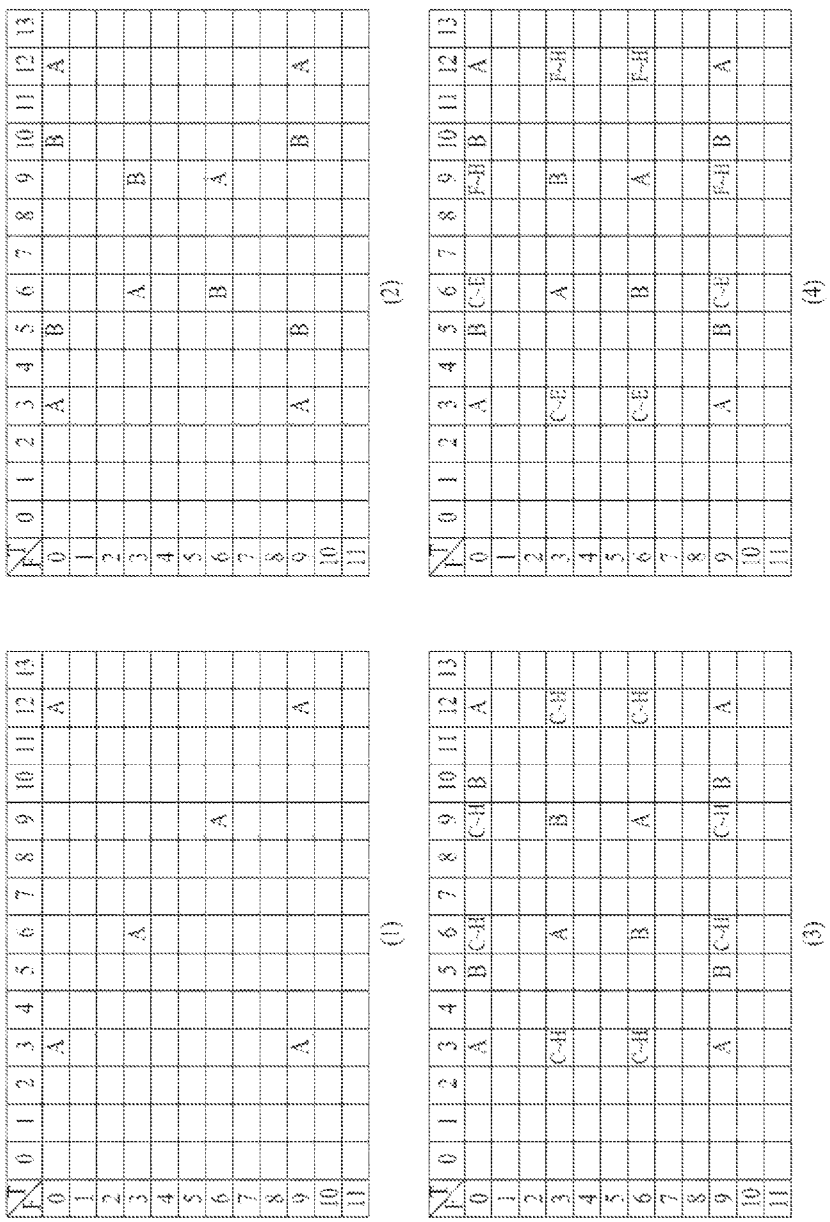

As shown in FIG. 51, in an embodiment D-13-(1), for rank-1 transmission, DRSs of the 1st layer are arranged at 1 or 2 subcarrier positions in 4 OFDM symbols. DRSs of the 1st layer are arranged at 6 REs in 2 RBs (i.e., in a pair of RBs) that are consecutive in time in one subframe.

In an embodiment D-13-(2), DRSs of the 2nd layer are arranged at 6 REs in addition to the REs, at which the DRSs are located in the embodiment D-13-(1).

In an embodiment D-13-(3), for rank-8 transmission, the same DRS pattern for the 1st and 2nd layers as that of the embodiment D-13-(2) is used without change and, in addition, a pattern of DRSs for the 3rd to 8th layers is defined. DRSs of the 5th to 8th layers are arranged at 8 REs and each set of DRSs of the 5th to 8th layers is multiplexed at each RE according to a CDM scheme.

In an embodiment D-13-(4), for rank-8 transmission, the same DRS pattern for the 1st and 2nd layers as that of the embodiment D-13-(2) is used without change and, in addition, a pattern of DRSs for the 3rd to 8th layers is defined. DRSs of the 3rd to 5th layers are arranged at 4 REs and each set of DRSs of the 3rd to 5th layers is multiplexed at each RE according to a CDM scheme. DRSs of the 6th to 8th layers are arranged at 4 REs and each set of DRSs of the 6th to 8th layers is multiplexed at each RE according to a CDM scheme.

Embodiments D-13-(5) to D-13-(8) shown in FIG. 52 are modifications of the embodiments D-13-(1) to D-13-(4) of FIG. 51, in which the DRSs, which are located at the 12th OFDM symbol in the embodiments D-13-(1) to D-13-(4), are located at the 13th OFDM symbol.

Embodiment D-14

TABLE 30

| | | |
|---|---|---|
| (1) | A(l, k)= | {(3, 0), (3, 9), (6, 3), (9, 6), (12, 0), (12, 9)} |
| (2) | A/B(l, k)= | {(3, 0), (3, 9), (6, 3), (9, 6), (12, 0), (12, 9)} |
| (3) | A/B(l, k)= | {(3, 0), (3, 9), (6, 3), (9, 6), (12, 0), (12, 9)} |
| | C(l, k)= | {(5, 4), (5, 10), (10, 0), (10, 7)} |
| | D(l, k)= | {(5, 5), (5, 11), (10, 1), (10, 8)} |
| | E~H(l, k)= | {(5, 0), (5, 7), (10, 3), (10, 10)} |
| (4) | A/B(l, k)= | {(3, 0), (3, 9), (6, 3), (9, 6), (12, 0), (12, 9)} |
| | C/E/G(l, k)= | {(5, 2), (5, 6), (5, 10), (10, 0), (10, 4), (10, 8)} |
| | D/F/H(l, k)= | {(5, 3), (5, 7), (5, 11), (10, 1), (10, 5), (10, 9)} |
| (5) | A/B(l, k)= | {(3, 0), (3, 9), (6, 3), (9, 6), (12, 0), (12, 9)} |
| | C/D(l, k)= | {(5, 0), (5, 9), (6, 6), (9, 3), (10, 0), (10, 9)} |
| | E/F(l, k)= | {(5, 6), (6, 0), (9, 9), (10, 3)} |
| | G/H(l, k)= | {(5, 3), (6, 9), (9, 0), (10, 6)} |
| (6) | A(l, k)= | {(3, 0), (3, 9), (6, 3), (9, 6), (13, 0), (13, 9)} |
| (7) | A/B(l, k)= | {(3, 0), (3, 9), (6, 3), (9, 6), (13, 0), (13, 9)} |
| (8) | A/B(l, k)= | {(3, 0), (3, 9), (6, 3), (9, 6), (13, 0), (13, 9)} |
| | C(l, k)= | {(5, 4), (5, 10), (10, 0), (10, 7)} |
| | D(l, k)= | {(5, 5), (5, 11), (10, 1), (10, 8)} |
| | E~H(l, k)= | {(5, 0), (5, 7), (10, 3), (10, 10)} |
| (9) | A/B(l, k)= | {(3, 0), (3, 9), (6, 3), (9, 6), (13, 0), (13, 9)} |
| | C/E/G(l, k)= | {(5, 2), (5, 6), (5, 10), (10, 0), (10, 4), (10, 8)} |
| | D/F/H(l, k)= | {(5, 3), (5, 7), (5, 11), (10, 1), (10, 5), (10, 9)} |
| (10) | A/B(l, k)= | {(3, 0), (3, 9), (6, 3), (9, 6), (13, 0), (13, 9)} |
| | C/D(l, k)= | {(5, 0), (5, 9), (6, 6), (9, 3), (10, 0), (10, 9)} |
| | E/F(l, k)= | {(5, 6), (6, 0), (9, 9), (10, 3)} |
| | G/H(l, k)= | {(5, 3), (6, 9), (9, 0), (10, 6)} |

Figure 53:
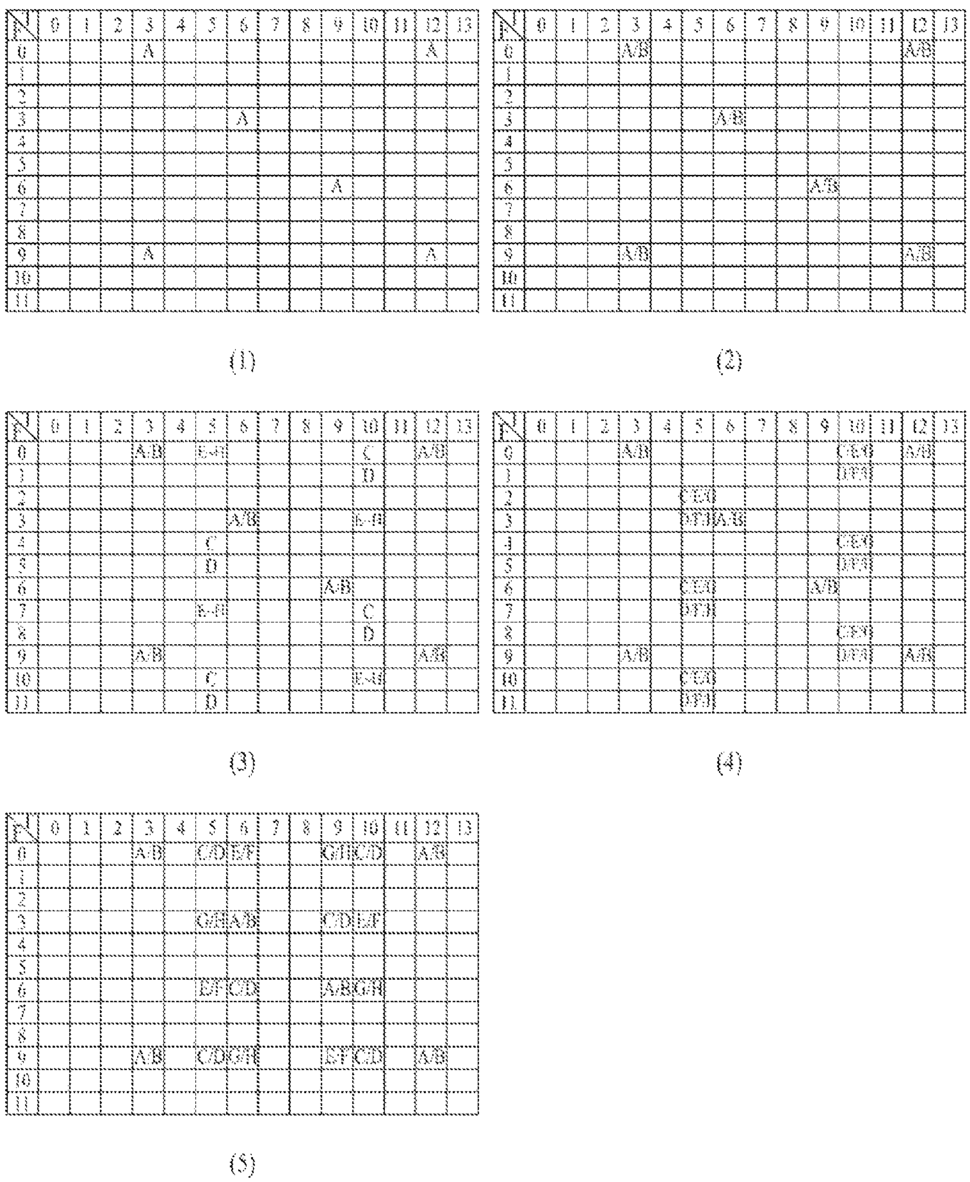

As shown in FIG. 53, in an embodiment D-14-(1), for rank-1 transmission, DRSs of the 1st layer are arranged at 1 or 2 subcarrier positions in 4 OFDM symbols. DRSs of the 1st layer are arranged at 6 REs in 2 RBs (i.e., in a pair of RBs) that are consecutive in time in one subframe.

In an embodiment D-14-(2), DRSs of the 1st and 2nd layers, which are multiplexed according to a CDM scheme, are arranged at all REs, at which the DRSs are located in the embodiment D-14-(1).

In an embodiment D-14-(3), for rank-8 transmission, the same DRS pattern for the 1st and 2nd layers as that of the embodiment D-14-(2) is used without change and, in addition, a pattern of DRSs for the 3rd to 8th layers is defined. DRSs of the 3rd and 4th layers are arranged at 4 REs. DRSs of the 3rd and 4th layers are arranged at contiguous subcarriers in one OFDM symbol to be multiplexed according to an FDM scheme. DRSs of the 5th to 8th layers are arranged at 4 REs and each set of DRSs of the 5th to 8th layers is multiplexed at each RE according to a CDM scheme.

In an embodiment D-14-(4), for rank-8 transmission, the same DRS pattern for the 1st and 2nd layers as that of the embodiment D-14-(2) is used without change and, in addition, a pattern of DRSs for the 3rd to 8th layers is defined. DRSs of the 3rd, 5th, and 7th layers are arranged at 6 REs and each set of DRSs of the 3rd, 5th, and 7th layers is multiplexed at each RE according to a CDM scheme. DRSs of the 4th, 6th, and 8th layers are arranged at 6 REs and each set of DRSs of the 4th, 6th, and 8th layers is multiplexed at each RE according to a CDM scheme.

In an embodiment D-14-(5), for rank-8 transmission, the same DRS pattern for the 1st and 2nd layers as that of the embodiment D-14-(2) is used without change and, in addition, a pattern of DRSs for the 3rd to 8th layers is defined. DRSs of the 3rd and 4th layers are arranged at 6 REs and each set of DRSs of the 3rd and 4th layers is multiplexed at each RE according to a CDM scheme. DRSs of the 5th and 6th layers are arranged at 4 REs and each set of DRSs of the 5th and 6th layers is multiplexed at each RE according to a CDM scheme. DRSs of the 7th and 8th layers are arranged at 4 REs and each set of DRSs of the 7th and 8th layers is multiplexed at each RE according to a CDM scheme.

Embodiments D-14-(6) to D-14-(10) shown in FIG. 54 are modifications of the embodiments D-14-(1) to D-14-(5) of FIG. 53, in which the DRSs, which are located at the 12th OFDM symbol in the embodiments D-14-(1) to D-14-(5), are located at the 13th OFDM symbol.

Embodiment D-15

TABLE 31

| | | |
|---|---|---|
| (1) | A(l, k)= | {(3, 0), (3, 9), (6, 3), (9, 6), (12, 0), (12, 9)} |
| (2) | A(l, k)= | {(6, 3), (9, 6)} |
| | B(l, k)= | {(6, 6), (9, 3)} |
| | A/B(l, k)= | {(3, 0), (3, 9), (12, 0), (12, 9)} |
| (3) | A(l, k)= | {(6, 3), (9, 6)} |
| | B(l, k)= | {(6, 6), (9, 3)} |
| | A/B(l, k)= | {(3, 0), (3, 9), (12, 0), (12, 9)} |
| | C(l, k)= | {(5, 4), (5, 10), (10, 0), (10, 7)} |
| | D(l, k)= | {(5, 5), (5, 11), (10, 1), (10, 8)} |
| | E~H(l, k)= | {(5, 0), (5, 7), (10, 3), (10, 10)} |
| (4) | A(l, k)= | {(6, 3), (9, 6)} |
| | B(l, k)= | {(6, 6), (9, 3)} |
| | A/B(l, k)= | {(3, 0), (3, 9), (12, 0), (12, 9)} |
| | C/E/G(l, k)= | {(5, 2), (5, 6), (5, 10), (10, 0), (10, 4), (10, 8)} |
| | D/F/H(l, k)= | {(5, 3), (5, 7), (5, 11), (10, 1), (10, 5), (10, 9)} |
| (5) | A(l, k)= | {(6, 3), (9, 6)} |
| | B(l, k)= | {(6, 6), (9, 3)} |
| | A/B(l, k)= | {(3, 0), (3, 9), (12, 0), (12, 9)} |
| | C/D(l, k)= | {(3, 3), (3, 6), (6, 0), (6, 9)} |
| | E/F(l, k)= | {(9, 0), (9, 9), (12, 3), (12, 6)} |
| | G/H(l, k)= | {(10, 0), (10, 3), (10, 6), (10, 9)} |
| (6) | A(l, k)= | {(3, 0), (3, 9), (6, 3), (9, 6), (13, 0), (13, 9)} |
| (7) | A(l, k)= | {(6, 3), (9, 6)} |
| | B(l, k)= | {(6, 6), (9, 3)} |
| | A/B(l, k)= | {(3, 0), (3, 9), (13, 0), (13, 9)} |
| (8) | A(l, k)= | {(6, 3), (9, 6)} |
| | B(l, k)= | {(6, 6), (9, 3)} |
| | A/B(l, k)= | {(3, 0), (3, 9), (13, 0), (13, 9)} |
| | C(l, k)= | {(5, 4), (5, 10), (10, 0), (10, 7)} |
| | D(l, k)= | {(5, 5), (5, 11), (10, 1), (10, 8)} |
| | E~H(l, k)= | {(5, 0), (5, 7), (10, 3), (10, 10)} |
| (9) | A(l, k)= | {(6, 3), (9, 6)} |
| | B(l, k)= | {(6, 6), (9, 3)} |
| | A/B(l, k)= | {(3, 0), (3, 9), (13, 0), (13, 9)} |
| | C/E/G(l, k)= | {(5, 2), (5, 6), (5, 10), (10, 0), (10, 4), (10, 8)} |
| | D/F/H(l, k)= | {(5, 3), (5, 7), (5, 11), (10, 1), (10, 5), (10, 9)} |
| (10) | A(l, k)= | {(6, 3), (9, 6)} |
| | B(l, k)= | {(6, 6), (9, 3)} |
| | A/B(l, k)= | {(3, 0), (3, 9), (13, 0), (13, 9)} |
| | C/D(l, k)= | {(3, 3), (3, 6), (6, 0), (6, 9)} |
| | E/F(l, k)= | {(9, 0), (9, 9), (13, 3), (13, 6)} |
| | G/H(l, k)= | {(10, 0), (10, 3), (10, 6), (10, 9)} |

As shown in FIG. 55, in an embodiment D-15-(1), for rank-1 transmission, DRSs of the 1st layer are arranged at 1 or 2 subcarrier positions in 4 OFDM symbols. DRSs of the 1st layer are arranged at 6 REs in 2 RBs (i.e., in a pair of RBs) that are consecutive in time in one subframe.

In an embodiment D-15-(2), DRSs of the 1st and 2nd layers, which are multiplexed according to a CDM scheme, are arranged at 4 REs from among the REs, at which the DRSs are located in the embodiment D-15-(1). In addition, DRSs of the 2nd layer are arranged at 2 REs in addition to the REs, at which the DRSs are located in the embodiment D-15-(1).

In an embodiment D-15-(3), for rank-8 transmission, the same DRS pattern for the 1st and 2nd layers as that of the embodiment D-15-(2) is used without change and, in addition, a pattern of DRSs for the 3rd to 8th layers is defined. DRSs of the 3rd and 4th layers are arranged at 4 REs. DRSs of the 3rd and 4th layers are arranged at contiguous subcarriers in one OFDM symbol to be multiplexed according to an FDM scheme. DRSs of the 5th to 8th layers are arranged at 4 REs and each set of DRSs of the 5th to 8th layers is multiplexed at each RE according to a CDM scheme.

In an embodiment D-15-(4), for rank-8 transmission, the same DRS pattern for the 1st and 2nd layers as that of the embodiment D-15-(2) is used without change and, in addition, a pattern of DRSs for the 3rd to 8th layers is defined. DRSs of the 3rd, 5th, and 7th layers are arranged at 6 REs and each set of DRSs of the 3rd, 5th, and 7th layers is multiplexed at each RE according to a CDM scheme. DRSs of the 4th, 6th, and 8th layers are arranged at 6 REs and each set of DRSs of the 4th, 6th, and 8th layers is multiplexed at each RE according to a CDM scheme.

In an embodiment D-15-(5), for rank-8 transmission, the same DRS pattern for the 1st and 2nd layers as that of the embodiment D-15-(2) is used without change and, in addition, a pattern of DRSs for the 3rd to 8th layers is defined. DRSs of the 3rd and 4th layers are arranged at 4 REs and each set of DRSs of the 3rd and 4th layers is multiplexed at each RE according to a CDM scheme. DRSs of the 5th and 6th layers are arranged at 4 REs and each set of DRSs of the 5th and 6th layers is multiplexed at each RE according to a CDM scheme. DRSs of the 7th and 8th layers are arranged at 4 REs and each set of DRSs of the 7th and 8th layers is multiplexed at each RE according to a CDM scheme.

Embodiments D-15-(6) to D-15-(10) shown in FIG. 56 are modifications of the embodiments D-15-(1) to D-15-(5) of FIG. 55, in which the DRSs, which are located at the 12th OFDM symbol in the embodiments D-15-(1) to D-15-(5), are located at the 13th OFDM symbol.

Embodiment D-16

TABLE 32

| | | |
|---|---|---|
| (1) | A(l, k)= | {(3, 0), (3, 9), (5, 0), (5, 9), (6, 3), (6, 6), (9, 3), (9, 6), (10, 0), (10, 9), (12, 0), (12, 9)} |
| (2) | A(l, k)= | {(3, 0), (3, 9), (6, 3), (9, 6), (12, 0), (12, 9)} |
| | B(l, k)= | {(5, 0), (5, 9), (6, 6), (9, 3), (10, 0), (10, 9)} |
| (3) | A(l, k)= | {(3, 0), (3, 9), (6, 3), (9, 6), (12, 0), (12, 9)} |
| | B(l, k)= | {(5, 0), (5, 9), (6, 6), (9, 3), (10, 0), (10, 9)} |
| | C~H(l, k)= | {(3, 3), (3, 6), (6, 0), (6, 9), (9, 0), (9, 9), (12, 3), (12, 6)} |
| (4) | A(l, k)= | {(3, 0), (3, 9), (6, 3), (9, 6), (12, 0), (12, 9)} |
| | B(l, k)= | {(5, 0), (5, 9), (6, 6), (9, 3), (10, 0), (10, 9)} |
| | C/D(l, k)= | {(3, 3), (3, 6), (6, 0), (6, 9)} |
| | E/F(l, k)= | {(9, 0), (9, 9), (12, 3), (12, 6)} |
| | G/H(l, k)= | {(5, 3), (5, 6), (10, 3), (10, 6)} |
| (5) | A(l, k)= | {(3, 0), (3, 9), (6, 3), (9, 6), (12, 0), (12, 9)} |
| | B(l, k)= | {(5, 0), (5, 9), (6, 6), (9, 3), (10, 0), (10, 9)} |
| | C~E(l, k)= | {(3, 6), (6, 9), (9, 0), (12, 3)} |
| | F~H(l, k)= | {(3, 3), (6, 0), (9, 9), (12, 6)} |
| (6) | A(l, k)= | {(3, 0), (3, 9), (5, 0), (5, 9), (6, 3), (6, 6), (9, 3), (9, 6), (10, 0), (10, 9), (13, 0), (13, 9)} |
| (7) | A(l, k)= | {(3, 0), (3, 9), (6, 3), (9, 6), (13, 0), (13, 9)} |
| | B(l, k)= | {(5, 0), (5, 9), (6, 6), (9, 3), (10, 0), (10, 9)} |
| (8) | A(l, k)= | {(3, 0), (3, 9), (6, 3), (9, 6), (13, 0), (13, 9)} |
| | B(l, k)= | {(5, 0), (5, 9), (6, 6), (9, 3), (10, 0), (10, 9)} |
| | C~H(l, k)= | {(3, 3), (3, 6), (6, 0), (6, 9), (9, 0), (9, 9), (13, 3), (13, 6)} |
| (9) | A(l, k)= | {(3, 0), (3, 9), (6, 3), (9, 6), (13, 0), (13, 9)} |
| | B(l, k)= | {(5, 0), (5, 9), (6, 6), (9, 3), (10, 0), (10, 9)} |
| | C/D(l, k)= | {(3, 3), (3, 6), (6, 0), (6, 9)} |
| | E/F(l, k)= | {(9, 0), (9, 9), (13, 3), (13, 6)} |
| | G/H(l, k)= | {(5, 3), (5, 6), (10, 3), (10, 6)} |
| (10) | A(l, k)= | {(3, 0), (3, 9), (6, 3), (9, 6), (13, 0), (13, 9)} |
| | B(l, k)= | {(5, 0), (5, 9), (6, 6), (9, 3), (10, 0), (10, 9)} |
| | C~E(l, k)= | {(3, 6), (6, 9), (9, 0), (13, 3)} |
| | F~H(l, k)= | {(3, 3), (6, 0), (9, 9), (13, 6)} |

As shown in FIG. 57, in an embodiment D-16-(1), for rank-1 transmission, DRSs of the 1st layer are arranged at 2 subcarrier positions in 6 OFDM symbols. DRSs of the 1st layer are arranged at 12 REs in 2 RBs (i.e., in a pair of RBs) that are consecutive in time in one subframe.

In an embodiment D-16-(2), DRSs of the 2nd layer are arranged at 6 REs from among the REs, at which the DRSs are located in the embodiment D-16-(1). Accordingly, DRSs of each of the 1st and 2nd layers are arranged at 6 REs.

In an embodiment D-16-(3), for rank-8 transmission, the same DRS pattern for the 1st and 2nd layers as that of the embodiment D-16-(2) is used without change and, in addition, a pattern of DRSs for the 3rd to 8th layers is defined. DRSs of the 5th to 8th layers are arranged at 8 REs and each set of DRSs of the 5th to 8th layers is multiplexed at each RE according to a CDM scheme.

In an embodiment D-16-(4), for rank-8 transmission, the same DRS pattern for the 1st and 2nd layers as that of the embodiment D-16-(2) is used without change and, in addition, a pattern of DRSs for the 3rd to 8th layers is defined. DRSs of the 3rd and 4th layers are arranged at 4 REs and each set of DRSs of the 3rd and 4th layers is multiplexed at each RE according to a CDM scheme. DRSs of the 5th and 6th layers are arranged at 4 REs and each set of DRSs of the 5th and 6th layers is multiplexed at each RE according to a CDM scheme. DRSs of the 7th and 8th layers are arranged at 4 REs and each set of DRSs of the 7th and 8th layers is multiplexed at each RE according to a CDM scheme.

In an embodiment D-16-(5), for rank-8 transmission, the same DRS pattern for the 1st and 2nd layers as that of the embodiment D-16-(2) is used without change and, in addition, a pattern of DRSs for the 3rd to 8th layers is defined. DRSs of the 3rd to 5th layers are arranged at 4 REs and each set of DRSs of the 3rd to 5th layers is multiplexed at each RE according to a CDM scheme. DRSs of the 6th to 8th layers are arranged at 4 REs and each set of DRSs of the 6th to 8th layers is multiplexed at each RE according to a CDM scheme.

Figure 58:
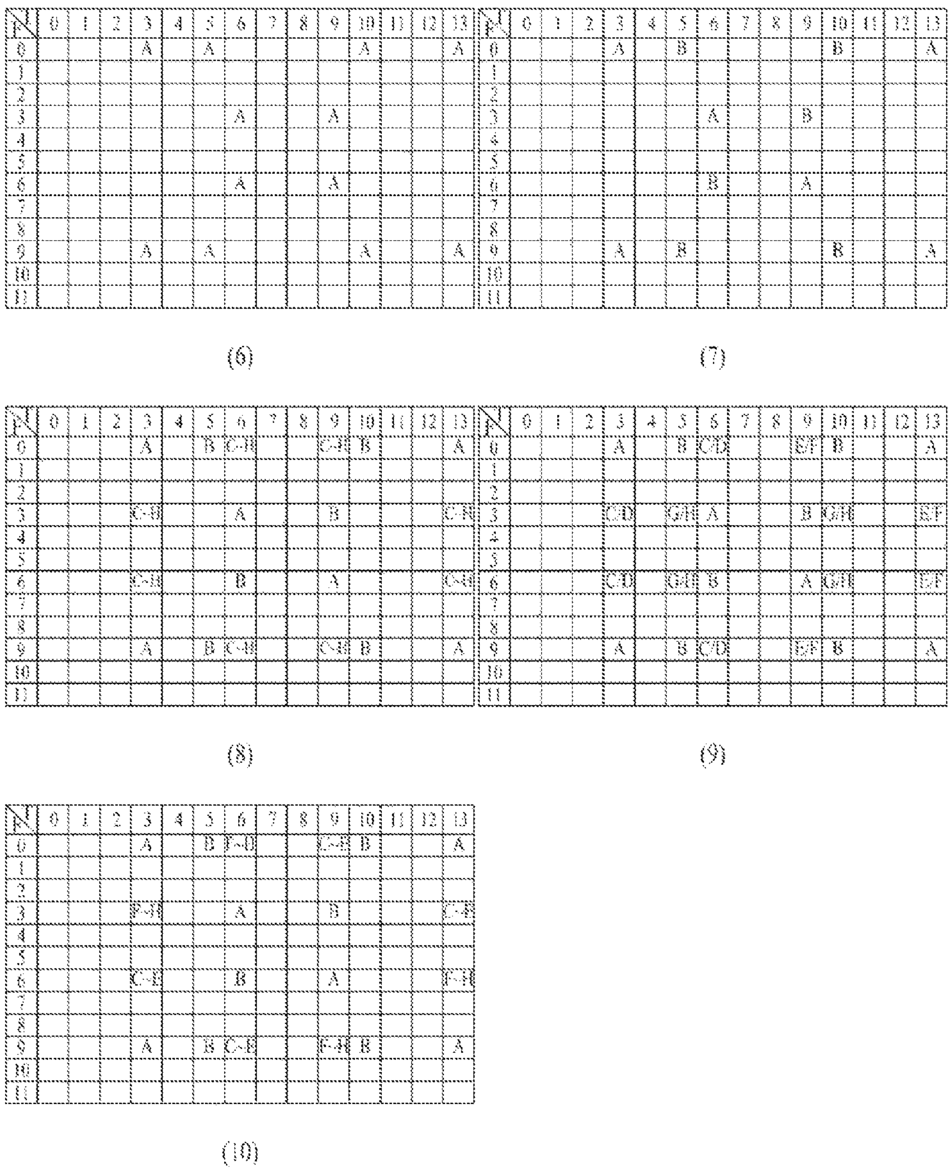

Embodiments D-16-(6) to D-16-(10) shown in FIG. 58 are modifications of the embodiments D-16-(1) to D-16-(5) of FIG. 57, in which the DRSs, which are located at the 12th OFDM symbol in the embodiments D-16-(1) to D-16-(5), are located at the 13th OFDM symbol.

Embodiment D-17

TABLE 33

| | | |
|---|---|---|
| (1) | A(l, k) = | {(3, 0), (3, 9), (5, 3), (5, 6), (6, 0), (6, 9), (9, 0), (9, 9), (10, 3), (10, 6), (12, 0), (12, 9)} |
| (2) | A(l, k) = | {(3, 0), (3, 9), (6, 3), (9, 6), (12, 0), (12, 9)} |
| | B(l, k) = | {(5, 0), (5, 9), (6, 6), (9, 3), (10, 0), (10, 9)} |
| (3) | A(l, k) = | {(3, 0), (3, 9), (6, 3), (9, 6), (12, 0), (12, 9)} |
| | B(l, k) = | {(5, 0), (5, 9), (6, 6), (9, 3), (10, 0), (10, 9)} |
| | C~H(l, k) = | {(3, 3), (3, 6), (6, 0), (6, 9), (9, 0), (9, 9), (12, 3), (12, 6)} |
| (4) | A(l, k) = | {(3, 0), (3, 9), (5, 3), (5, 6), (6, 0), (6, 9), (9, 0), (9, 9), (10, 3), (10, 6), (13, 0), (13, 9)} |
| (5) | A(l, k) = | {(3, 0), (3, 9), (6, 3), (9, 6), (13, 0), (13, 9)} |
| | B(l, k) = | {(5, 0), (5, 9), (6, 6), (9, 3), (10, 0), (10, 9)} |
| (6) | A(l, k) = | {(3, 0), (3, 9), (6, 3), (9, 6), (13, 0), (13, 9)} |
| | B(l, k) = | {(5, 0), (5, 9), (6, 6), (9, 3), (10, 0), (10, 9)} |
| | C~H(l, k) = | {(3, 3), (3, 6), (6, 0), (6, 9), (9, 0), (9, 9), (13, 3), (13, 6)} |

Figure 59:
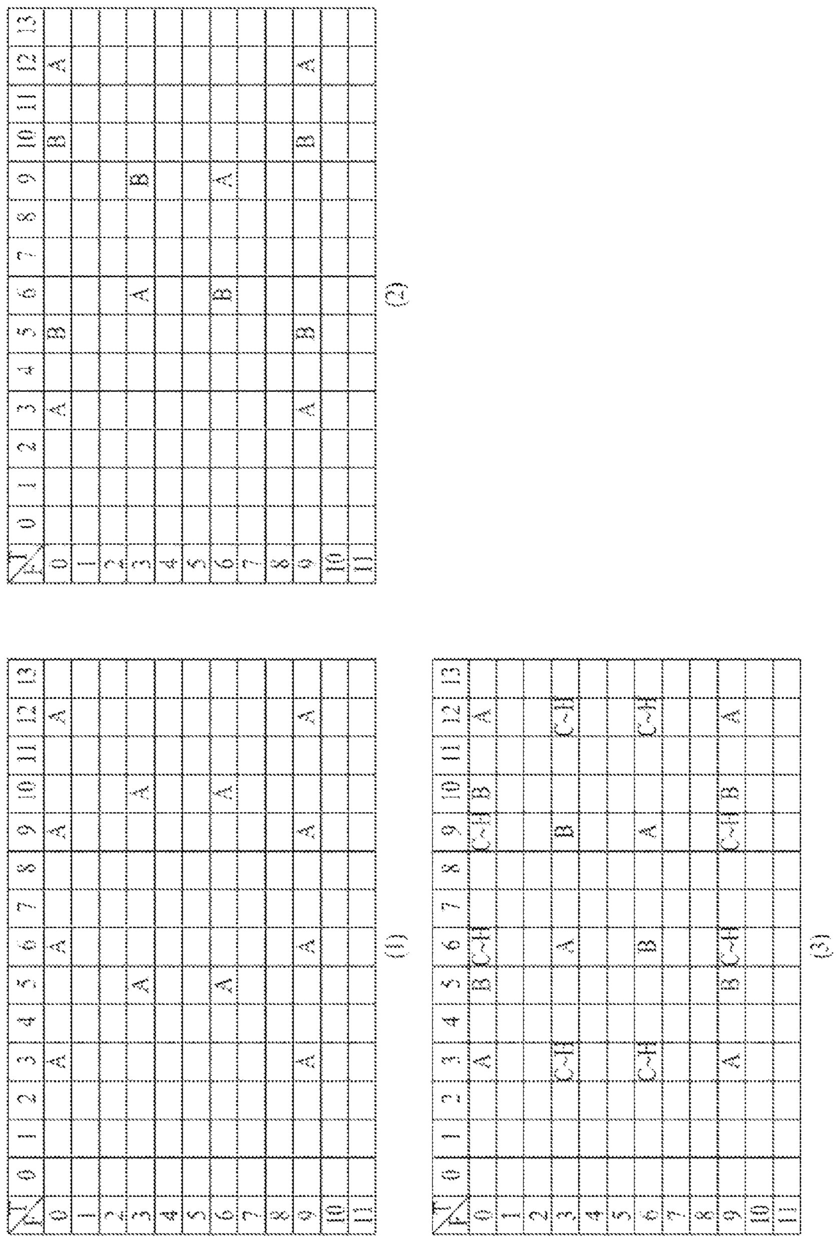

As shown in FIG. 59, in an embodiment D-17-(1), for rank-1 transmission, DRSs of the 1st layer are arranged at 2 subcarrier positions in 6 OFDM symbols. DRSs of the 1st layer are arranged at 12 REs in 2 RBs (i.e., in a pair of RBs) that are consecutive in time in one subframe.

In an embodiment D-17-(2), DRSs of the 2nd layer are arranged at 6 REs from among the REs, at which the DRSs are located in the embodiment D-17-(1). Accordingly, DRSs of each of the 1st and 2nd layers are arranged at 6 REs.

In an embodiment D-17-(3), for rank-8 transmission, the same DRS pattern for the 1st and 2nd layers as that of the embodiment D-17-(2) is used without change and, in addition, a pattern of DRSs for the 3rd to 8th layers is defined. DRSs of the 5th to 8th layers are arranged at 8 REs and each set of DRSs of the 5th to 8th layers is multiplexed at each RE according to a CDM scheme.

Embodiments D-17-(4) and D-17-(6) shown in FIG. 60 are modifications of the embodiments D-17-(1) to D-17-(3) of FIG. 59, in which the DRSs, which are located at the 12th OFDM symbol in the embodiments D-17-(1) to D-17-(3), are located at the 13th OFDM symbol.

Embodiment D-18

TABLE 34

| | | |
|---|---|---|
| (1) | A(l, k) = | {(3, 0), (3, 3), (3, 6), (3, 9), (6, 3), (6, 6), (9, 6), (9, 9), (12, 2), (12, 5), (12, 8), (12, 11)} |
| (2) | A(l, k) = | {(3, 0), (3, 6), (6, 3), (9, 6), (12, 2), (12, 8)} |
| | B(l, k) = | {(3, 3), (3, 9), (6, 6), (9, 9), (12, 5), (12, 11)} |
| (3) | A(l, k) = | {(3, 0), (3, 6), (6, 3), (9, 6), (12, 2), (12, 8)} |
| | B(l, k) = | {(3, 3), (3, 9), (6, 6), (9, 9), (12, 5), (12, 11)} |
| | C(l, k) = | {(5, 4), (5, 10), (10, 0), (10, 7)} |
| | D(l, k) = | {(5, 5), (5, 11), (10, 1), (10, 8)} |
| | E~H(l, k) = | {(5, 0), (5, 7), (10, 3), (10, 10)} |
| (4) | A(l, k) = | {(3, 0), (3, 6), (6, 3), (9, 6), (12, 2), (12, 8)} |
| | B(l, k) = | {(3, 3), (3, 9), (6, 6), (9, 9), (12, 5), (12, 11)} |
| | C/E/G(l, k) = | {(5, 2), (5, 6), (5, 10), (10, 0), (10, 4), (10, 8)} |
| | D/F/H(l, k) = | {(5, 3), (5, 7), (5, 11), (10, 1), (10, 5), (10, 9)} |
| (5) | A(l, k) = | {(3, 0), (3, 3), (3, 6), (3, 9), (6, 3), (6, 6), (9, 6), (9, 9), (13, 2), (13, 5), (13, 8), (13, 11)} |
| (6) | A(l, k) = | {(3, 0), (3, 6), (6, 3), (9, 6), (13, 2), (13, 8)} |
| | B(l, k) = | {(3, 3), (3, 9), (6, 6), (9, 9), (13, 5), (13, 11)} |
| (7) | A(l, k) = | {(3, 0), (3, 6), (6, 3), (9, 6), (13, 2), (13, 8)} |
| | B(l, k) = | {(3, 3), (3, 9), (6, 6), (9, 9), (13, 5), (13, 11)} |
| | C(l, k) = | {(5, 4), (5, 10), (10, 0), (10, 7)} |
| | D(l, k) = | {(5, 5), (5, 11), (10, 1), (10, 8)} |
| | E~H(l, k) = | {(5, 0), (5, 7), (10, 3), (10, 10)} |
| (8) | A(l, k) = | {(3, 0), (3, 6), (6, 3), (9, 6), (13, 2), (13, 8)} |
| | B(l, k) = | {(3, 3), (3, 9), (6, 6), (9, 9), (13, 5), (13, 11)} |
| | C/E/G(l, k) = | {(5, 2), (5, 6), (5, 10), (10, 0), (10, 4), (10, 8)} |
| | D/F/H(l, k) = | {(5, 3), (5, 7), (5, 11), (10, 1), (10, 5), (10, 9)} |

Figure 61:
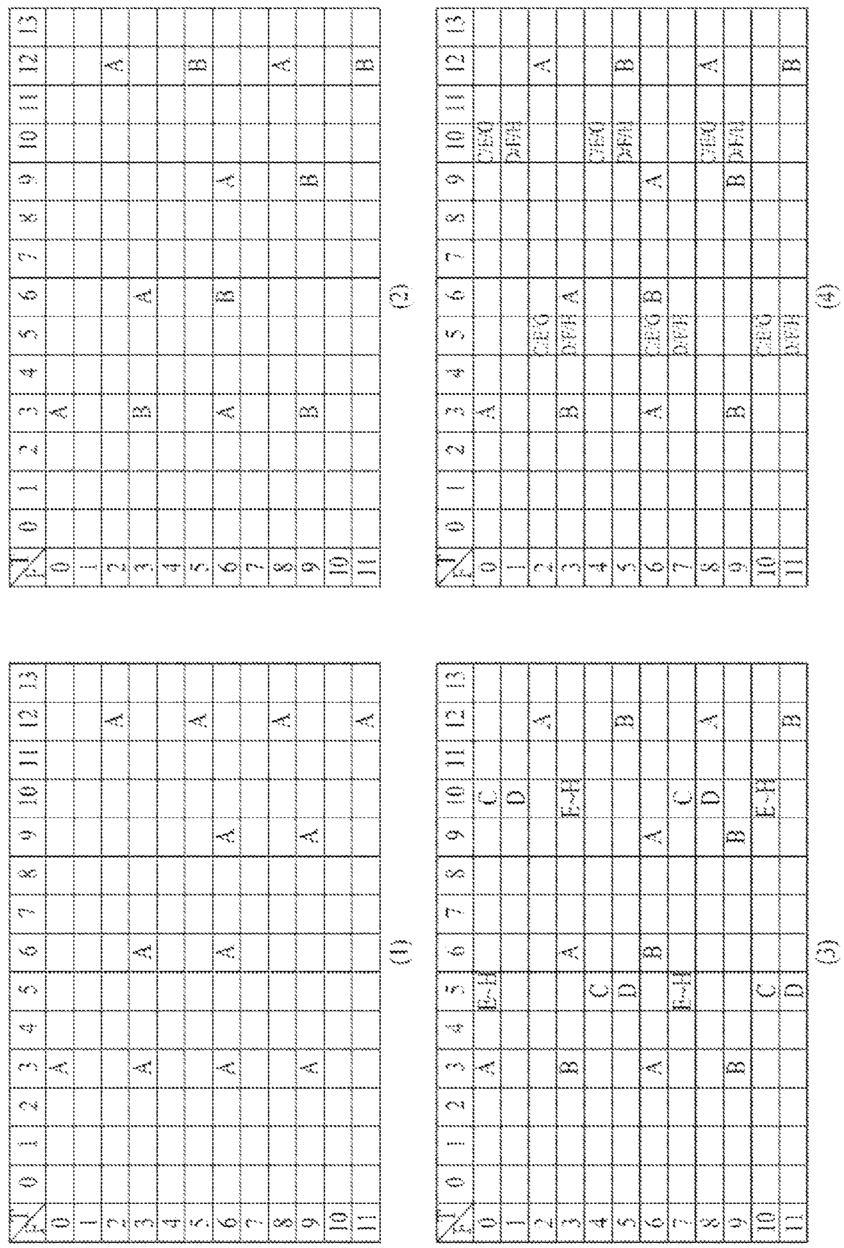

As shown in FIG. 61, in an embodiment D-18-(1), for rank-1 transmission, DRSs of the 1st layer are arranged at 2 or 4 subcarrier positions in 4 OFDM symbols. DRSs of the 1st layer are arranged at 12 REs in 2 RBs (i.e., in a pair of RBs) that are consecutive in time in one subframe.

In an embodiment D-18-(2), DRSs of the 2nd layer are arranged at 6 REs from among the REs, at which the DRSs are located in the embodiment D-18-(1). Accordingly, DRSs of each of the 1st and 2nd layers are arranged at 6 REs.

In an embodiment D-18-(3), for rank-8 transmission, the same DRS pattern for the 1st and 2nd layers as that of the embodiment D-18-(2) is used without change and, in addition, a pattern of DRSs for the 3rd to 8th layers is defined. DRSs of the 3rd to 4th layers are arranged at 4 REs and each set of DRSs of the 3rd and 4th layers are multiplexed at contiguous subcarriers in one OFDM symbol according to a FDM scheme. DRSs of the 5th to 8th layers are arranged at 4 REs and each set of DRSs of the 5th to 8th layers is multiplexed at each RE according to a CDM scheme.

In an embodiment D-18-(4), for rank-8 transmission, the same DRS pattern for the 1st and 2nd layers as that of the embodiment D-18-(2) is used without change and, in addition, a pattern of DRSs for the 3rd to 8th layers is defined. DRSs of the 3rd, 5th, and 7th layers are arranged at 6 REs and each set of DRSs of the 3rd, 5th, and 7th layers is multiplexed at each RE according to a CDM scheme. DRSs of the 4th, 6th, and 8th layers are arranged at 6 REs and each set of DRSs of the 4th, 6th, and 8th layers is multiplexed at each RE according to a CDM scheme.

Figure 62:
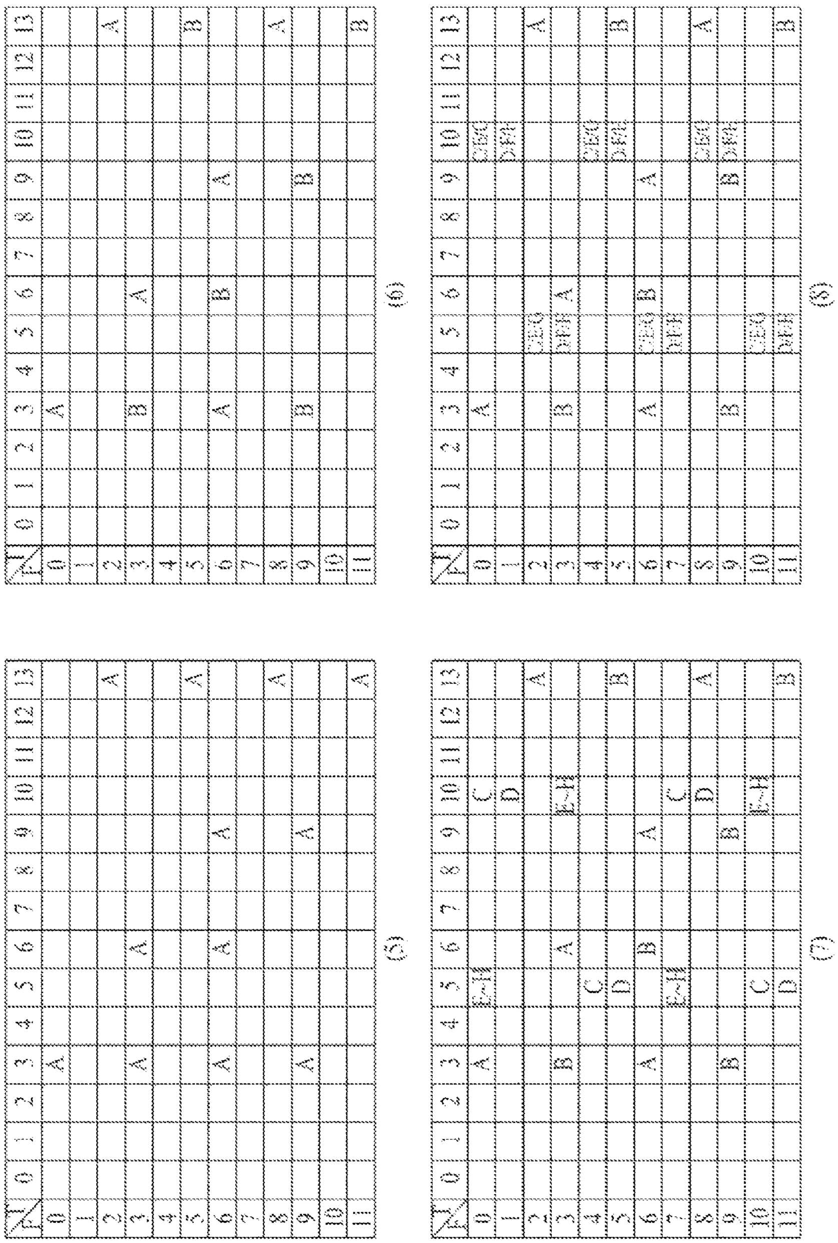

Embodiments D-18-(5) to D-18-(8) shown in FIG. 62 are modifications of the embodiments D-18-(1) to D-18-(4) of FIG. 61, in which the DRSs, which are located at the 12th OFDM symbol in the embodiments D-18-(1) to D-18-(4), are located at the 13th OFDM symbol.

Embodiment D-19

TABLE 35

| | | |
|---|---|---|
| (1) | A(l, k) = | {(3, 0), (3, 3), (3, 6), (3, 9), (6, 1), (6, 4), (6, 7), (6, 10), (12, 0), (12, 3), (12, 6), (12, 9)} |
| (2) | A(l, k) = | {(3, 0), (3, 6), (6, 4), (6, 10), (12, 3), (12, 9)} |
| | B(l, k) = | {(3, 3), (3, 9), (6, 1), (6, 7), (12, 0), (12, 6)} |
| (3) | A(l, k) = | {(3, 0), (3, 6), (6, 4), (6, 10), (12, 3), (12, 9)} |
| | B(l, k) = | {(3, 3), (3, 9), (6, 1), (6, 7), (12, 0), (12, 6)} |
| | C(l, k) = | {(5, 4), (5, 10), (10, 0), (10, 7)} |
| | D(l, k) = | {(5, 5), (5, 11), (10, 1), (10, 8)} |
| | E~H(l, k) = | {(5, 0), (5, 7), (10, 3), (10, 10)} |
| (4) | A(l, k) = | {(3, 0), (3, 6), (6, 4), (6, 10), (12, 3), (12, 9)} |
| | B(l, k) = | {(3, 3), (3, 9), (6, 1), (6, 7), (12, 0), (12, 6)} |
| | C/E/G(l, k) = | {(5, 2), (5, 6), (5, 10), (10, 0), (10, 4), (10, 8)} |
| | D/F/H(l, k) = | {(5, 3), (5, 7), (5, 11), (10, 1), (10, 5), (10, 9)} |
| (5) | A(l, k) = | {(3, 0), (3, 3), (3, 6), (3, 9), (6, 1), (6, 4), (6, 7), (6, 10), (13, 0), (13, 3), (13, 6), (13, 9)} |
| (6) | A(l, k) = | {(3, 0), (3, 6), (6, 4), (6, 10), (13, 3), (13, 9)} |
| | B(l, k) = | {(3, 3), (3, 9), (6, 1), (6, 7), (13, 0), (13, 6)} |
| (7) | A(l, k) = | {(3, 0), (3, 6), (6, 4), (6, 10), (13, 3), (13, 9)} |
| | B(l, k) = | {(3, 3), (3, 9), (6, 1), (6, 7), (13, 0), (13, 6)} |
| | C(l, k) = | {(5, 4), (5, 10), (10, 0), (10, 7)} |
| | D(l, k) = | {(5, 5), (5, 11), (10, 1), (10, 8)} |
| | E~H(l, k) = | {(5, 0), (5, 7), (10, 3), (10, 10)} |
| (8) | A(l, k) = | {(3, 0), (3, 6), (6, 4), (6, 10), (13, 3), (13, 9)} |
| | B(l, k) = | {(3, 3), (3, 9), (6, 1), (6, 7), (13, 0), (13, 6)} |
| | C/E/G(l, k) = | {(5, 2), (5, 6), (5, 10), (10, 0), (10, 4), (10, 8)} |
| | D/F/H(l, k) = | {(5, 3), (5, 7), (5, 11), (10, 1), (10, 5), (10, 9)} |

Figure 63:
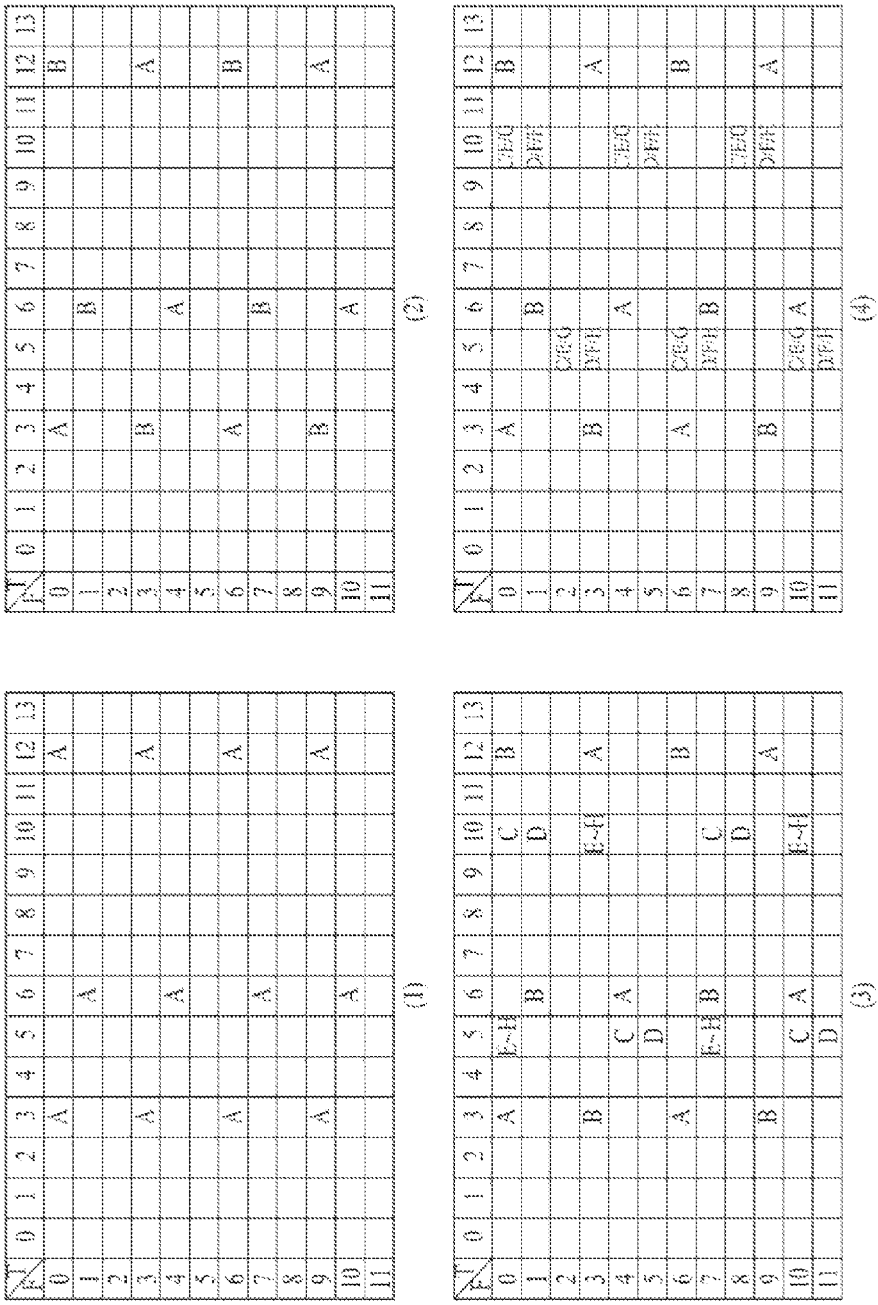

As shown in FIG. 63, in an embodiment D-19-(1), for rank-1 transmission, DRSs of the 1st layer are arranged at 4 subcarrier positions in 3 OFDM symbols. DRSs of the 1st layer are arranged at 12 REs in 2 RBs (i.e., in a pair of RBs) that are consecutive in time in one subframe.

In an embodiment D-19-(2), DRSs of the 2nd layer are arranged at 6 REs from among the REs, at which the DRSs are located in the embodiment D-19-(1). Accordingly, DRSs of each of the 1st and 2nd layers are arranged at 6 REs.

In an embodiment D-19-(3), for rank-8 transmission, the same DRS pattern for the 1st and 2nd layers as that of the embodiment D-19-(2) is used without change and, in addition, a pattern of DRSs for the 3rd to 8th layers is defined. DRSs of the 3rd to 4th layers are arranged at 4 REs and each set of DRSs of the 3rd and 4th layers are multiplexed at contiguous subcarriers in one OFDM symbol according to a FDM scheme. DRSs of the 5th to 8th layers are arranged at 4 REs and each set of DRSs of the 5th to 8th layers is multiplexed at each RE according to a CDM scheme.

In an embodiment D-19-(4), for rank-8 transmission, the same DRS pattern for the 1st and 2nd layers as that of the embodiment D-19-(2) is used without change and, in addition, a pattern of DRSs for the 3rd to 8th layers is defined. DRSs of the 3rd, 5th, and 7th layers are arranged at 6 REs and each set of DRSs of the 3rd, 5th, and 7th layers is multiplexed at each RE according to a CDM scheme. DRSs of the 4th, 6th, and 8th layers are arranged at 6 REs and each set of DRSs of the 4th, 6th, and 8th layers is multiplexed at each RE according to a CDM scheme.

Embodiments D-19-(5) to D-19-(8) shown in FIG. 64 are modifications of the embodiments D-19-(1) to D-19-(4) of FIG. 63, in which the DRSs, which are located at the 12th OFDM symbol in the embodiments D-19-(1) to D-19-(4), are located at the 13th OFDM symbol.

Embodiment D-20

TABLE 36

| | | |
|---|---|---|
| (1) | A(l, k) = | {(3, 1), (3, 7), (10, 1), (10, 7), (12, 1), (12, 7)} |
| | B(l, k) = | {(3, 4), (3, 10), (10, 4), (10, 10), (12, 4), (12, 10)} |
| | C(l, k) = | {(5, 1), (5, 7), (9, 1), (9, 7)} |
| | D(l, k) = | {(6, 4), (6, 10), (9, 4), (9, 10)} |
| | E~H(l, k) = | {(5, 4), (5, 10), (6, 1), (6, 7)} |
| (2) | A(l, k) = | {(3, 0), (3, 6), (10, 0), (10, 6), (12, 0), (12, 6)} |
| | B(l, k) = | {(3, 3), (3, 9), (10, 3), (10, 9), (12, 3), (12, 9)} |
| | C(l, k) = | {(5, 0), (5, 6), (9, 0), (9, 6)} |
| | D(l, k) = | {(6, 3), (6, 9), (9, 3), (9, 9)} |
| | E~H(l, k) = | {(5, 3), (5, 9), (6, 0), (6, 6)} |
| (3) | A(l, k) = | {(3, 2), (3, 8), (10, 2), (10, 8), (12, 2), (12, 8)} |
| | B(l, k) = | {(3, 5), (3, 11), (10, 5), (10, 11), (12, 5), (12, 11)} |
| | C(l, k) = | {(5, 2), (5, 8), (9, 2), (9, 8)} |
| | D(l, k) = | {(6, 5), (6, 11), (9, 5), (9, 11)} |
| | E~H(l, k) = | {(5, 5), (5, 11), (6, 2), (6, 8)} |
| (4) | A(l, k) = | {(3, 1), (3, 7), (10, 1), (10, 7), (12, 1), (12, 7)} |
| | B(l, k) = | {(3, 4), (3, 10), (10, 4), (10, 10), (12, 4), (12, 10)} |
| | C(l, k) = | {(9, 0), (9, 3), (9, 6), (9, 9)} |
| | D(l, k) = | {(9, 1), (9, 4), (9, 7), (9, 10)} |
| | E~H(l, k) = | {(9, 2), (9, 5), (9, 8), (9, 11)} |
| (5) | A(l, k) = | {(3, 0), (3, 6), (10, 1), (10, 7), (12, 2), (12, 8)} |
| | B(l, k) = | {(3, 3), (3, 9), (10, 4), (10, 10), (12, 5), (12, 11)} |
| | C(l, k) = | {(5, 0), (5, 6), (9, 2), (9, 8)} |
| | D(l, k) = | {(6, 4), (6, 10), (9, 5), (9, 11)} |
| | E~H(l, k) = | {(5, 3), (5, 9), (6, 1), (6, 7)} |
| (6) | A(l, k) = | {(3, 2), (3, 8), (10, 1), (10, 7), (12, 0), (12, 6)} |
| | B(l, k) = | {(3, 5), (3, 11), (10, 4), (10, 10), (12, 3), (12, 9)} |
| | C(l, k) = | {(5, 2), (5, 8), (9, 0), (9, 6)} |
| | D(l, k) = | {(6, 4), (6, 10), (9, 3), (9, 9)} |
| | E~H(l, k) = | {(5, 5), (5, 11), (6, 1), (6, 7)} |
| (7) | A(l, k) = | {(3, 0), (3, 6), (10, 0), (10, 6), (12, 0), (12, 6)} |
| | B(l, k) = | {(3, 1), (3, 7), (10, 1), (10, 7), (12, 1), (12, 7)} |
| | C(l, k) = | {(5, 0), (5, 6), (9, 0), (9, 6)} |
| | D(l, k) = | {(6, 1), (6, 7), (9, 1), (9, 7)} |
| | E~H(l, k) = | {(5, 1), (5, 7), (6, 0), (6, 6)} |
| (8) | A(l, k) = | {(3, 1), (3, 7), (10, 2), (10, 8), (12, 3), (12, 9)} |
| | B(l, k) = | {(3, 2), (3, 8), (10, 3), (10, 9), (12, 4), (12, 10)} |
| | C(l, k) = | {(5, 1), (5, 7), (9, 3), (9, 9)} |
| | D(l, k) = | {(6, 3), (6, 9), (9, 4), (9, 10)} |
| | E~H(l, k) = | {(5, 2), (5, 8), (6, 2), (6, 8)} |
| (9) | A(l, k) = | {(3, 2), (3, 8), (10, 3), (10, 9), (12, 4), (12, 10)} |
| | B(l, k) = | {(3, 3), (3, 9), (10, 4), (10, 10), (12, 5), (12, 11)} |
| | C(l, k) = | {(5, 2), (5, 8), (9, 4), (9, 10)} |
| | D(l, k) = | {(6, 4), (6, 10), (9, 5), (9, 11)} |
| | E~H(l, k) = | {(5, 3), (5, 9), (6, 3), (6, 9)} |
| (10) | A(l, k) = | {(3, 2), (3, 8), (10, 2), (10, 8), (12, 2), (12, 8)} |
| | B(l, k) = | {(3, 3), (3, 9), (10, 3), (10, 9), (12, 3), (12, 9)} |
| | C(l, k) = | {(5, 2), (5, 8), (9, 2), (9, 8)} |
| | D(l, k) = | {(6, 3), (6, 9), (9, 3), (9, 9)} |
| | E~H(l, k) = | {(5, 3), (5, 9), (6, 2), (6, 8)} |
| (11) | A(l, k) = | {(3, 0), (3, 6), (10, 2), (10, 8), (12, 4), (12, 10)} |
| | B(l, k) = | {(3, 1), (3, 7), (10, 3), (10, 9), (12, 5), (12, 11)} |
| | C(l, k) = | {(5, 0), (5, 6), (9, 4), (9, 10)} |
| | D(l, k) = | {(6, 3), (6, 9), (9, 5), (9, 11)} |
| | E~H(l, k) = | {(5, 1), (5, 7), (6, 2), (6, 8)} |
| (12) | A(l, k) = | {(3, 1), (3, 7), (10, 1), (10, 7), (12, 1), (12, 7)} |
| | B(l, k) = | {(3, 4), (3, 10), (10, 4), (10, 10), (12, 4), (12, 10)} |
| | C(l, k) = | {(3, 2), (3, 8), (10, 2), (10, 8)} |
| | D(l, k) = | {(3, 5), (3, 11), (10, 5), (10, 11)} |
| | E~H(l, k) = | {(12, 2), (12, 5), (12, 8), (12, 11)} |
| (13) | A(l, k) = | {(3, 0), (3, 6), (10, 0), (10, 6), (12, 0), (12, 6)} |
| | B(l, k) = | {(3, 1), (3, 7), (10, 1), (10, 7), (12, 1), (12, 7)} |
| | C(l, k) = | {(3, 2), (3, 8), (10, 2), (10, 8)} |
| | D(l, k) = | {(3, 3), (3, 9), (10, 3), (10, 9)} |
| | E~H(l, k) = | {(12, 2), (12, 3), (12, 8), (12, 9)} |

Figure 66:
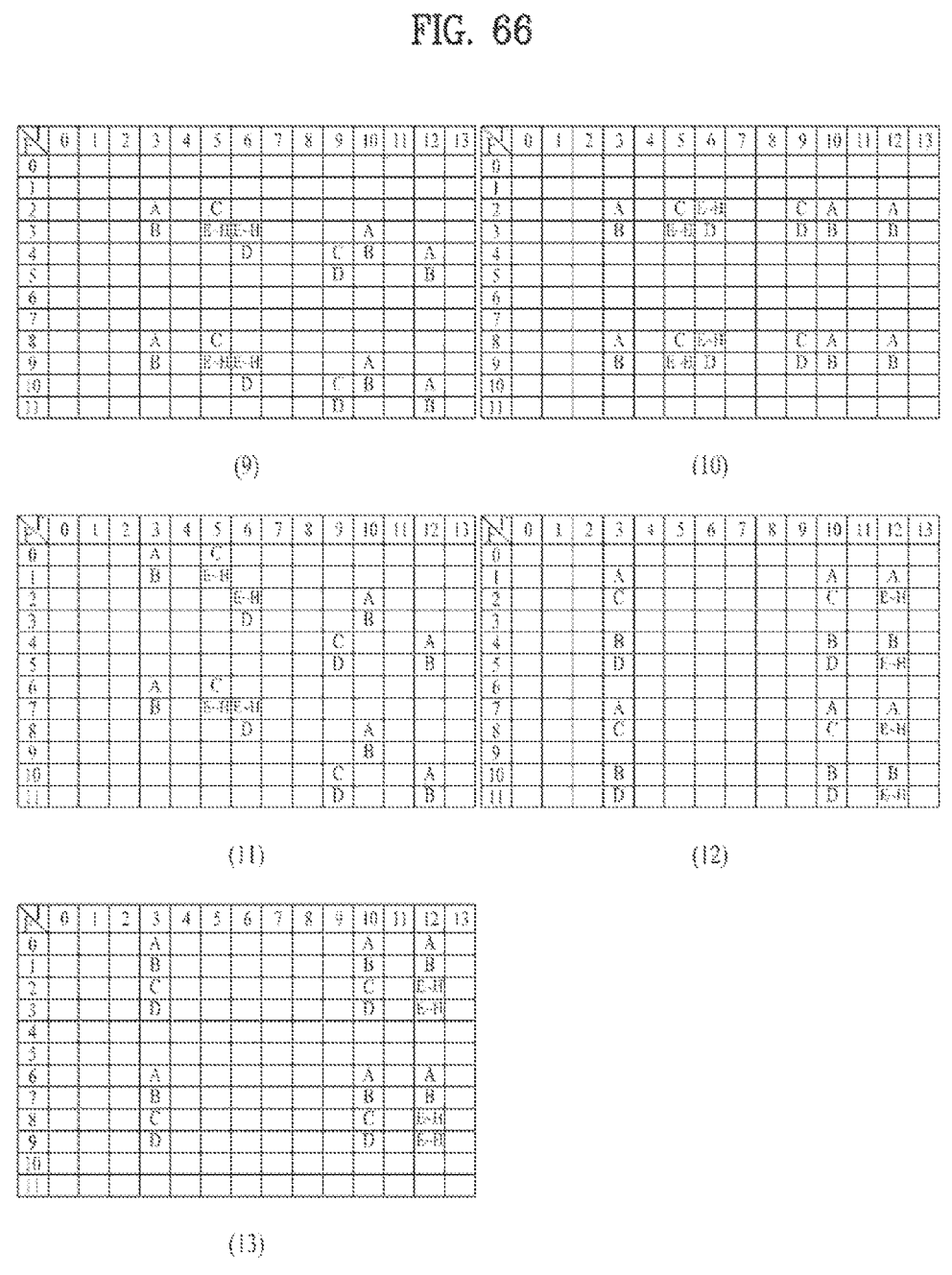

As shown in FIGS. 65 and 66, embodiments D-20-(1) to D-20-(13) define DRS patterns in which DRSs of the 1st to 8th layers are arranged for rank-8 transmission.

DRSs of the 1st and 2nd layers are arranged in the 3rd, 10th, and 12th OFDM symbols and DRSs of the 1st and 2nd layers are alternately arranged at specific subcarrier intervals in each of the OFDM symbols. Accordingly, DRSs of the 1st and 2nd layers are arranged at 12 REs in 2 RBs (i.e., in a pair of RBs) that are consecutive in time in one subframe.

DRSs of each of the 3rd and 4th layers are arranged at 4 REs. The DRSs of the 3rd and 4th layers may be alternately arranged at specific subcarrier intervals in the same OFDM symbol and may also be arranged in different OFDM symbols. Accordingly, DRSs of the 3rd and 4th layers are arranged at 8 REs in 2 RBs (i.e., in a pair of RBs) that are consecutive in time in one subframe.

DRSs of the 5th to 8th layers are arranged at 4 REs in 2 RBs (i.e., in a pair of RBs) that are consecutive in time in one subframe and each set of DRSs of the 5th to 8th layers is multiplexed at each RE according to a CDM scheme.

Embodiment D-21

TABLE 37

| | | |
|---|---|---|
| (1) | A(l, k) = | {(3, 1), (3, 7), (10, 1), (10, 7), (13, 1), (13, 7)} |
| | B(l, k) = | {(3, 4), (3, 10), (10, 4), (10, 10), (13, 4), (13, 10)} |
| | C(l, k) = | {(5, 1), (5, 7), (9, 1), (9, 7)} |
| | D(l, k) = | {(6, 4), (6, 10), (9, 4), (9, 10)} |
| | E~H(l, k) = | {(5, 4), (5, 10), (6, 1), (6, 7)} |
| (2) | A(l, k) = | {(3, 0), (3, 6), (10, 0), (10, 6), (13, 0), (13, 6)} |
| | B(l, k) = | {(3, 3), (3, 9), (10, 3), (10, 9), (13, 3), (13, 9)} |
| | C(l, k) = | {(5, 0), (5, 6), (9, 0), (9, 6)} |
| | D(l, k) = | {(6, 3), (6, 9), (9, 3), (9, 9)} |
| | E~H(l, k) = | {(5, 3), (5, 9), (6, 0), (6, 6)} |
| (3) | A(l, k) = | {(3, 2), (3, 8), (10, 2), (10, 8), (13, 2), (13, 8)} |
| | B(l, k) = | {(3, 5), (3, 11), (10, 5), (10, 11), (13, 5), (13, 11)} |
| | C(l, k) = | {(5, 2), (5, 8), (9, 2), (9, 8)} |
| | D(l, k) = | {(6, 5), (6, 11), (9, 5), (9, 11)} |
| | E~H(l, k) = | {(5, 5), (5, 11), (6, 2), (6, 8)} |
| (4) | A(l, k) = | {(3, 1), (3, 7), (10, 1), (10, 7), (13, 1), (13, 7)} |
| | B(l, k) = | {(3, 4), (3, 10), (10, 4), (10, 10), (13, 4), (13, 10)} |
| | C(l, k) = | {(9, 0), (9, 3), (9, 6), (9, 9)} |
| | D(l, k) = | {(9, 1), (9, 4), (9, 7), (9, 10)} |
| | E~H(l, k) = | {(9, 2), (9, 5), (9, 8), (9, 11)} |
| (5) | A(l, k) = | {(3, 0), (3, 6), (10, 1), (10, 7), (13, 2), (13, 8)} |
| | B(l, k) = | {(3, 3), (3, 9), (10, 4), (10, 10), (13, 5), (13, 11)} |
| | C(l, k) = | {(5, 0), (5, 6), (9, 2), (9, 8)} |
| | D(l, k) = | {(6, 4), (6, 10), (9, 5), (9, 11)} |
| | E~H(l, k) = | {(5, 3), (5, 9), (6, 1), (6, 7)} |
| (6) | A(l, k) = | {(3, 2), (3, 8), (10, 1), (10, 7), (13, 0), (13, 6)} |
| | B(l, k) = | {(3, 5), (3, 11), (10, 4), (10, 10), (13, 3), (13, 9)} |
| | C(l, k) = | {(5, 2), (5, 8), (9, 0), (9, 6)} |
| | D(l, k) = | {(6, 4), (6, 10), (9, 3), (9, 9)} |
| | E~H(l, k) = | {(5, 5), (5, 11), (6, 1), (6, 7)} |
| (7) | A(l, k) = | {(3, 0), (3, 6), (10, 0), (10, 6), (13, 0), (13, 6)} |
| | B(l, k) = | {(3, 1), (3, 7), (10, 1), (10, 7), (13, 1), (13, 7)} |
| | C(l, k) = | {(5, 0), (5, 6), (9, 0), (9, 6)} |
| | D(l, k) = | {(6, 1), (6, 7), (9, 1), (9, 7)} |
| | E~H(l, k) = | {(5, 1), (5, 7), (6, 0), (6, 6)} |
| (8) | A(l, k) = | {(3, 1), (3, 7), (10, 2), (10, 8), (13, 3), (13, 9)} |
| | B(l, k) = | {(3, 2), (3, 8), (10, 3), (10, 9), (13, 4), (13, 10)} |
| | C(l, k) = | {(5, 1), (5, 7), (9, 3), (9, 9)} |
| | D(l, k) = | {(6, 3), (6, 9), (9, 4), (9, 10)} |
| | E~H(l, k) = | {(5, 2), (5, 8), (6, 2), (6, 8)} |
| (9) | A(l, k) = | {(3, 2), (3, 8), (10, 3), (10, 9), (13, 4), (13, 10)} |
| | B(l, k) = | {(3, 3), (3, 9), (10, 4), (10, 10), (13, 5), (13, 11)} |
| | C(l, k) = | {(5, 2), (5, 8), (9, 4), (9, 10)} |
| | D(l, k) = | {(6, 4), (6, 10), (9, 5), (9, 11)} |
| | E~H(l, k) = | {(5, 3), (5, 9), (6, 3), (6, 9)} |
| (10) | A(l, k) = | {(3, 2), (3, 8), (10, 2), (10, 8), (13, 2), (13, 8)} |
| | B(l, k) = | {(3, 3), (3, 9), (10, 3), (10, 9), (13, 3), (13, 9)} |
| | C(l, k) = | {(5, 2), (5, 8), (9, 2), (9, 8)} |
| | D(l, k) = | {(6, 3), (6, 9), (9, 3), (9, 9)} |
| | E~H(l, k) = | {(5, 3), (5, 9), (6, 2), (6, 8)} |
| (11) | A(l, k) = | {(3, 0), (3, 6), (10, 2), (10, 8), (13, 4), (13, 10)} |
| | B(l, k) = | {(3, 1), (3, 7), (10, 3), (10, 9), (13, 5), (13, 11)} |
| | C(l, k) = | {(5, 0), (5, 6), (9, 4), (9, 10)} |
| | D(l, k) = | {(6, 3), (6, 9), (9, 5), (9, 11)} |
| | E~H(l, k) = | {(5, 1), (5, 7), (6, 2), (6, 8)} |
| (12) | A(l, k) = | {(3, 1), (3, 7), (10, 1), (10, 7), (13, 1), (13, 7)} |
| | B(l, k) = | {(3, 4), (3, 10), (10, 4), (10, 10), (13, 4), (13, 10)} |
| | C(l, k) = | {(3, 2), (3, 8), (10, 2), (10, 8)} |
| | D(l, k) = | {(3, 5), (3, 11), (10, 5), (10, 11)} |
| | E~H(l, k) = | {(13, 2), (13, 5), (13, 8), (13, 11)} |

TABLE 37-continued

| | | |
|---|---|---|
| (13) | A(l, k) = | {(3, 0), (3, 6), (10, 0), (10, 6), (13, 0), (13, 6)} |
| | B(l, k) = | {(3, 1), (3, 7), (10, 1), (10, 7), (13, 1), (13, 7)} |
| | C(l, k) = | {(3, 2), (3, 8), (10, 2), (10, 8)} |
| | D(l, k) = | {(3, 3), (3, 9), (10, 3), (10, 9)} |
| | E~H(l, k) = | {(13, 2), (13, 3), (13, 8), (13, 9)} |

Embodiments D-21-(1) to D-21-(13) shown in FIGS. 67 and 68 are modifications of the embodiments D-20-(1) to D-20-(13) of FIGS. 65 and 66, in which the DRSs, which are located at the 12th OFDM symbol in the embodiments D-20-(1) to D-20-(13), are located at the 13th OFDM symbol.

Embodiment D-22

TABLE 38

| | | |
|---|---|---|
| (1) | A(l, k) = | {(3, 1), (3, 7), (8, 1), (8, 7), (12, 1), (12, 7)} |
| | B(l, k) = | {(3, 4), (3, 10), (8, 4), (8, 10), (12, 4), (12, 10)} |
| | C(l, k) = | {(5, 1), (6, 1), (9, 1), (10, 1)} |
| | D(l, k) = | {(5, 9), (6, 9), (9, 9), (10, 9)} |
| | E~H(l, k) = | {(5, 5), (6, 5), (9, 5), (10, 5)} |
| (2) | A(l, k) = | {(3, 0), (3, 6), (8, 0), (8, 6), (12, 0), (12, 6)} |
| | B(l, k) = | {(3, 3), (3, 9), (8, 3), (8, 9), (12, 3), (12, 9)} |
| | C(l, k) = | {(5, 0), (6, 0), (9, 0), (10, 0)} |
| | D(l, k) = | {(5, 8), (6, 8), (9, 8), (10, 8)} |
| | E~H(l, k) = | {(5, 4), (6, 4), (9, 4), (10, 4)} |
| (3) | A(l, k) = | {(3, 2), (3, 8), (8, 2), (8, 8), (12, 2), (12, 8)} |
| | B(l, k) = | {(3, 5), (3, 11), (8, 5), (8, 11), (12, 5), (12, 11)} |
| | C(l, k) = | {(5, 2), (6, 2), (9, 2), (10, 2)} |
| | D(l, k) = | {(5, 10), (6, 10), (9, 10), (10, 10)} |
| | E~H(l, k) = | {(5, 6), (6, 6), (9, 6), (10, 6)} |
| (4) | A(l, k) = | {(3, 1), (3, 7), (8, 1), (8, 7), (12, 1), (12, 7)} |
| | B(l, k) = | {(3, 4), (3, 10), (8, 4), (8, 10), (12, 4), (12, 10)} |
| | C(l, k) = | {(10, 0), (10, 3), (10, 6), (10, 9)} |
| | D(l, k) = | {(10, 1), (10, 4), (10, 7), (10, 10)} |
| | E~H(l, k) = | {(10, 2), (10, 5), (10, 8), (10, 11)} |
| (5) | A(l, k) = | {(3, 0), (3, 6), (8, 1), (8, 7), (12, 2), (12, 8)} |
| | B(l, k) = | {(3, 3), (3, 9), (8, 4), (8, 10), (12, 5), (12, 11)} |
| | C(l, k) = | {(5, 0), (6, 1), (9, 2), (10, 3)} |
| | D(l, k) = | {(5, 8), (6, 9), (9, 10), (10, 11)} |
| | E~H(l, k) = | {(5, 4), (6, 5), (9, 6), (10, 7)} |
| (6) | A(l, k) = | {(3, 2), (3, 8), (8, 1), (8, 7), (12, 0), (12, 6)} |
| | B(l, k) = | {(3, 5), (3, 11), (8, 4), (8, 10), (12, 3), (12, 9)} |
| | C(l, k) = | {(5, 3), (6, 2), (9, 1), (10, 0)} |
| | D(l, k) = | {(5, 11), (6, 10), (9, 9), (10, 8)} |
| | E~H(l, k) = | {(5, 7), (6, 6), (9, 5), (10, 4)} |
| (7) | A(l, k) = | {(3, 0), (3, 6), (8, 0), (8, 6), (12, 0), (12, 6)} |
| | B(l, k) = | {(3, 1), (3, 7), (8, 1), (8, 7), (12, 1), (12, 7)} |
| | C(l, k) = | {(5, 0), (6, 0), (9, 0), (10, 0)} |
| | D(l, k) = | {(5, 1), (6, 1), (9, 1), (10, 1)} |
| | E~H(l, k) = | {(5, 6), (6, 6), (9, 6), (10, 6)} |
| (8) | A(l, k) = | {(3, 1), (3, 7), (8, 2), (8, 8), (12, 3), (12, 9)} |
| | B(l, k) = | {(3, 2), (3, 8), (8, 3), (8, 9), (12, 4), (12, 10)} |
| | C(l, k) = | {(5, 1), (6, 2), (9, 3), (10, 4)} |
| | D(l, k) = | {(5, 2), (6, 3), (9, 4), (10, 5)} |
| | E~H(l, k) = | {(5, 7), (6, 8), (9, 9), (10, 10)} |
| (9) | A(l, k) = | {(3, 2), (3, 8), (8, 3), (8, 9), (12, 4), (12, 10)} |
| | B(l, k) = | {(3, 3), (3, 9), (8, 4), (8, 10), (12, 5), (12, 11)} |
| | C(l, k) = | {(5, 2), (6, 3), (9, 4), (10, 5)} |
| | D(l, k) = | {(5, 3), (6, 4), (9, 5), (10, 6)} |
| | E~H(l, k) = | {(5, 8), (6, 9), (9, 10), (10, 11)} |
| (10) | A(l, k) = | {(3, 0), (3, 6), (8, 0), (8, 6), (12, 0), (12, 6)} |
| | B(l, k) = | {(3, 1), (3, 7), (8, 1,), (8, 7), (12, 1), (12, 7)} |
| | C(l, k) = | {(10, 0), (10, 3), (10, 6), (10, 9)} |
| | D(l, k) = | {(10, 1), (10, 4), (10, 7), (10, 10)} |
| | E~H(l, k) = | {(10, 2), (10, 5), (10, 8), (10, 11)} |
| (11) | A(l, k) = | {(3, 2), (3, 8), (8, 2), (8, 8), (12, 2), (12, 8)} |
| | B(l, k) = | {(3, 3), (3, 9), (8, 3), (8, 9), (12, 3), (12, 9)} |
| | C(l, k) = | {(5, 2), (6, 2), (9, 2), (10, 2)} |
| | D(l, k) = | {(5, 3), (6, 3), (9, 3), (10, 3)} |
| | E~H(l, k) = | {(5, 8), (6, 8), (9, 8), (10, 8)} |
| (12) | A(l, k) = | {(3, 0), (3, 6), (8, 2), (8, 8), (12, 4), (12, 10)} |
| | B(l, k) = | {(3, 1), (3, 7), (8, 3), (8, 9), (12, 5), (12, 11)} |
| | C(l, k) = | {(5, 0), (6, 1), (9, 2), (10, 3)} |
| | D(l, k) = | {(5, 1), (6, 2), (9, 3), (10, 4)} |
| | E~H(l, k) = | {(5, 6), (6, 7), (9, 8), (10, 9)} |

TABLE 38-continued

| | | |
|---|---|---|
| (13) | A(l, k) = | {(3, 1), (3, 7), (8, 1), (8, 7), (12, 1), (12, 7)} |
| | B(l, k) = | {(3, 4), (3, 10), (8, 4), (8, 10), (12, 4), (12, 10)} |
| | C(l, k) = | {(5, 1), (5, 7), (10, 1), (10, 7)} |
| | D(l, k) = | {(6, 4), (6, 10), (10, 4), (10, 10)} |
| | E~H(l, k) = | {(5, 4), (5, 10), (6, 1), (6, 7)} |
| (14) | A(l, k) = | {(3, 0), (3, 6), (8, 0), (8, 6), (12, 0), (12, 6)} |
| | B(l, k) = | {(3, 3), (3, 9), (8, 3), (8, 9), (12, 3), (12, 9)} |
| | C(l, k) = | {(5, 0), (5, 6), (10, 0), (10, 6)} |
| | D(l, k) = | {(6, 3), (6, 9), (10, 3), (10, 9)} |
| | E~H(l, k) = | {(5, 3), (5, 9), (6, 0), (6, 6)} |
| (15) | A(l, k) = | {(3, 2), (3, 8), (8, 2), (8, 8), (12, 2), (12, 8)} |
| | B(l, k) = | {(3, 5), (3, 11), (8, 5), (8, 11), (12, 5), (12, 11)} |
| | C(l, k) = | {(5, 2), (5, 8), (10, 2), (10, 8)} |
| | D(l, k) = | {(6, 5), (6, 11), (10, 5), (10, 11)} |
| | E~H(l, k) = | {(5, 5), (5, 11), (6, 2), (6, 8)} |
| (16) | A(l, k) = | {(3, 0), (3, 6), (8, 1), (8, 7), (12, 2), (12, 8)} |
| | B(l, k) = | {(3, 3), (3, 9), (8, 4), (8, 10), (12, 5), (12, 11)} |
| | C(l, k) = | {(5, 0), (5, 6), (10, 2), (10, 8)} |
| | D(l, k) = | {(6, 4), (6, 10), (10, 5), (10, 11)} |
| | E~H(l, k) = | {(5, 3), (5, 9), (6, 1), (6, 7)} |
| (17) | A(l, k) = | {(3, 2), (3, 8), (8, 1), (8, 7), (12, 0), (12, 6)} |
| | B(l, k) = | {(3, 5), (3, 11), (8, 4), (8, 10), (12, 3), (12, 9)} |
| | C(l, k) = | {(5, 2), (5, 8), (10, 0), (10, 6)} |
| | D(l, k) = | {(6, 4), (6, 10), (10, 3), (10, 9)} |
| | E~H(l, k) = | {(5, 5), (5, 11), (6, 1), (6, 7)} |
| (18) | A(l, k) = | {(3, 0), (3, 6), (8, 0), (8, 6), (12, 0), (12, 6)} |
| | B(l, k) = | {(3, 1), (3, 7), (8, 1), (8, 7), (12, 1), (12, 7)} |
| | C(l, k) = | {(5, 0), (5, 6), (10, 0), (10, 6)} |
| | D(l, k) = | {(6, 1), (6, 7), (10, 1), (10, 7)} |
| | E~H(l, k) = | {(5, 1), (5, 7), (6, 0), (6, 6)} |
| (19) | A(l, k) = | {(3, 1), (3, 7), (8, 2), (8, 8), (12, 3), (12, 9)} |
| | B(l, k) = | {(3, 2), (3, 8), (8, 3), (8, 9), (12, 4), (12, 10)} |
| | C(l, k) = | {(5, 1), (5, 7), (10, 3), (10, 9)} |
| | D(l, k) = | {(6, 3), (6, 9), (10, 4), (10, 10)} |
| | E~H(l, k) = | {(5, 2), (5, 8), (6, 2), (6, 8)} |
| (20) | A(l, k) = | {(3, 2), (3, 8), (8, 3), (8, 9), (12, 4), (12, 10)} |
| | B(l, k) = | {(3, 3), (3, 9), (8, 4), (8, 10), (12, 5), (12, 11)} |
| | C(l, k) = | {(5, 2), (5, 8), (10, 4), (10, 10)} |
| | D(l, k) = | {(6, 4), (6, 10), (10, 5), (10, 11)} |
| | E~H(l, k) = | {(5, 3), (5, 9), (6, 3), (6, 9)} |
| (21) | A(l, k) = | {(3, 2), (3, 8), (8, 2), (8, 8), (12, 2), (12, 8)} |
| | B(l, k) = | {(3, 3), (3, 9), (8, 3), (8, 9), (12, 3), (12, 9)} |
| | C(l, k) = | {(5, 2), (5, 8), (10, 2), (10, 8)} |
| | D(l, k) = | {(6, 3), (6, 9), (10, 3), (10, 9)} |
| | E~H(l, k) = | {(5, 3), (5, 9), (6, 2), (6, 8)} |
| (22) | A(l, k) = | {(3, 0), (3, 6), (8, 2), (8, 8), (12, 4), (12, 10)} |
| | B(l, k) = | {(3, 1), (3, 7), (8, 3), (8, 9), (12, 5), (12, 11)} |
| | C(l, k) = | {(5, 0), (5, 6), (10, 4), (10, 10)} |
| | D(l, k) = | {(6, 3), (6, 9), (10, 5), (10, 11)} |
| | E~H(l, k) = | {(5, 1), (5, 7), (6, 2), (6, 8)} |
| (23) | A(l, k) = | {(3, 1), (3, 7), (8, 1), (8, 7), (12, 1), (12, 7)} |
| | B(l, k) = | {(3, 4), (3, 10), (8, 4), (8, 10), (12, 4), (12, 10)} |
| | C(l, k) = | {(3, 2), (3, 8), (12, 2), (12, 8)} |
| | D(l, k) = | {(3, 5), (3, 11), (12, 5), (12, 11)} |
| | E~H(l, k) = | {(8, 2), (8, 5), (8, 8), (8, 11)} |
| (24) | A(l, k) = | {(3, 0), (3, 6), (8, 0), (8, 6), (12, 0), (12, 6)} |
| | B(l, k) = | {(3, 1), (3, 7), (8, 1), (8, 7), (12, 1), (12, 7)} |
| | C(l, k) = | {(3, 2), (3, 8), (12, 2), (12, 8)} |
| | D(l, k) = | {(3, 3), (3, 9), (12, 3), (12, 9)} |
| | E~H(l, k) = | {(8, 2), (8, 3), (8, 8), (8, 9)} |

As shown in FIGS. 69 to 72, embodiments D-22-(1) to D-22-(24) define DRS patterns in which DRSs of the 1st to 8th layers are arranged for rank-8 transmission.

DRSs of the 1st and 2nd layers are arranged in the 3rd, 8th, and 12th OFDM symbols and DRSs, of the 1st and 2nd layers are alternately arranged at specific subcarrier intervals in each of the OFDM symbols. Accordingly, DRSs of the 1st and 2nd layers are arranged at 12 REs in 2 RBs (i.e., in a pair of RBs) that are consecutive in time in one subframe.

DRSs of each of the 3rd and 4th layers are arranged at 4 REs. The DRSs of the 3rd and 4th layers may be alternately arranged at specific subcarrier intervals in the same OFDM symbol and may also be arranged in different OFDM symbols. Accordingly, DRSs of the 3rd and 4th layers are arranged at 8 REs in 2 RBs (i.e., in a pair of RBs) that are consecutive in time in one subframe.

DRSs of the 5th to 8th layers are arranged at 4 REs in 2 RBs (i.e., in a pair of RBs) that are consecutive in time in one subframe and each set of DRSs of the 5th to 8th layers is multiplexed at each RE according to a CDM scheme.

Embodiment D-23

TABLE 39

| | | |
|---|---|---|
| (1) | A(l, k) = | {(3, 1), (3, 7), (8, 1), (8, 7), (13, 1), (13, 7)} |
| | B(l, k) = | {(3, 4), (3, 10), (8, 4), (8, 10), (13, 4), (13, 10)} |
| | C(l, k) = | {(5, 1), (6, 1), (9, 1), (10, 1)} |
| | D(l, k) = | {(5, 9), (6, 9), (9, 9), (10, 9)} |
| | E~H(l, k) = | {(5, 5), (6, 5), (9, 5), (10, 5)} |
| (2) | A(l, k) = | {(3, 0), (3, 6), (8, 0), (8, 6), (13, 0), (13, 6)} |
| | B(l, k) = | {(3, 3), (3, 9), (8, 3), (8, 9), (13, 3), (13, 9)} |
| | C(l, k) = | {(5, 0), (6, 0), (9, 0), (10, 0)} |
| | D(l, k) = | {(5, 8), (6, 8), (9, 8), (10, 8)} |
| | E~H(l, k) = | {(5, 4), (6, 4), (9, 4), (10, 4)} |
| (3) | A(l, k) = | {(3, 2), (3, 8), (8, 2), (8, 8), (13, 2), (13, 8)} |
| | B(l, k) = | {(3, 5), (3, 11), (8, 5), (8, 11), (13, 5), (13, 11)} |
| | C(l, k) = | {(5, 2), (6, 2), (9, 2), (10, 2)} |
| | D(l, k) = | {(5, 10), (6, 10), (9, 10), (10, 10)} |
| | E~H(l, k) = | {(5, 6), (6, 6), (9, 6), (10, 6)} |
| (4) | A(l, k) = | {(3, 1), (3, 7), (8, 1), (8, 7), (13, 1), (13, 7)} |
| | B(l, k) = | {(3, 4), (3, 10), (8, 4), (8, 10), (13, 4), (13, 10)} |
| | C(l, k) = | {(10, 0), (10, 3), (10, 6), (10, 9)} |
| | D(l, k) = | {(10, 1), (10, 4), (10, 7), (10, 10)} |
| | E~H(l, k) = | {(10, 2), (10, 5), (10, 8), (10, 11)} |
| (5) | A(l, k) = | {(3, 0), (3, 6), (8, 1), (8, 7), (13, 2), (13, 8)} |
| | B(l, k) = | {(3, 3), (3, 9), (8, 4), (8, 10), (13, 5), (13, 11)} |
| | C(l, k) = | {(5, 0), (6, 1), (9, 2), (10, 3)} |
| | D(l, k) = | {(5, 8), (6, 9), (9, 10), (10, 11)} |
| | E~H(l, k) = | {(5, 4), (6, 5), (9, 6), (10, 7)} |
| (6) | A(l, k) = | {(3, 2), (3, 8), (8, 1), (8, 7), (13, 0), (13, 6)} |
| | B(l, k) = | {(3, 5), (3, 11), (8, 4), (8, 10), (13, 3), (13, 9)} |
| | C(l, k) = | {(5, 3), (6, 2), (9, 1), (10, 0)} |
| | D(l, k) = | {(5, 11), (6, 10), (9, 9), (10, 8)} |
| | E~H(l, k) = | {(5, 7), (6, 6), (9, 5), (10, 4)} |
| (7) | A(l, k) = | {(3, 0), (3, 6), (8, 0), (8, 6), (13, 0), (13, 6)} |
| | B(l, k) = | {(3, 1), (3, 7), (8, 1), (8, 7), (13, 1), (13, 7)} |
| | C(l, k) = | {(5, 0), (6, 0), (9, 0), (10, 0)} |
| | D(l, k) = | {(5, 1), (6, 1), (9, 1), (10, 1)} |
| | E~H(l, k) = | {(5, 6), (6, 6), (9, 6), (10, 6)} |
| (8) | A(l, k) = | {(3, 1), (3, 7), (8, 2), (8, 8), (13, 3), (13, 9)} |
| | B(l, k) = | {(3, 2), (3, 8), (8, 3), (8, 9), (13, 4), (13, 10)} |
| | C(l, k) = | {(5, 1), (6, 2), (9, 3), (10, 4)} |
| | D(l, k) = | {(5, 2), (6, 3), (9, 4), (10, 5)} |
| | E~H(l, k) = | {(5, 7), (6, 8), (9, 9), (10, 10)} |
| (9) | A(l, k) = | {(3, 2), (3, 8), (8, 3), (8, 9), (13, 4), (13, 10)} |
| | B(l, k) = | {(3, 3), (3, 9), (8, 4), (8, 10), (13, 5), (13, 11)} |
| | C(l, k) = | {(5, 2), (6, 3), (9, 4), (10, 5)} |
| | D(l, k) = | {(5, 3), (6, 4), (9, 5), (10, 6)} |
| | E~H(l, k) = | {(5, 8), (6, 9), (9, 10), (10, 11)} |
| (10) | A(l, k) = | {(3, 0), (3, 6), (8, 0), (8, 6), (13, 0), (13, 6)} |
| | B(l, k) = | {(3, 1), (3, 7), (8, 1), (8, 7), (13, 1), (13, 7)} |
| | C(l, k) = | {(10, 0), (10, 3), (10, 6), (10, 9)} |
| | D(l, k) = | {(10, 1), (10, 4), (10, 7), (10, 10)} |
| | E~H(l, k) = | {(10, 2), (10, 5), (10, 8), (10, 11)} |
| (11) | A(l, k) = | {(3, 2), (3, 8), (8, 2), (8, 8), (13, 2), (13, 8)} |
| | B(l, k) = | {(3, 3), (3, 9), (8, 3), (8, 9), (13, 3), (13, 9)} |
| | C(l, k) = | {(5, 2), (6, 2), (9, 2), (10, 2)} |
| | D(l, k) = | {(5, 3), (6, 3), (9, 3), (10, 3)} |
| | E~H(l, k) = | {(5, 8), (6, 8), (9, 8), (10, 8)} |
| (12) | A(l, k) = | {(3, 0), (3, 6), (8, 2), (8, 8), (13, 4), (13, 10)} |
| | B(l, k) = | {(3, 1), (3, 7), (8, 3), (8, 9), (13, 5), (13, 11)} |
| | C(l, k) = | {(5, 0), (6, 1), (9, 2), (10, 3)} |
| | D(l, k) = | {(5, 1), (6, 2), (9, 3), (10, 4)} |
| | E~H(l, k) = | {(5, 6), (6, 7), (9, 8), (10, 9)} |
| (13) | A(l, k) = | {(3, 1), (3, 7), (8, 1), (8, 7), (13, 1), (13, 7)} |
| | B(l, k) = | {(3, 4), (3, 10), (8, 4), (8, 10), (13, 4), (13, 10)} |
| | C(l, k) = | {(5, 1), (5, 7), (10, 1), (10, 7)} |
| | D(l, k) = | {(6, 4), (6, 10), (10, 4), (10, 10)} |
| | E~H(l, k) = | {(5, 4), (5, 10), (6, 1), (6, 7)} |

TABLE 39-continued

| | | |
|---|---|---|
| (14) | A(l, k) = | {(3, 0), (3, 6), (8, 0), (8, 6), (13, 0), (13, 6)} |
| | B(l, k) = | {(3, 3), (3, 9), (8, 3), (8, 9), (13, 3), (13, 9)} |
| | C(l, k) = | {(5, 0), (5, 6), (10, 0), (10, 6)} |
| | D(l, k) = | {(6, 3), (6, 9), (10, 3), (10, 9)} |
| | E~H(l, k) = | {(5, 3), (5, 9), (6, 0), (6, 6)} |
| (15) | A(l, k) = | {(3, 2), (3, 8), (8, 2), (8, 8), (13, 2), (13, 8)} |
| | B(l, k) = | {(3, 5), (3, 11), (8, 5), (8, 11), (13, 5), (13, 11)} |
| | C(l, k) = | {(5, 2), (5, 8), (10, 2), (10, 8)} |
| | D(l, k) = | {(6, 5), (6, 11), (10, 5), (10, 11)} |
| | E~H(l, k) = | {(5, 5), (5, 11), (6, 2), (6, 8)} |
| (16) | A(l, k) = | {(3, 0), (3, 6), (8, 1), (8, 7), (13, 2), (13, 8)} |
| | B(l, k) = | {(3, 3), (3, 9), (8, 4), (8, 10), (13, 5), (13, 11)} |
| | C(l, k) = | {(5, 0), (5, 6), (10, 2), (10, 8)} |
| | D(l, k) = | {(6, 4), (6, 10), (10, 5), (10, 11)} |
| | E~H(l, k) = | {(5, 3), (5, 9), (6, 1), (6, 7)} |
| (17) | A(l, k) = | {(3, 2), (3, 8), (8, 1), (8, 7), (13, 0), (13, 6)} |
| | B(l, k) = | {(3, 5), (3, 11), (8, 4), (8, 10), (13, 3), (13, 9)} |
| | C(l, k) = | {(5, 2), (5, 8), (10, 0), (10, 6)} |
| | D(l, k) = | {(6, 4), (6, 10), (10, 3), (10, 9)} |
| | E~H(l, k) = | {(5, 5), (5, 11), (6, 1), (6, 7)} |
| (18) | A(l, k) = | {(3, 0), (3, 6), (8, 0), (8, 6), (13, 0), (13, 6)} |
| | B(l, k) = | {(3, 1), (3, 7), (8, 1), (8, 7), (13, 1), (13, 7)} |
| | C(l, k) = | {(5, 0), (5, 6), (10, 0), (10, 6)} |
| | D(l, k) = | {(6, 1), (6, 7), (10, 1), (10, 7)} |
| | E~H(l, k) = | {(5, 1), (5, 7), (6, 0), (6, 6)} |
| (19) | A(l, k) = | {(3, 1), (3, 7), (8, 2), (8, 8), (13, 3), (13, 9)} |
| | B(l, k) = | {(3, 2), (3, 8), (8, 3), (8, 9), (13, 4), (13, 10)} |
| | C(l, k) = | {(5, 1), (5, 7), (10, 3), (10, 9)} |
| | D(l, k) = | {(6, 3), (6, 9), (10, 4), (10, 10)} |
| | E~H(l, k) = | {(5, 2), (5, 8), (6, 2), (6, 8)} |
| (20) | A(l, k) = | {(3, 2), (3, 8), (8, 3), (8, 9), (13, 4), (13, 10)} |
| | B(l, k) = | {(3, 3), (3, 9), (8, 4), (8, 10), (13, 5), (13, 11)} |
| | C(l, k) = | {(5, 2), (5, 8), (10, 4), (10, 10)} |
| | D(l, k) = | {(6, 4), (6, 10), (10, 5), (10, 11)} |
| | E~H(l, k) = | {(5, 3), (5, 9), (6, 3), (6, 9)} |
| (21) | A(l, k) = | {(3, 2), (3, 8), (8, 2), (8, 8), (13, 2), (13, 8)} |
| | B(l, k) = | {(3, 3), (3, 9), (8, 3), (8, 9), (13, 3), (13, 9)} |
| | C(l, k) = | {(5, 2), (5, 8), (10, 2), (10, 8)} |
| | D(l, k) = | {(6, 3), (6, 9), (10, 3), (10, 9)} |
| | E~H(l, k) = | {(5, 3), (5, 9), (6, 2), (6, 8)} |
| (22) | A(l, k) = | {(3, 0), (3, 6), (8, 2), (8, 8), (13, 4), (13, 10)} |
| | B(l, k) = | {(3, 1), (3, 7), (8, 3), (8, 9), (13, 5), (13, 11)} |
| | C(l, k) = | {(5, 0), (5, 6), (10, 4), (10, 10)} |
| | D(l, k) = | {(6, 3), (6, 9), (10, 5), (10, 11)} |
| | E~H(l, k) = | {(5, 1), (5, 7), (6, 2), (6, 8)} |
| (23) | A(l, k) = | {(3, 1), (3, 7), (8, 1), (8, 7), (13, 1), (13, 7)} |
| | B(l, k) = | {(3, 4), (3, 10), (8, 4), (8, 10), (13, 4), (13, 10)} |
| | C(l, k) = | {(3, 2), (3, 8), (13, 2), (13, 8)} |
| | D(l, k) = | {(3, 5), (3, 11), (13, 5), (13, 11)} |
| | E~H(l, k) = | {(8, 2), (8, 5), (8, 8), (8, 11)} |
| (24) | A(l, k) = | {(3, 0), (3, 6), (8, 0), (8, 6), (13, 0), (13, 6)} |
| | B(l, k) = | {(3, 1), (3, 7), (8, 1), (8, 7), (13, 1), (13, 7)} |
| | C(l, k) = | {(3, 2), (3, 8), (13, 2), (13, 8)} |
| | D(l, k) = | {(3, 3), (3, 9), (13, 3), (13, 9)} |
| | E~H(l, k) = | {(8, 2), (8, 3), (8, 8), (8, 9)} |

Figure 69:
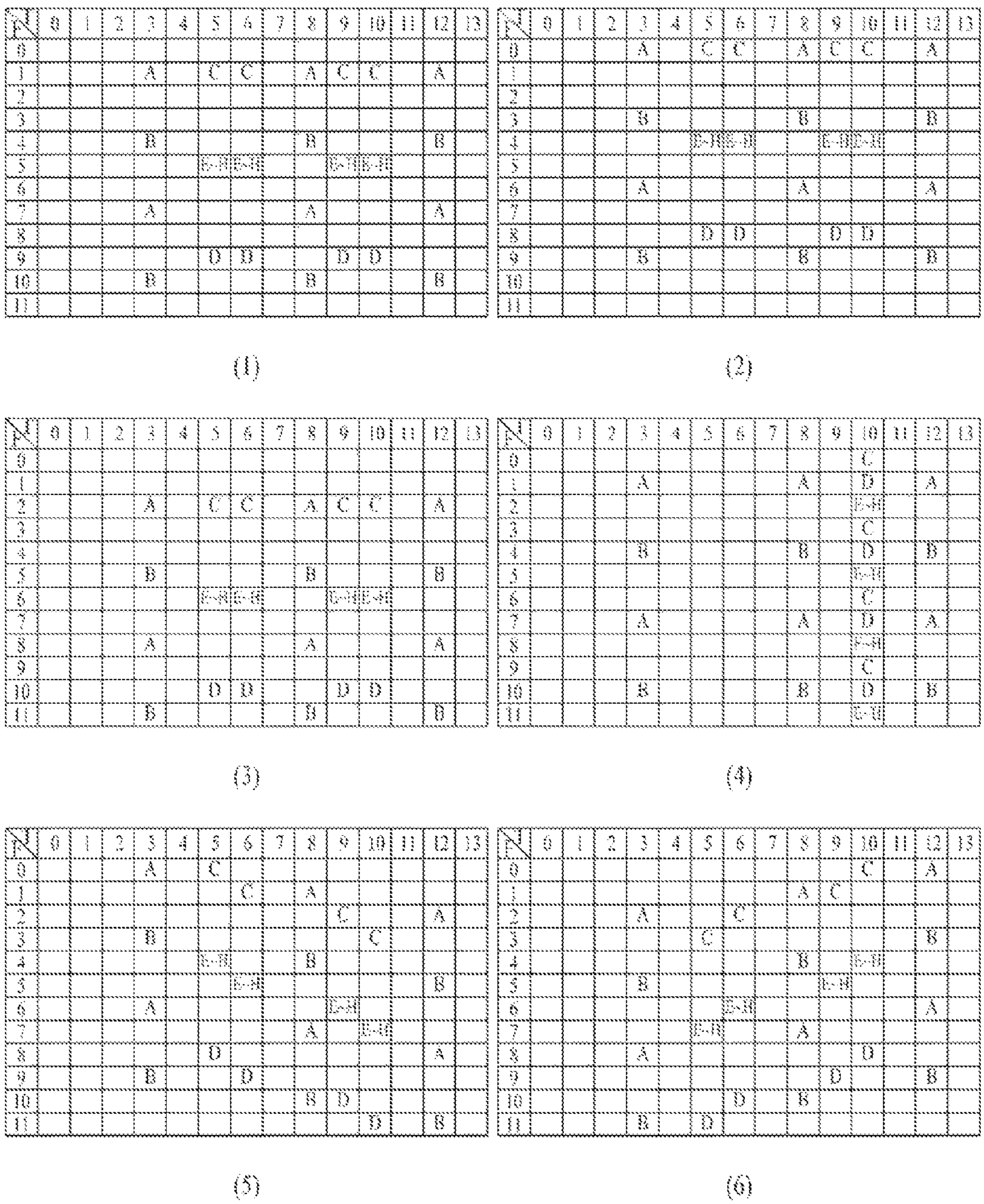
Figure 72:
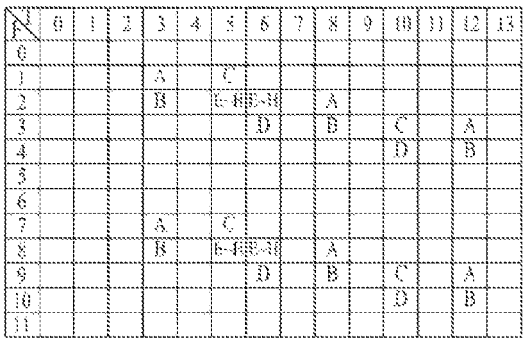
Figure 72:
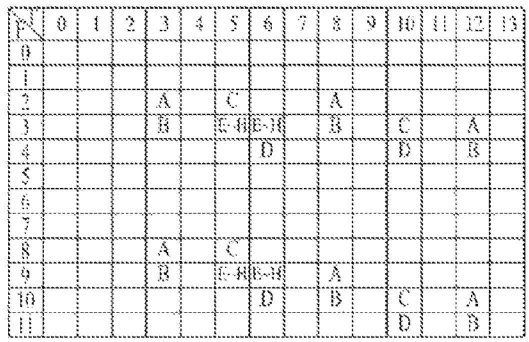
Figure 72:
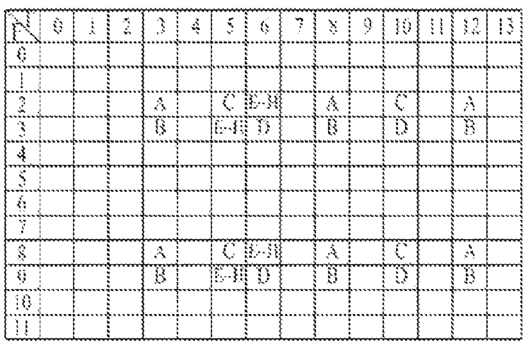
Figure 72:
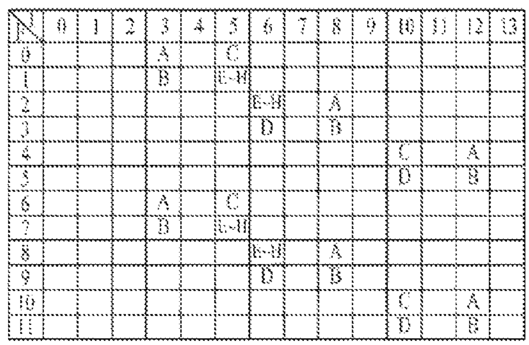
Figure 72:
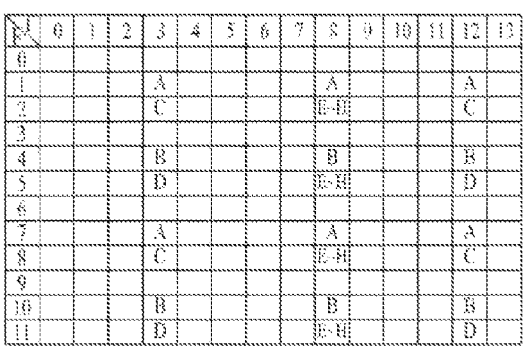
Figure 72:
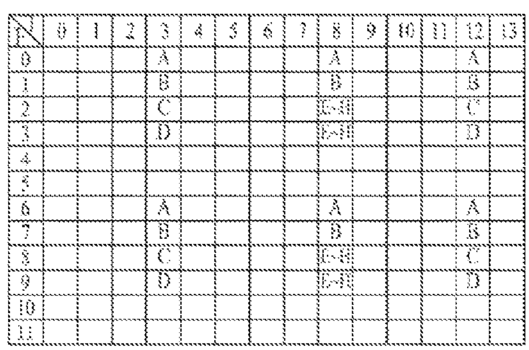
Figure 75:
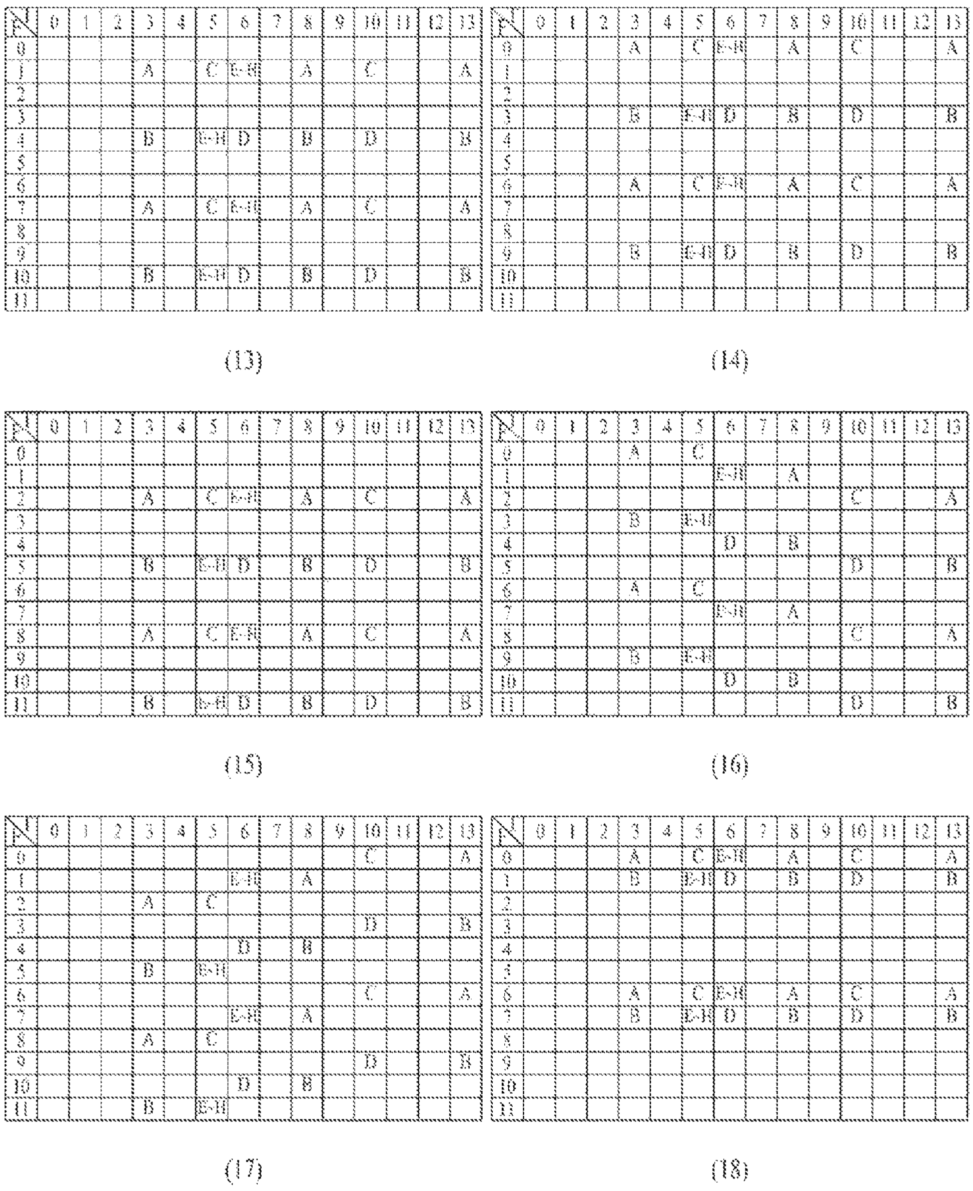

Embodiments D-23-(1) to D-23-(24) shown in FIGS. 73 to 76 are modifications of the embodiments D-22-(1) to D-22-(24) of FIGS. 69 and 72, in which the DRSs, which are located at the 12th OFDM symbol in the embodiments D-22-(1) to D-22-(24), are located at the 13th OFDM symbol.

Embodiment E-1

TABLE 40

| | | |
|---|---|---|
| (1) | A(l, k) = | {(3, 2), (3, 8), (12, 2), (12, 8)} |
| | B(l, k) = | {(3, 5), (3, 11), (12, 5), (12, 11)} |
| | C(l, k) = | {(5, 2), (5, 8), (13, 2), (13, 8)} |
| | D(l, k) = | {(5, 5), (5, 11), (13, 5), (13, 11)} |
| (2) | A(l, k) = | {(3, 2), (3, 8), (12, 2), (12, 8)} |
| | B(l, k) = | {(3, 5), (3, 11), (12, 5), (12, 11)} |
| | C(l, k) = | {(5, 2), (5, 8), (13, 5), (13, 11)} |
| | D(l, k) = | {(5, 5), (5, 11), (13, 2), (13, 8)} |
| (3) | A(l, k) = | {(3, 0), (3, 4), (3, 8), (10, 0), (10, 4), (10, 8)} |
| | B(l, k) = | {(3, 2), (3, 6), (3, 10), (10, 2), (10, 6), (10, 10)} |
| | C(l, k) = | (12, 0) |
| | D(l, k) = | (12, 2) |
| | E(l, k) = | (12, 4) |
| | F(l, k) = | (12, 6) |
| | G(l, k) = | (12, 8) |
| | H(l, k) = | (12, 10) |
| (4) | A(l, k) = | {(3, 0), (3, 4), (3, 8), (10, 0), (10, 4), (10, 8)} |
| | B(l, k) = | {(3, 2), (3, 6), (3, 10), (10, 2), (10, 6), (10, 10)} |
| | C(l, k) = | {(5, 0), (12, 6)} |
| | D(l, k) = | {(5, 2), (12, 8)} |
| | E(l, k) = | {(5, 4), (12, 10)} |
| | F(l, k) = | {(5, 6), (12, 0)} |
| | G(l, k) = | {(5, 8), (12, 2)} |
| | H(l, k) = | {(5, 10), (12, 4)} |
| (5) | A(l, k) = | {(3, 0), (3, 4), (3, 8), (10, 0), (10, 4), (10, 8)} |
| | B(l, k) = | {(3, 2), (3, 6), (3, 10), (10, 2), (10, 6), (10, 10)} |
| | C/D(l, k) = | {(12, 0), (12, 6)} |
| | E/F(l, k) = | {(12, 2), (12, 8)} |
| | G/H(l, k) = | {(12, 4), (12, 10)} |
| (6) | A(l, k) = | {(5, 0), (5, 4), (5, 8), (10, 3), (10, 7), (10, 11)} |
| | B(l, k) = | {(5, 2), (5, 6), (5, 10), (10, 1), (10, 5), (10, 9)} |
| | C(l, k) = | {(3, 0), (9, 6)} |
| | D(l, k) = | {(3, 2), (9, 8)} |
| | E(l, k) = | {(3, 4), (9, 10)} |
| | F(l, k) = | {(3, 6), (9, 0)} |
| | G(l, k) = | {(3, 8), (9, 2)} |
| | H(l, k) = | {(3, 10), (9, 4)} |
| (7) | A(l, k) = | {(3, 2), (3, 8), (9, 5), (9, 11), (12, 2), (12, 8)} |
| | B(l, k) = | {(3, 5), (3, 11), (9, 2), (9, 8), (12, 5), (12, 11)} |
| | C(l, k) = | {(5, 6), (13, 0)} |
| | D(l, k) = | {(5, 8), (13, 2)} |
| | E(l, k) = | {(5, 10), (13, 4)} |
| | F(l, k) = | {(5, 0), (13, 6)} |
| | G(l, k) = | {(5, 2), (13, 8)} |
| | H(l, k) = | {(5, 4), (13, 10)} |

Embodiments E-1-(1) to E-1-(7) are described below with reference to FIG. 77.

The embodiments E-1-(1) and E-1-(2) define DRS patterns for rank-4 transmission.

In the embodiment E-1-(1), DRSs of the 1st and 2nd layers are alternately arranged at equal intervals of 3 subcarriers in the 3rd and 12th OFDM symbols and DRSs of each of the 1st and 2nd layers are arranged at 4 REs in 2 RBs (i.e., in a pair of RBs) that are consecutive in time in one subframe. DRSs of the 3rd and 4th layers are alternately arranged at equal intervals of 3 subcarriers in the 5th and 13th OFDM symbols and DRSs of each of the 1st and 2nd layers are arranged at 4 REs.

The embodiment E-1-(2) is a modification of the embodiment E-1-(1), in which the arrangement of DRSs of the 3rd and 4th layers in the 13th OFDM symbol in the embodiment E-1-(1) is modified.

The embodiments E-1-(3) to E-1-(7) define DRS patterns for rank-8 transmission.

In the embodiment E-1-(3), DRSs of the 1st and 2nd layers are alternately arranged at equal intervals of 2 subcarriers in the 3rd and 10th OFDM symbols and DRSs of each of the 1st and 2nd layers are arranged at 6 REs. DRSs of the 3rd to 8th layers are sequentially arranged respectively at REs at intervals of 2 subcarriers in the 12th OFDM symbol.

In the embodiment E-1-(4), DRSs of the 1st and 2nd layers are arranged at a total of 12 REs at the same positions as the embodiment E-1-(3). DRSs of the 3rd to 8th layers are sequentially arranged respectively at REs at intervals of 2 subcarriers in the 5th OFDM symbol and are also arranged respectively at REs in a different order at intervals of 2 subcarriers in the 12th OFDM symbol. Accordingly, 2 DRSs are arranged for each of the 3rd to 8th layers such that the DRSs of the 3rd to 8th layers are arranged at a total of 12 REs in 2 RBs (i.e., in a pair of RBs) that are consecutive in time in one subframe.

In the embodiment E-1-(5), DRSs of the 1st and 2nd layers are arranged at a total of 12 REs at the same positions as the embodiment E-1-(3). DRSs of the 3rd to 8th layers are arranged in the 12th OFDM symbol. Here, DRSs of the 3rd and 4th layers are multiplexed according to a CDM scheme and the multiplexed DRSs of the 3rd and 4th layers are arranged at 2 REs that are spaced at an interval of 6 subcarriers. DRSs of the 5th and 6th layers and DRSs of the 7th and 8th layers are also multiplexed according to a CDM scheme and the multiplexed DRSs of the 5th and 6th layers and the multiplexed DRSs of the 7th and 8th layers are also arranged at 2 REs that are spaced at an interval of 6 subcarriers in the 12th OFDM symbol.

In the embodiment E-1-(6), DRSs of the 1st and 2nd layers are alternately arranged in the 5th and 10th OFDM symbols and DRSs of each of the 1st and 2nd layers are arranged at 6 REs. DRSs of the 3rd to 8th layers are sequentially arranged respectively at REs in the 3rd OFDM symbol and are also arranged respectively at REs in a different order in the 9th OFDM symbol.

In the embodiment E-1-(7), DRSs of the 1st and 2nd layers are arranged in the 3rd, 5th, and 9th OFDM symbols and the DRSs are arranged at equal intervals of 3 subcarriers in each of the OFDM symbols. 4 DRSs are arranged for each of the 1st and 2nd layers such that the DRSs of the 1st and 2nd layers are arranged at a total of 12 REs in each OFDM symbol. DRSs of the 3rd to 8th layers are sequentially arranged respectively at REs in the 5th OFDM symbol and are also arranged respectively at REs in a different order in the 13th OFDM symbol.

Embodiment E-2

TABLE 41

| | | |
|---|---|---|
| (1) | A(l, k) = | {(3, 2), (3, 8), (13, 2), (13, 8)} |
| | B(l, k) = | {(3, 5), (3, 11), (13, 5), (13, 11)} |
| | C(l, k) = | {(5, 2), (5, 8), (12, 2), (12, 8)} |
| | D(l, k) = | {(5, 5), (5, 11), (12, 5), (12, 11)} |
| (2) | A(l, k) = | {(3, 2), (3, 8), (13, 2), (13, 8)} |
| | B(l, k) = | {(3, 5), (3, 11), (13, 5), (13, 11)} |
| | C(l, k) = | {(5, 2), (5, 8), (12, 5), (12, 11)} |
| | D(l, k) = | {(5, 5), (5, 11), (12, 2), (12, 8)} |
| (3) | A(l, k) = | {(3, 0), (3, 4), (3, 8), (10, 0), (10, 4), (10, 8)} |
| | B(l, k) = | {(3, 2), (3, 6), (3, 10), (10, 2), (10, 6), (10, 10)} |
| | C(l, k) = | {(13, 0)} |
| | D(l, k) = | {(13, 2)} |
| | E(l, k) = | {(13, 4)} |
| | F(l, k) = | {(13, 6)} |
| | G(l, k) = | {(13, 8)} |
| | H(l, k) = | {(13, 10)} |
| (4) | A(l, k) = | {(3, 0), (3, 4), (3, 8), (10, 0), (10, 4), (10, 8)} |
| | B(l, k) = | {(3, 2), (3, 6), (3, 10), (10, 2), (10, 6), (10, 10)} |
| | C(l, k) = | {(5, 0), (13, 6)} |
| | D(l, k) = | {(5, 2), (13, 8)} |
| | E(l, k) = | {(5, 4), (13, 10)} |
| | F(l, k) = | {(5, 6), (13, 0)} |
| | G(l, k) = | {(5, 8), (13, 2)} |
| | H(l, k) = | {(5, 10), (13, 4)} |
| (5) | A(l, k) = | {(3, 0), (3, 4), (3, 8), (10, 0), (10, 4), (10, 8)} |
| | B(l, k) = | {(3, 2), (3, 6), (3, 10), (10, 2), (10, 6), (10, 10)} |
| | C/D(l, k) = | {(13, 0), (13, 6)} |
| | E/F(l, k) = | {(13, 2), (13, 8)} |
| | G/H(l, k) = | {(13, 4), (13, 10)} |
| (6) | A(l, k) = | {(5, 0), (5, 4), (5, 8), (10, 3), (10, 7), (10, 11)} |
| | B(l, k) = | {(5, 2), (5, 6), (5, 10), (10, 1), (10, 5), (10, 9)} |
| | C(l, k) = | {(3, 0), (9, 6)} |
| | D(l, k) = | {(3, 2), (9, 8)} |
| | E(l, k) = | {(3, 4), (9, 10)} |
| | F(l, k) = | {(3, 6), (9, 0)} |
| | G(l, k) = | {(3, 8), (9, 2)} |
| | H(l, k) = | {(3, 10), (9, 4)} |

TABLE 41-continued

| | | |
|---|---|---|
| (7) | A(l, k) = | {(3, 2), (3, 8), (9, 5), (9, 11), (13, 2), (13, 8)} |
| | B(l, k) = | {(3, 5), (3, 11), (9, 2), (9, 8), (13, 5), (13, 11)} |
| | C(l, k) = | {(5, 6), (12, 0)} |
| | D(l, k) = | {(5, 8), (12, 2)} |
| | E(l, k) = | {(5, 10), (12, 4)} |
| | F(l, k) = | {(5, 0), (12, 6)} |
| | G(l, k) = | {(5, 2), (12, 8)} |
| | H(l, k) = | {(5, 4), (12, 10)} |

Figure 77:
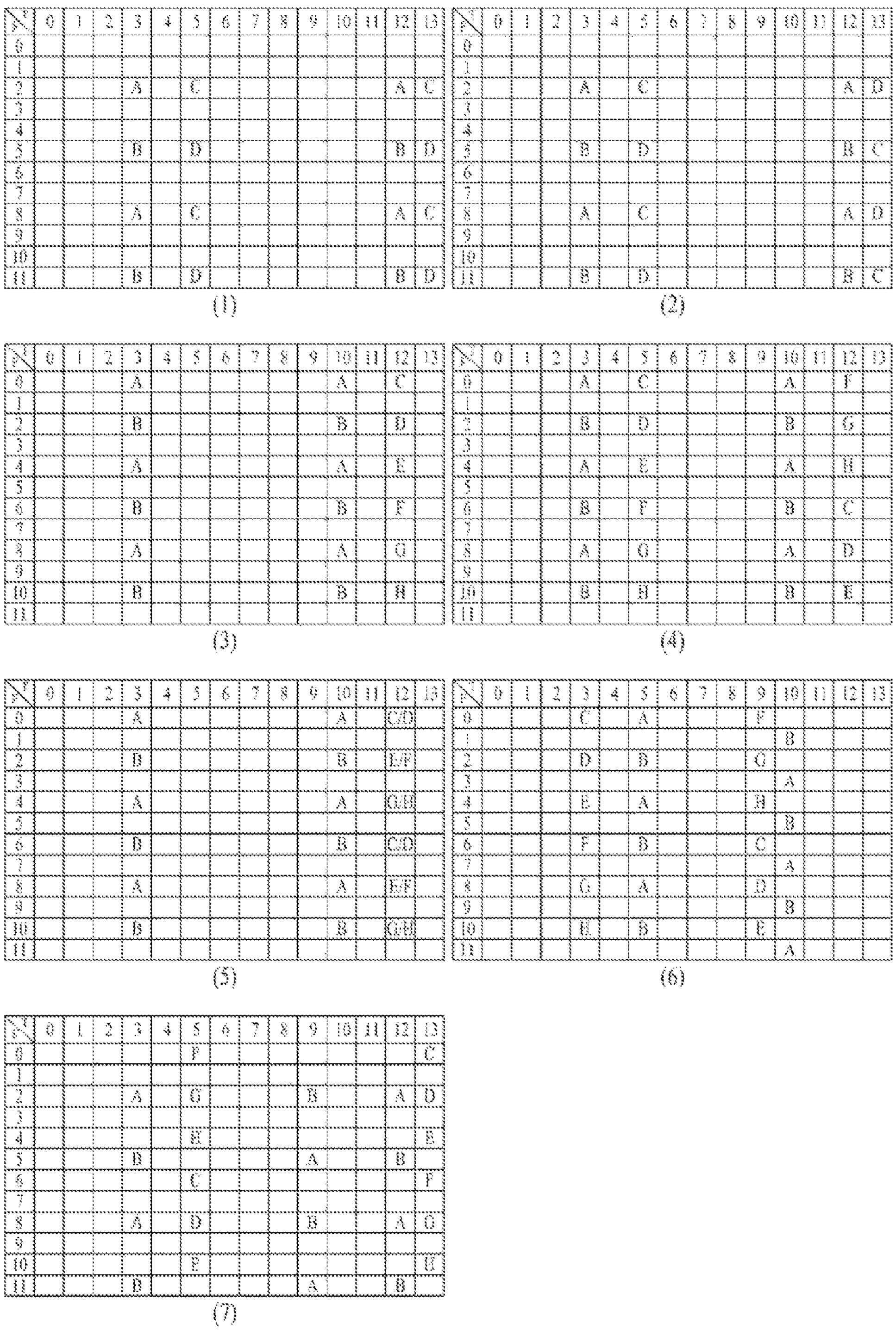
Figure 78:
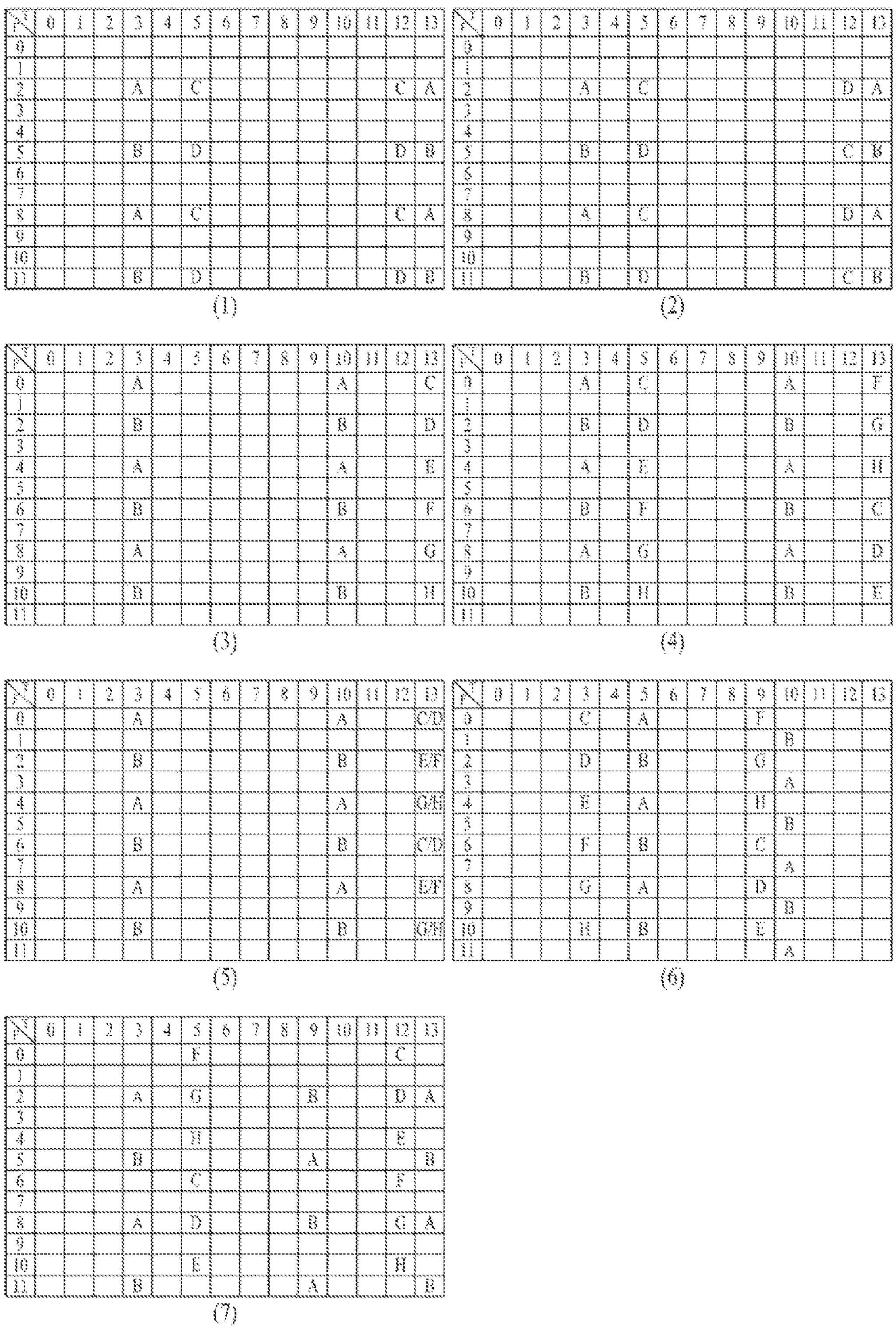

Embodiments E-2-(1) to E-2-(7) shown in FIG. 78 are modifications of the embodiments E-1-(1) to E-1-(7), in which the pattern of the 12th OFDM symbol and the pattern of the 13th OFDM symbol are replaced with each other in the embodiments E-1-(1) to E-1-(7) of FIG. 77.

Embodiment E-3

TABLE 42

| | | |
|---|---|---|
| (1) | P0(l, k) = | {(3, 0), (3, 6), (8, 2), (8, 8), (12, 4), (12, 10)} |
| | P1(l, k) = | {(3, 1), (3, 7), (8, 3), (8, 9), (12, 5), (12, 11)} |
| | P2(l, k) = | {(3, 2), (3, 8), (8, 4), (8, 10), (12, 0), (12, 6)} |
| | P3(l, k) = | {(3, 3), (3, 9), (8, 5), (8, 11), (12, 1), (12, 7)} |
| (2) | P0(l, k) = | {(3, 0), (3, 6), (8, 4), (8, 10), (12, 2), (12, 8)} |
| | P1(l, k) = | {(3, 1), (3, 7), (8, 5), (8, 11), (12, 3), (12, 9)} |
| | P2(l, k) = | {(3, 2), (3, 8), (8, 0), (8, 6), (12, 4), (12, 10)} |
| | P3(l, k) = | {(3, 3), (3, 9), (8, 1), (8, 7), (12, 5), (12, 11)} |
| (3) | P0(l, k) = | {(3, 0), (3, 6), (8, 2), (8, 8), (12, 0), (12, 6)} |
| | P1(l, k) = | {(3, 3), (3, 9), (8, 5), (8, 11), (12, 3), (12, 9)} |
| | P2(l, k) = | {(3, 1), (3, 7), (8, 3), (8, 9), (12, 1), (12, 7)} |
| | P3(l, k) = | {(3, 4), (3, 10), (8, 0), (8, 6), (12, 4), (12, 10)} |
| (4) | P0(l, k) = | {(3, 0), (3, 6), (8, 3), (8, 9), (12, 0), (12, 6)} |
| | P1(l, k) = | {(3, 3), (3, 9), (8, 0), (8, 6), (12, 3), (12, 9)} |
| | P2(l, k) = | {(3, 1), (3, 7), (8, 4), (8, 10), (12, 1), (12, 7)} |
| | P3(l, k) = | {(3, 4), (3, 10), (8, 1), (8, 7), (12, 4), (12, 10)} |
| (5) | P0(l, k) = | {(3, 2), (3, 8), (8, 5), (8, 11), (12, 2), (12, 8)} |
| | P1(l, k) = | {(3, 5), (3, 11), (8, 2), (8, 8), (12, 5), (12, 11)} |
| | P2(l, k) = | {(3, 3), (3, 9), (8, 0), (8, 6), (12, 3), (12, 9)} |
| | P3(l, k) = | {(3, 0), (3, 6), (8, 3), (8, 9), (12, 0), (12, 6)} |

FIG. 79 illustrates a DRS pattern in which DRSs are multiplexed according to an FDM scheme for rank-4 transmission. In FIG. 79, P0 to P3 correspond respectively to positions of DRSs of the 1st to 4th layers in the case of rank-4 transmission. DRSs of the 1st to 4th layers may be arranged in 3 OFDM symbols. Although DRSs of the 1st to 4th layers are illustrated as being arranged in the 3rd, 8th, and 12th OFDM symbols in embodiments E-3-(1) to E-3-(5), a first pattern may be arranged in the 3rd or 5th OFDM symbol, a second pattern may be arranged in the 8th or 9th OFDM symbol, and a third pattern may be arranged in the 10th or 12th OFDM symbol.

In the embodiment E-3-(1), DRSs of the 1st to 4th layers are arranged in the 3rd, 8th, and 12th OFDM symbols. DRSs of the 1st to 4th layers, which are multiplexed according to an FDM scheme, are arranged at contiguous subcarrier positions in 2 groups in one OFDM symbol in which the DRSs are arranged. For example, DRSs P0 to P3 which are multiplexed according to an FDM scheme may be located at 0th to 3rd subcarriers and at 6th to 9th subcarriers in the 3rd OFDM symbol. DRSs of one layer are arranged at shifted positions in the frequency domain in a next OFDM symbol. Accordingly, DRSs of the 1st to 4th layers are sequentially arranged at the 3rd to 6th and 8th to 11th subcarrier positions in the 8th OFDM symbol and are sequentially arranged at the 5th to 8th, 10th, 11th, 0th, and 1st subcarrier positions in the 12th OFDM symbol.

The embodiment E-3-(2) is a modification of the embodiment E-3-(1), in which DRSs of one layer are arranged at shifted positions in the frequency domain in each OFDM symbol in which the DRSs are arranged.

In the embodiment E-3-(3), DRSs (P0 and P2) of the 1st and 3rd layers are arranged at contiguous subcarriers in one OFDM symbol and DRSs (P1 and P3) of the 2nd and 4th layers are arranged at contiguous subcarriers, which are spaced from the above contiguous subcarriers in the frequency domain, in the OFDM symbol. DRSs of one layer are arranged at shifted positions in the frequency domain in each OFDM symbol in which the DRSs are arranged.

The embodiments E-3-(4) and E-3-(5) are modifications of the embodiment E-3-(3), in which the subcarrier positions at which DRSs of one layer are arranged in one OFDM symbol are shifted.

Embodiment E-4

TABLE 43

| | | |
|---|---|---|
| (1) | P0(l, k) = | {(3, 0), (3, 6), (8, 2), (8, 8), (13, 4), (13, 10)} |
| | P1(l, k) = | {(3, 1), (3, 7), (8, 3), (8, 9), (13, 5), (13, 11)} |
| | P2(l, k) = | {(3, 2), (3, 8), (8, 4), (8, 10), (13, 0), (13, 6)} |
| | P3(l, k) = | {(3, 3), (3, 9), (8, 5), (8, 11), (13, 1), (13, 7)} |
| (2) | P0(l, k) = | {(3, 0), (3, 6), (8, 4), (8, 10), (13, 2), (13, 8)} |
| | P1(l, k) = | {(3, 1), (3, 7), (8, 5), (8, 11), (13, 3), (13, 9)} |
| | P2(l, k) = | {(3, 2), (3, 8), (8, 0), (8, 6), (13, 4), (13, 10)} |
| | P3(l, k) = | {(3, 3), (3, 9), (8, 1), (8, 7), (13, 5), (13, 11)} |
| (3) | P0(l, k) = | {(3, 0), (3, 6), (8, 2), (8, 8), (13, 0), (13, 6)} |
| | P1(l, k) = | {(3, 3), (3, 9), (8, 5), (8, 11), (13, 3), (13, 9)} |
| | P2(l, k) = | {(3, 1), (3, 7), (8, 3), (8, 9), (13, 1), (13, 7)} |
| | P3(l, k) = | {(3, 4), (3, 10), (8, 0), (8, 6), (13, 4), (13, 10)} |
| (4) | P0(l, k) = | {(3, 0), (3, 6), (8, 3), (8, 9), (13, 0), (13, 6)} |
| | P1(l, k) = | {(3, 3), (3, 9), (8, 0), (8, 6), (13, 3), (13, 9)} |
| | P2(l, k) = | {(3, 1), (3, 7), (8, 4), (8, 10), (13, 1), (13, 7)} |
| | P3(l, k) = | {(3, 4), (3, 10), (8, 1), (8, 7), (13, 4), (13, 10)} |
| (5) | P0(l, k) = | {(3, 2), (3, 8), (8, 5), (8, 11), (13, 2), (13, 8)} |
| | P1(l, k) = | {(3, 5), (3, 11), (8, 2), (8, 8), (13, 5), (13, 11)} |
| | P2(l, k) = | {(3, 3), (3, 9), (8, 0), (8, 6), (13, 3), (13, 9)} |
| | P3(l, k) = | {(3, 0), (3, 6), (8, 3), (8, 9), (13, 0), (13, 6)} |

Embodiments E-4-(1) to E-4-(5) shown in FIG. 80 are modifications of the embodiments E-1-(1) to E-1-(7), in which the pattern of the 12th OFDM symbol and the pattern of the 13th OFDM symbol are replaced with each other in the embodiments E-3-(1) to E-3-(5) of FIG. 79.

Embodiment E-5

TABLE 44

| | | |
|---|---|---|
| (1) | P(l, k) = | {(3, 1), (3, 5), (3, 9), (6, 1), (6, 5), (6, 9), (9, 1), (9, 5), (9, 9), (12, 1), (12, 5), (12, 9)} |
| | Ph(l, k) = | {(3, 2), (3, 6), (3, 10), (6, 2), (6, 6), (6, 10), (9, 2), (9, 6), (9, 10), (12, 2), (12, 6), (12, 10)} |
| (2) | P(l, k) = | {(3, 1), (3, 5), (3, 9), (6, 2), (6, 6), (6, 10), (9, 1), (9, 5), (9, 9), (12, 2), (12, 6), (12, 10)} |
| | Ph(l, k) = | {(3, 2), (3, 6), (3, 10), (6, 3), (6, 7), (6, 11), (9, 2), (9, 6), (9, 10), (12, 3), (12, 7), (12, 11)} |
| (3) | P(l, k) = | {(3, 0), (3, 4), (3, 8), (6, 3), (6, 7), (6, 11), (9, 0), (9, 4), (9, 8), (12, 3), (12, 7), (12, 11)} |
| | Ph(l, k) = | {(3, 1), (3, 5), (3, 9), (6, 0), (6, 4), (6, 8), (9, 1), (9, 5), (9, 9), (12, 0), (12, 4), (12, 8)} |
| (4) | P(l, k) = | {(3, 0), (3, 3), (3, 6), (3, 9), (8, 2), (8, 5), (8, 8), (8, 11), (12, 0), (12, 3), (12, 6), (12, 9)} |
| | Ph(l, k) = | {(3, 1), (3, 4), (3, 7), (3, 10), (8, 3), (8, 6), (8, 9), (12, 1), (12, 4), (12, 7)} |
| (5) | P(l, k) = | {(3, 0), (3, 3), (3, 6), (3, 9), (8, 0), (8, 3), (8, 6), (8, 9), (12, 0), (12, 3), (12, 6), (12, 9)} |
| | Ph(l, k) = | {(3, 1), (3, 4), (3, 7), (3, 10), (8, 1), (8, 4), (8, 7), (8, 10), (12, 1), (12, 4), (12, 7), (12, 10)} |
| (6) | P(l, k) = | {(3, 2), (3, 5), (3, 8), (3, 11), (8, 2), (8, 5), (8, 8), (8, 11), (12, 2), (12, 5), (12, 8), (12, 11)} |
| | Ph(l, k) = | {(3, 0), (3, 3), (3, 6), (3, 9), (8, 0), (8, 3), (8, 6), (8, 9), (12, 0), (12, 3), (12, 6), (12, 9)} |

Figure 81:
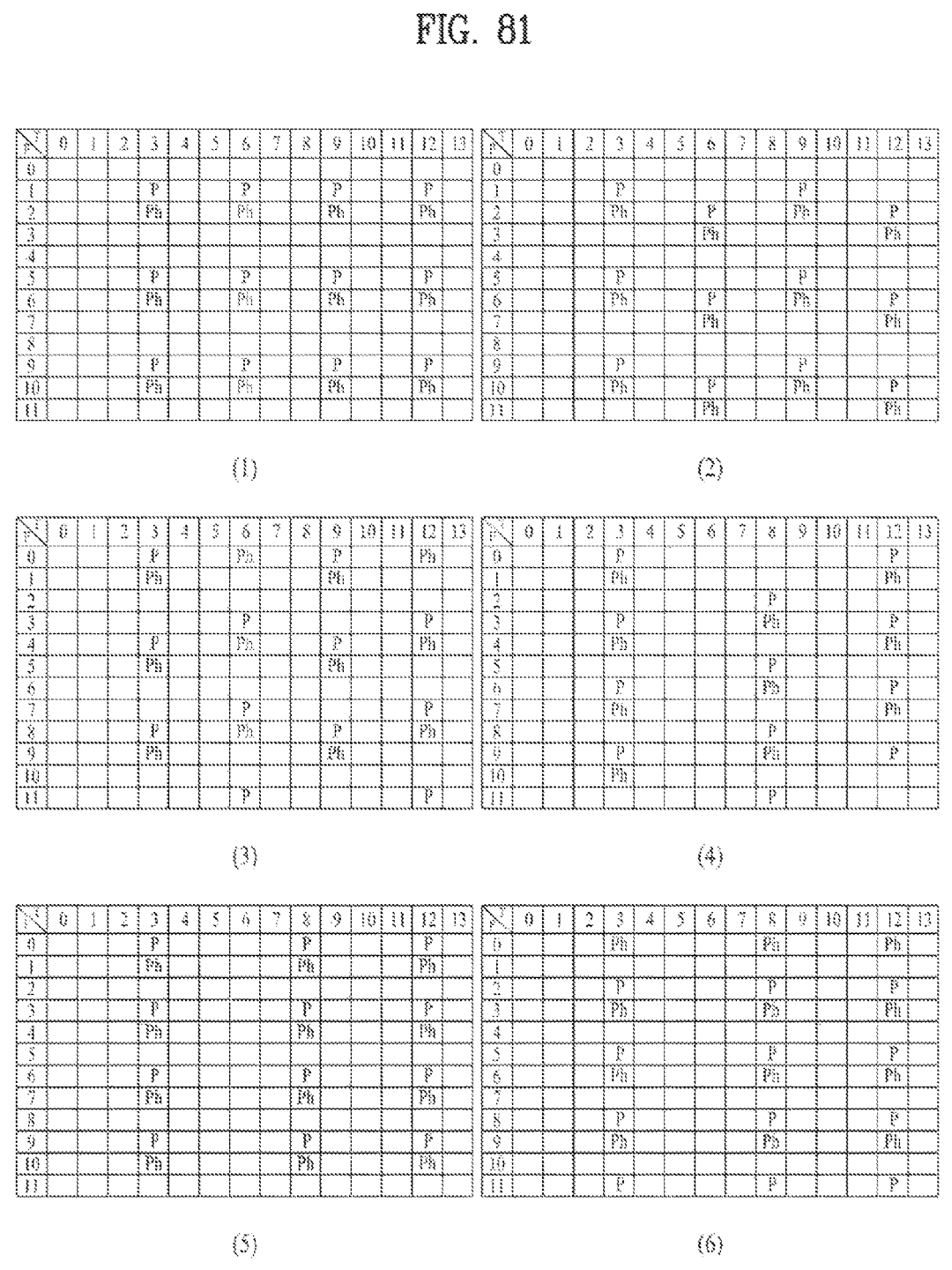

FIG. 81 illustrates DRS patterns defined for rank-4 or rank-8 transmission.

In the case of rank-4 transmission, P indicates that DRSs of 2 arbitrary layers (1st DRS group) among DRSs of the 1st to 4th layers have been multiplexed according to a CDM scheme. Ph indicates that DRSs of the 2 remaining layers (2nd DRS group), which are not included in the 1st DRS group P, have been multiplexed according to a CDM scheme. For example, P indicates that DRSs of the 1st and 2nd layers, which are multiplexed according to a CDM scheme, are arranged at one RE and Ph indicates that DRSs of the 3rd and 4th layers, which are multiplexed according to a CDM scheme, are arranged at one RE.

In the case of rank-8 transmission, P indicates that DRSs of 4 arbitrary layers (1st DRS group) among DRSs of the 1st to 8th layers have been multiplexed according to a CDM scheme. Ph indicates that DRSs of the 4 remaining layers (2nd DRS group), which are not included in the 1st DRS group P, have been multiplexed according to a CDM scheme. For example, P indicates that DRSs of the 1st to 4th layers, which are multiplexed according to a CDM scheme, are arranged at one RE and Ph indicates that DRSs of the 5th to 8th layers, which are multiplexed according to a CDM scheme, are arranged at one RE.

Although DRSs are illustrated as being arranged in the 3rd, 6th, 9th, and 12th OFDM symbols in the embodiments E-5-(1) to E-5-(3), a first pattern may be arranged in the 3rd OFDM symbol, a second pattern may be arranged in the 5th or 6th OFDM symbol, a third pattern may be arranged in the 8th or 9th OFDM symbol, and a fourth pattern may be arranged in 10th or 12th OFDM symbol.

In the embodiment E-5-(1), 3 DRS groups P and 3 DRS groups Ph are arranged in one OFDM symbol. The 3 DRS groups P are arranged at intervals of 4 subcarriers and the 3 DRS groups Ph are also arranged at intervals of 4 subcarriers. The DRS groups P and Ph are arranged at contiguous subcarrier positions in one OFDM symbol. The DRS groups P and Ph are arranged at the same frequency-domain positions in the 4 OFDM symbols in which the DRSs are arranged.

The embodiments E-5-(2) and E-5-(3) are modifications of the embodiment E-5-(1), in which frequency-domain positions at which DRS groups P and Ph are arranged in one OFDM symbol are shifted in another OFDM symbol.

Although DRSs are illustrated as being arranged in the 3rd, 8th, and 12th OFDM symbols in the embodiments E-5-(4) to E-5-(6), a first pattern may be arranged in the 3rd or 5th OFDM symbol, a second pattern may be arranged in the 8th or 9th OFDM symbol, and a third pattern may be arranged in 10th or 12th OFDM symbol.

In the embodiment E-5-(4), 4 DRS groups P and 4 DRS groups Ph are arranged in one OFDM symbol. The 4 DRS groups P are arranged at intervals of 3 subcarriers and the 4 DRS groups Ph are also arranged at intervals of 3 subcarriers. The DRS groups P and Ph are arranged at contiguous subcarrier positions in one OFDM symbol. The DRS groups P and Ph are arranged at different (or shifted) frequency-domain positions in the 3 OFDM symbols in which the DRSs are arranged.

The embodiments E-5-(5) and E-5-(6) are modifications of the embodiment E-5-(4), in which frequency-domain positions at which DRS groups P and Ph are set to be arranged at the same frequency-domain positions in the 3 OFDM symbols in which the DRSs are arranged.

Embodiment E-6

TABLE 45

| | | |
|---|---|---|
| (1) | P(l, k) = | {(3, 1), (3, 5), (3, 9), (6, 1), (6, 5), (6, 9), (9, 1), (9, 5), (9, 9), (13, 1), (13, 5), (13, 9)} |
| | Ph(l, k) = | {(3, 2), (3, 6), (3, 10), (6, 2), (6, 6), (6, 10), (9, 2), (9, 6), (9, 10), (13, 2), (13, 6), (13, 10)} |

TABLE 45-continued

| | |
|---|---|
| (2) P(l, k) = | {(3, 1), (3, 5), (3, 9), (6, 2), (6, 6), (6, 10), (9, 1), (9, 5), (9, 9), (13, 2), (13, 6), (13, 10)} |
| Ph(l, k) = | {(3, 2), (3, 6), (3, 10), (6, 3), (6, 7), (6, 11), (9, 2), (9, 6), (9, 10), (13, 3), (13, 7), (13, 11)} |
| (3) P(l, k) = | {(3, 0), (3, 4), (3, 8), (6, 3), (6, 7), (6, 11), (9, 0), (9, 4), (9, 8), (13, 3), (13, 7), (13, 11)} |
| Ph(l, k) = | {(3, 1), (3, 5), (3, 9), (6, 0), (6, 4), (6, 8), (9, 1), (9, 5), (9, 9), (13, 0), (13, 4), (13, 8)} |
| (4) P(l, k) = | {(3, 0), (3, 3), (3, 6), (3, 9), (8, 2), (8, 5), (8, 8), ((8, 11), (13, 0), 13, 3), (13, 6), (13, 9)} |
| Ph(l, k) = | {(3, 1), (3, 4), (3, 7), (3, 10), (8, 3), (8, 6), (8, 9), (13, 1), (13, 4), (13, 7)} |
| (5) P(l, k) = | {(3, 0), (3, 3), (3, 6), (3, 9), (8, 0), (8, 3), (8, 6), (8, 9), (13, 0), (13, 3), (13, 6), (13, 9)} |
| Ph(l, k) = | {(3, 1), (3, 4), (3, 7), (3, 10), (8, 1), (8, 4), (8, 7), (8, 10), (13, 1), (13, 4), (13, 7), (13, 10)} |
| (6) P(l, k) = | {(3, 2), (3, 5), (3, 8), (3, 11), (8, 2), (8, 5), (8, 8), (8, 11), (13, 2), (13, 5), (13, 8), (13, 11)} |
| Ph(l, k) = | {(3, 0), (3, 3), (3, 6), (3, 9), (8, 0), (8, 3), (8, 6), (8, 9), (13, 0), (13, 3), (13, 6), (13, 9)} |

Embodiments E-6-(1) to E-6-(6) shown in FIG. 82 are modifications of the embodiments E-1-(1) to E-1-(7), in which the pattern of the 12th OFDM symbol and the pattern of the 13th OFDM symbol are replaced with each other in the embodiments E-5-(1) to E-5-(6) of FIG. 81.

Figure 83:
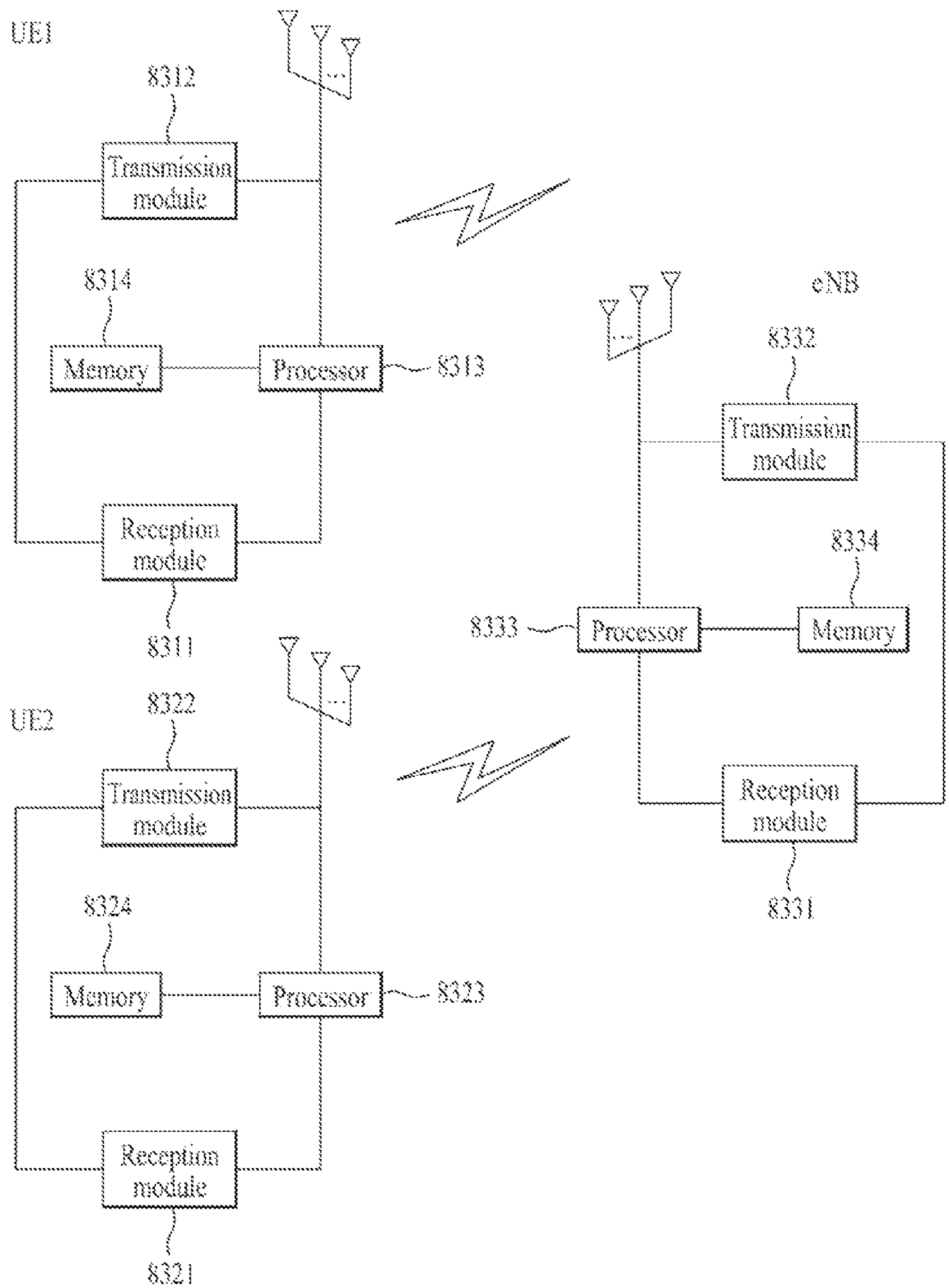
FIG. 83 illustrates a configuration of a preferred embodiment of a wireless communication system including UE apparatuses and an eNB apparatus according to the present invention.

FIG. 83 illustrates a configuration of a preferred embodiment of a wireless communication system including UE apparatuses and an eNB (or base station) apparatus according to the present invention.

As shown in FIG. 83, apparatuses of UEs (UE1 and UE2) may include reception modules 8311 and 8321, transmission modules 8312 and 8322, processors 8313 and 8323, and memories 8314 and 8324. The reception modules 8311 and 8321 may receive a variety of signals, data, information, or the like from the eNB. The transmission modules 8312 and 8322 may transmit a variety of signals, data, information, or the like to the eNB and the like.

The processors 8313 and 8323 may receive data of 8 layers or less through a data region of a downlink subframe through the reception modules 8311 and 8321. The processors 8313 and 8323 may also control the reception modules 8311 and 8321 to receive RSs of 8 layers or less through a specific OFDM symbol in a downlink subframe and may control the UEs to perform channel estimation to modulate the data of 8 layers or less using RSs received by the UEs. RSs of 8 layers or less may be divided into a first group and a second group and RSs of the first and second groups may be multiplexed according to a Code Division Multiplexing (CDM) scheme at one RE.

The processors 8313 and 8323 may also perform a function to perform arithmetic processing on information received by the UE apparatuses, information to be transmitted to the outside, and the like. The memories 8314 and 8324 may store the processed information or the like for a specific time and may be replaced with a component such as a buffer (not shown).

The eNB apparatus may include a reception module 8331, a transmission module 8332, a processor 8333, and a memory 8334. The reception module 8331 may receive a variety of signals, data, information, or the like from the UEs and the like. The transmission module 8332 may transmit a variety of signals, data, information, or the like to the UEs and the like.

The processor 8333 may transmit data of 8 layers or less through a data region of a downlink subframe through the transmission module 8332. The processor 8333 may also control the transmission module 8332 to transmit RSs of 8 layers or less through a specific OFDM symbol in a downlink subframe. The RSs are DRSs for modulating the data of 8 layers or less. The RSs of 8 layers or less may be divided into a first group and a second group and RSs of the first and second groups may be multiplexed according to a Code Division Multiplexing (CDM) scheme at one RE.

The processor 8333 may also perform a function to perform arithmetic processing on information received by the UE apparatuses, information to be transmitted to the outside, and the like. The memory 8334 may store the processed information or the like for a specific time and may be replaced with a component such as a buffer (not shown).

The embodiments of the present invention may be implemented by various means. For example, the embodiments of the present invention may be implemented by hardware, firmware, software, or any combination thereof.

In the case where the present invention is implemented by hardware, the methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the methods according to the embodiments of the present invention may be implemented in the form of modules, processes, functions, or the like which perform the features or operations described below. Software code can be stored in a memory unit so as to be executed by a processor. The memory unit may be located inside or outside the processor and can communicate data with the processor through a variety of known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the scope of the invention. For example, those skilled in the art may use the components of the embodiments described above in combination. Accordingly, the invention should not be limited to the specific embodiments described herein, but should be accorded the broadest scope consistent with the principles and novel features disclosed herein.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. The invention should not be limited to the specific embodiments described herein, but should be accorded the broadest scope consistent with the principles and novel features disclosed herein. Claims which are not explicitly dependent on each other can be combined to provide an embodiment or new claims can be added through amendment after this application is filed.

INDUSTRIAL APPLICABILITY

The methods and apparatuses for transmitting downlink RSs according to the embodiments of the present invention is applicable to mobile communication systems or wireless communication industries.

The invention claimed is:

1. A method for a base station transmitting a reference signal to a user equipment using 8 layers or less, the method comprising:

transmitting data of the 8 layers or less through a data region of a downlink subframe that comprises 14 Orthogonal Frequency Division Multiplexing (OFDM) symbols; and transmitting Dedicated Reference Signals (DRSs) of the 8 layers or less in a specific OFDM symbol of the downlink subframe, wherein the DRSs of the 8 layers or less are divided into first and second groups, wherein the DRSs of the first and second groups are multiplexed according to a Code Division Multiplexing (CDM) scheme at each resource element, wherein the DRSs of the first and second groups are arranged at intervals of M subcarriers in a $10^{th}$ OFDM symbol and a $12^{th}$ OFDM symbol in the downlink subframe, and wherein M is an integer equal to or greater than 4.

2. The method according to claim 1, wherein the DRSs of the first and second groups are arranged at the same frequency-domain positions in each OFDM symbol in which the DRSs are arranged.

3. The method according to claim 1, wherein frequency-domain positions of the DRSs of the first and second groups are shifted in each OFDM symbol in which the DRSs are arranged.

4. A method for a user equipment processing a reference signal received from a base station using 8 layers or less, the method comprising:

receiving data of the 8 layers or less through a data region of a downlink subframe that comprises 14 Orthogonal Frequency Division Multiplexing (OFDM) symbols;

receiving Dedicated Reference Signals (DRSs) of the 8 layers or less in a specific OFDM symbol of the downlink subframe; and performing channel estimation for demodulating data of the 8 layers or less using the received DRSs, wherein the DRSs of the 8 layers or less are divided into first and second groups, wherein the DRSs of the first and second groups are multiplexed according to a Code Division Multiplexing (CDM) scheme at each resource element, wherein the DRSs of the first and second groups are arranged at cqual intervals of M subcarriers in a $10^{th}$ OFDM symbol and a $12^{th}$ OFDM symbol in the downlink subframe, and wherein M is an integer equal to or greater than 4.

5. The method according to claim 4, wherein the DRSs of the first and second groups are arranged at the same frequency-domain positions in each OFDM symbol in which the DRSs are arranged.

6. The method according to claim 4, wherein frequency-domain positions of the DRSs of the first and second groups are shifted in each OFDM symbol in which the DRSs are arranged.

7. A base station (BS) for transmitting a reference signal to a user equipment UE) using 8 layers or less, the BS comprising:

a reception module for receiving an uplink signal from the UE;

a transmission module for transmitting a downlink signal to the UE; and a processor connected to the reception module and the transmission module for controlling transmission module to transmit data of the 8 layers or less through a data region of a downlink subframe, the downlink subframe comprising 14 Orthogonal Frequency Division Multiplexing (OFDM) symbols, and to transmit Dedicated Reference Signals (DRSs) of the 8 layers or less in a specific OFDM symbol of the downlink subframe, wherein the DRSs of the 8 layers or less are divided into first and second groups, wherein the DRSs of the first and second groups are multiplexed according to a Code Division Multiplexing (CDM) scheme at each resource element, wherein the DRSs of the first and second groups are arranged at intervals of M subcarriers in a $10^{th}$ OFDM symbol and a $12^{th}$ OFDM symbol in the downlink subframe, and wherein M is an integer equal to or greater than 4.

8. A user equipment (UE) for processing a reference signal received from a base station (BS) using 8 layers or less, the UE comprising:

a reception module for receiving control information and data from the BS;

a transmission module for transmitting control information and data to the BS; and a processor connected to the reception module and the transmission module for controlling the reception module to receive data of the 8 layers or less through a data region of a downlink subframe, the downlink subframe comprising 14 Orthogonal Frequency Division Multiplexing (OFDM) symbols, and to receive Dedicated Reference Signals (DRSs)of the 8 layers or less in a specific OFDM symbol of the downlink subframe, wherein the DRSs of the 8 layers or less are divided into first and second groups, wherein the DRSs of the first and second groups are multiplexed according to a Code Division Multiplexing (CDM) scheme at each resource element, wherein the DRSs of the first and second groups are arranged at cqual intervals of M subcarriers in a $10^{th}$ OFDM symbol and a $12^{th}$ OFDM symbol in the downlink subframe, and wherein M is an integer equal to or greater than 4.

9. The method according to claim 7, wherein the DRSs of the first and second groups are arranged at the same frequency-domain positions in each OFDM symbol in which the DRSs are arranged.

10. The method according to claim 7, wherein frequency-domain positions of the DRSs of the first and second groups are shifted in each OFDM symbol in which the DRSs are arranged.

11. The method according to claim 8, wherein the DRSs of the first and second groups are arranged at the same frequency-domain positions in each OFDM symbol in which the DRSs are arranged.

12. The method according to claim 8, wherein frequency-domain positions of the DRSs of the first and second groups are shifted in each OFDM symbol in which the DRSs are arranged.

* * * * *